(12) United States Patent
Yeoh

(10) Patent No.: US 12,552,091 B2
(45) Date of Patent: Feb. 17, 2026

(54) ADDITIVE MANUFACTURING SYSTEM USING INTERLINKED REPEATING SUBUNITS

(71) Applicant: Ivan Li Chuen Yeoh, Wesley Chapel, FL (US)

(72) Inventor: Ivan Li Chuen Yeoh, Wesley Chapel, FL (US)

( * ) Notice: Subject to any disclaimer, the term of this patent is extended or adjusted under 35 U.S.C. 154(b) by 0 days.

(21) Appl. No.: 18/650,895

(22) Filed: Apr. 30, 2024

(65) Prior Publication Data

US 2024/0286342 A1  Aug. 29, 2024

Related U.S. Application Data

(60) Division of application No. 16/947,197, filed on Jul. 22, 2020, now Pat. No. 11,999,100, which is a
(Continued)

(51) Int. Cl.
| | |
|---|---|
| *B29C 64/00* | (2017.01) |
| *B22F 12/50* | (2021.01) |
| *B28B 1/00* | (2006.01) |
| *B29C 64/141* | (2017.01) |
| *B29C 64/20* | (2017.01) |
| *B29C 70/22* | (2006.01) |

(Continued)

(52) U.S. Cl.
CPC ............ *B29C 64/141* (2017.08); *B22F 12/50* (2021.01); *B28B 1/001* (2013.01); *B29C 64/20* (2017.08); *B29C 70/222* (2013.01); *B29C 70/382* (2013.01); *B29C 70/388* (2013.01); *B33Y 10/00* (2014.12); *B33Y 30/00* (2014.12); *B33Y 70/00* (2014.12); *B22F 10/18* (2021.01); *B22F 10/62* (2021.01); *B22F 10/64* (2021.01); *B22F 10/66* (2021.01); *B22F 10/80* (2021.01); *B22F 12/13* (2021.01); *B22F 12/222* (2021.01); *B22F 12/90* (2021.01)

(58) Field of Classification Search
CPC ............................ B29C 64/141; B33Y 10/00
See application file for complete search history.

(56) References Cited

U.S. PATENT DOCUMENTS 5,987,929 A * 11/1999 Bostani .................. D04B 35/00
66/1 R \* cited by examiner

*Primary Examiner* — Nicholas Krasnow
(74) *Attorney, Agent, or Firm* — Andrew Behrens; Trenam Law

(57) ABSTRACT

Described herein relates to an additive manufacturing system and an input material that overcomes that need to heat and extrude solidifying materials to create a three-dimensional structure. The system arranges subunits of the input material into repeating, interlinked subunits that can be arranged to manufacture a three-dimensional structure that is flexible but also has sufficient structural integrity to retain a desired shape during the additive manufacturing process or post-manufacturing usage. During the additive manufacturing process, the flexible input material can be manipulated and reformed to match the shape and structure of a target three-dimensional structure, upon which the manufactured three-dimensional structure is based. As elongated units of the input material are received by the additive manufacturing machine, the machine assembles the input material into the interlinked, repeating subunits, thereby removing the need to heat and extrude an input material to create a structure.

15 Claims, 84 Drawing Sheets

Related U.S. Application Data continuation-in-part of application No. PCT/US2019/023889, filed on Mar. 25, 2019, which is a continuation of application No. 16/270,253, filed on Feb. 7, 2019, now Pat. No. 11,173,656.

(60) Provisional application No. 62/876,989, filed on Jul. 22, 2019, provisional application No. 62/651,731, filed on Apr. 3, 2018.

(51) Int. Cl.
| | |
|---|---|
| *B29C 70/38* | (2006.01) |
| *B33Y 10/00* | (2015.01) |
| *B33Y 30/00* | (2015.01) |
| *B33Y 70/00* | (2020.01) |
| *B22F 10/18* | (2021.01) |
| *B22F 10/62* | (2021.01) |
| *B22F 10/64* | (2021.01) |
| *B22F 10/66* | (2021.01) |
| *B22F 10/80* | (2021.01) |
| *B22F 12/00* | (2021.01) |
| *B22F 12/13* | (2021.01) |
| *B22F 12/90* | (2021.01) |

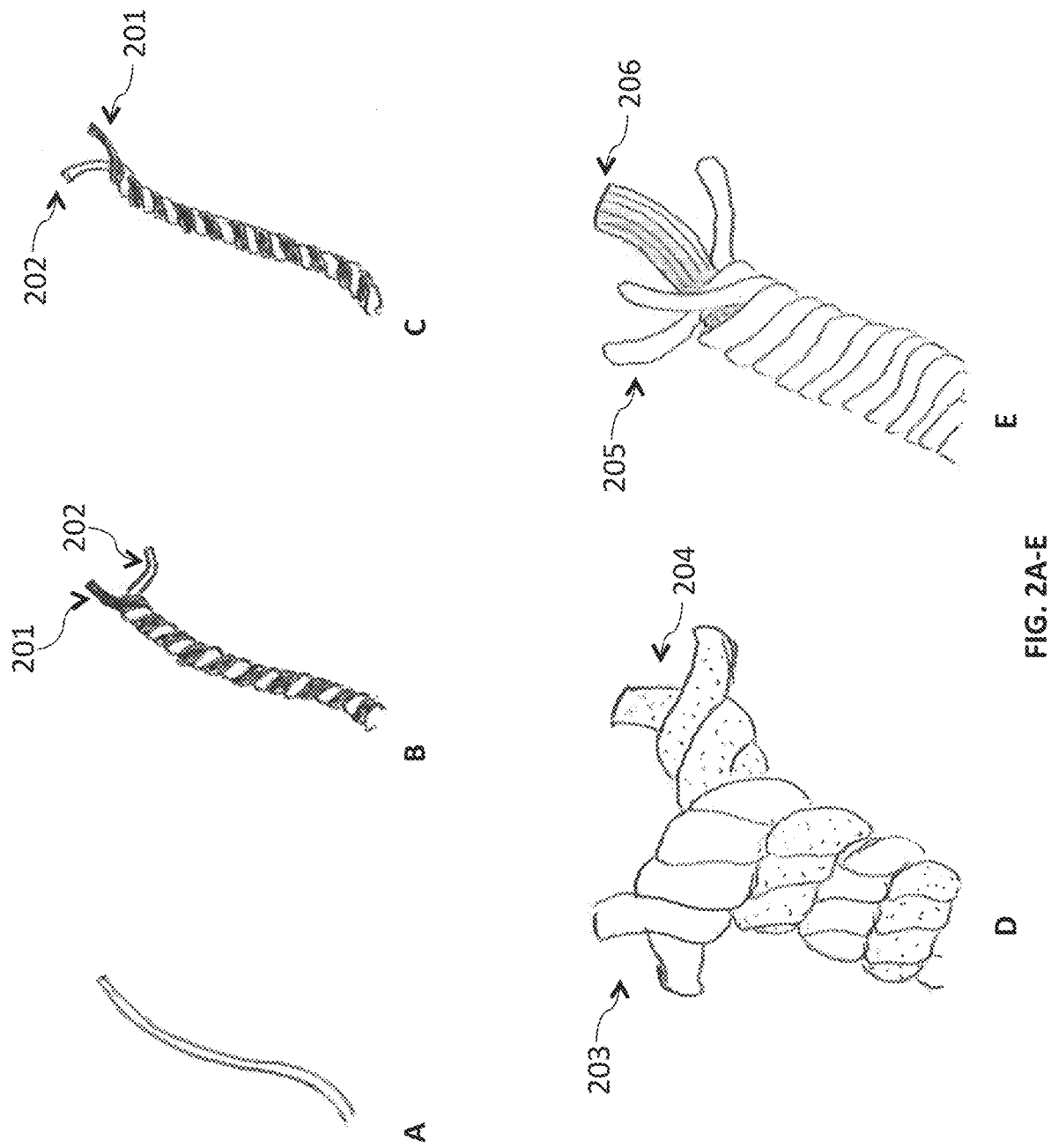
FIG. 2A-E

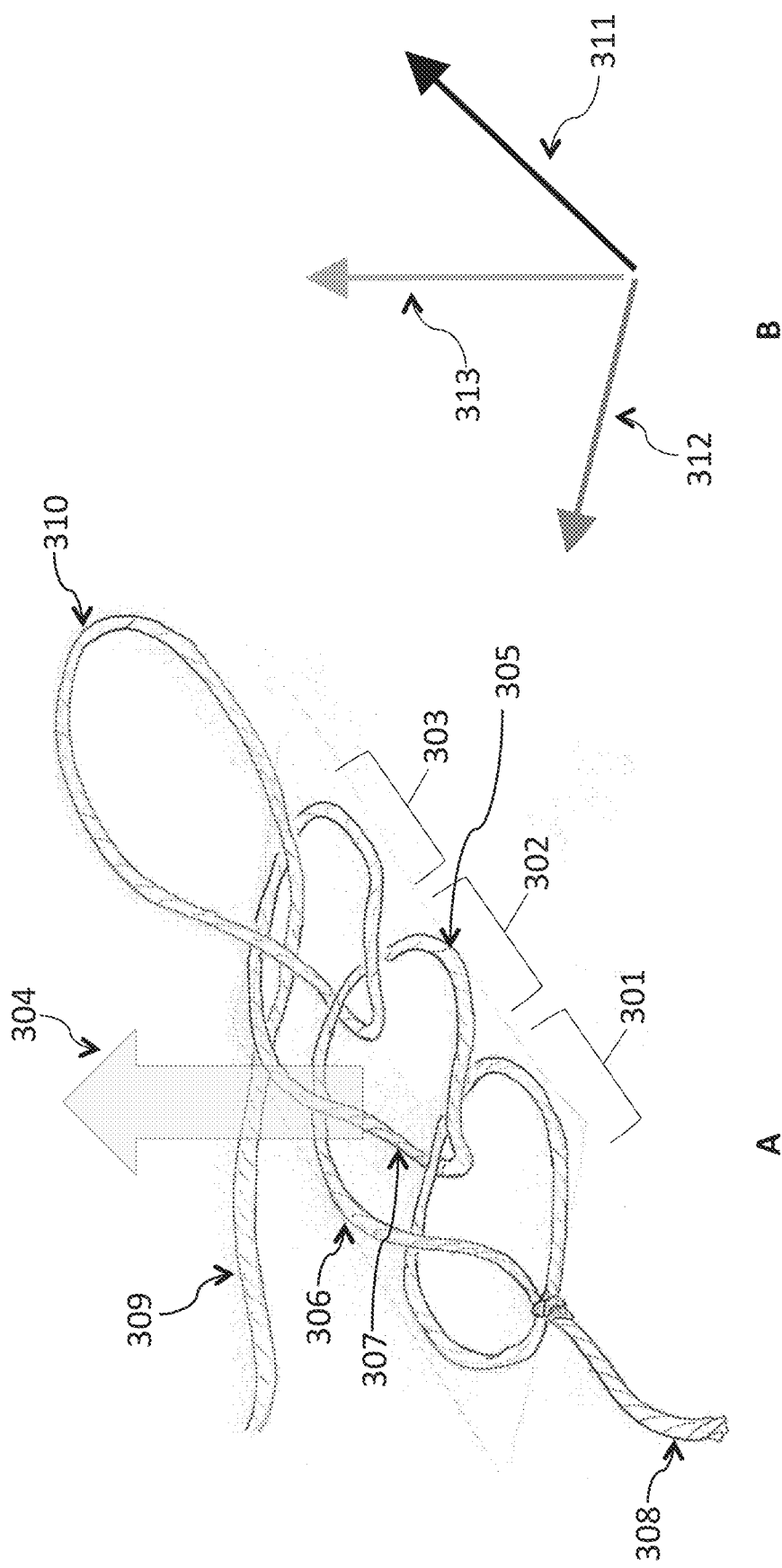
FIG. 3A-B

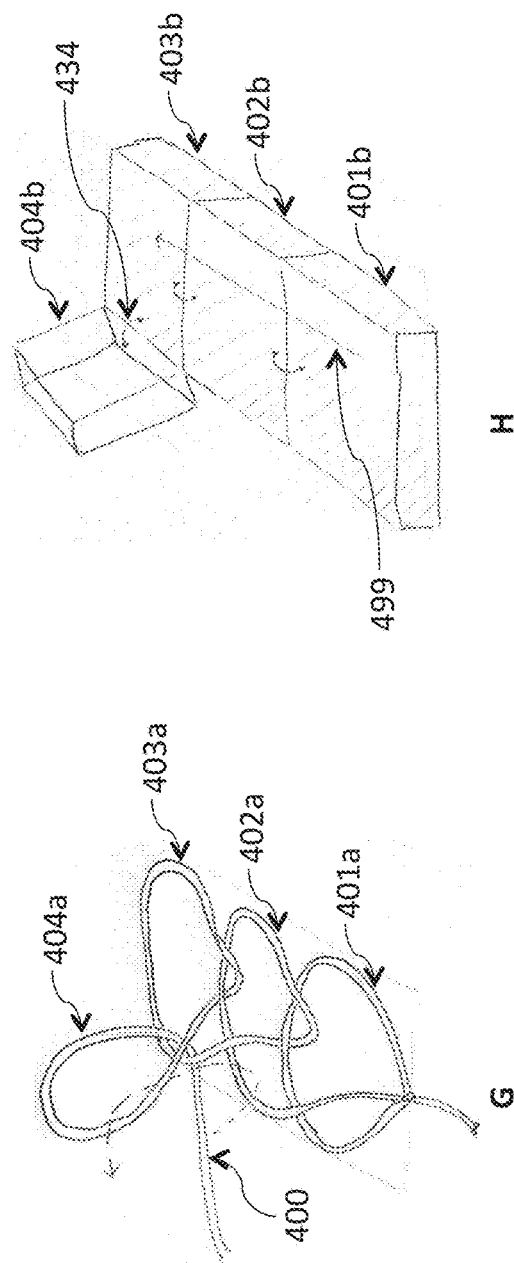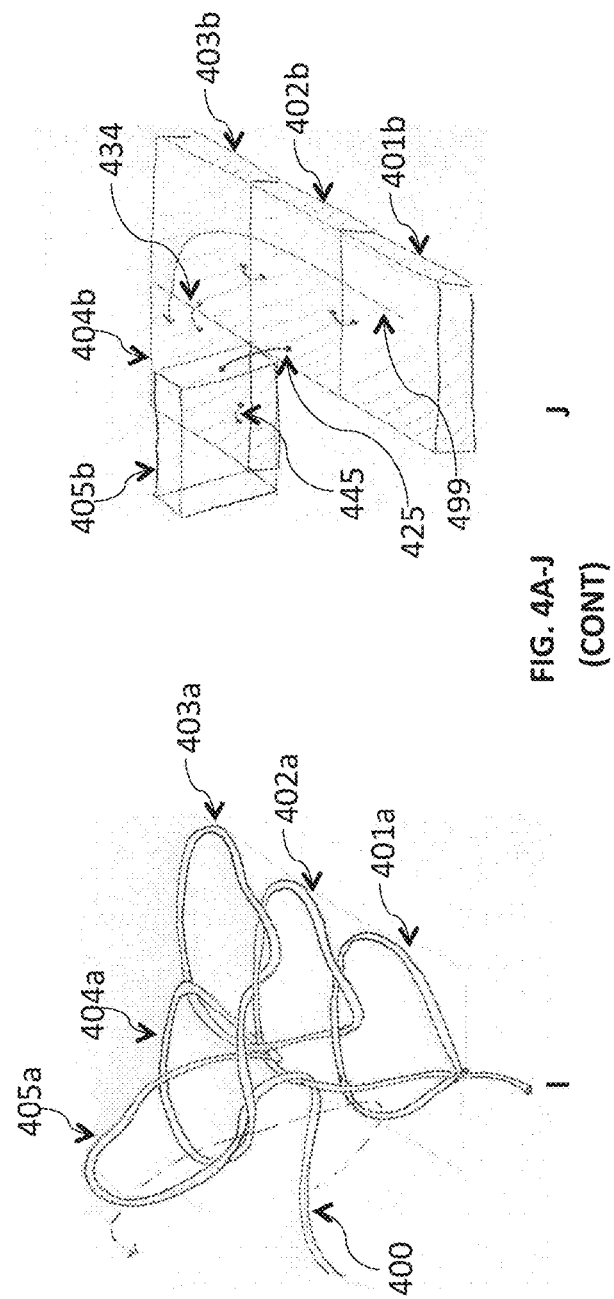
FIG. 4A-J (CONT)

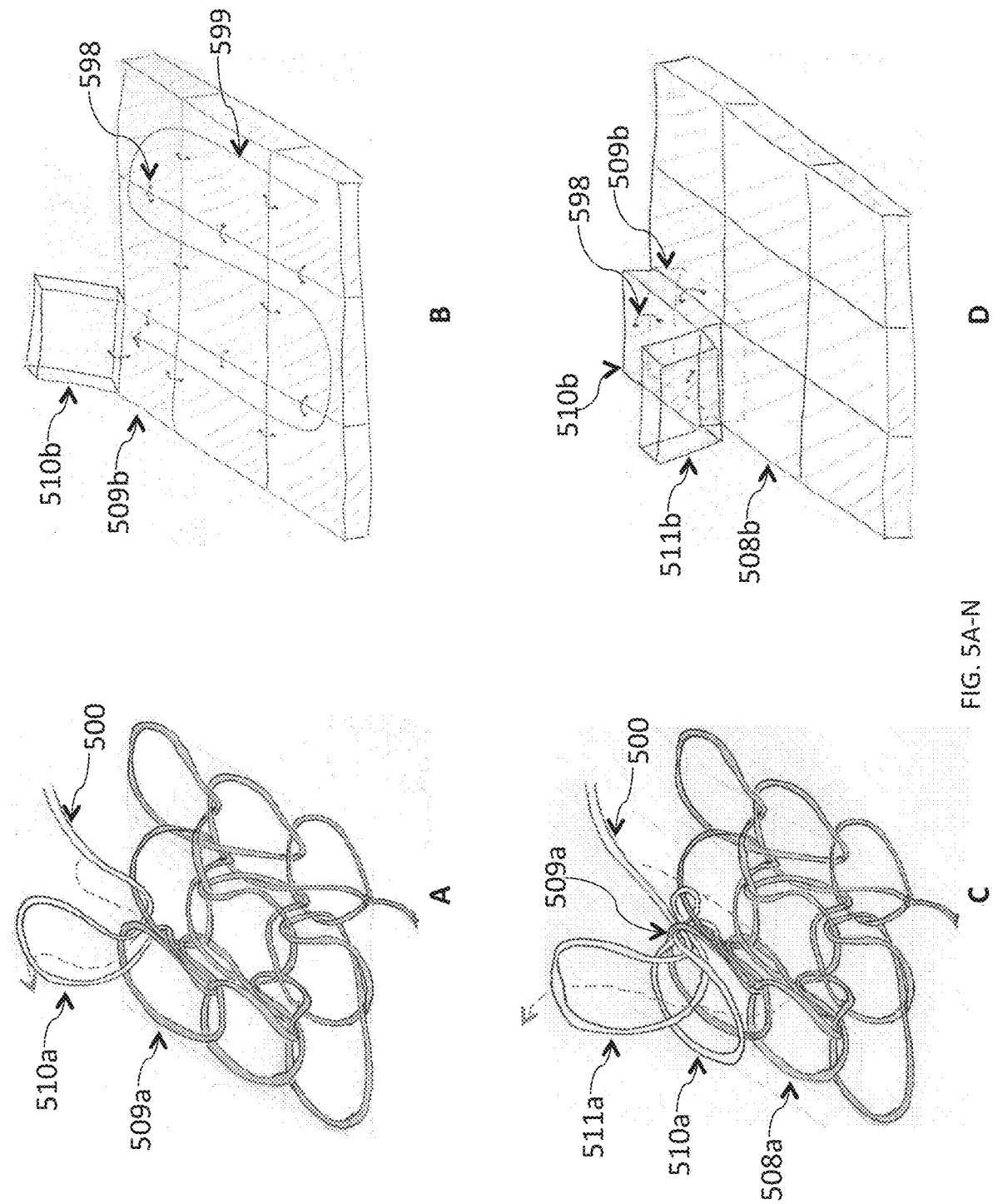
FIG. 5A-N

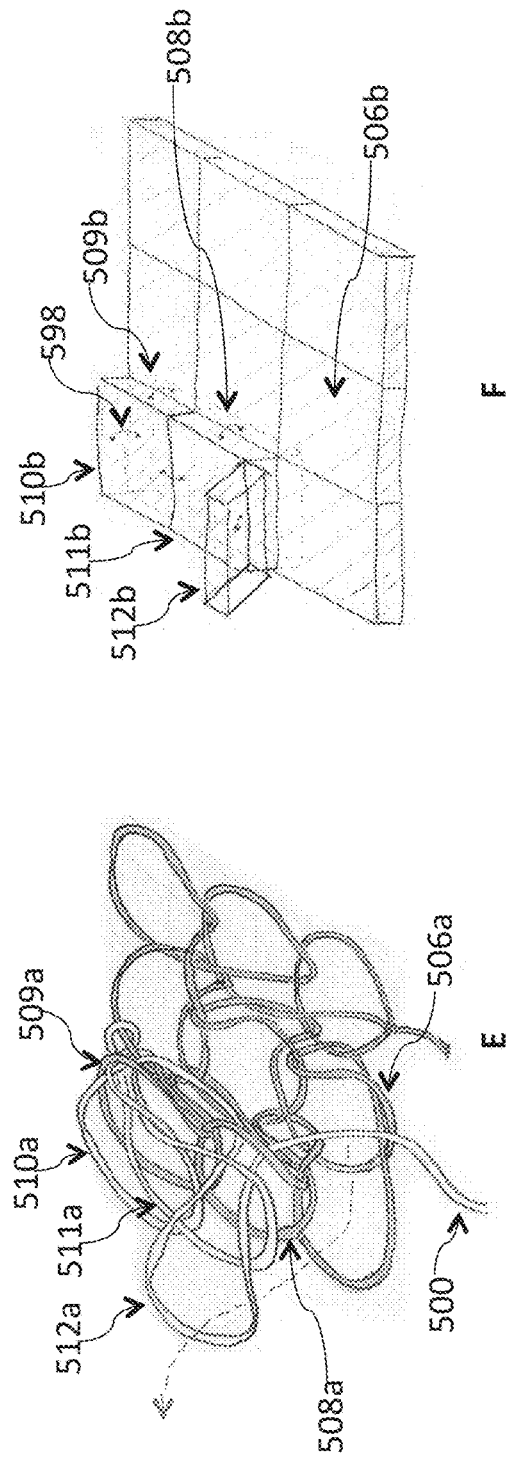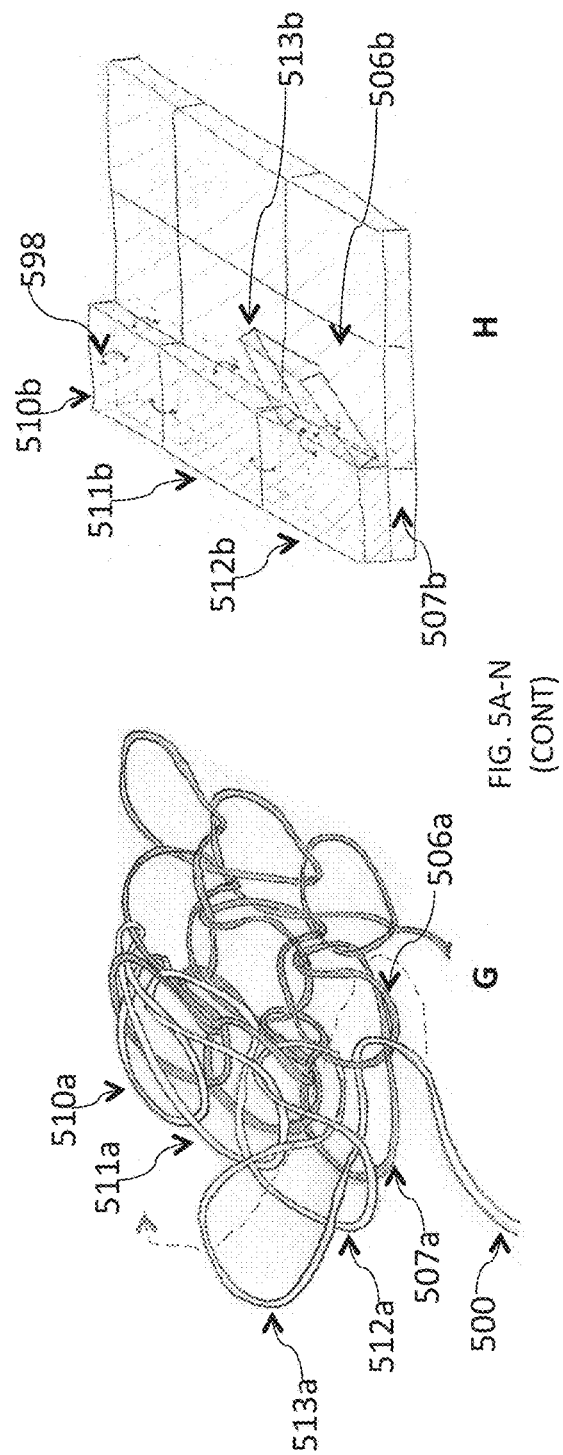
FIG. 5A-N (CONT)

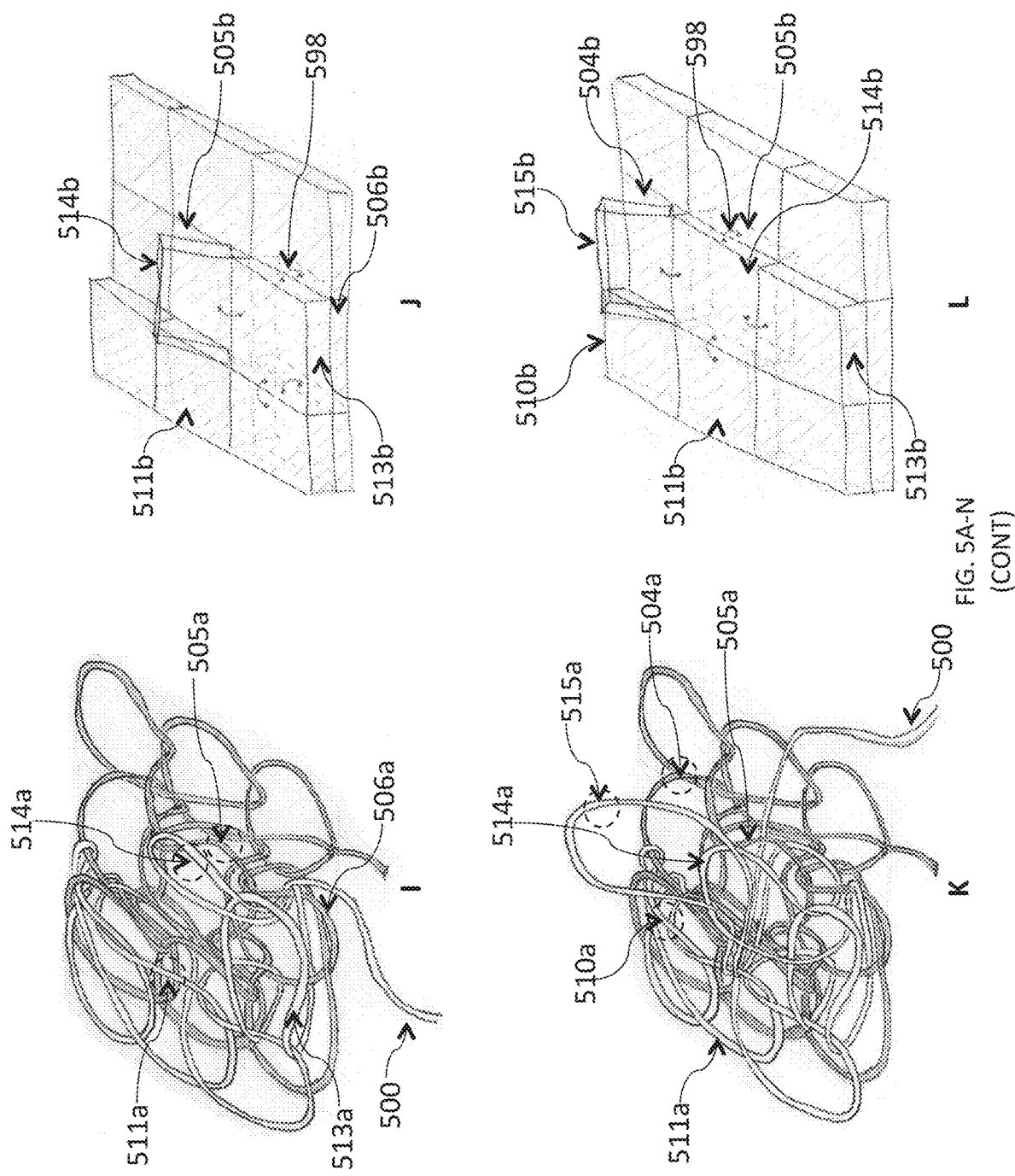
FIG. 5A-N (CONT)

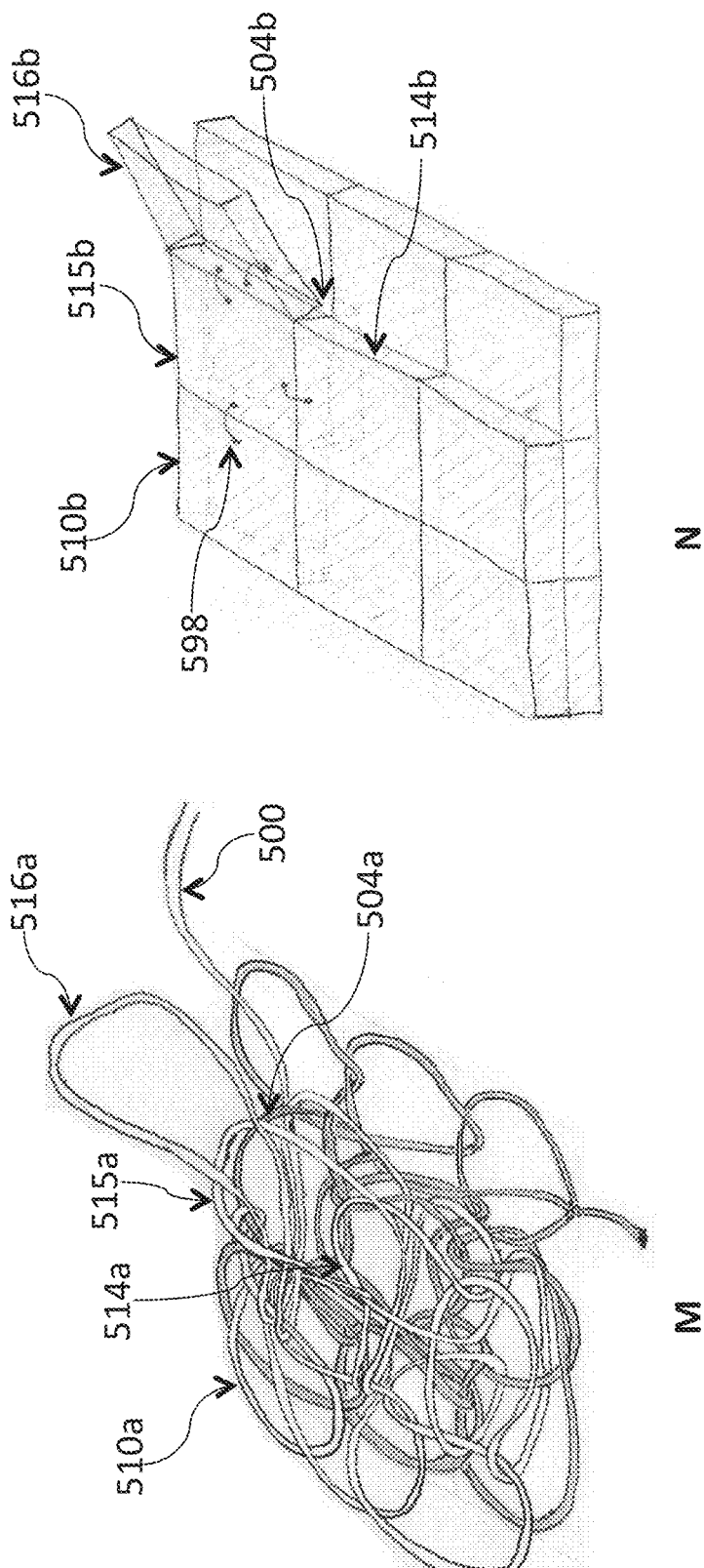
FIG. 5A-N (CONT)

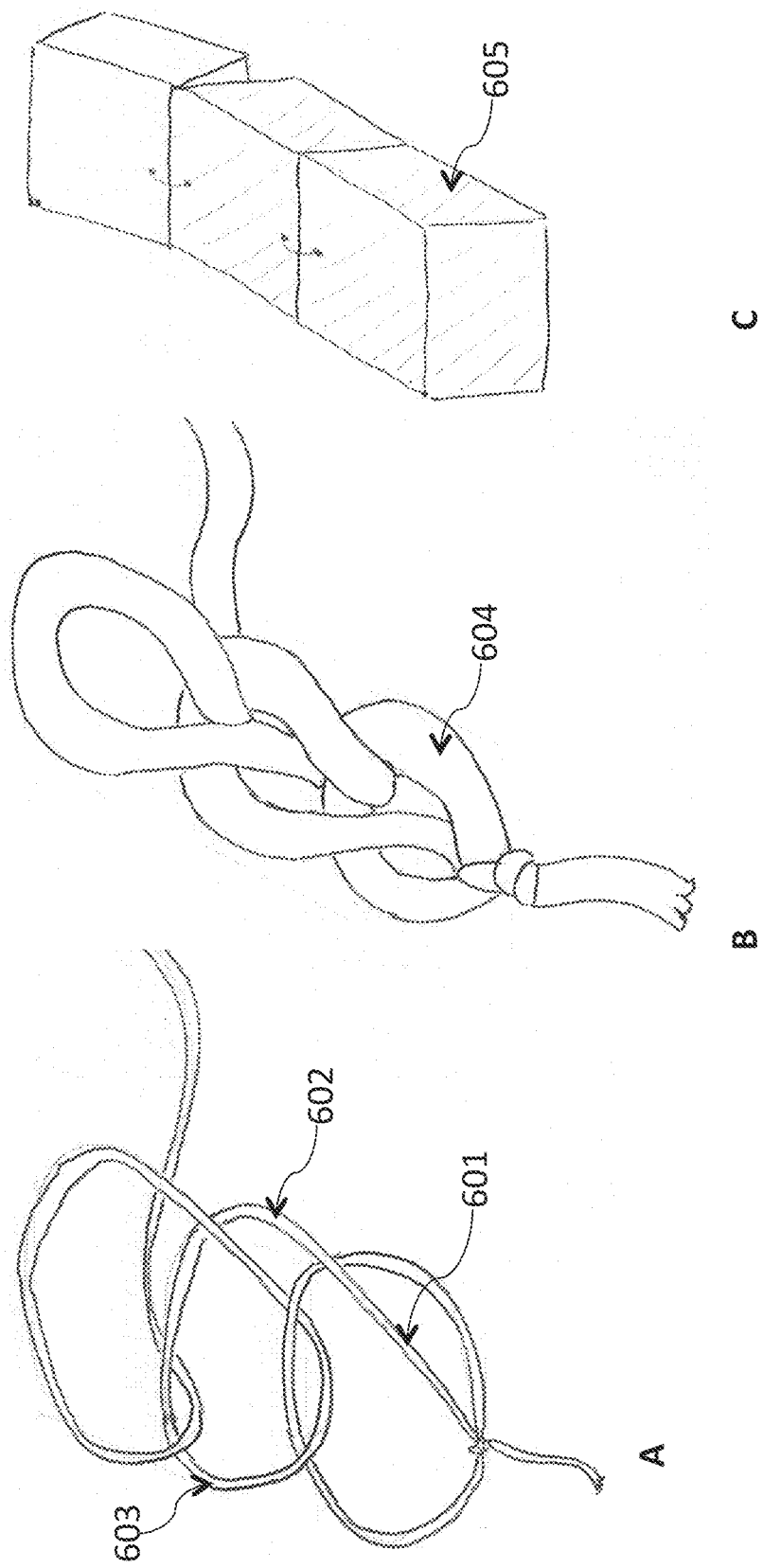
FIG. 6A-C

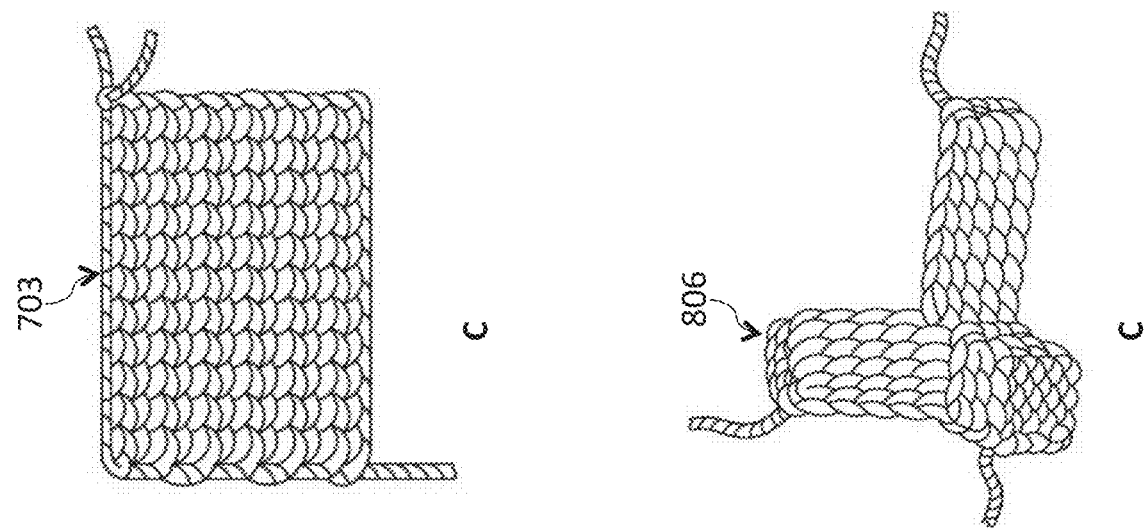
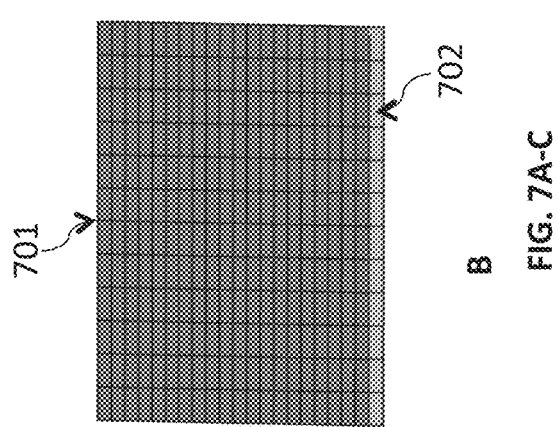
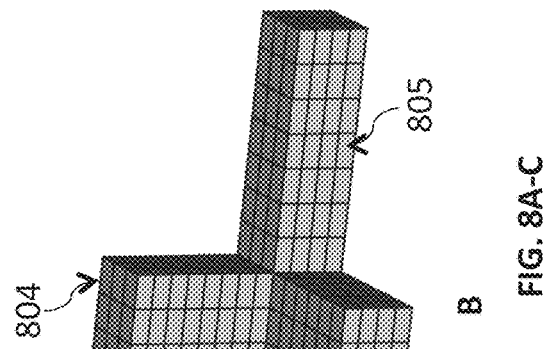
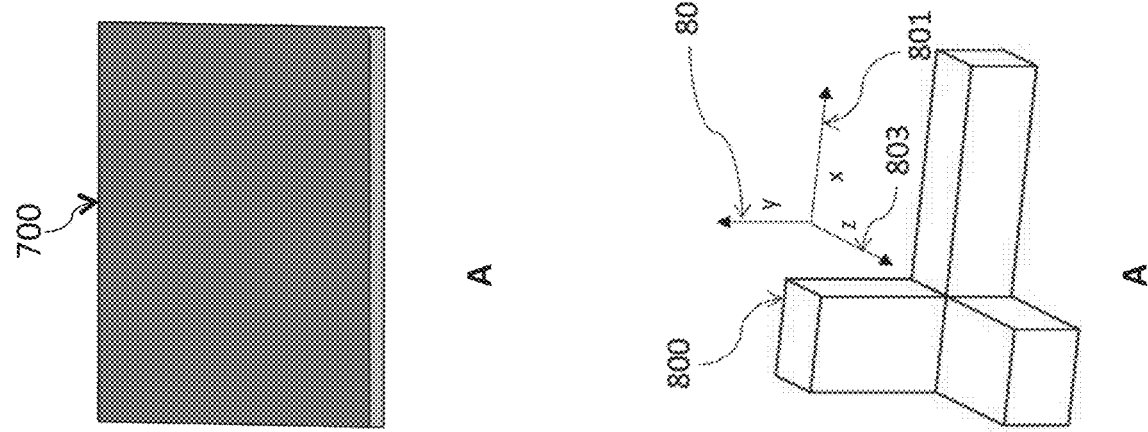
FIG. 7A-C
FIG. 8A-C

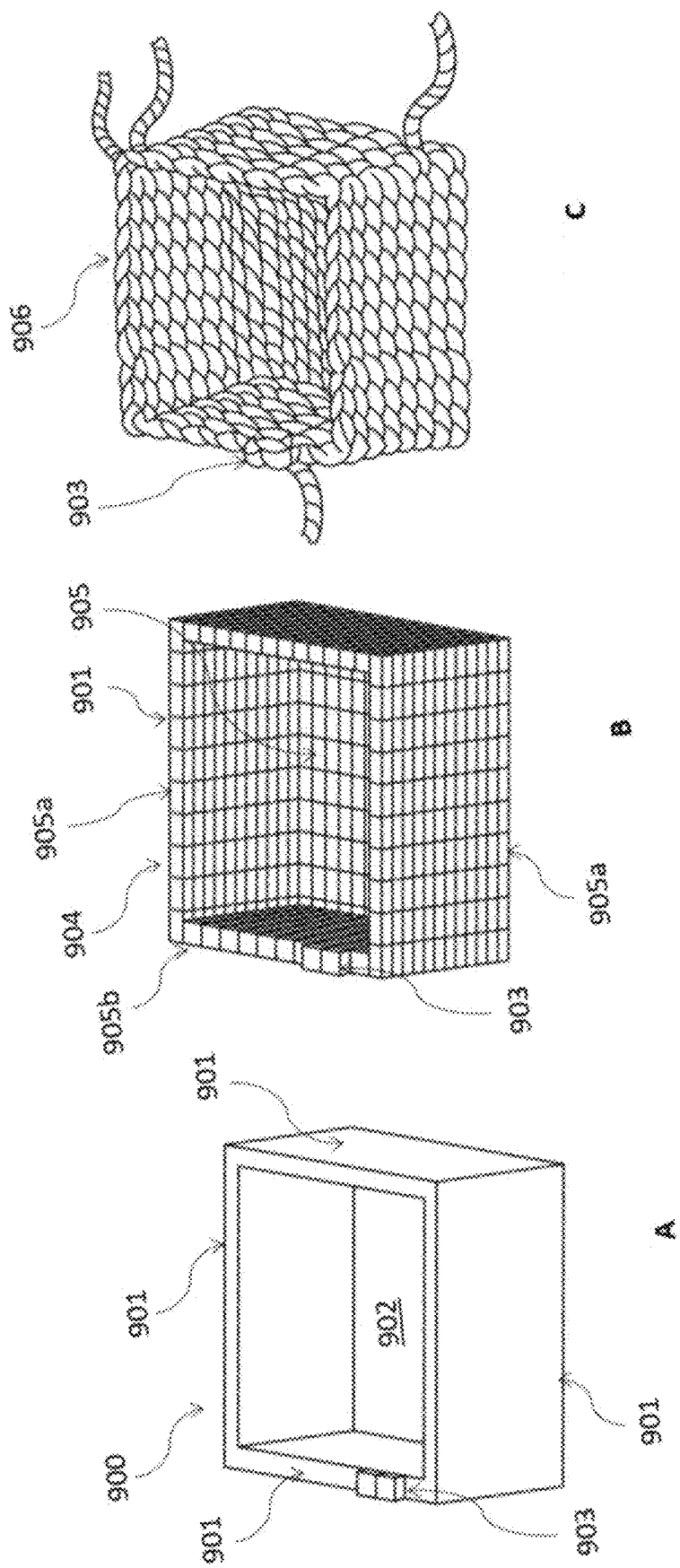
FIG. 9A-C

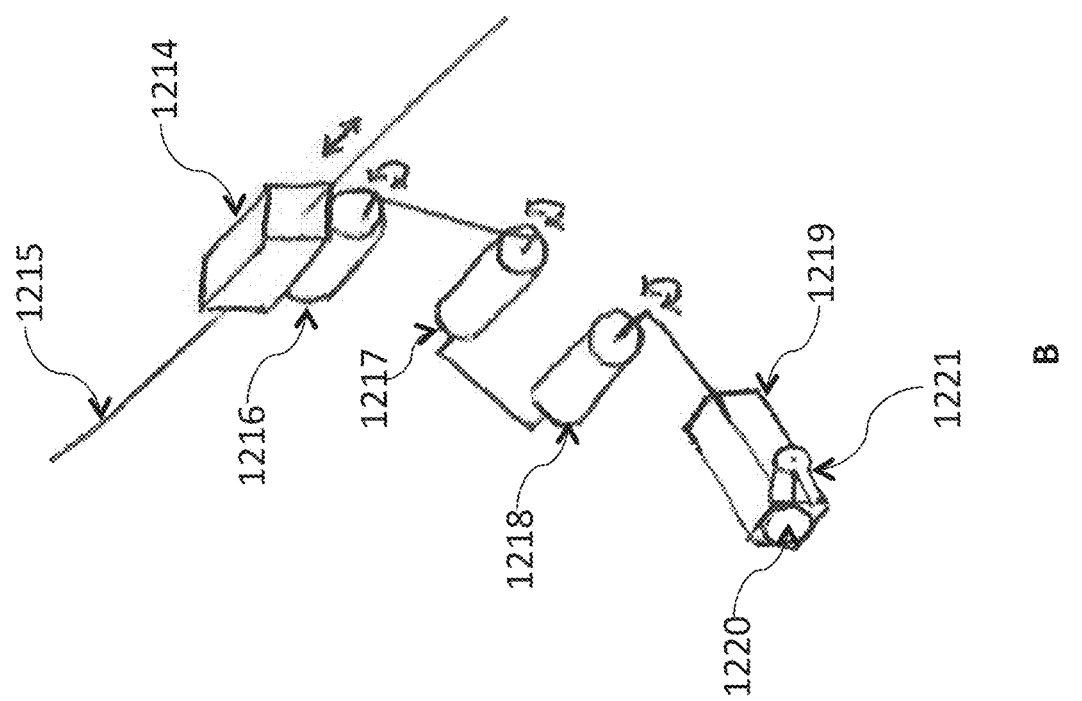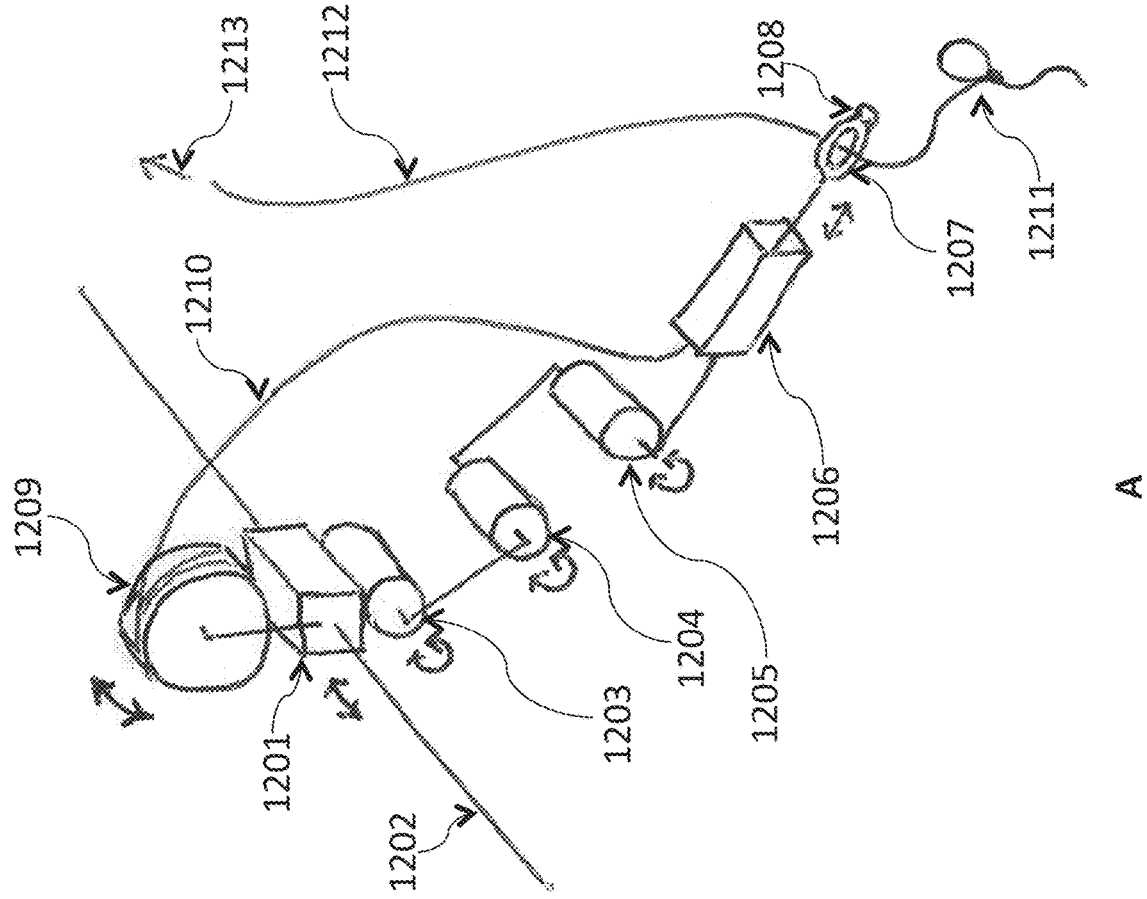
FIG. 12A-B

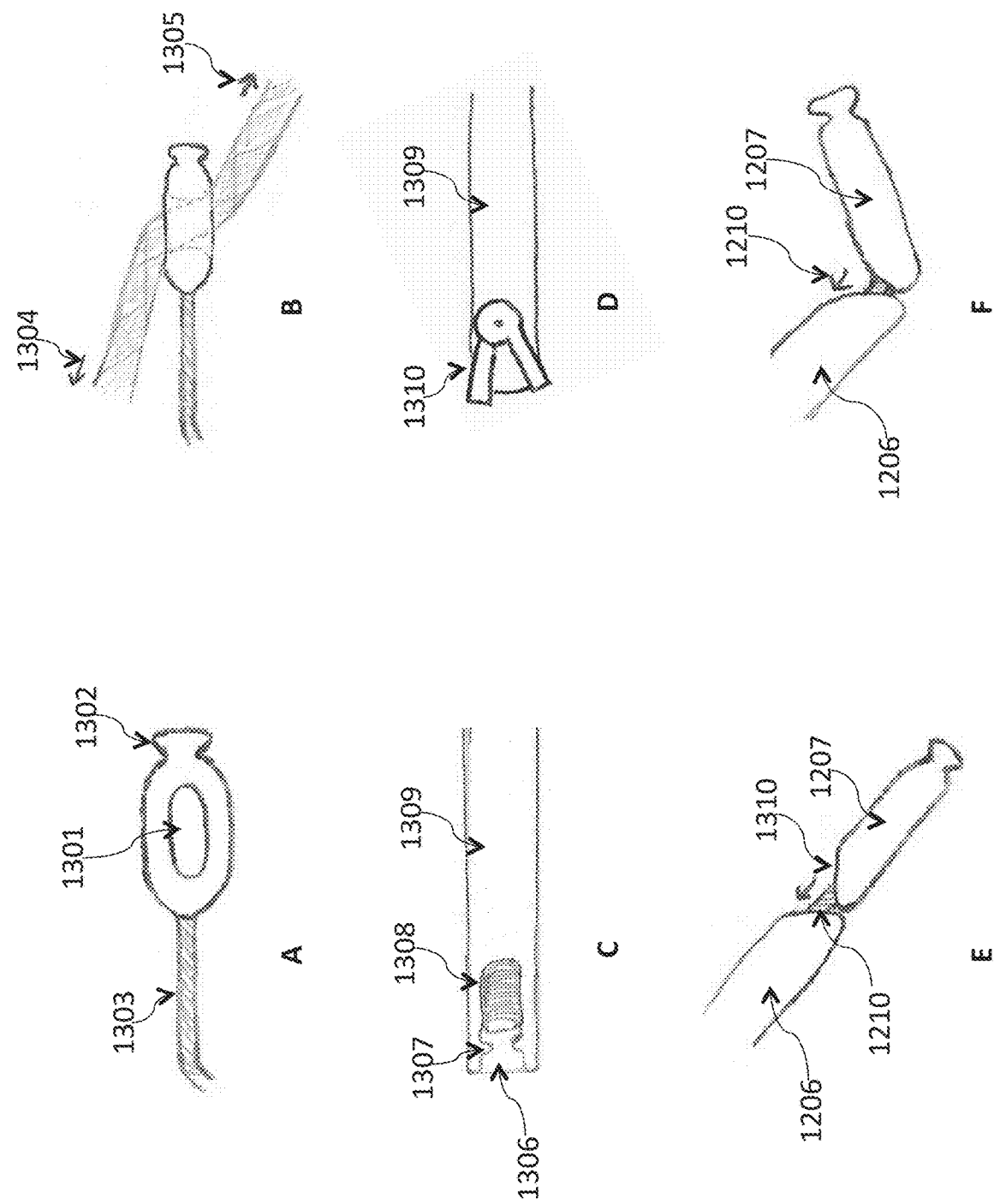
FIG. 13A-F

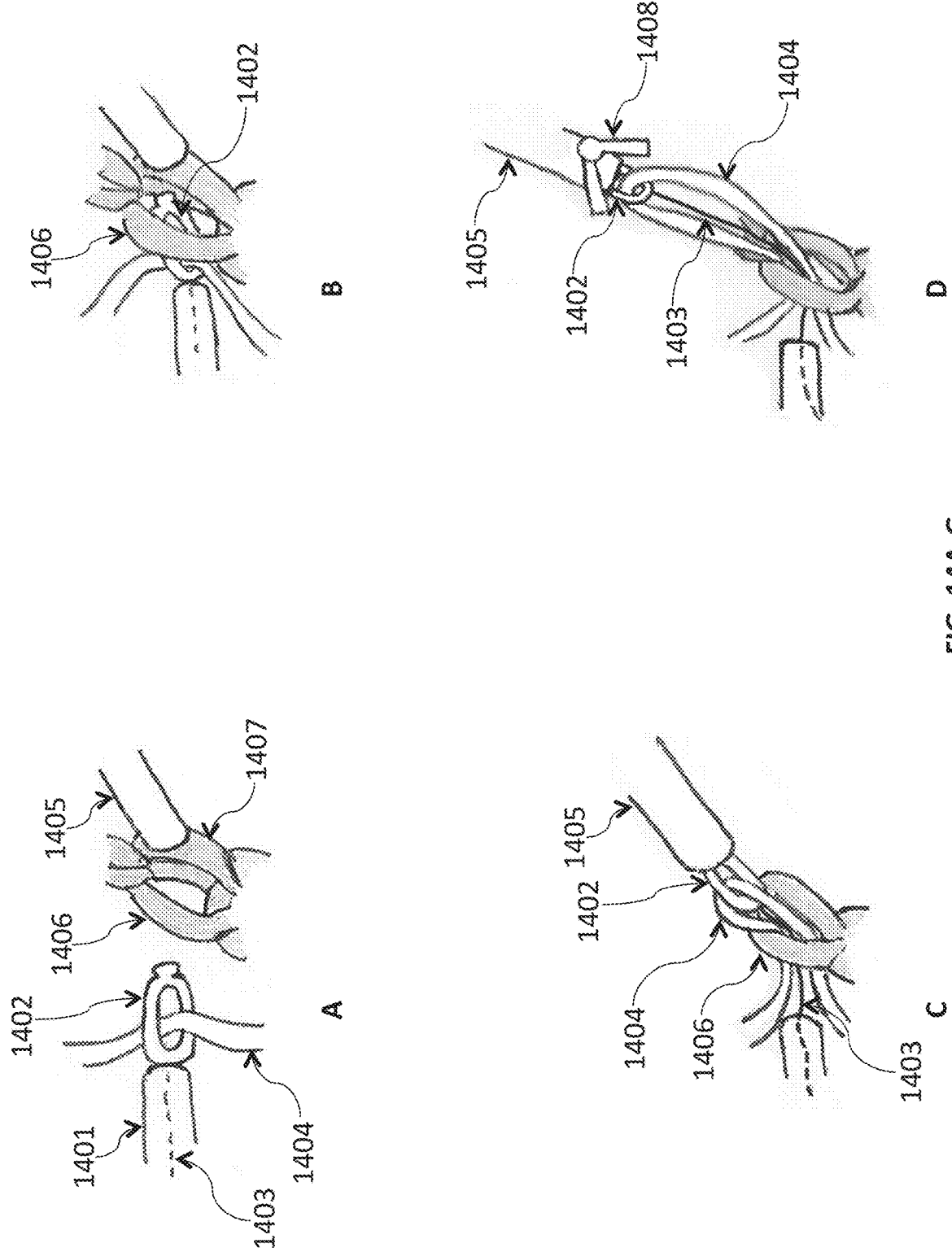
FIG. 14A-G

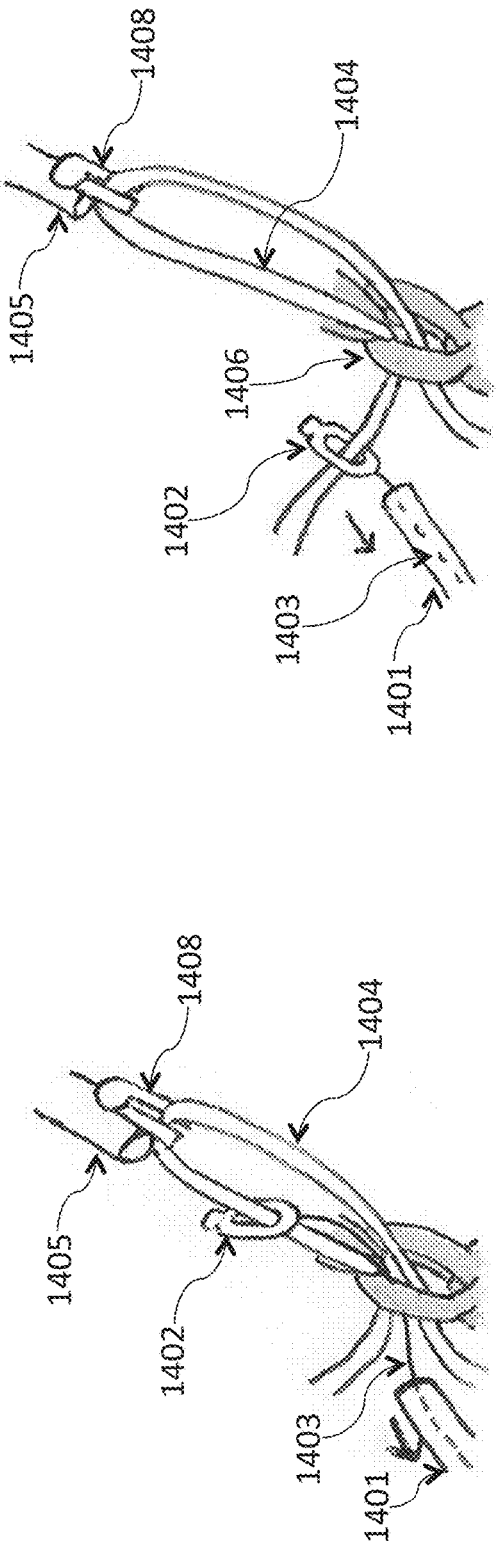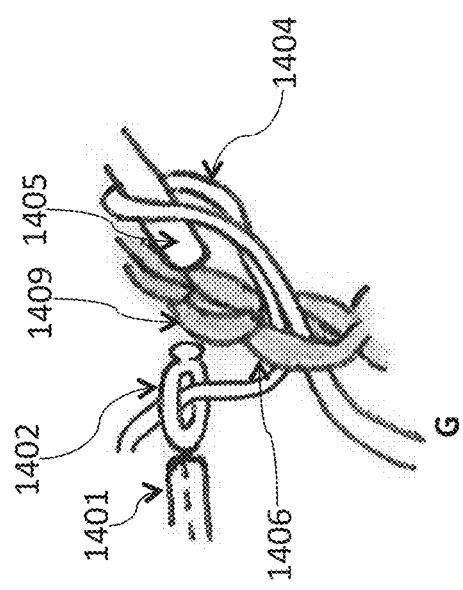
FIG. 14A-G (CONT)

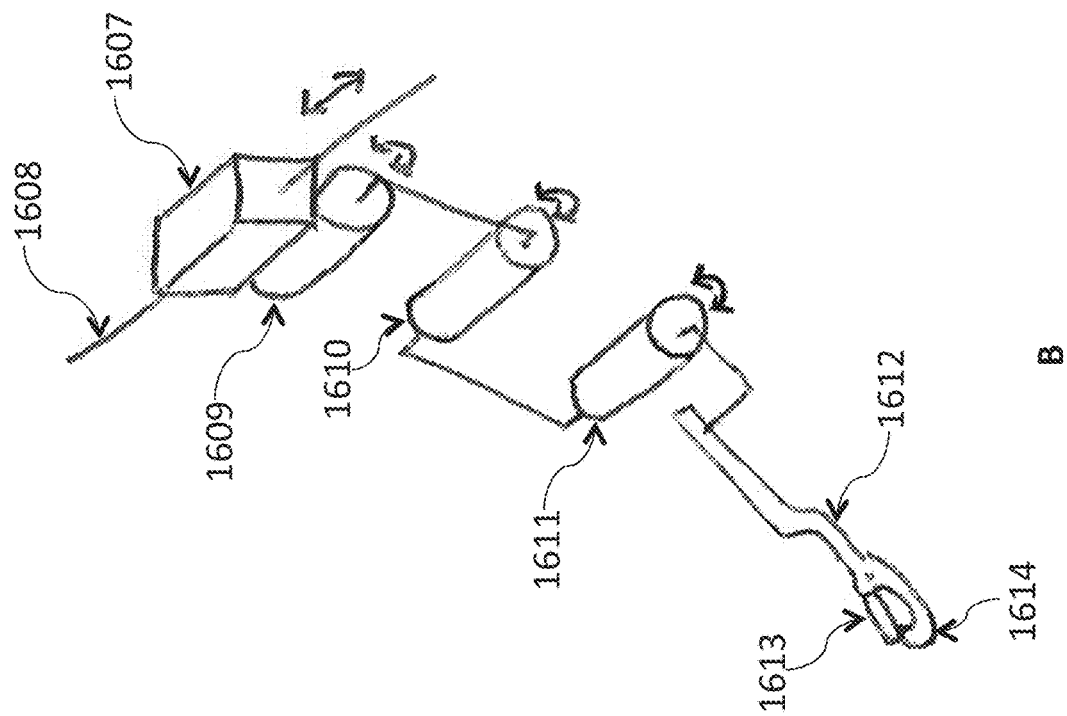
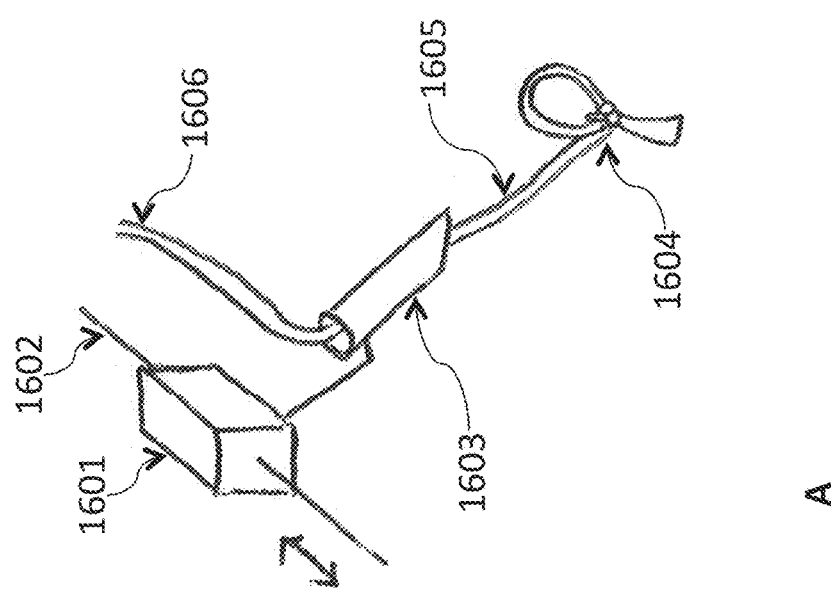
FIG. 16A-B

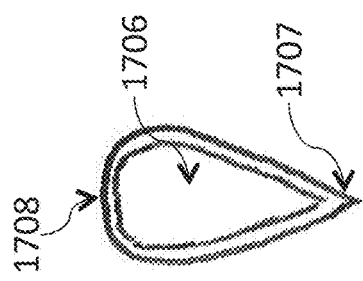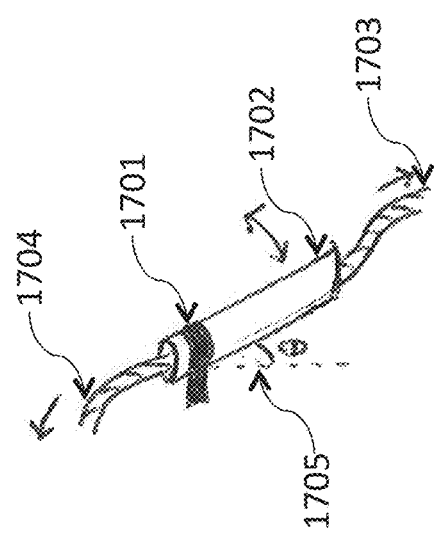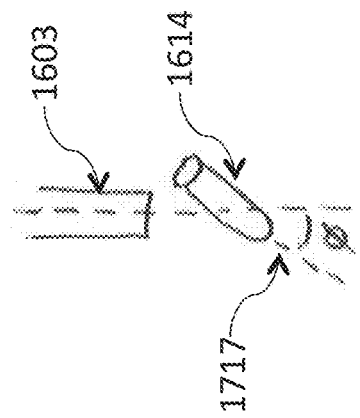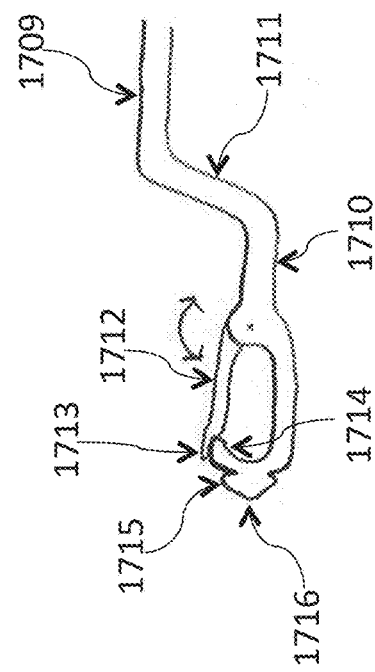
FIG. 17A-D

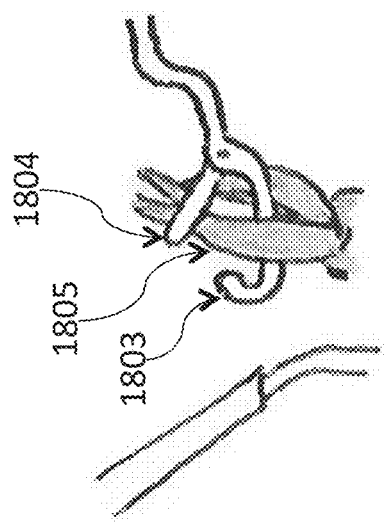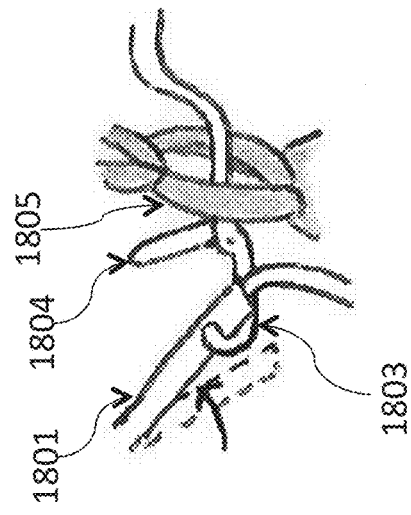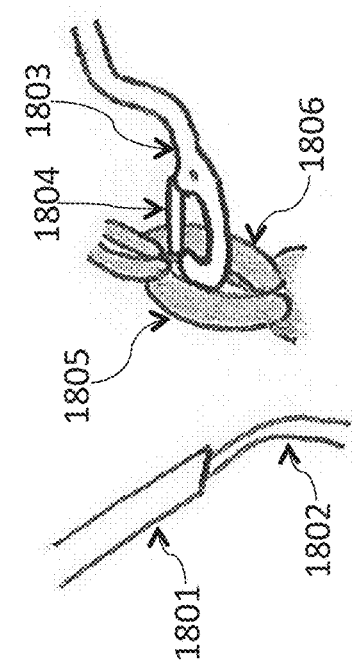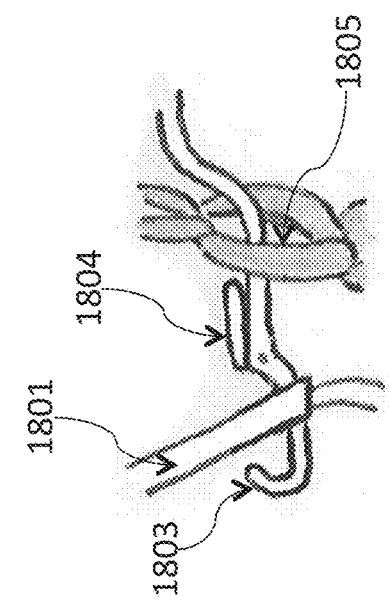
FIG. 18A-K

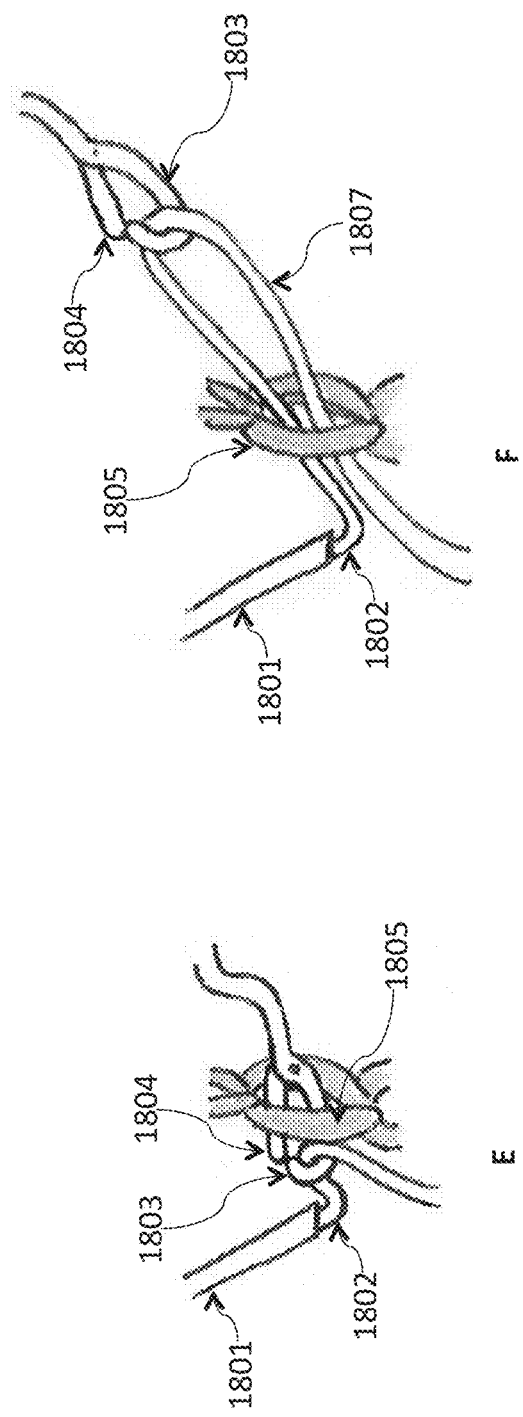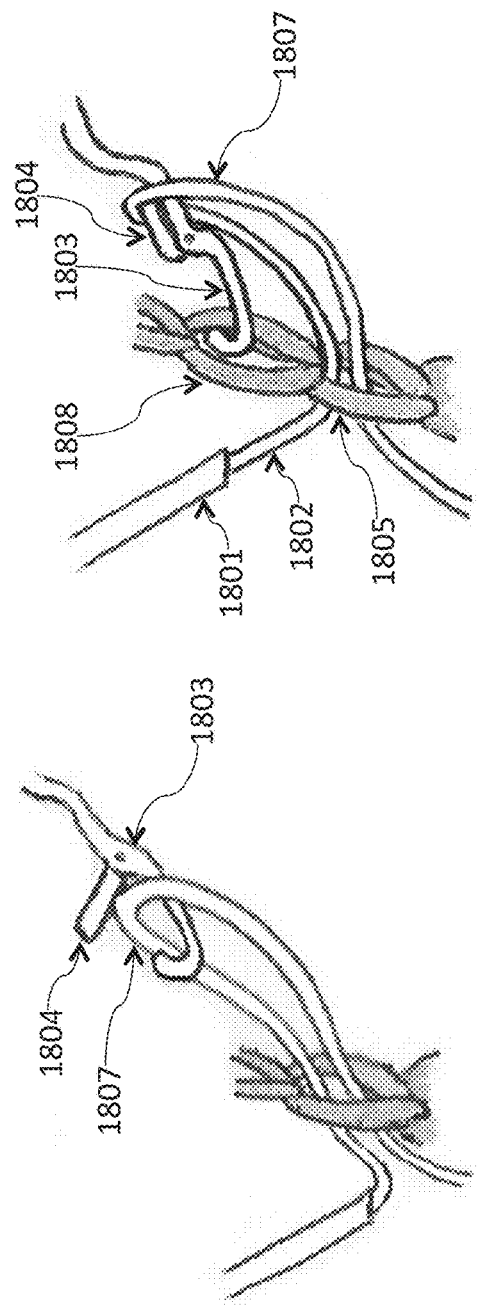
FIG. 18A-K (CONT)

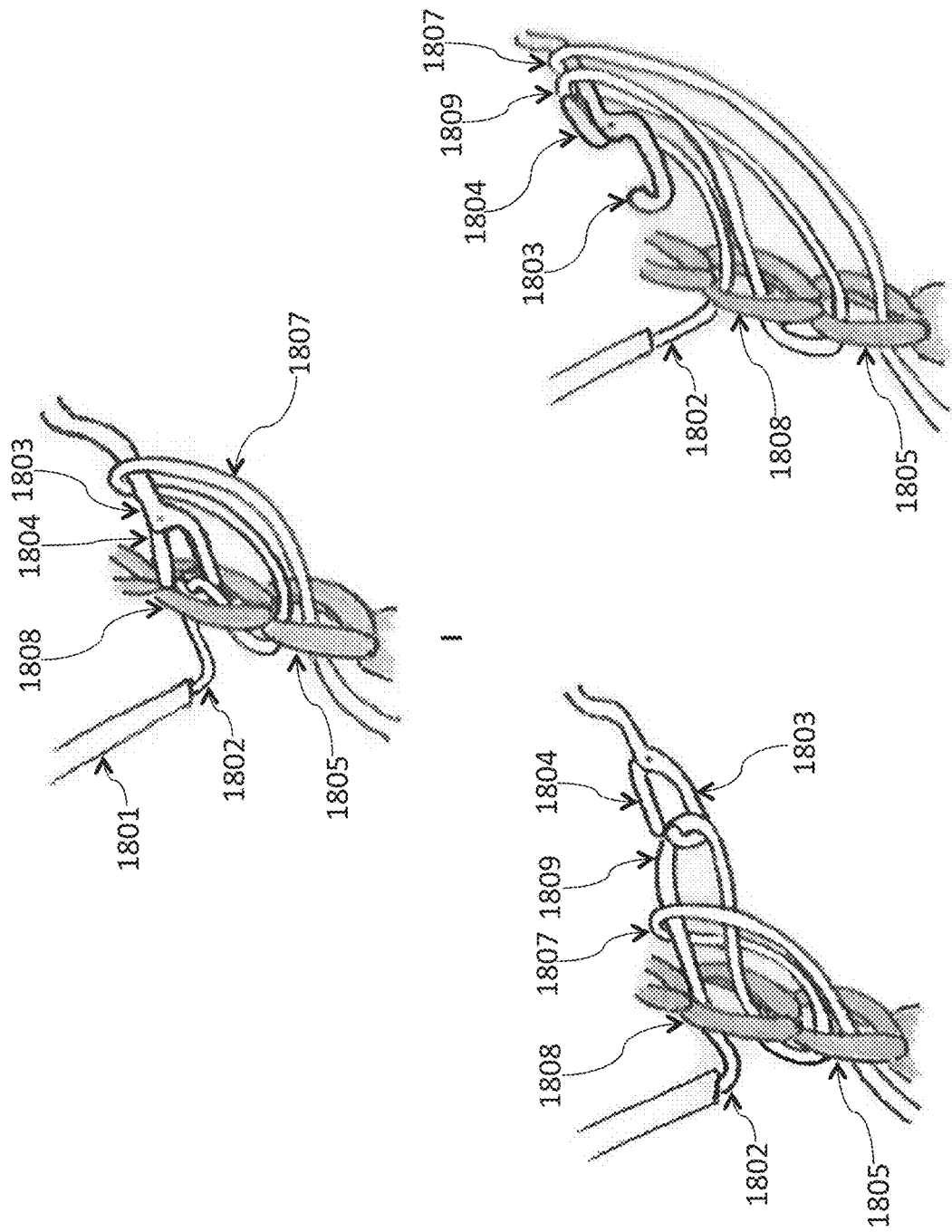
FIG. 18A-K (CONT)

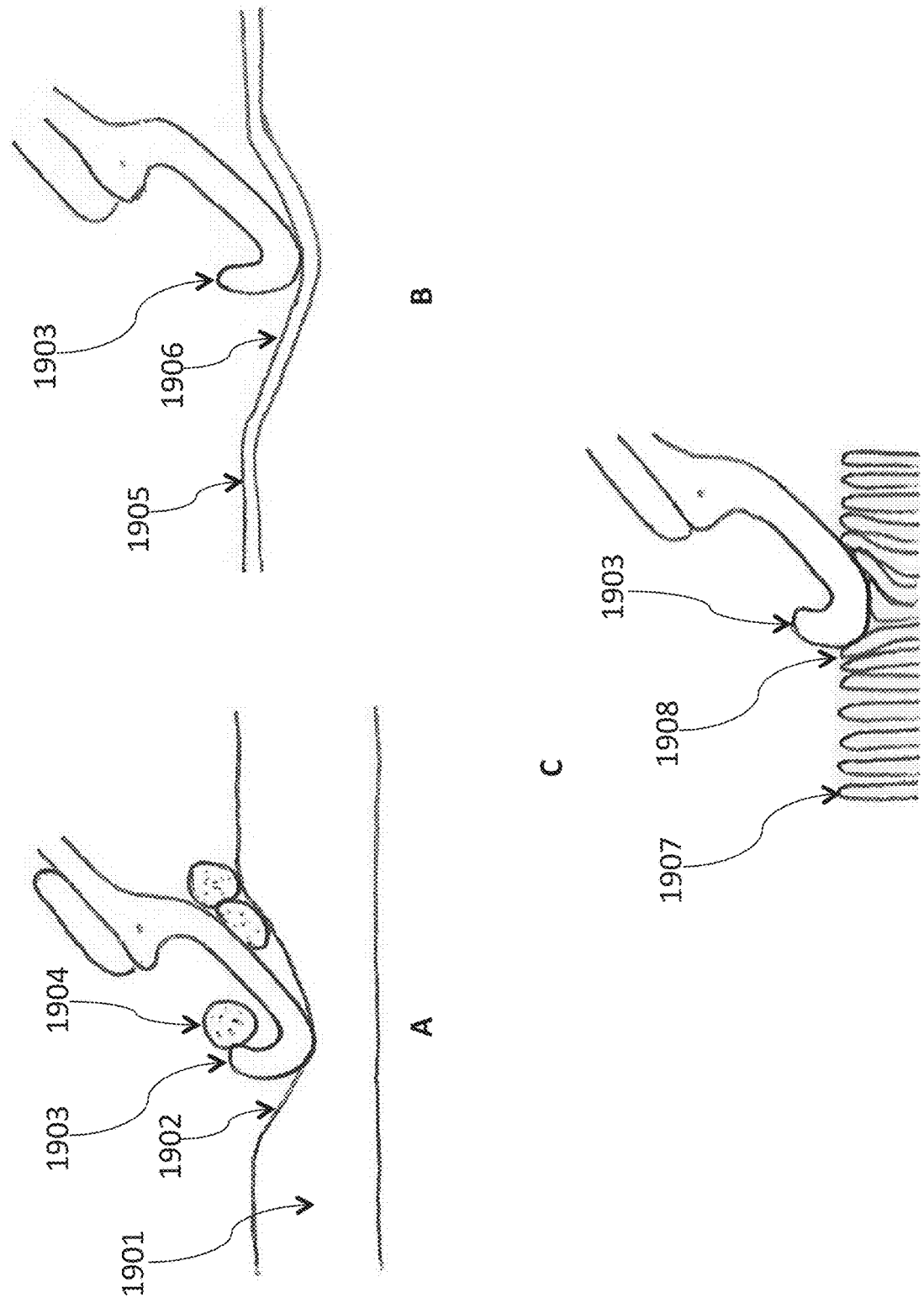

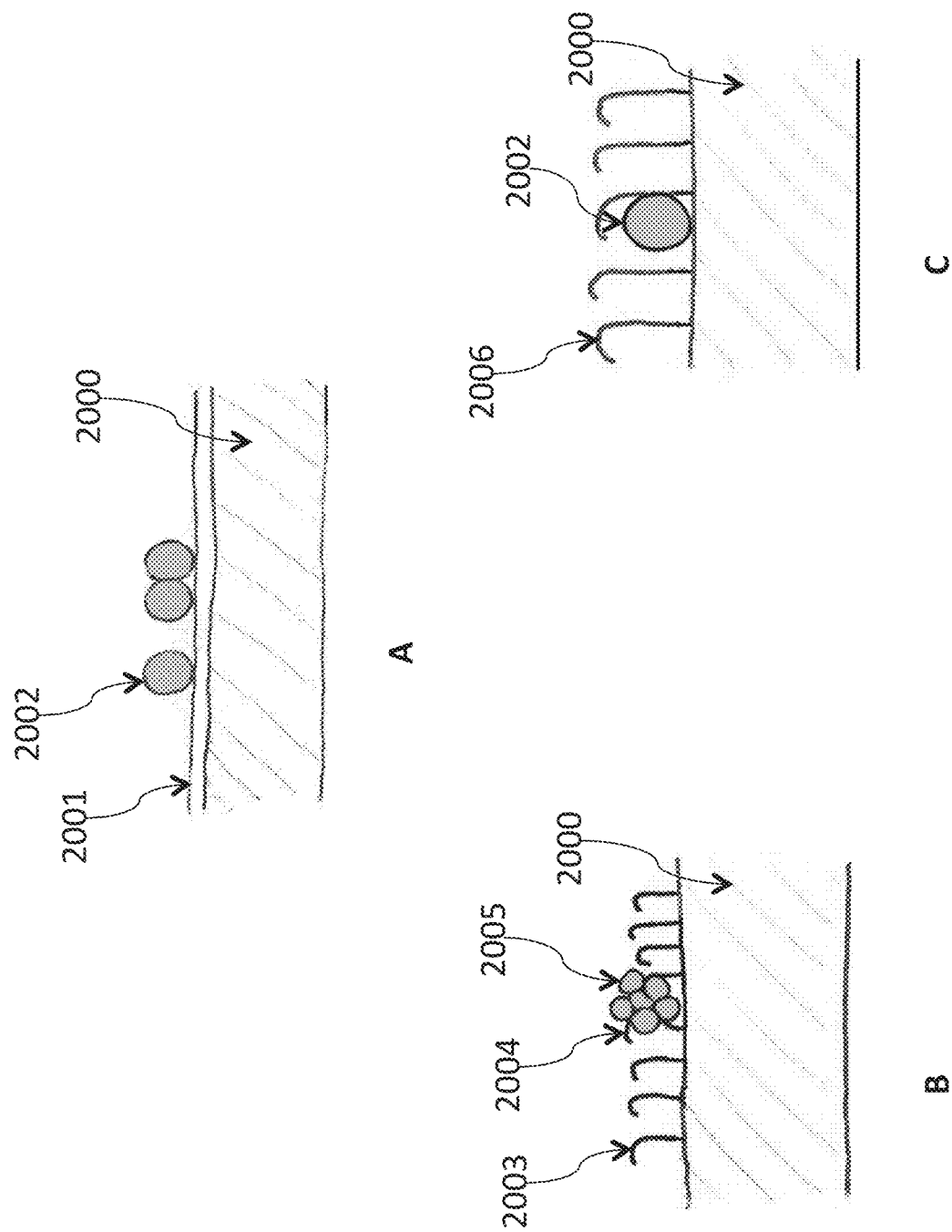
FIG. 20A-C

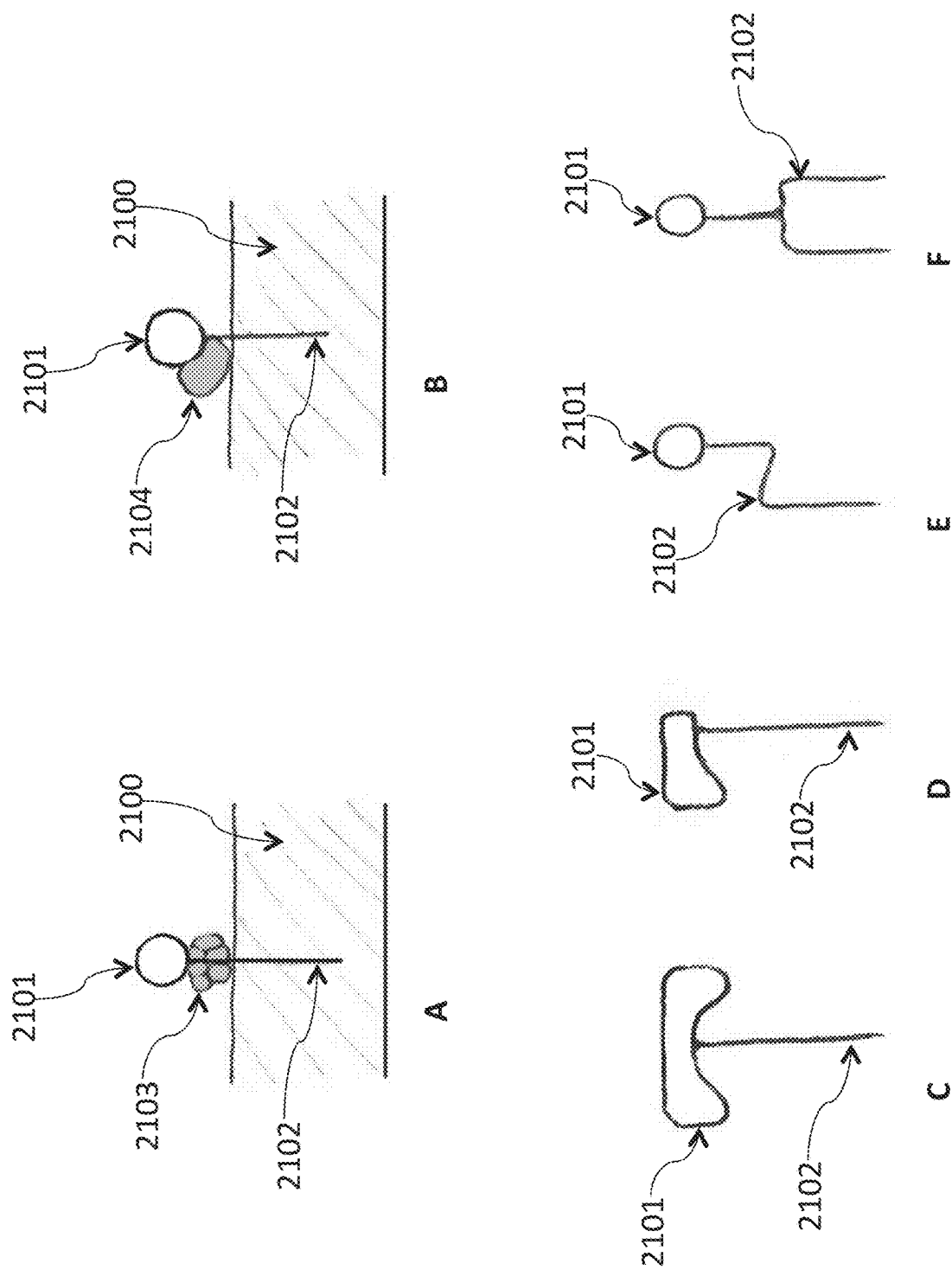
FIG. 21A-F

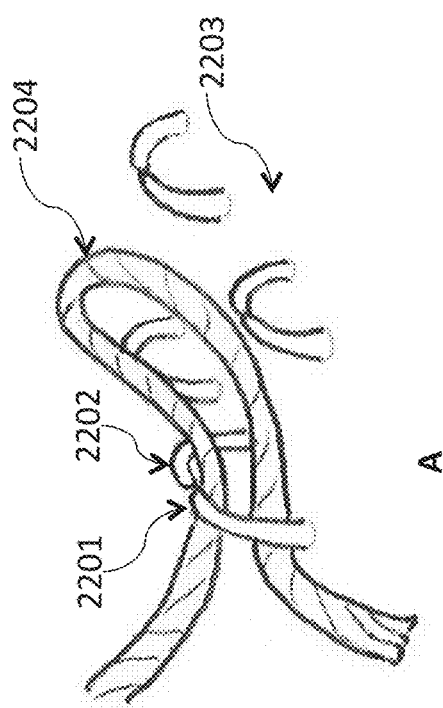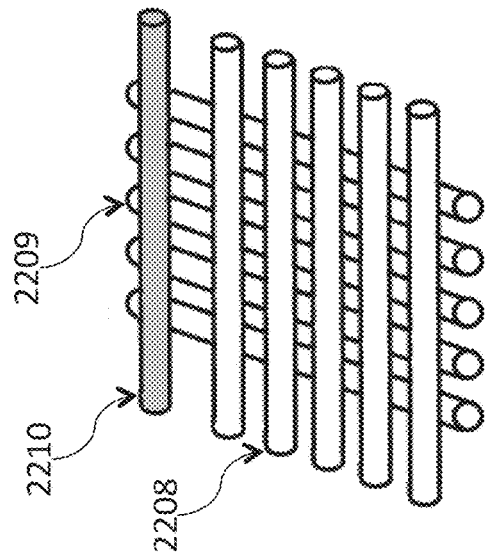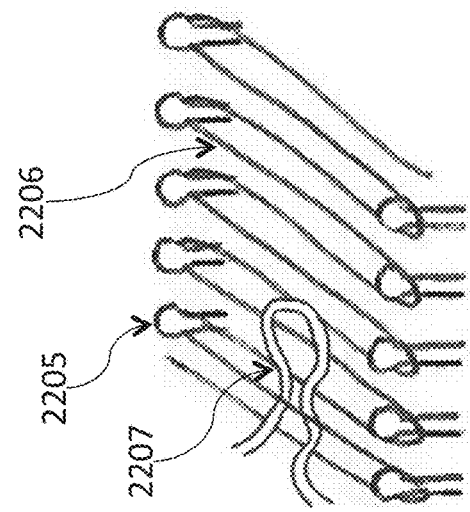
FIG. 22A-C

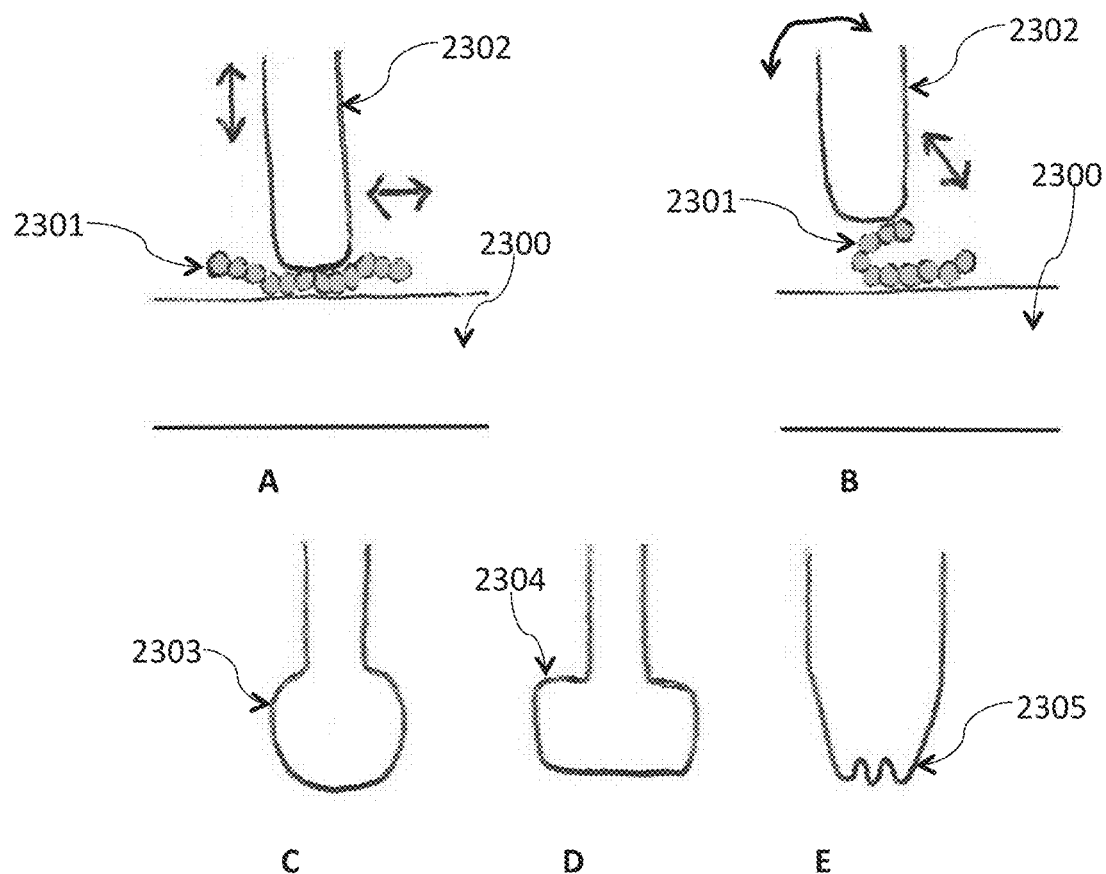
FIG. 23A-E
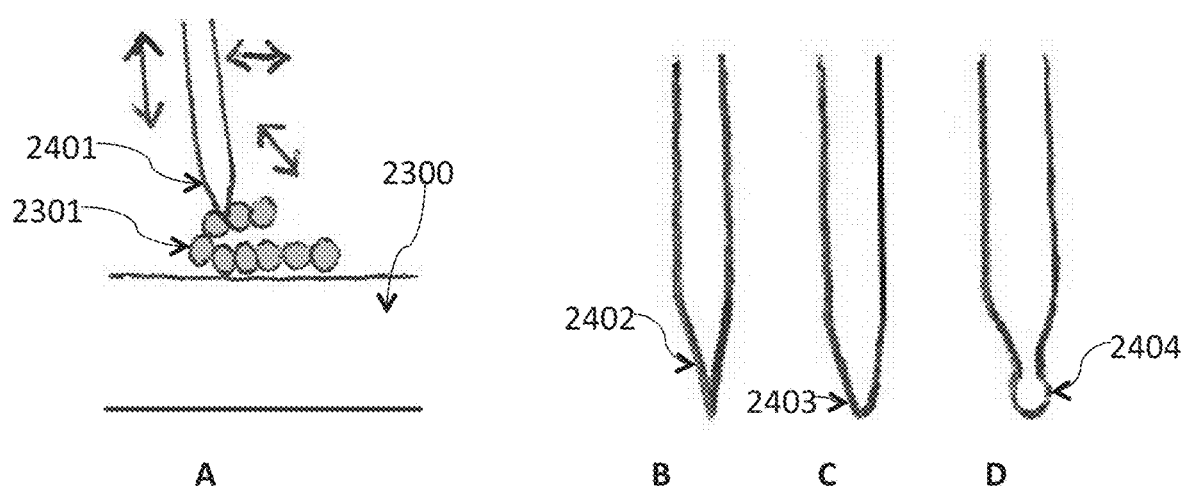
FIG. 24A-D

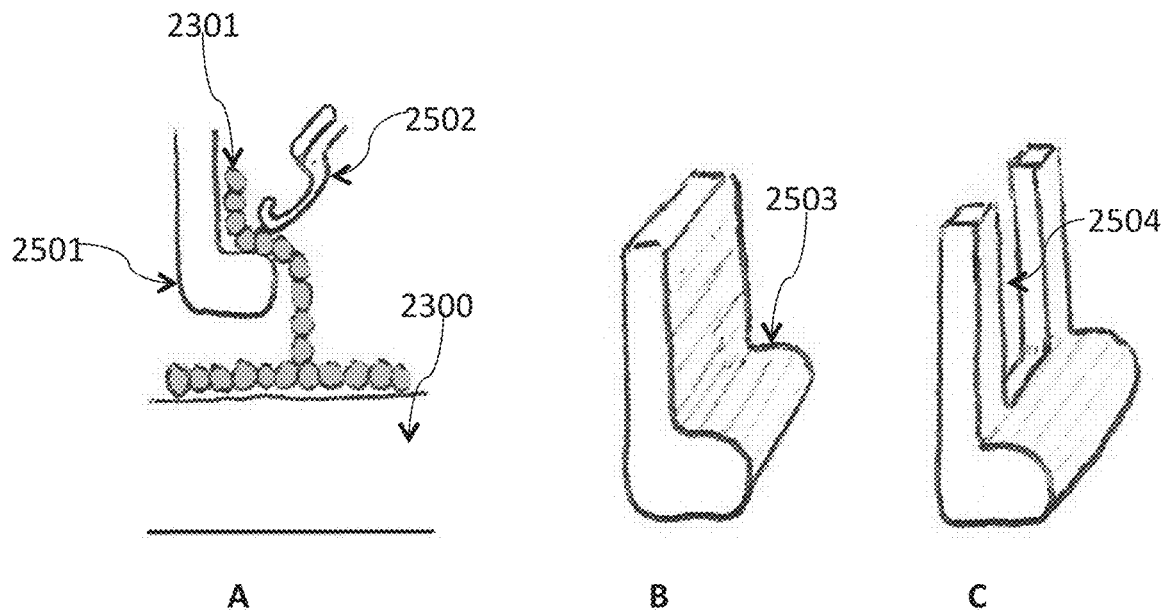
FIG. 25A-C
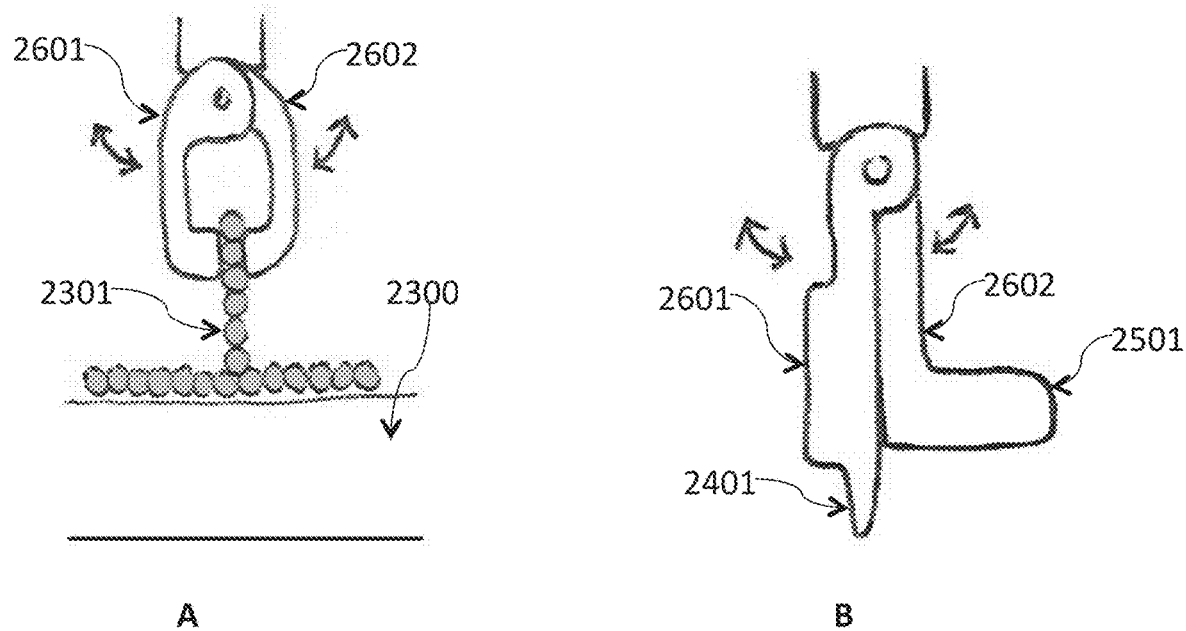
FIG. 26A-B

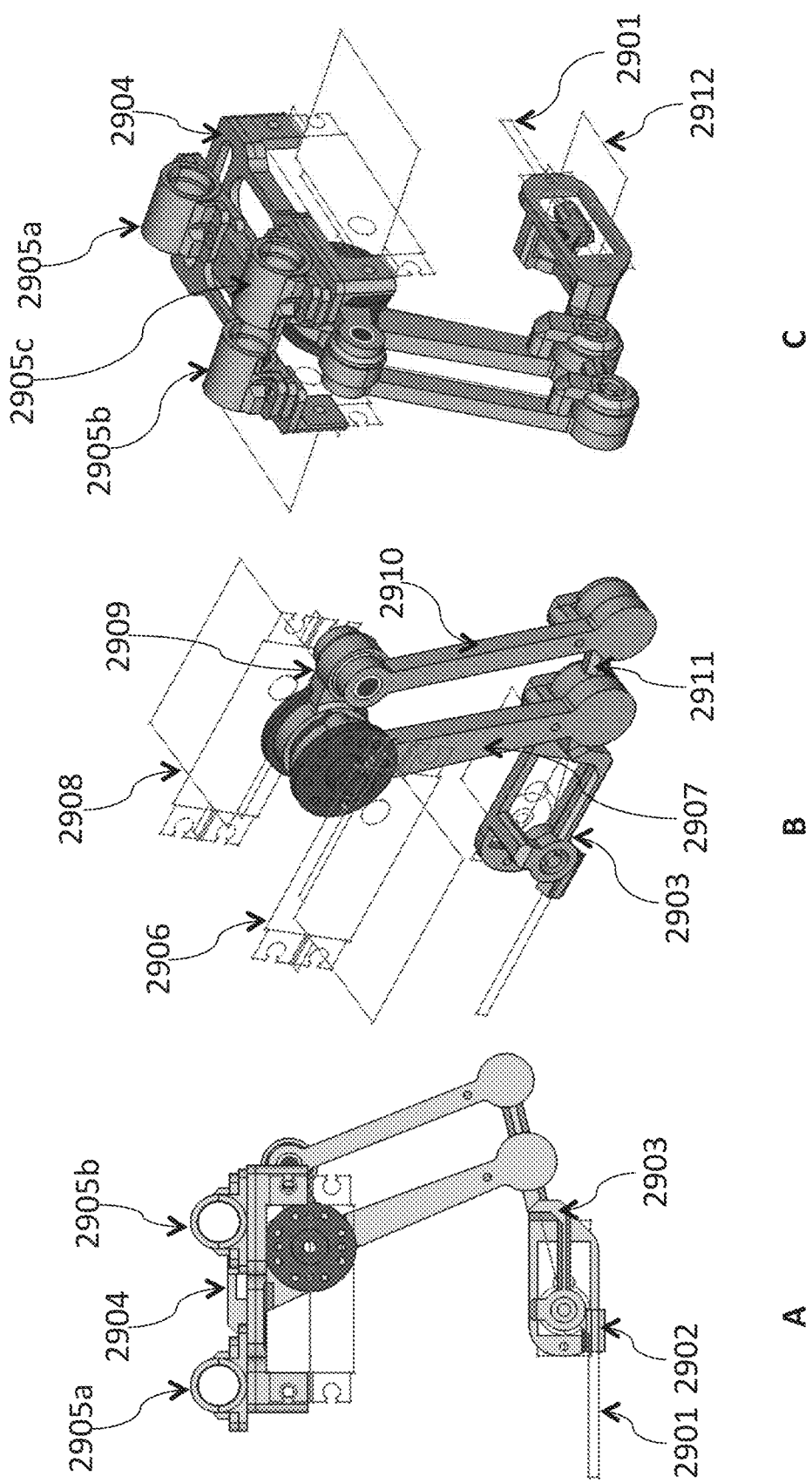
FIG. 29A-C

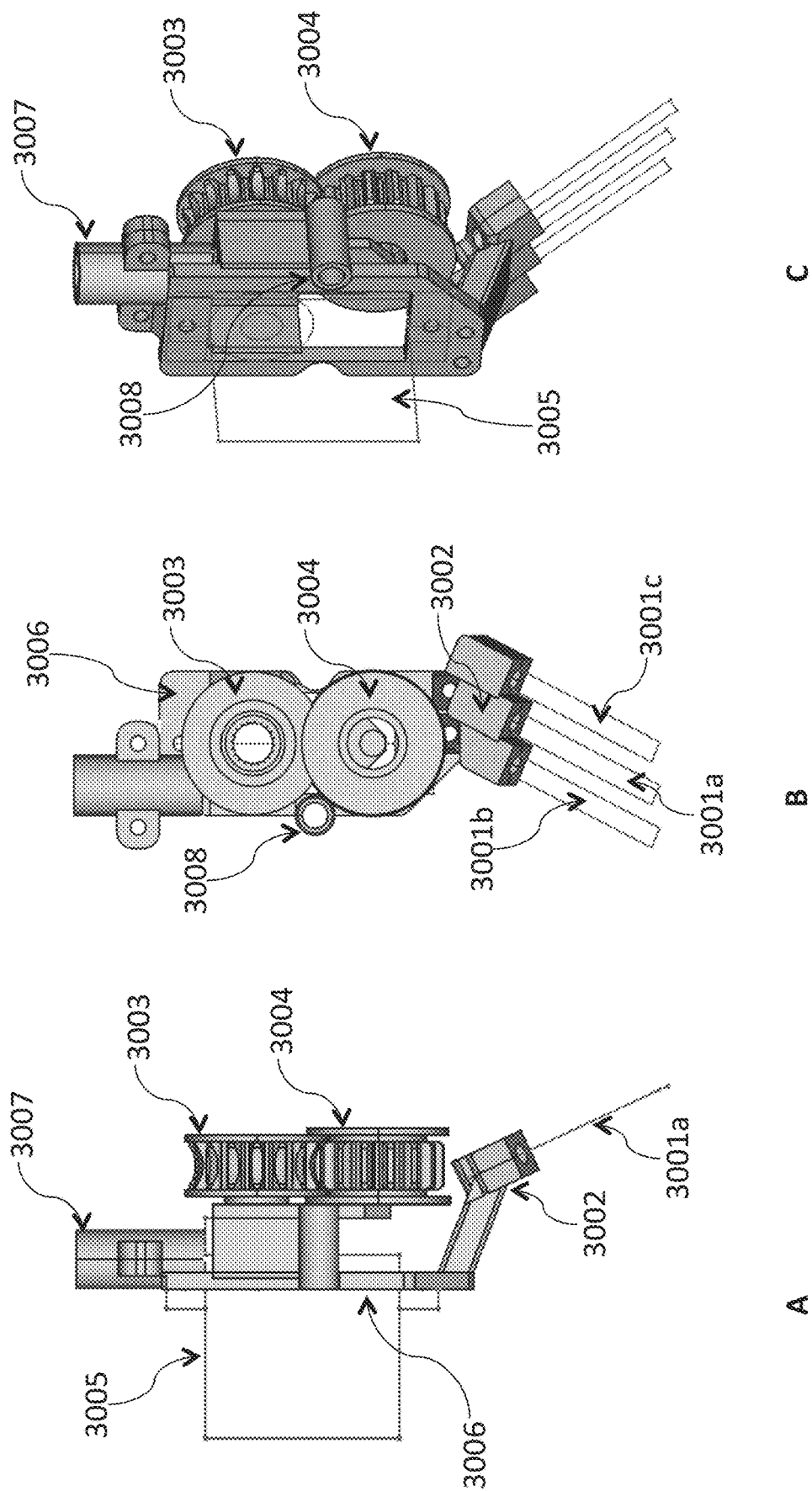
FIG. 30A-C

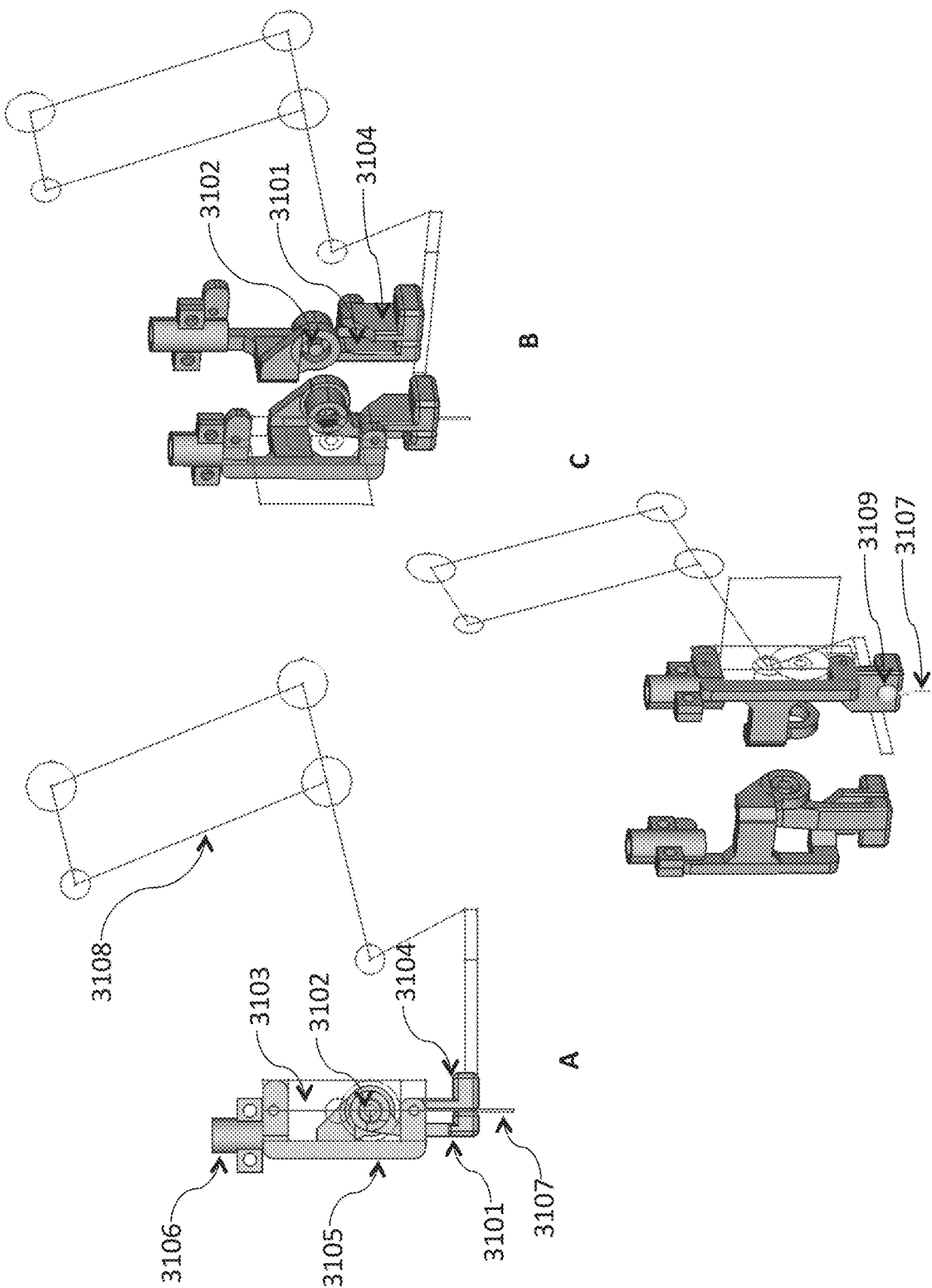
FIG. 31A-C

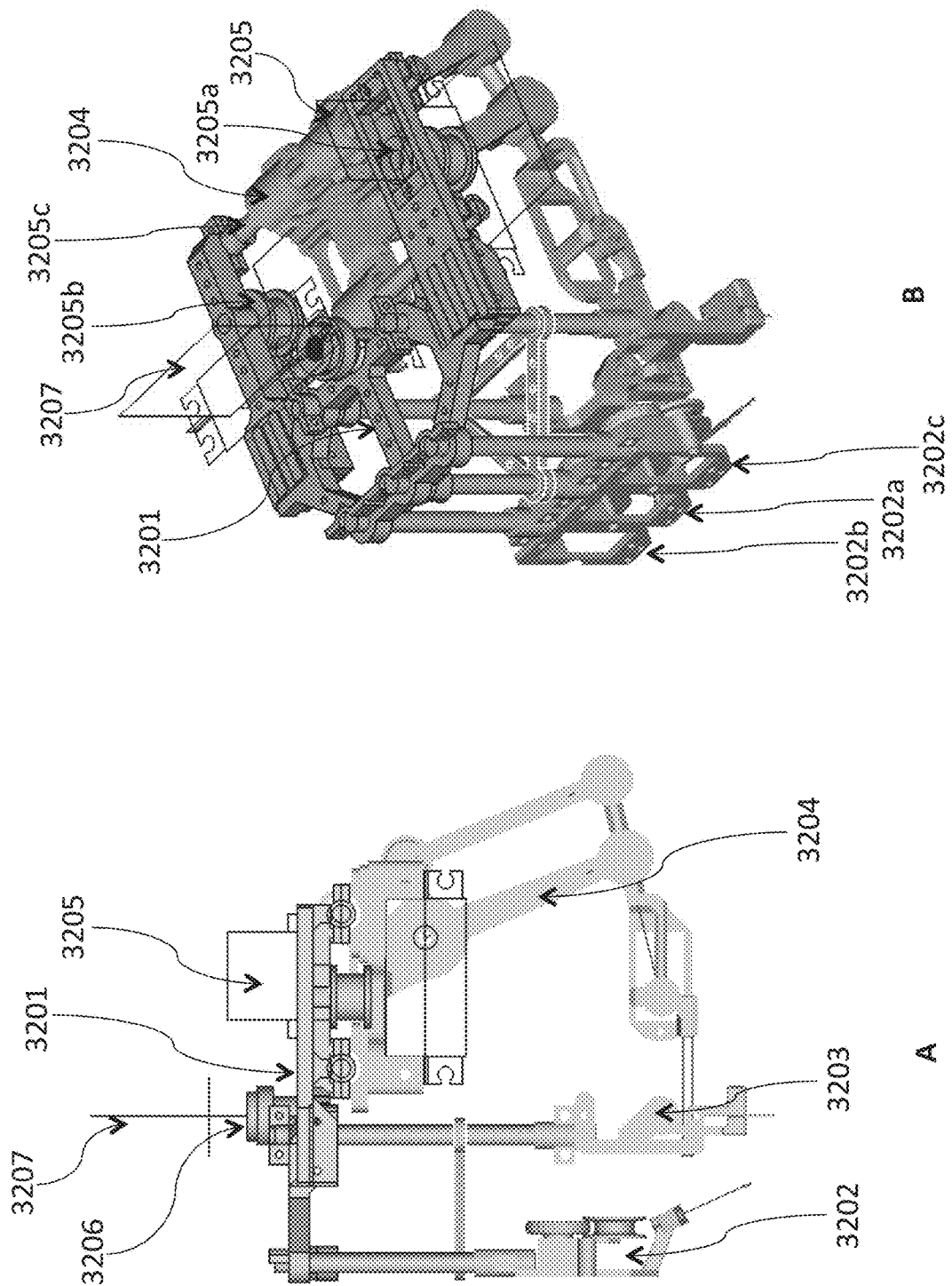
FIG. 32A-D

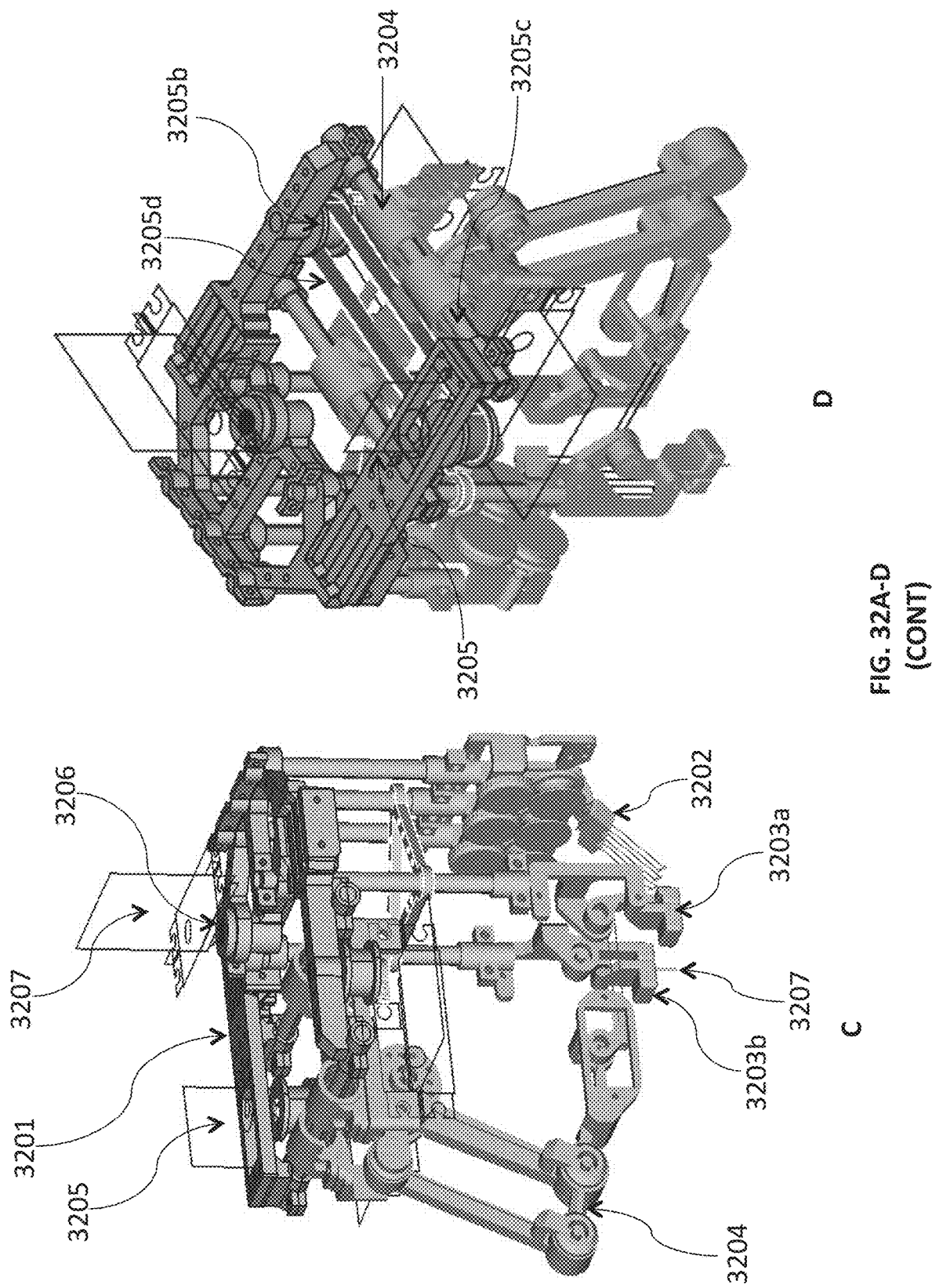
FIG. 32A-D (CONT)

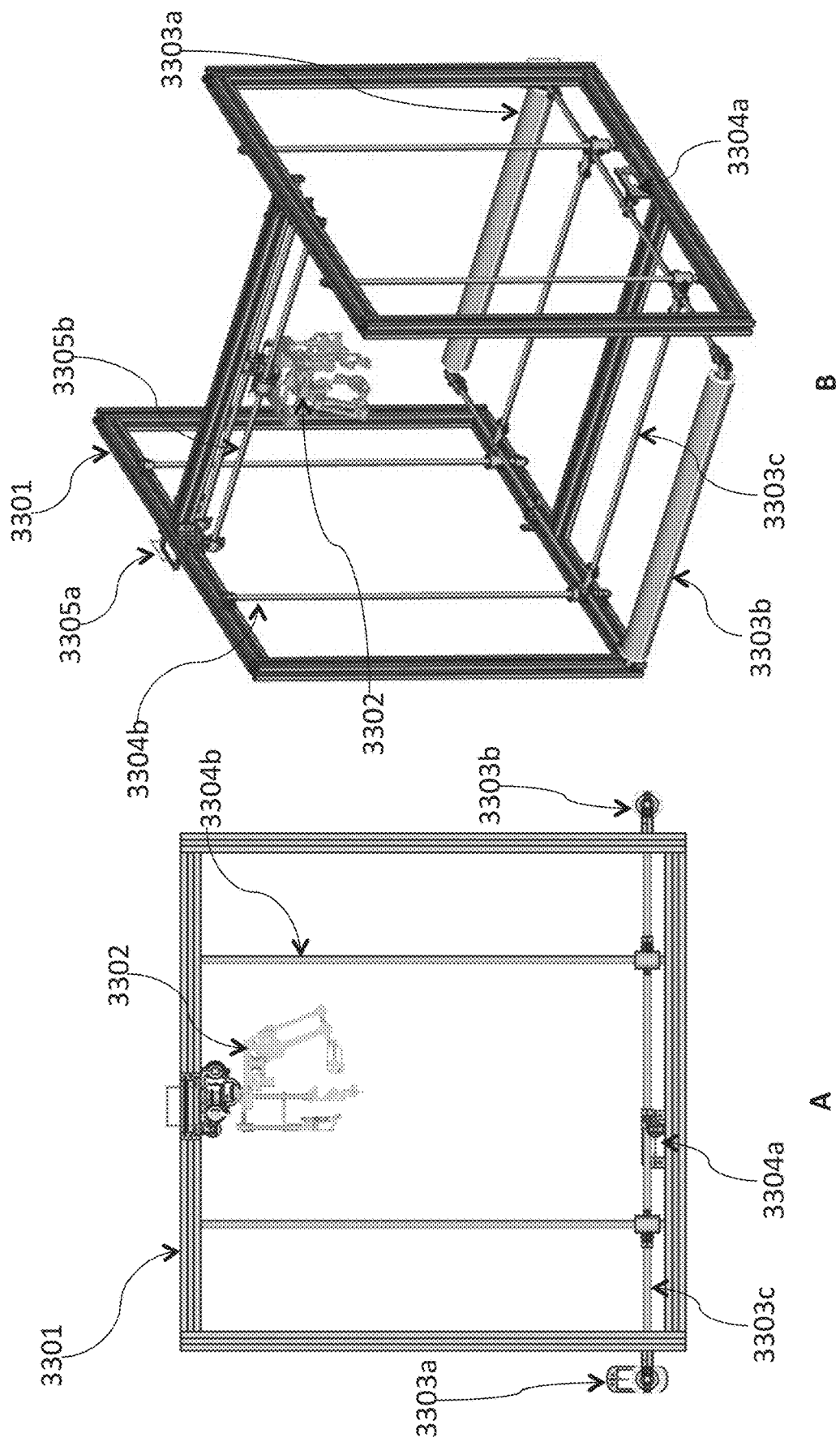
FIG. 33A-D

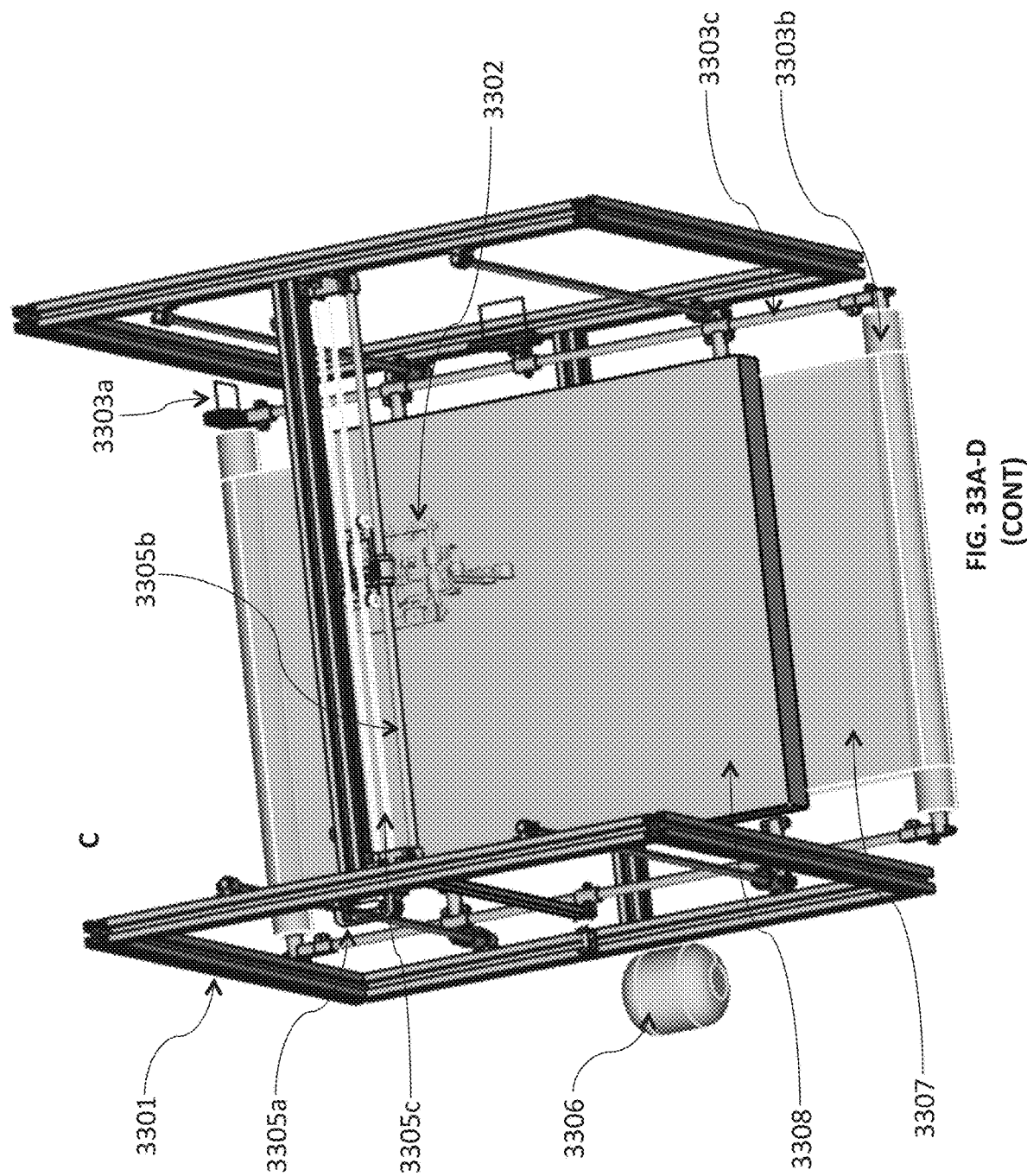
FIG. 33A-D (CONT)

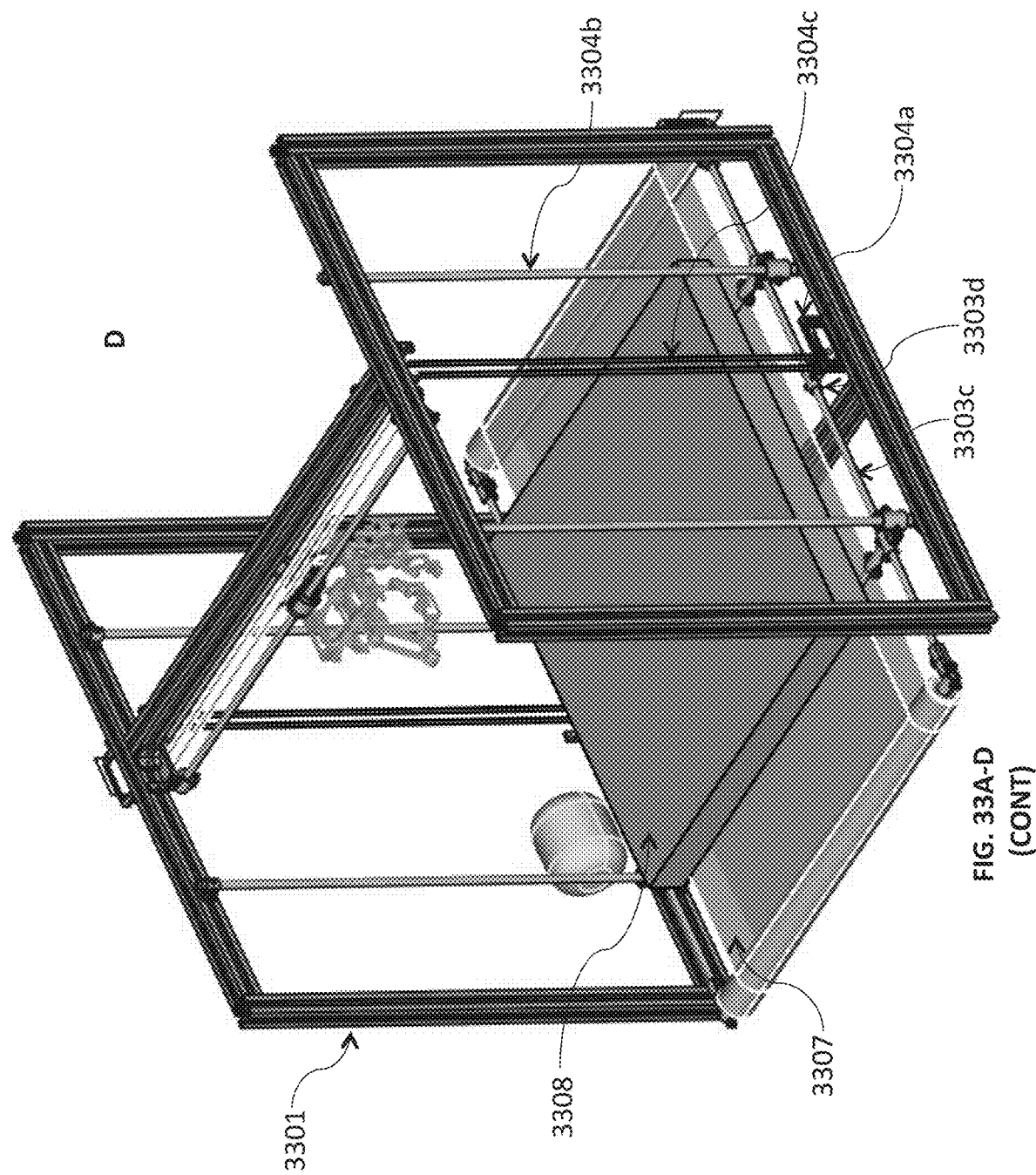
FIG. 33A-D (CONT)

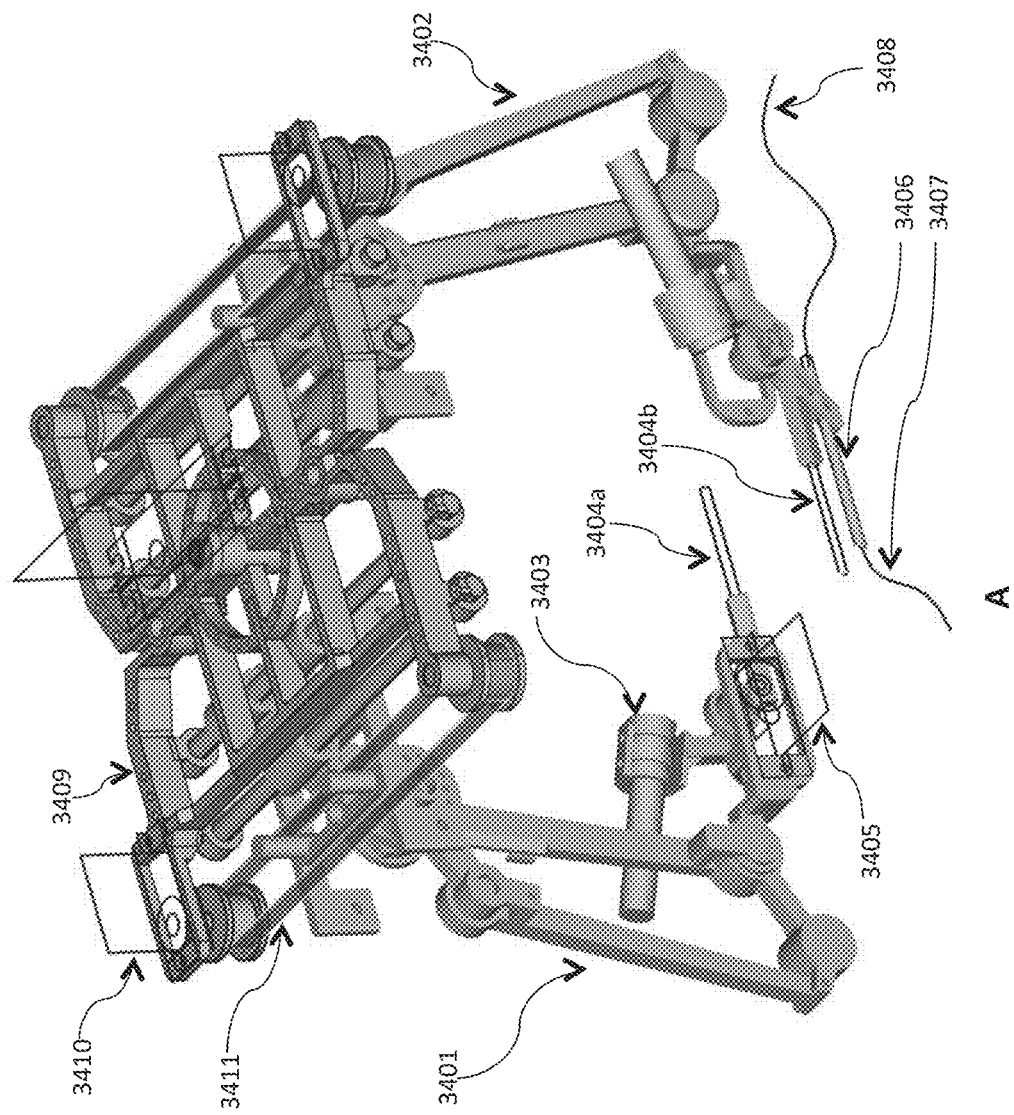
FIG. 34A-B

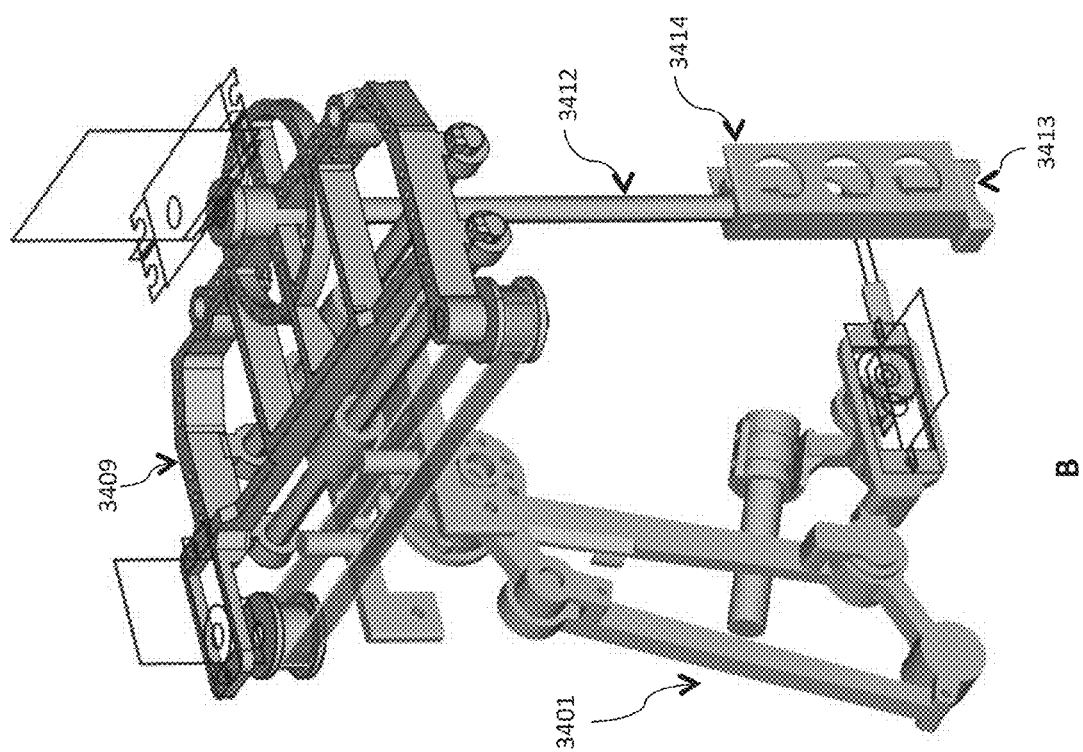
FIG. 34A-B (CONT)

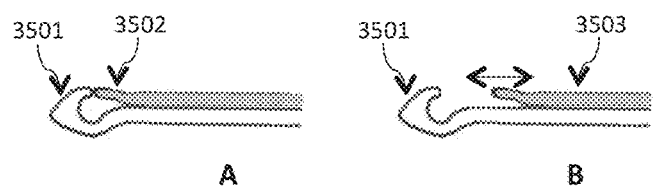
FIG. 35A-B
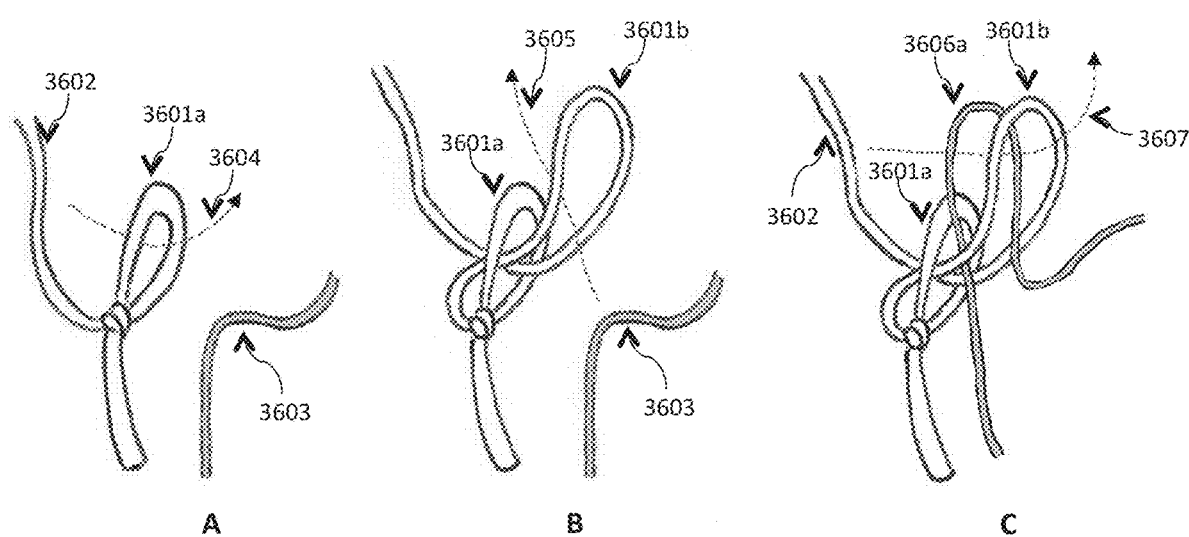
FIG 36A-E

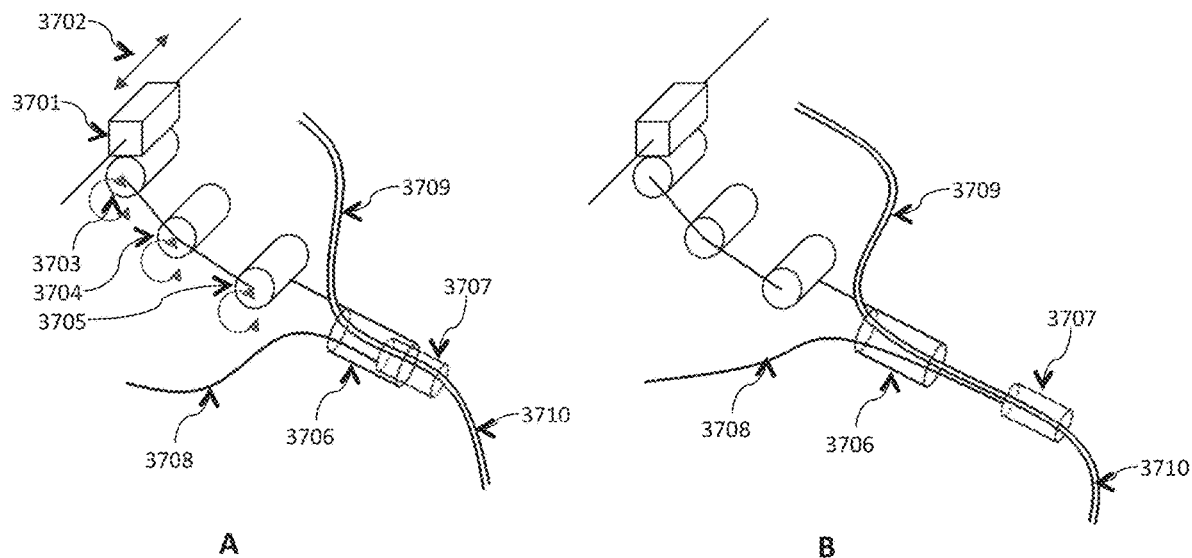
FIG. 37A-B
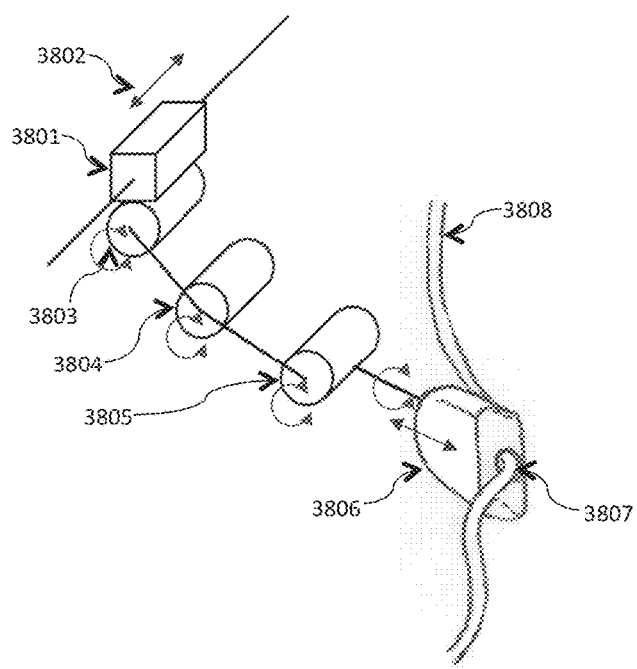
FIG. 38

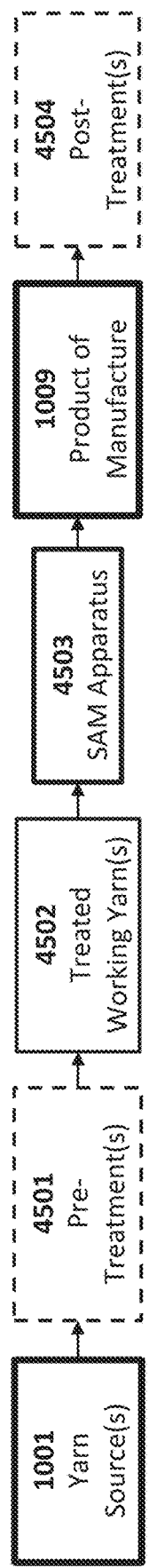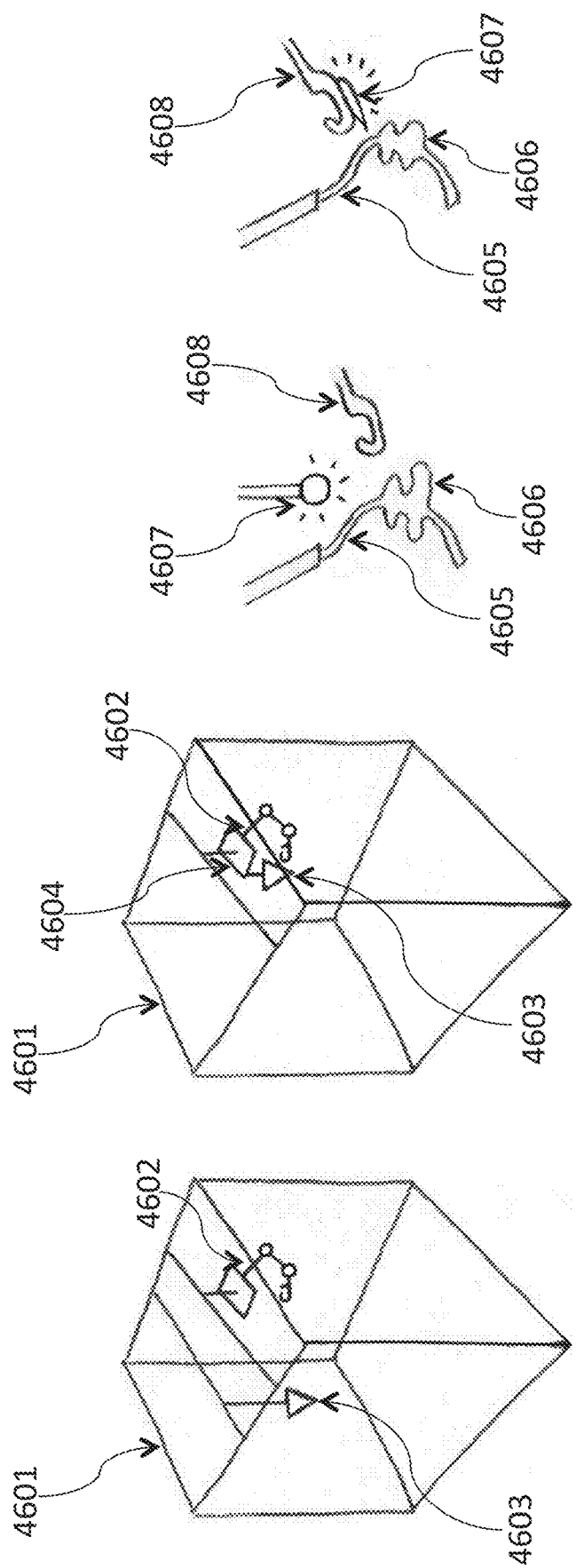
FIG. 45
FIG. 46A-D

FIG. 48A-B

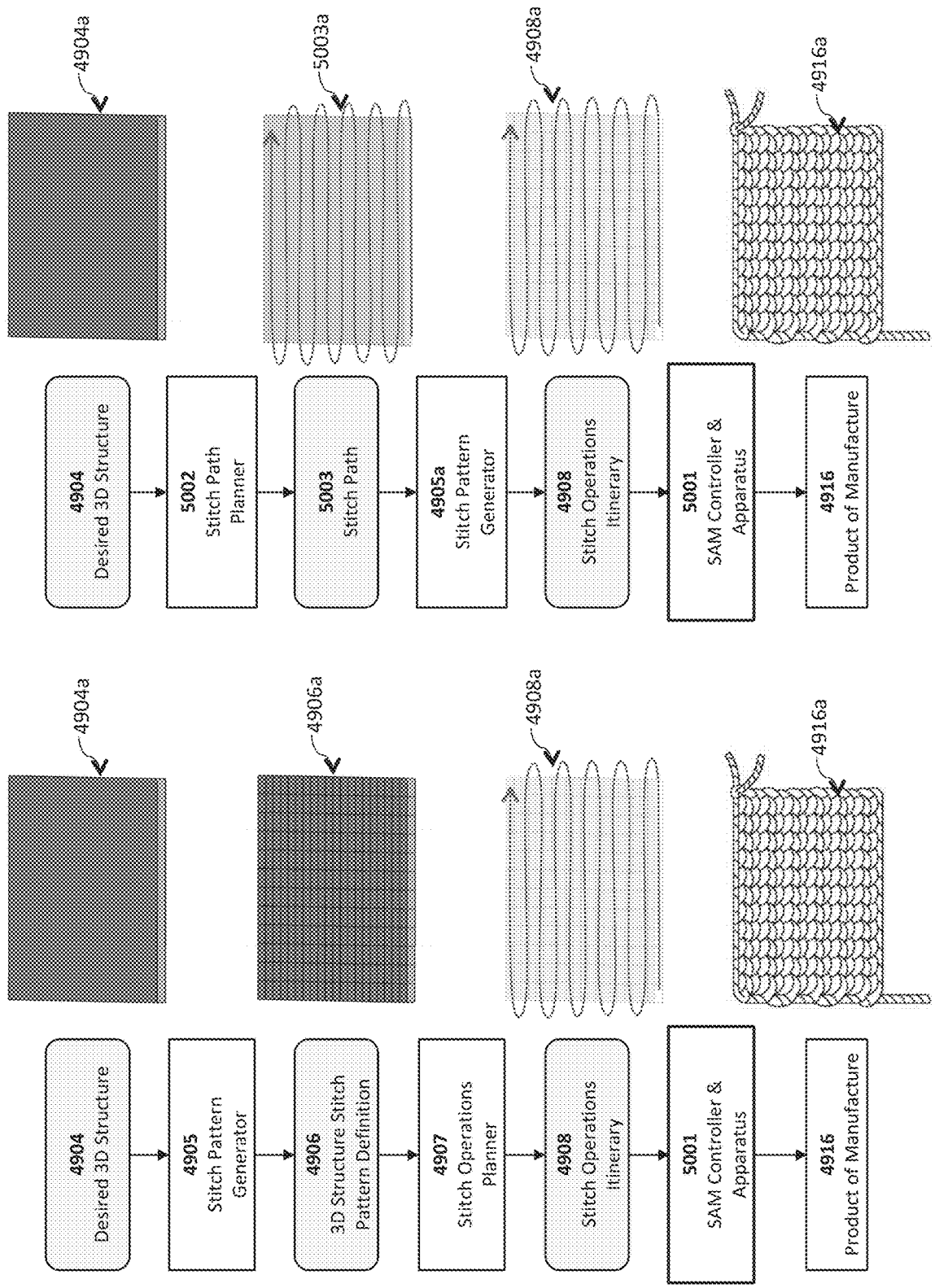
FIG. 50A-C

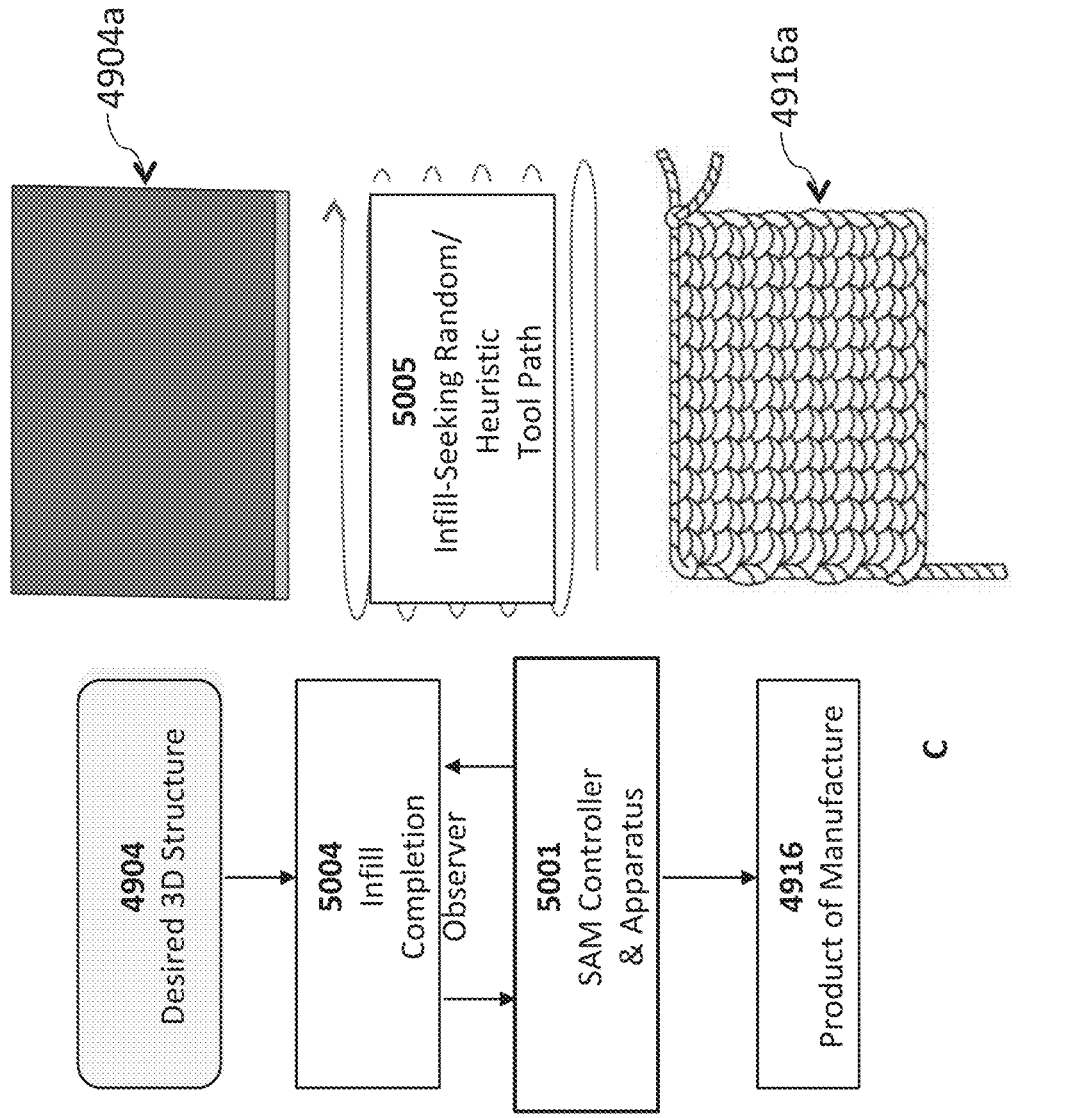
FIG. 50A-C (CONT)

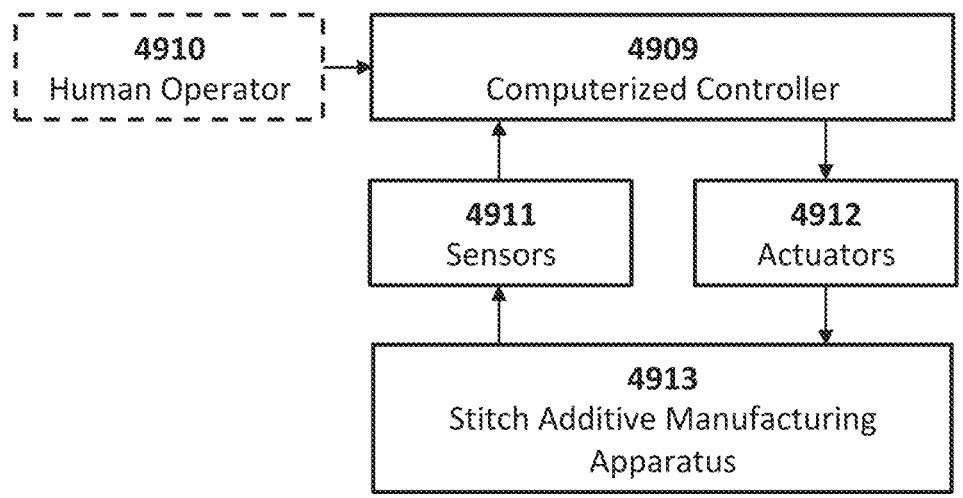
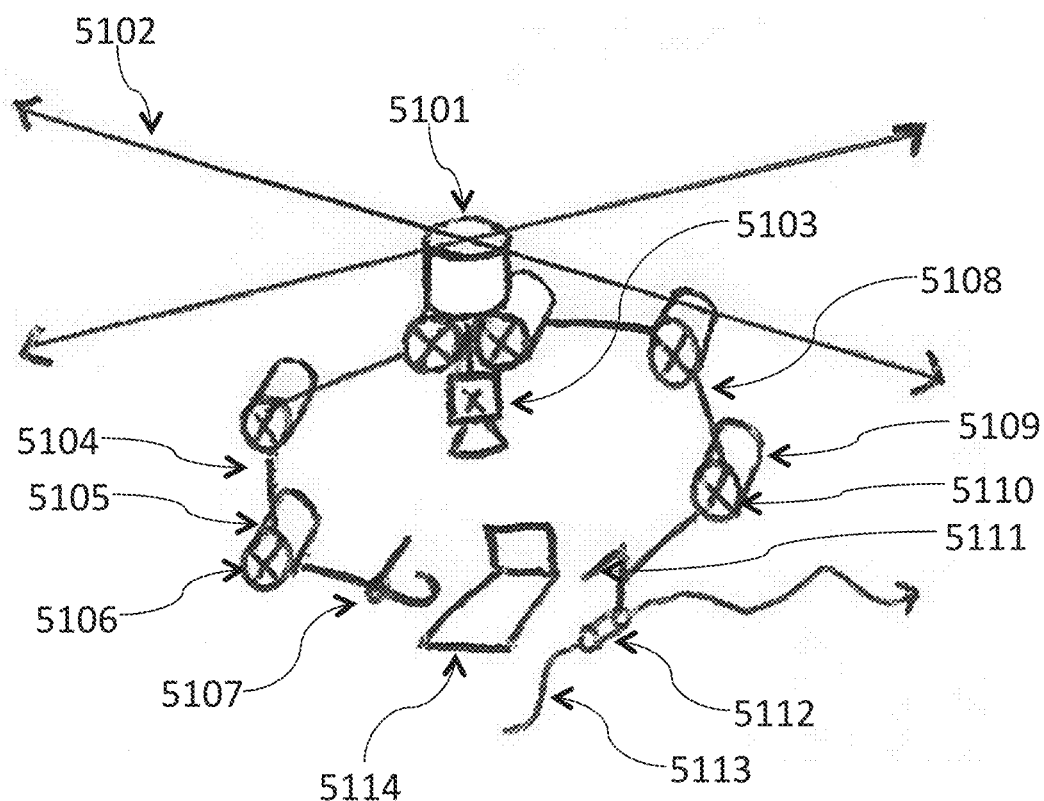
FIG. 51

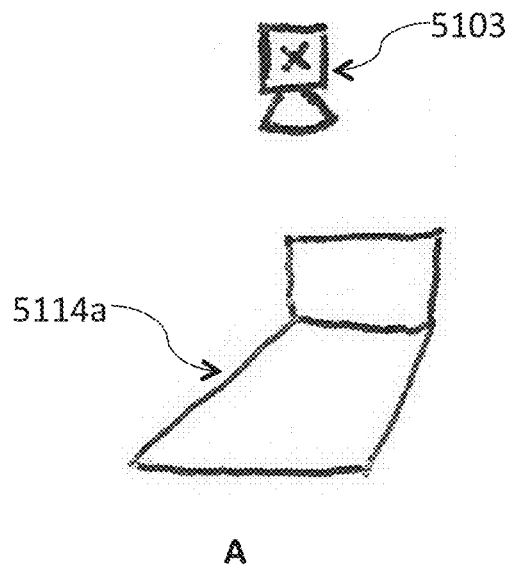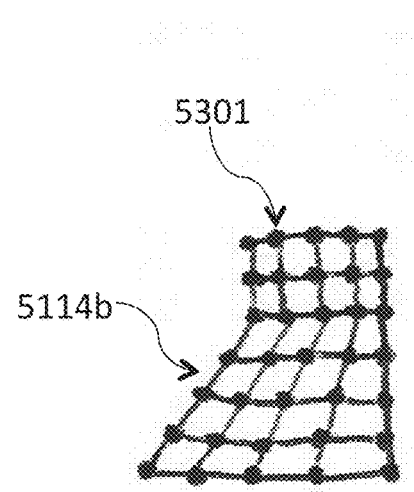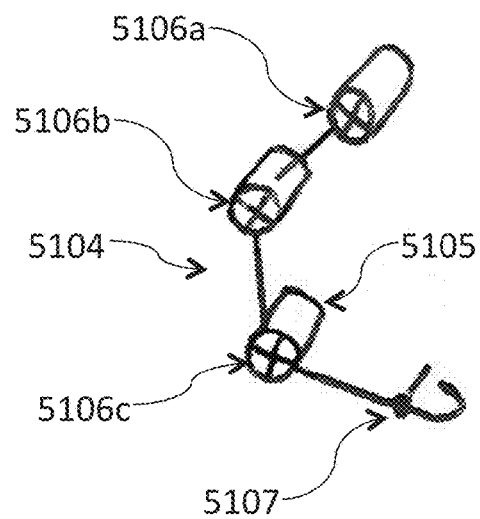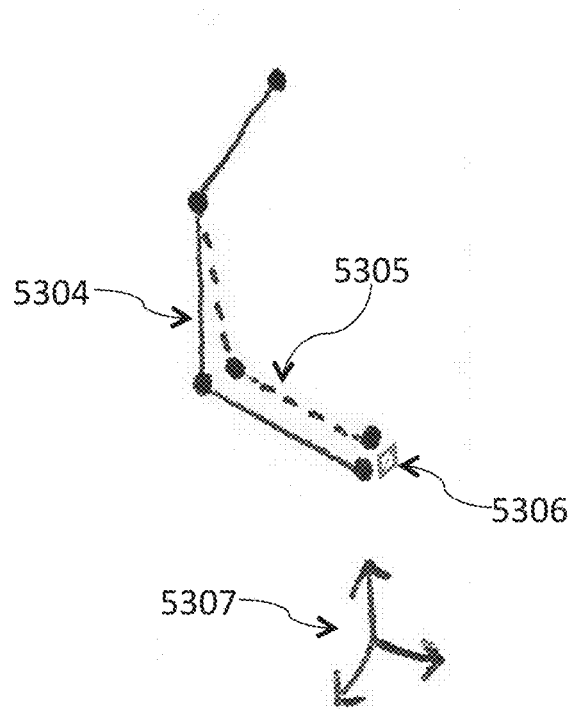
FIG. 53A-D

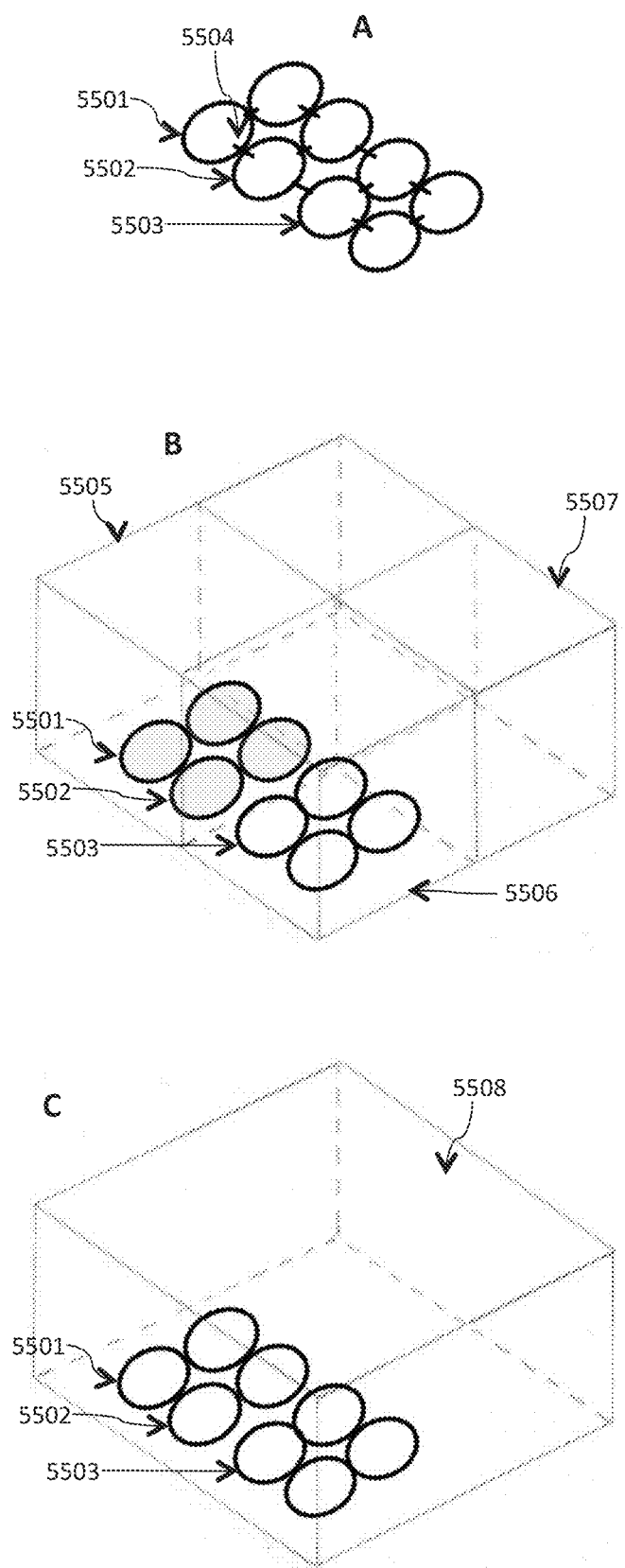
FIG. 55A-C

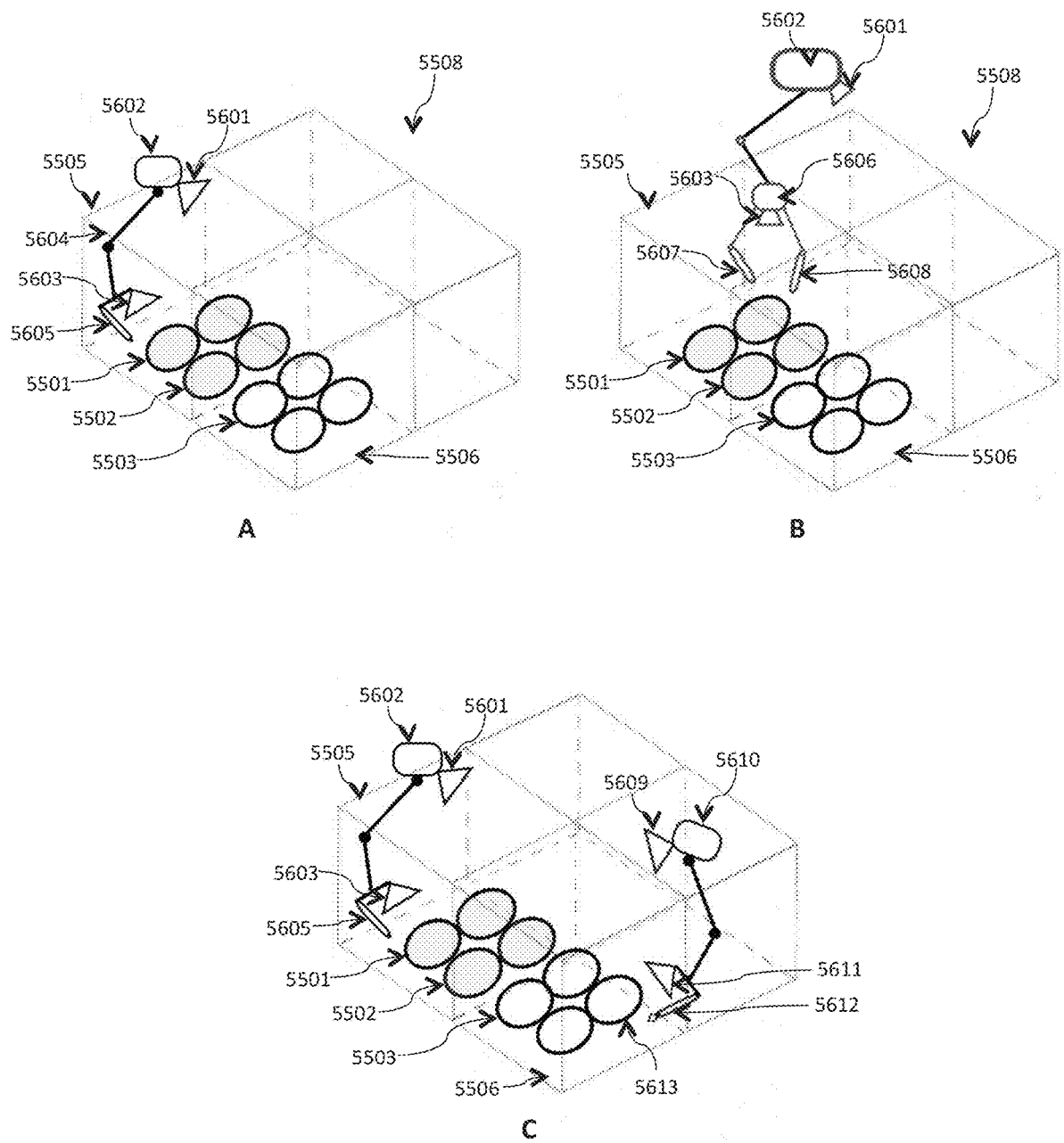
FIG. 56A-C

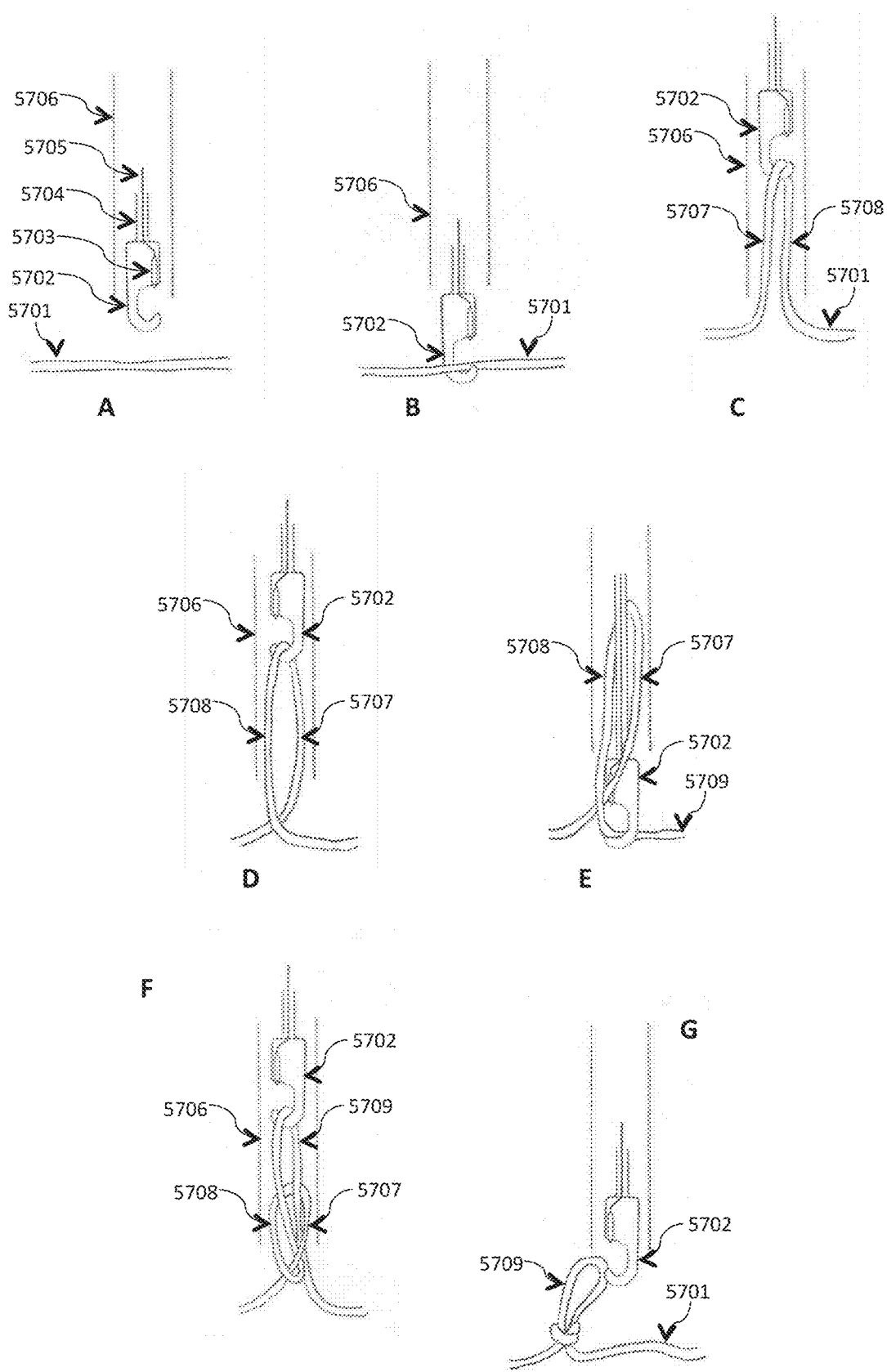
FIG. 57A-G

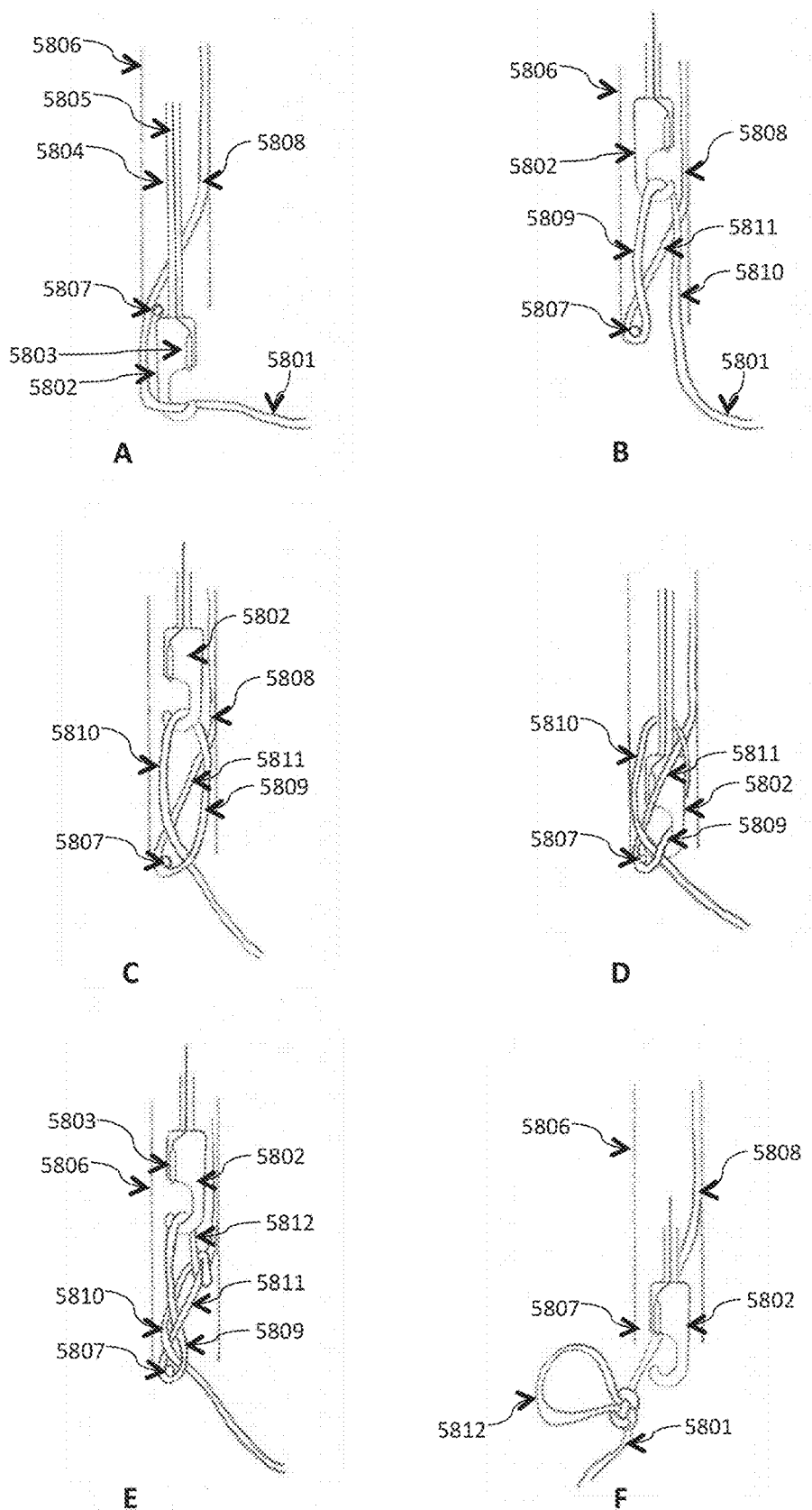
FIG. 58A-F

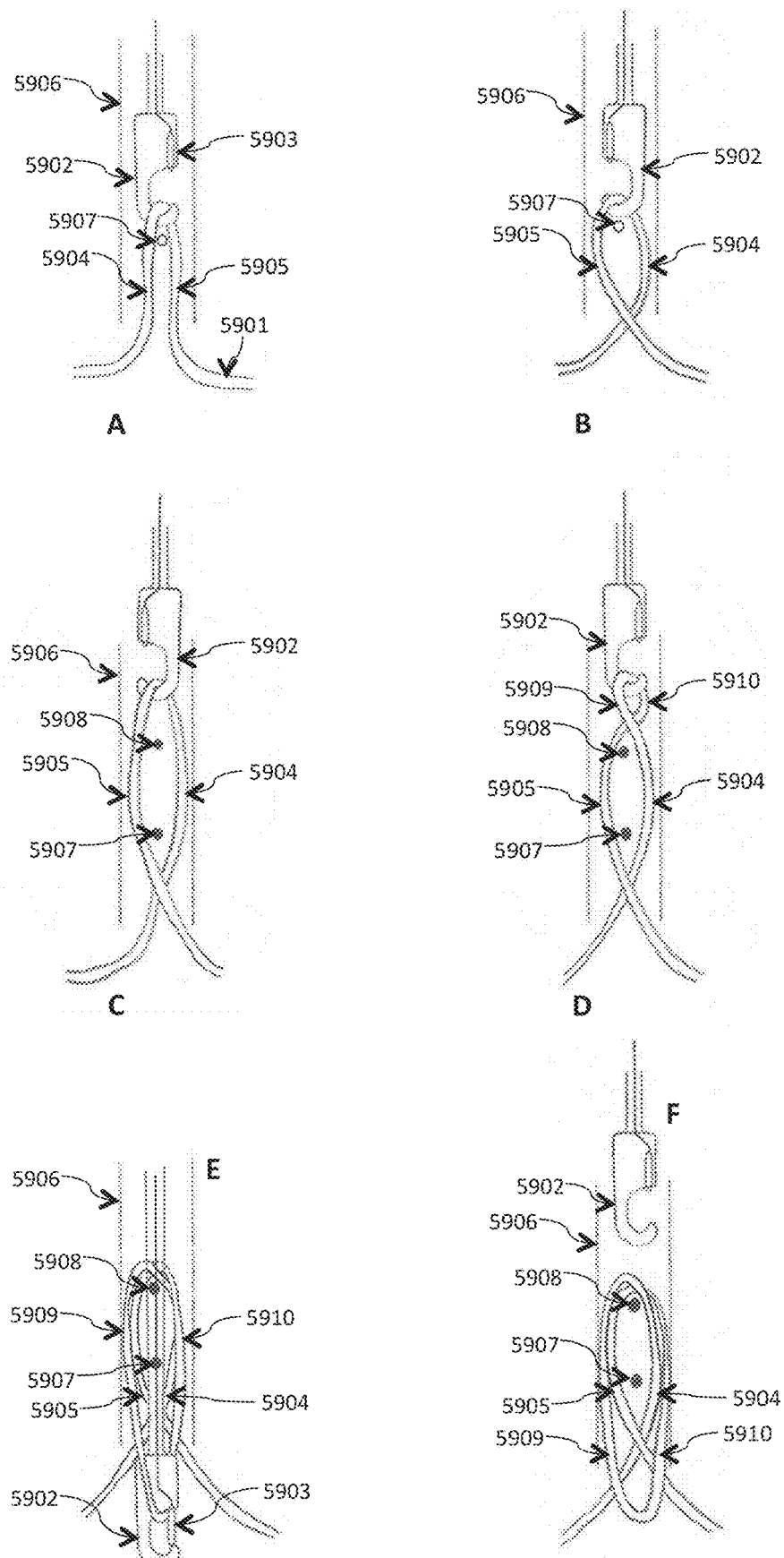
FIG. 59A-I

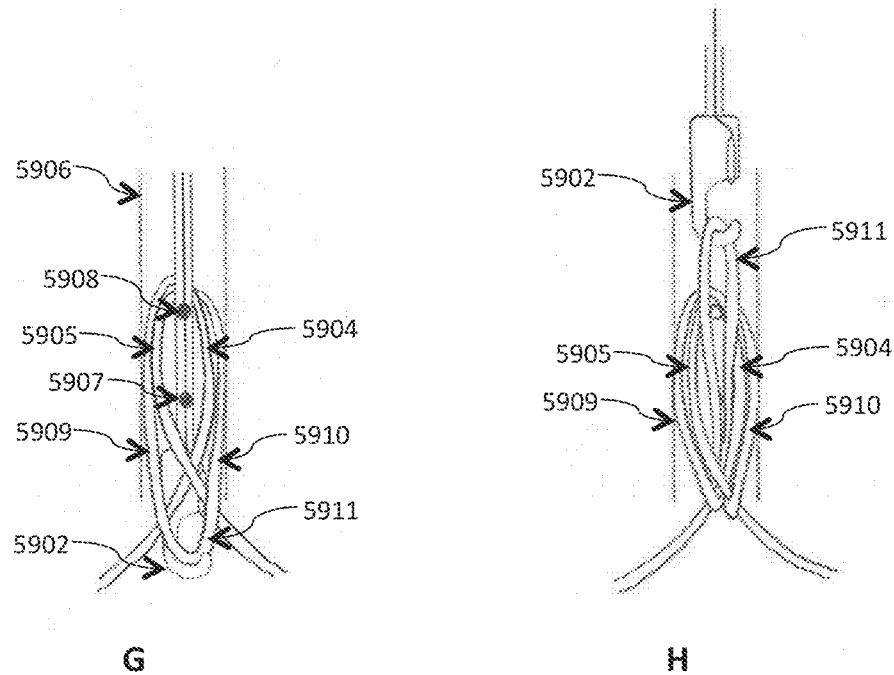
FIG. 59A-I
(CONT)

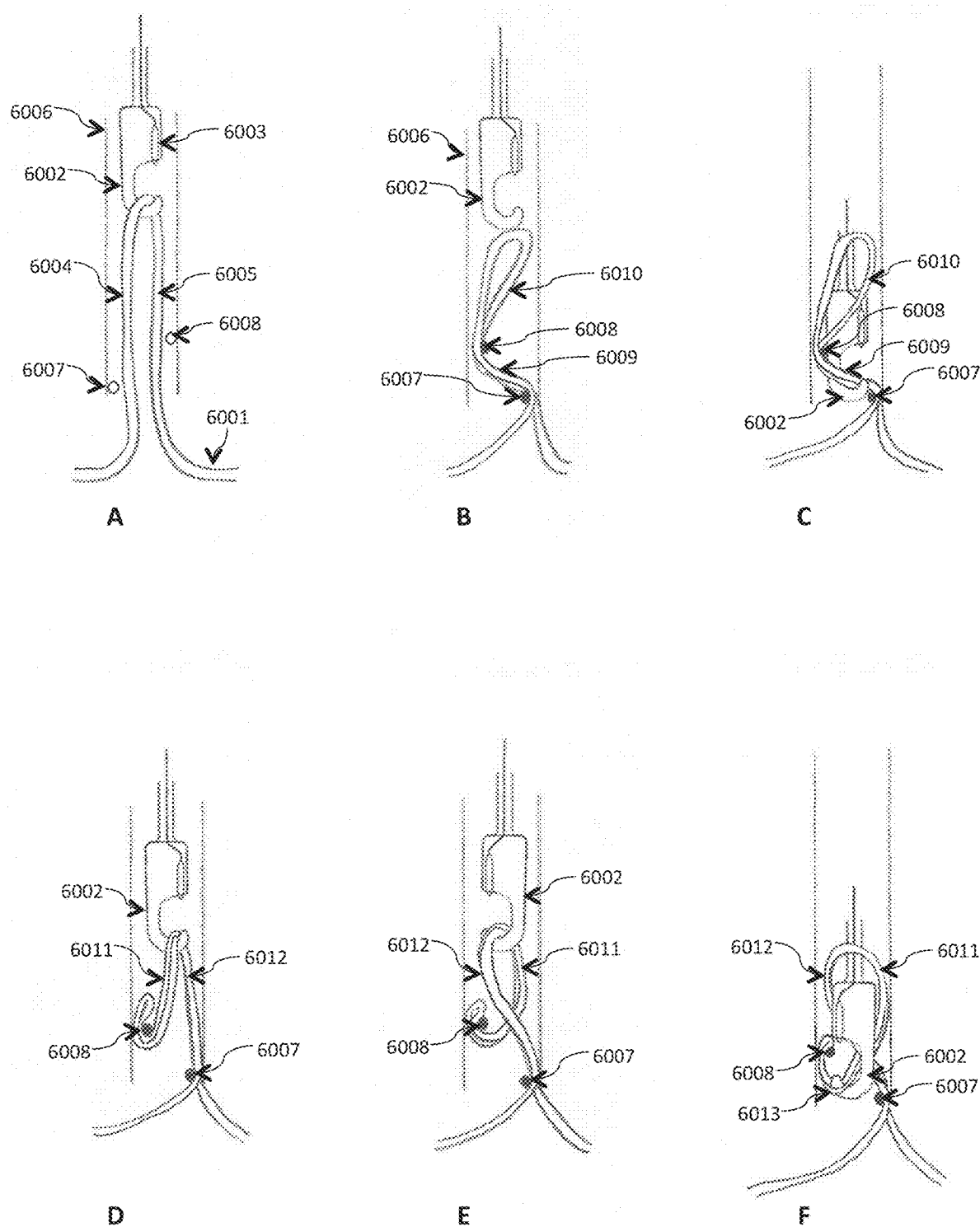
FIG. 60A-H

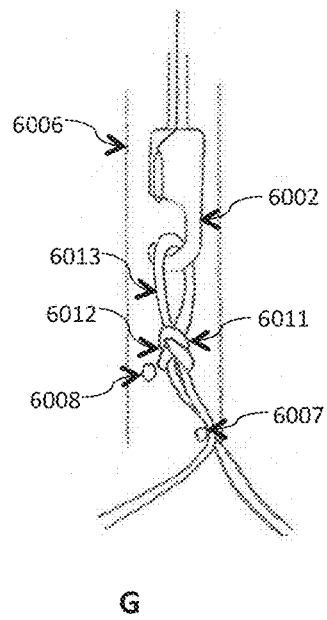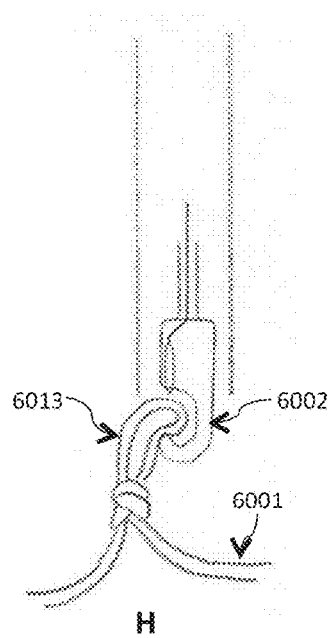
FIG. 60A-H (CONT)
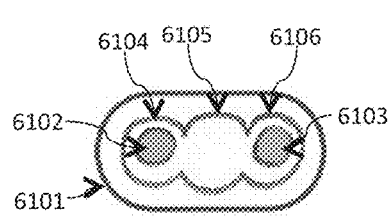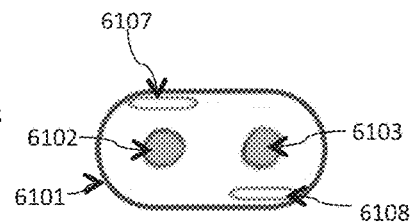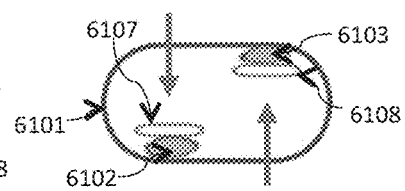
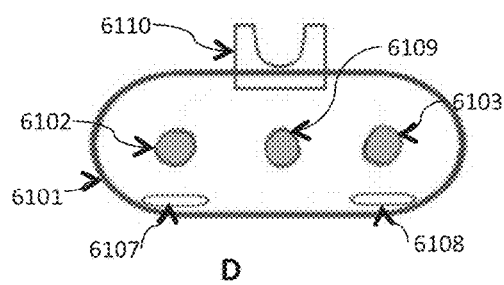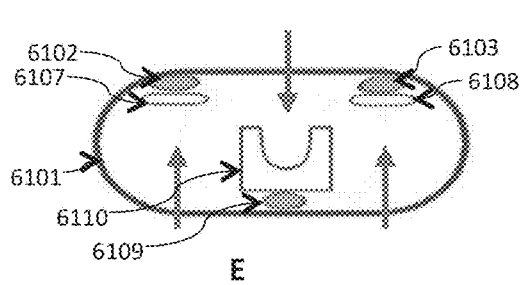
FIG. 61A-E

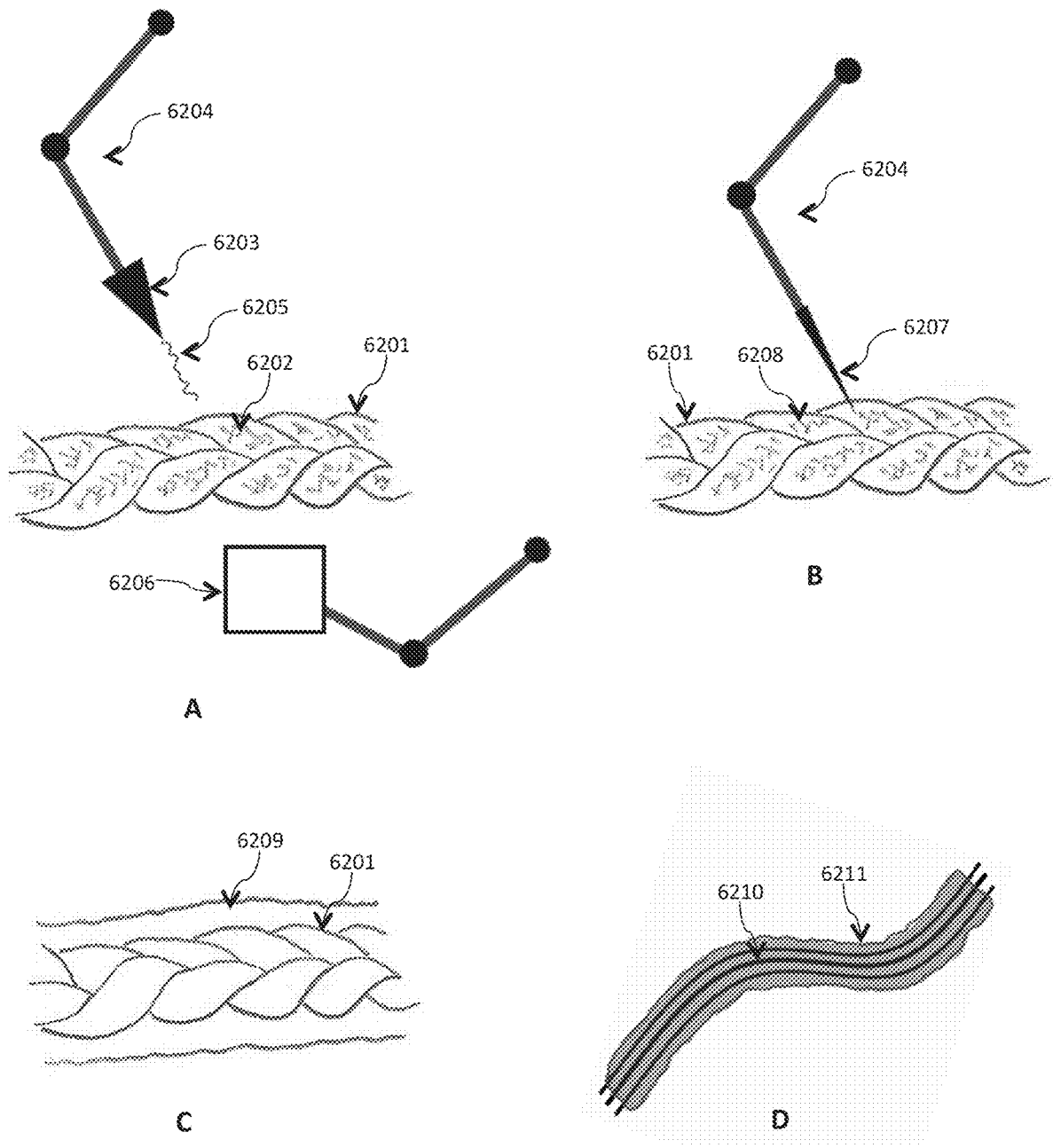
FIG. 62A-D

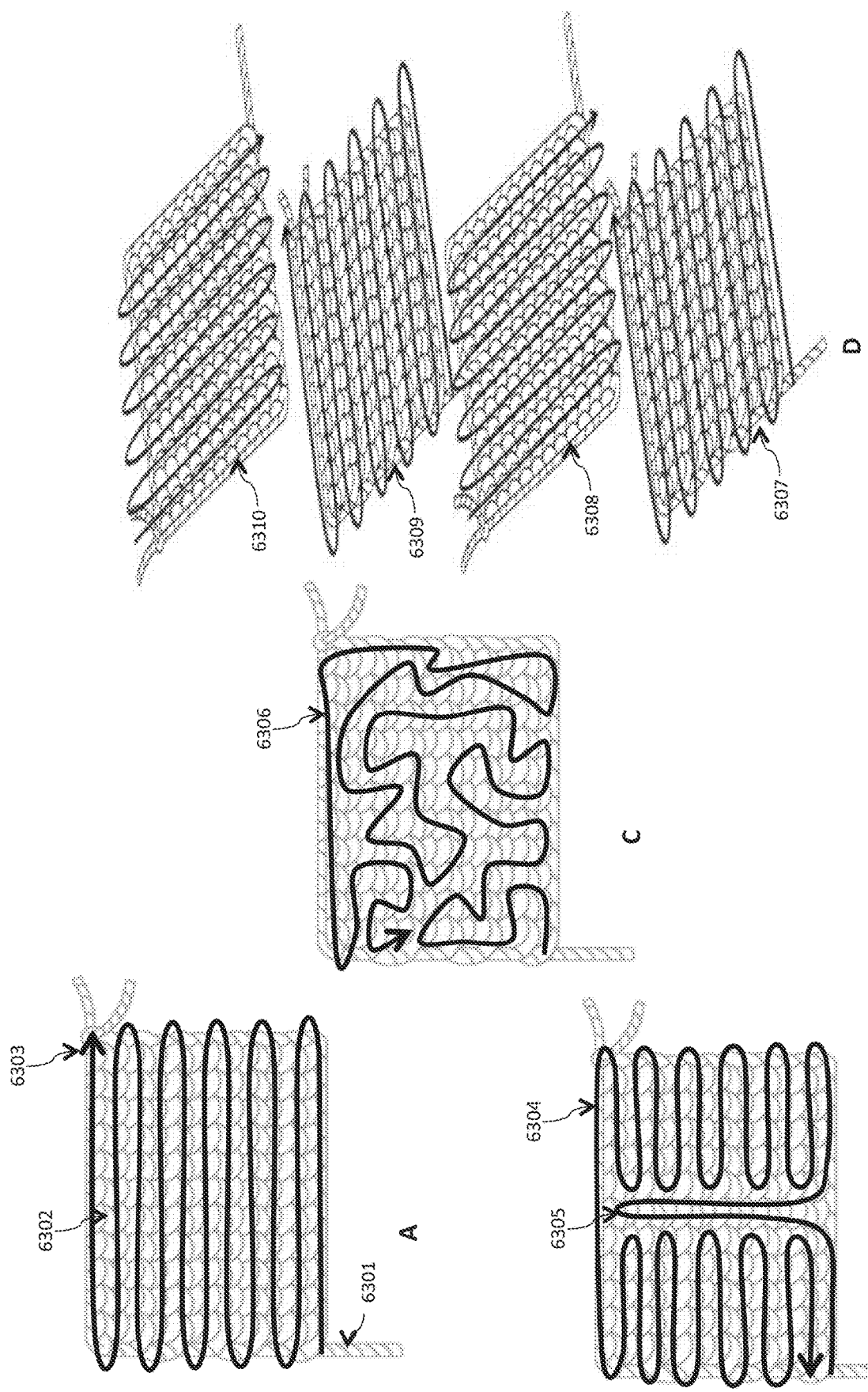
FIG. 63A-D

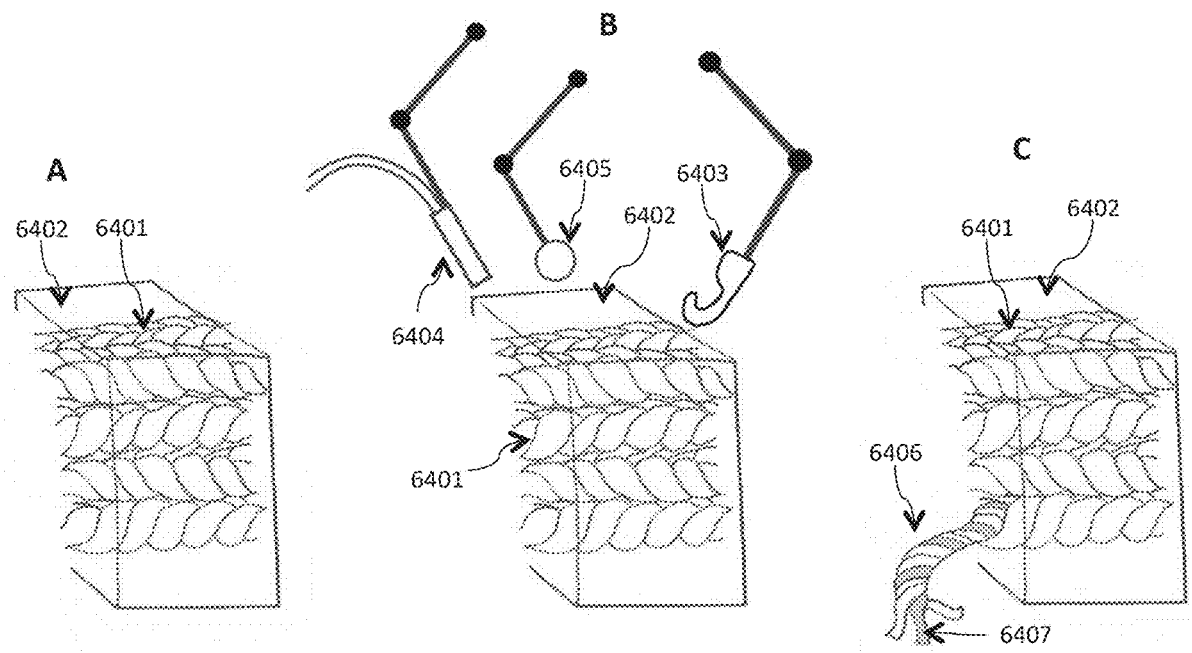
FIG. 64A-C
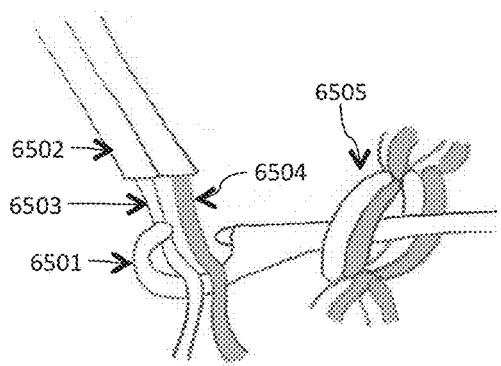
FIG. 65
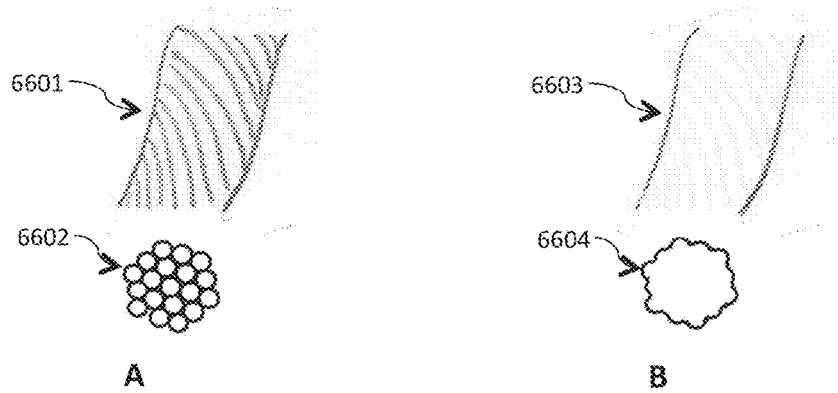
FIG. 66A-B

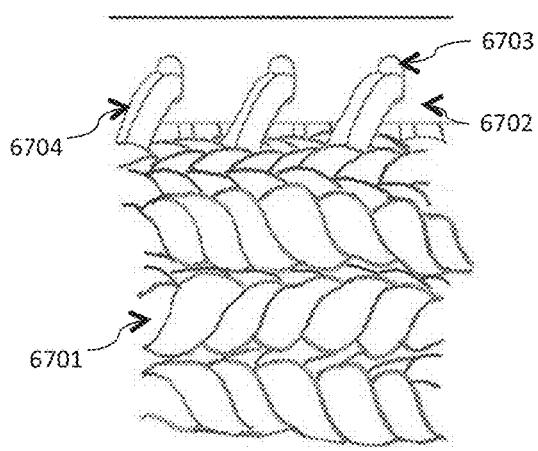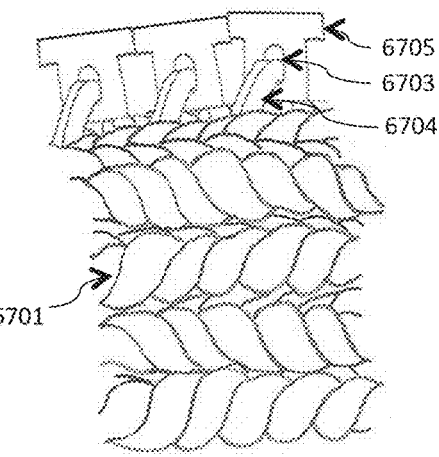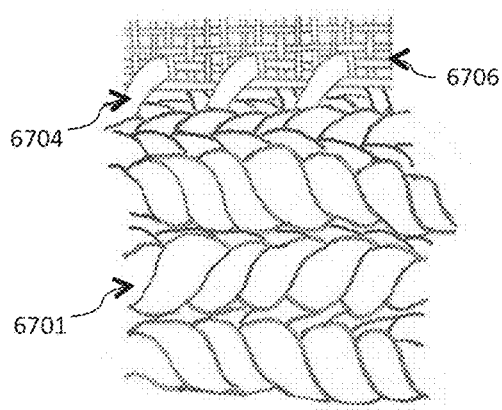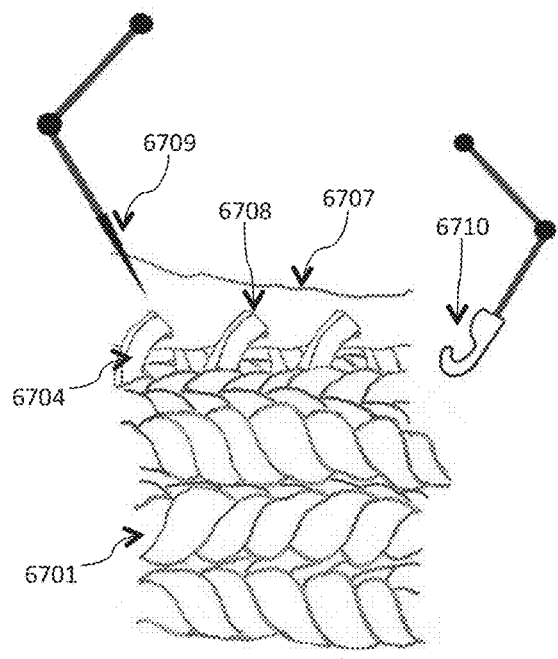
FIG. 67A-D

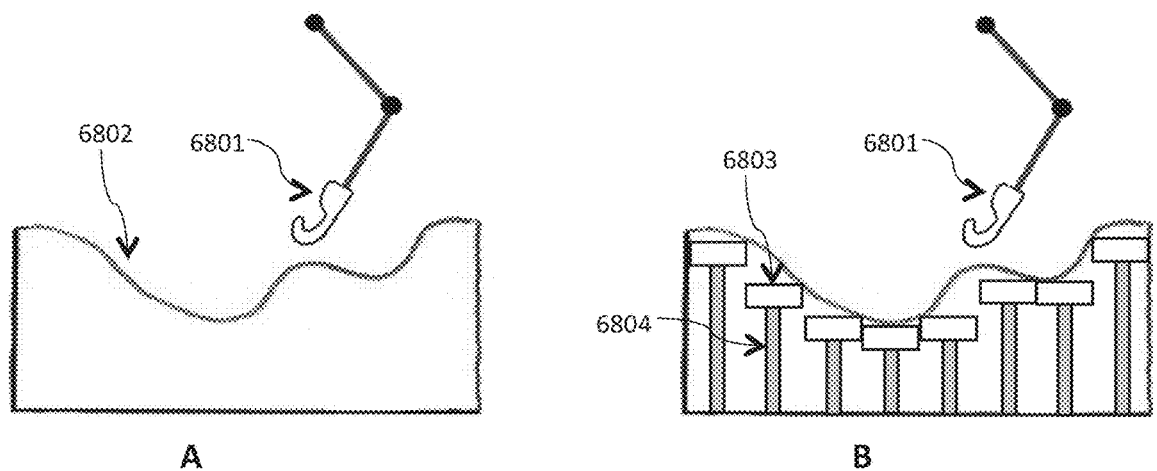
FIG. 68A-B
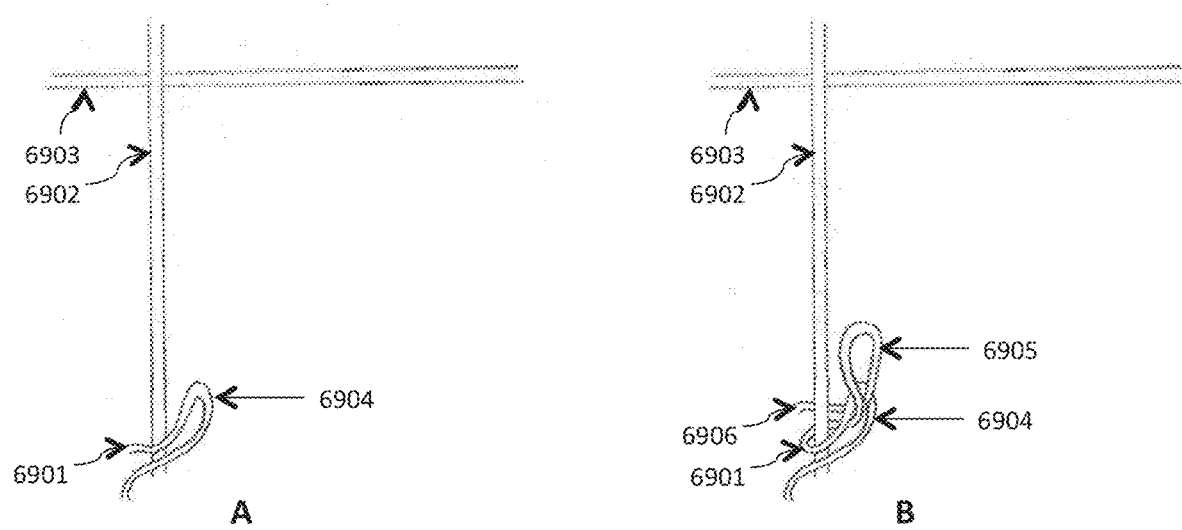
FIG. 69A-J

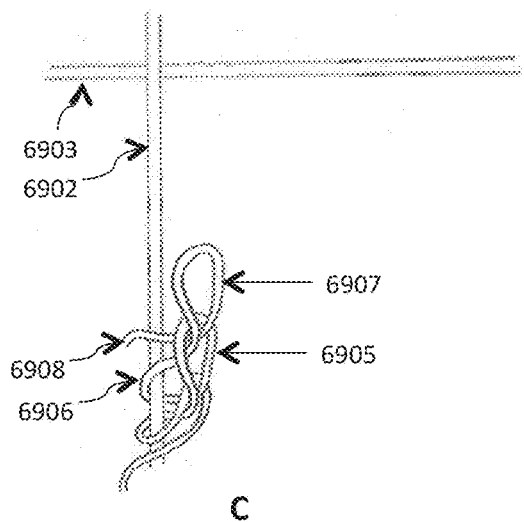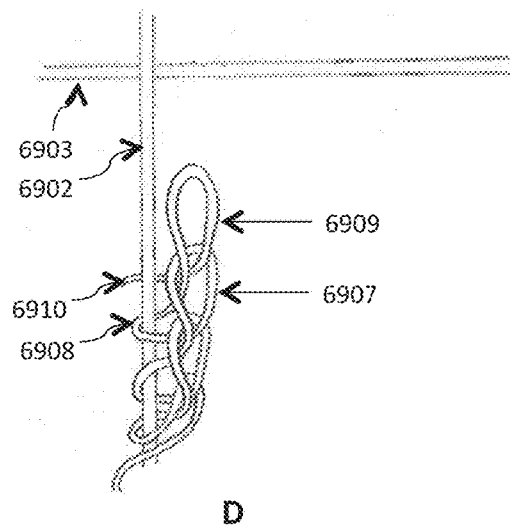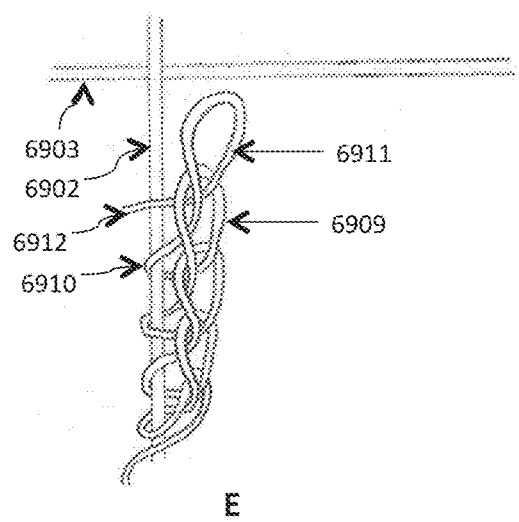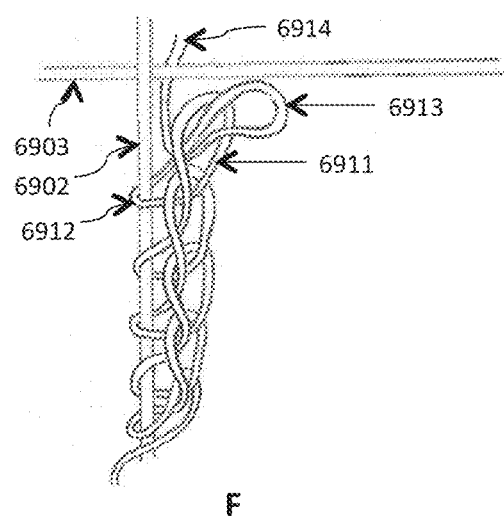
FIG. 69A-J
(CONT)

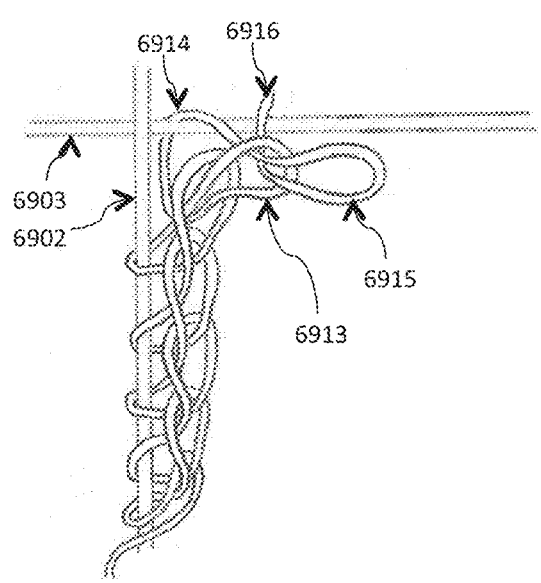
G
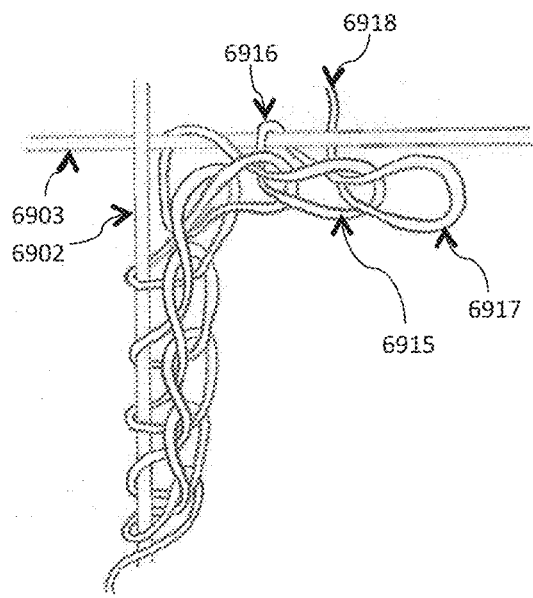
H
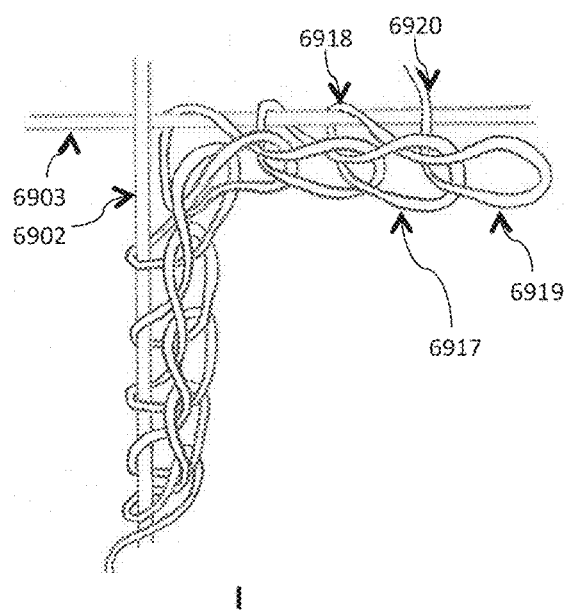
I
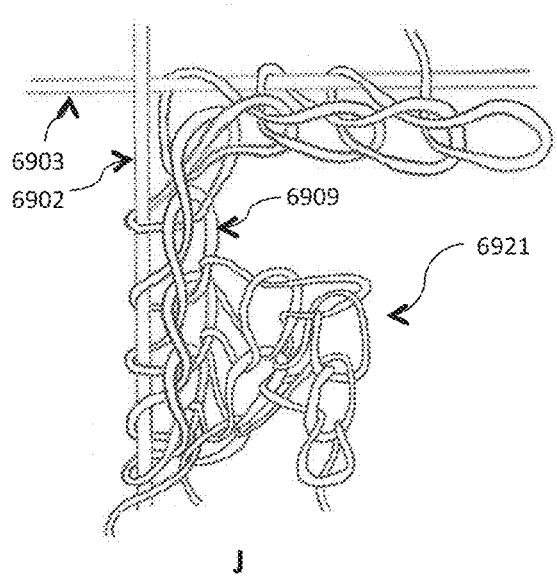
J
FIG. 69A-J
(CONT)

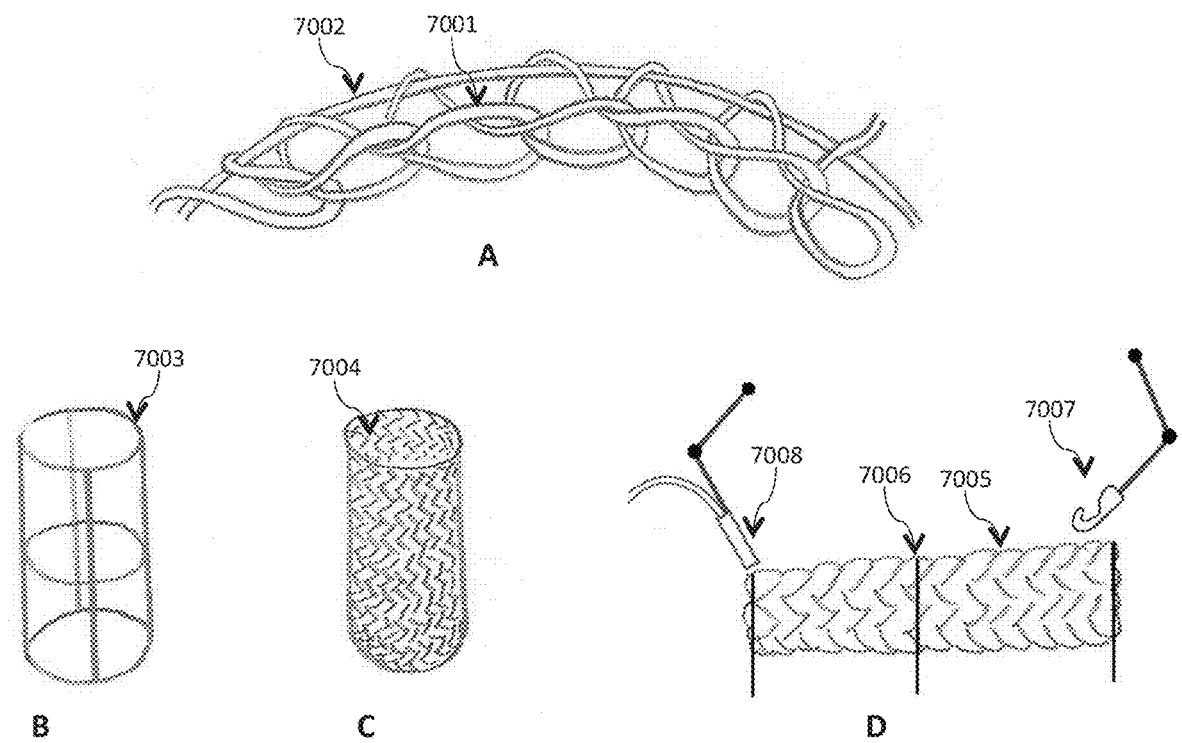
FIG. 70A-D
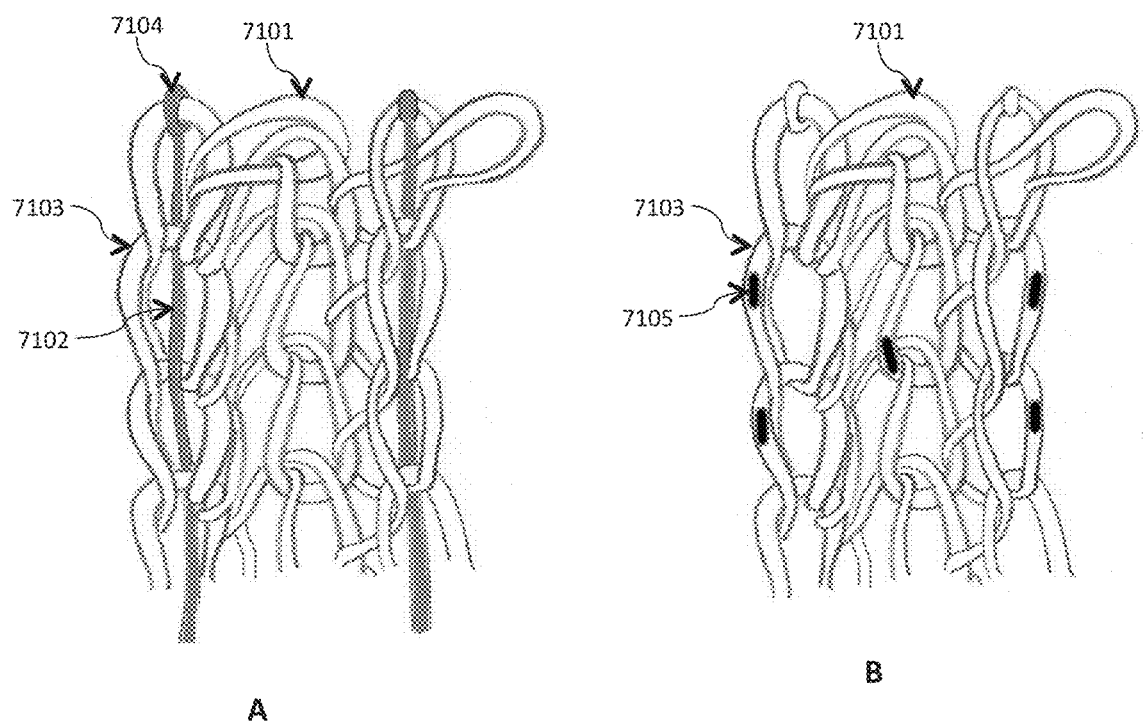
FIG. 71A-B

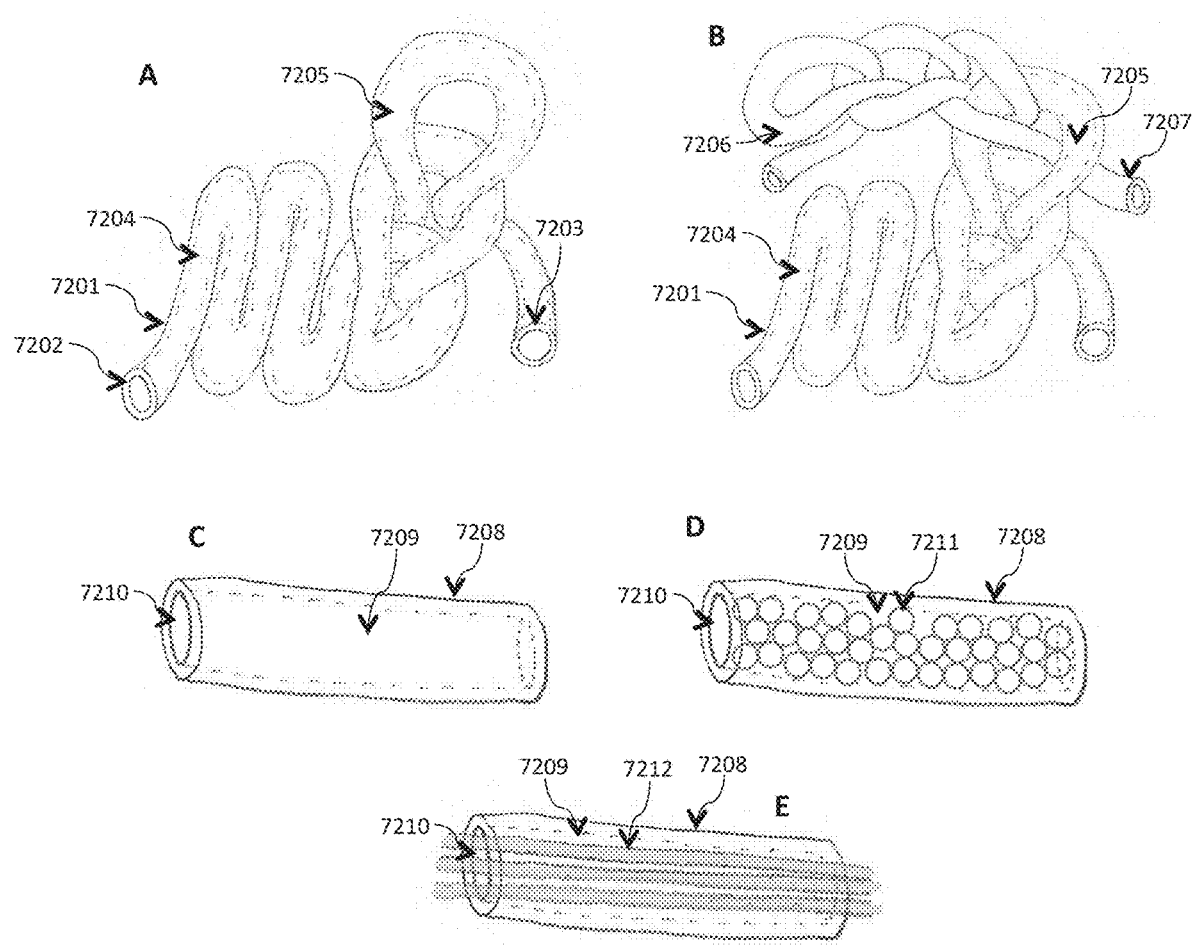
FIG. 72A-E
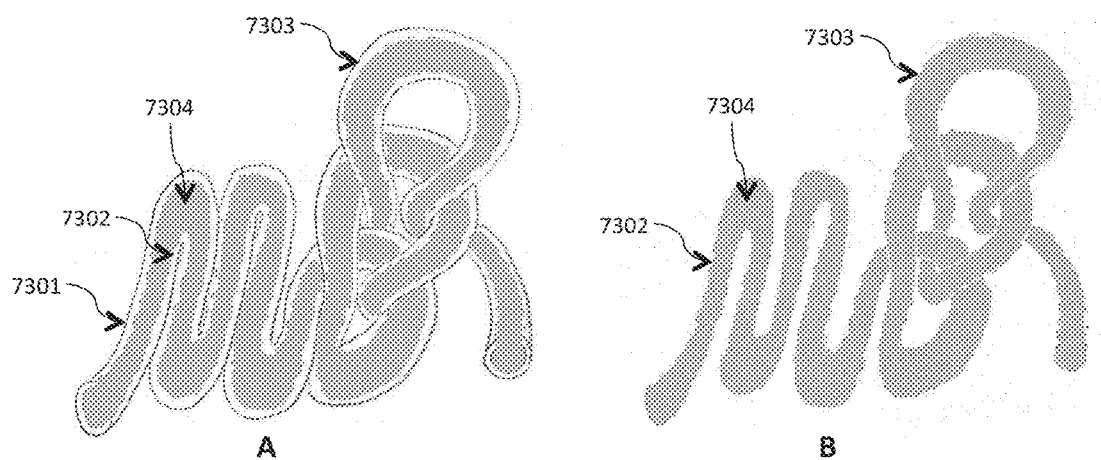
FIG. 73A-B

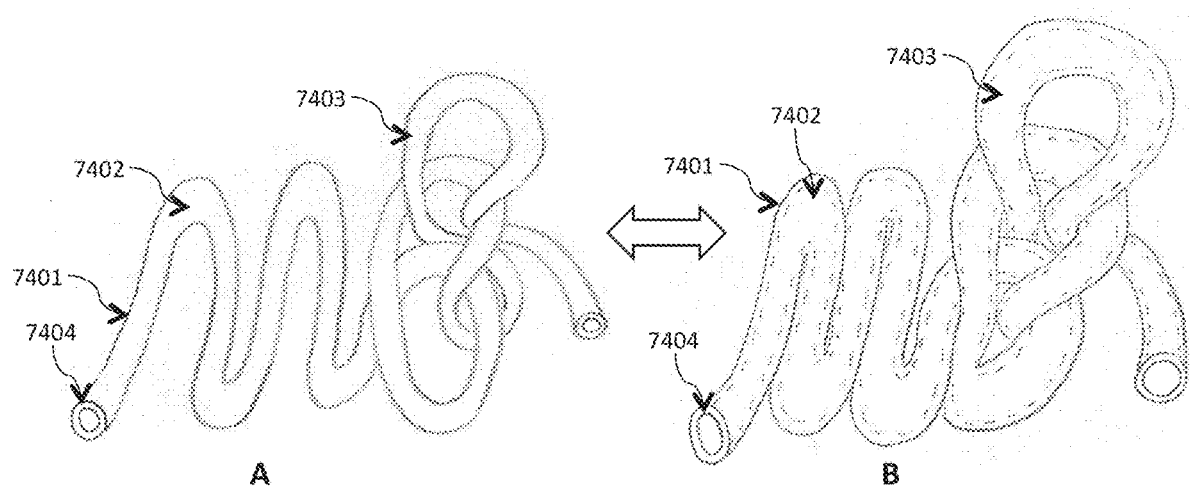
FIG. 74A-B
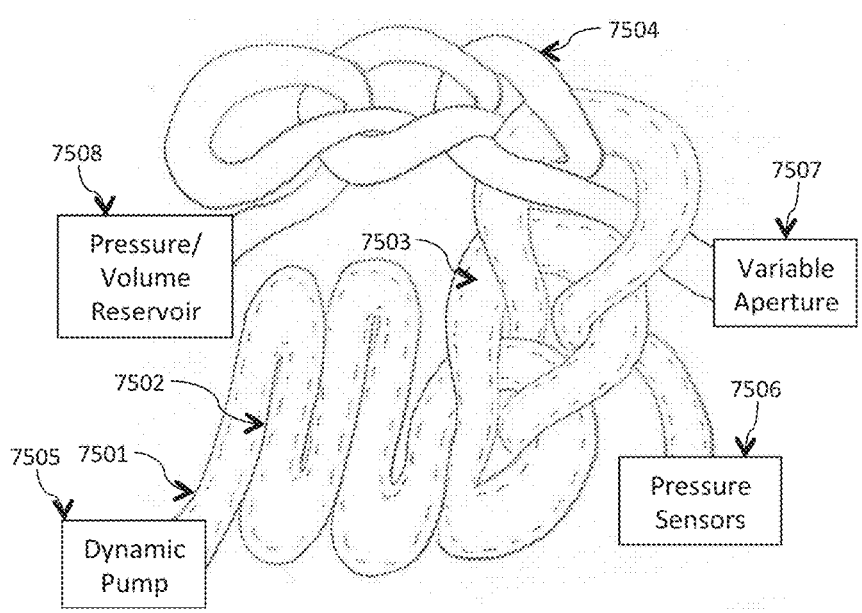
FIG. 75

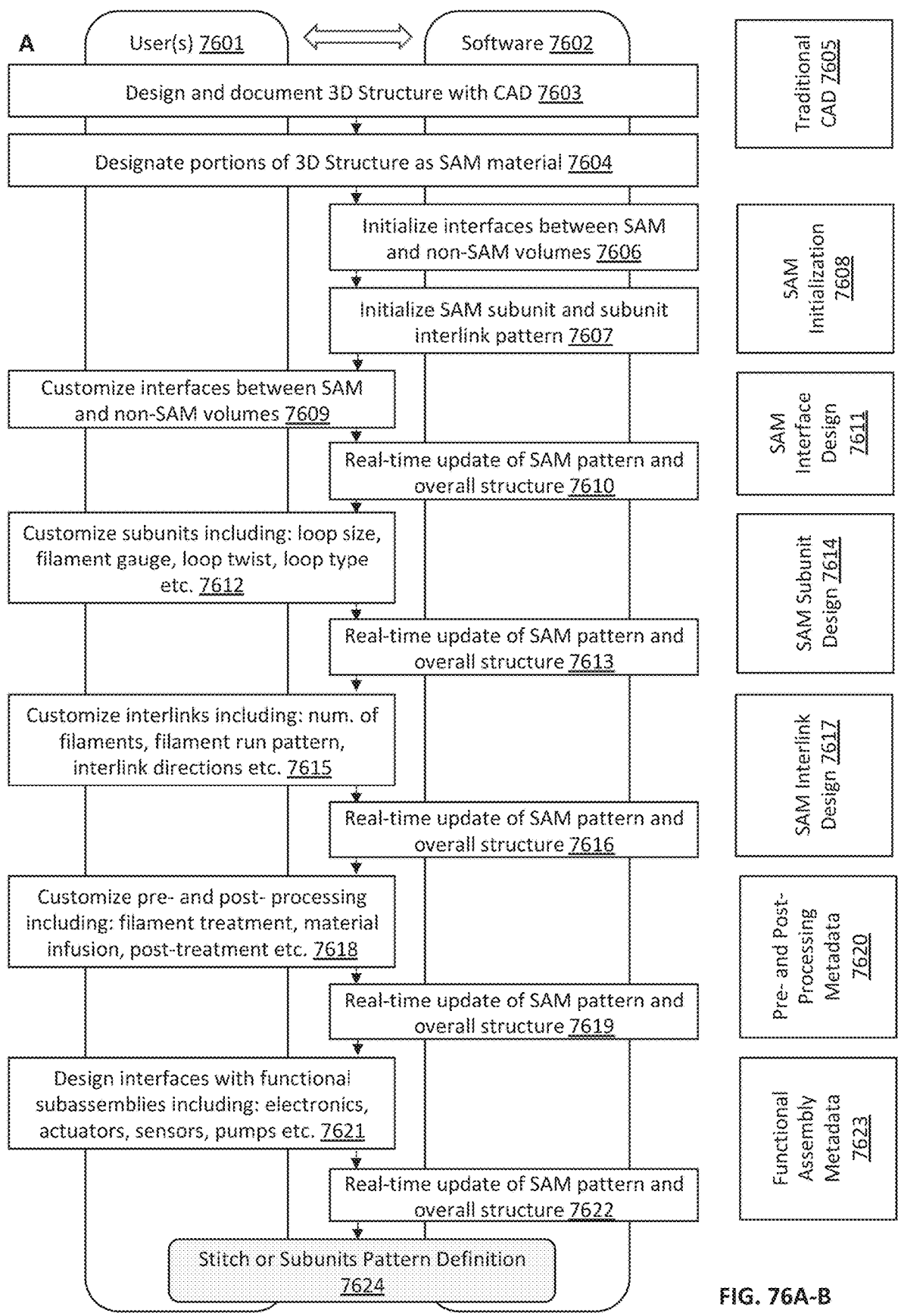
FIG. 76A-B

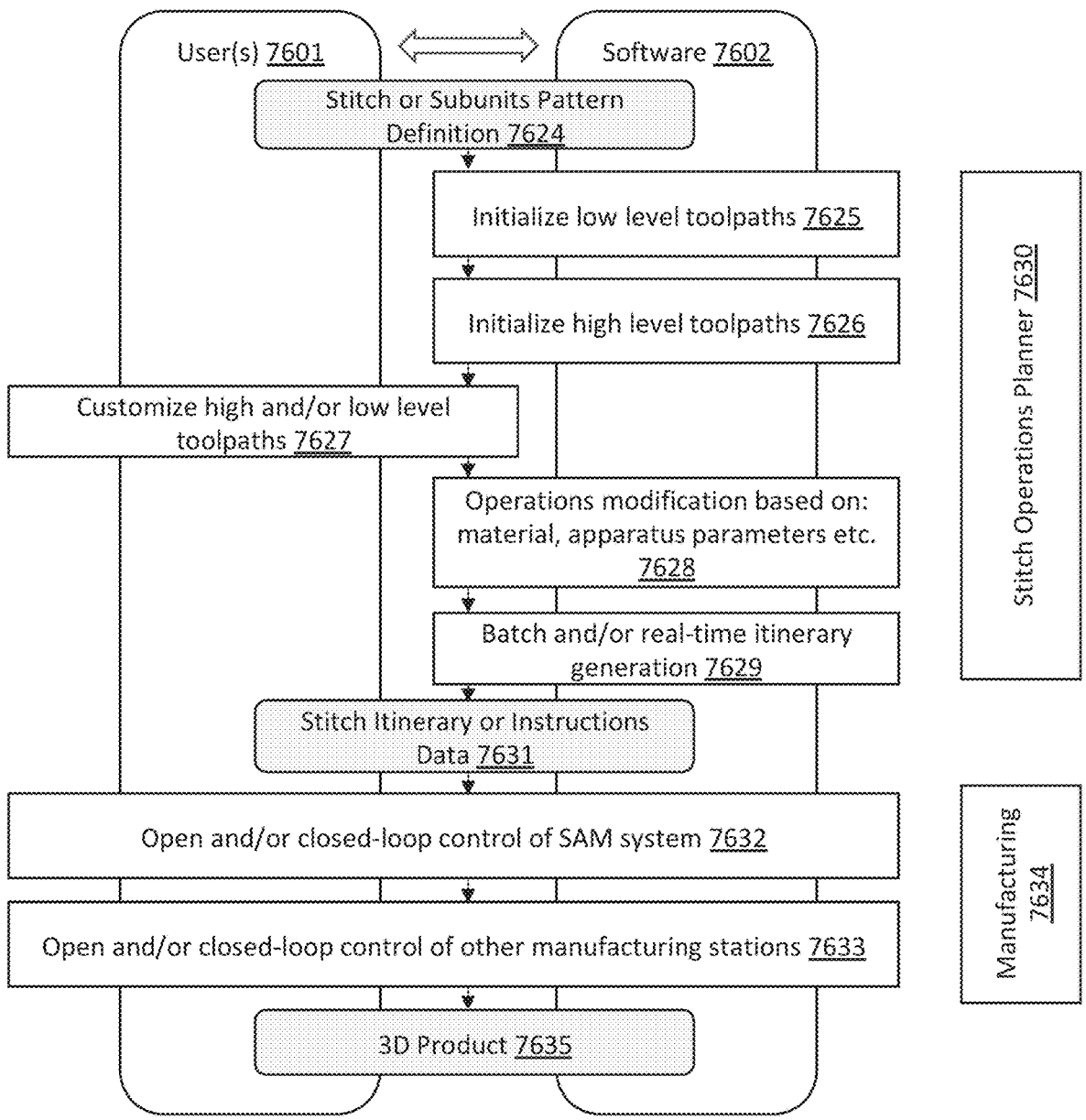
FIG. 76A-B
(CONT)

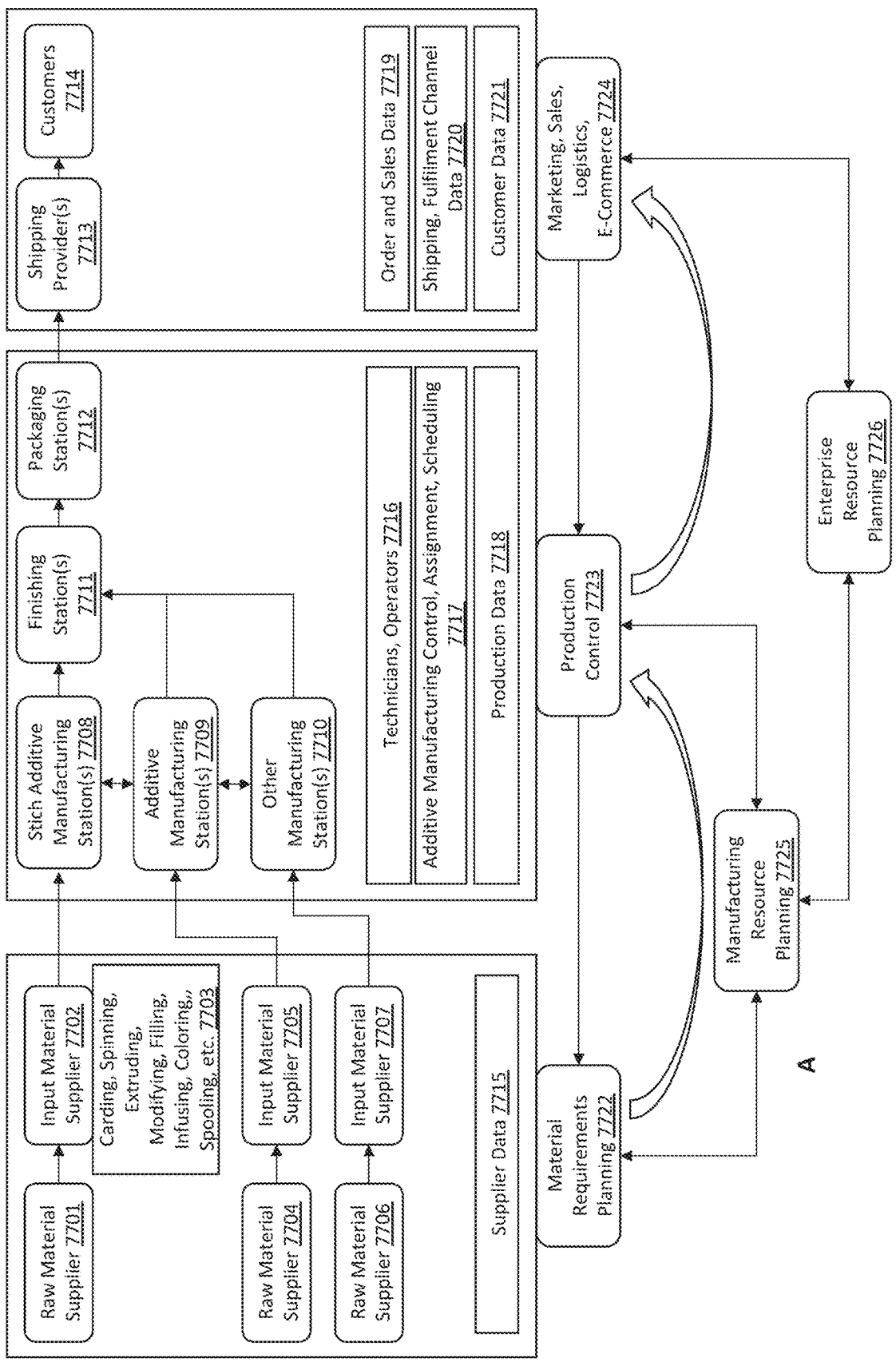
FIG. 77A-C

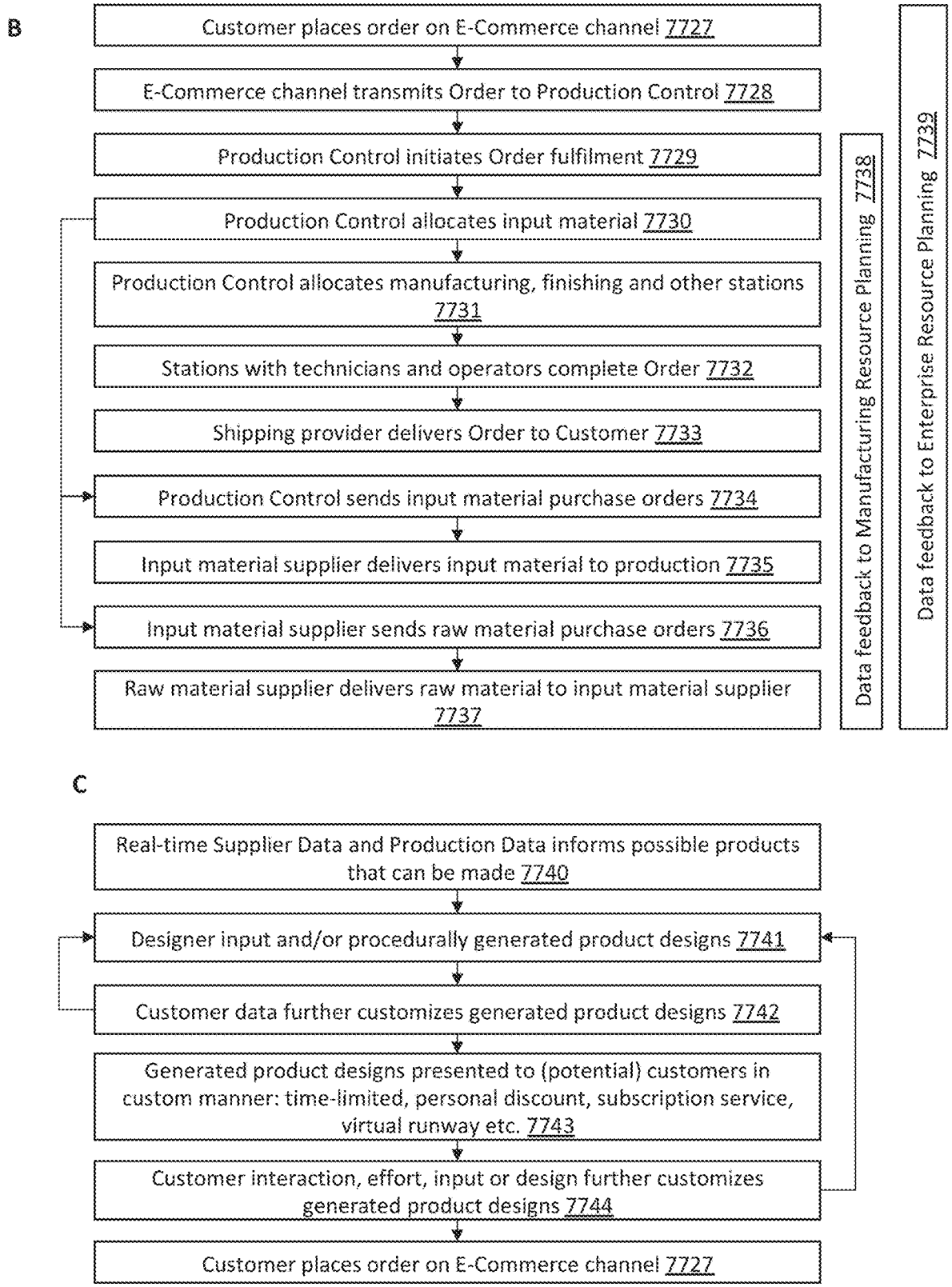
FIG. 77A-C
(CONT)

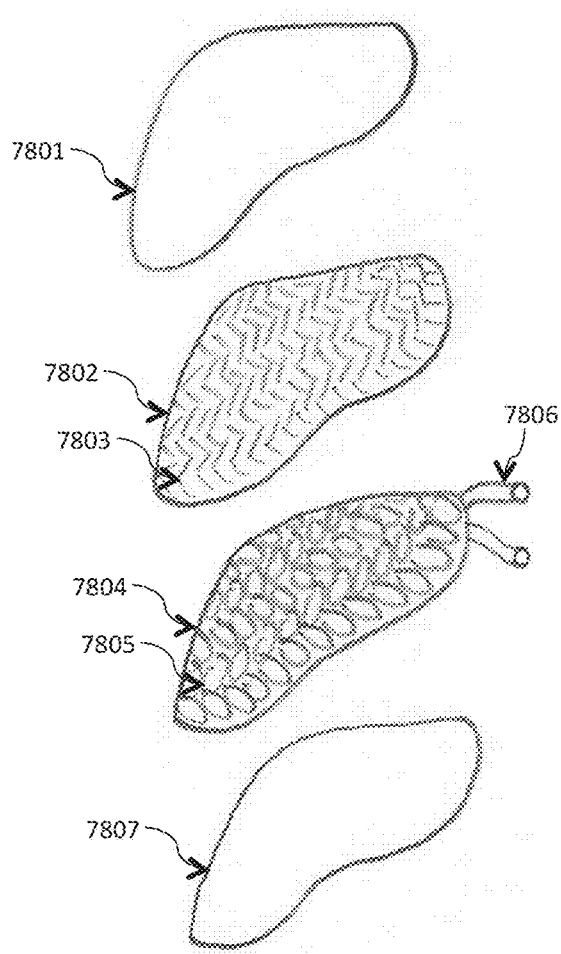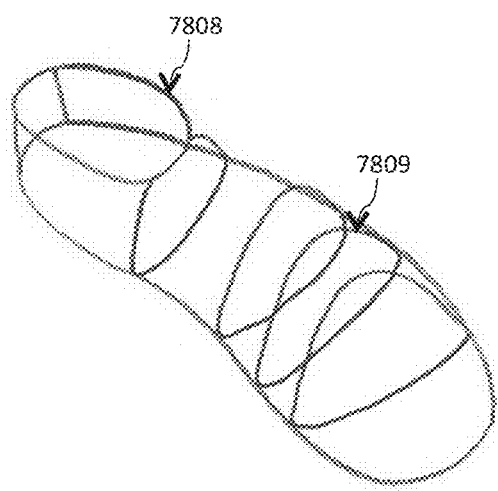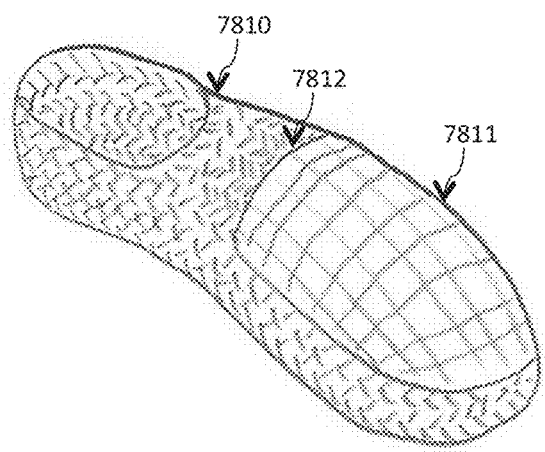
FIG. 78A-C

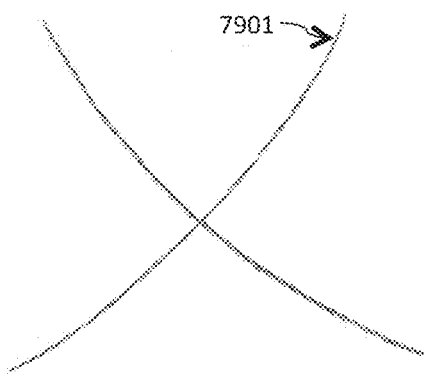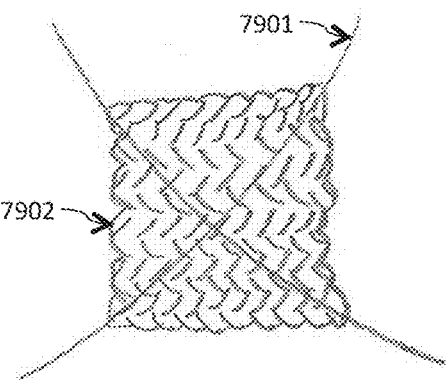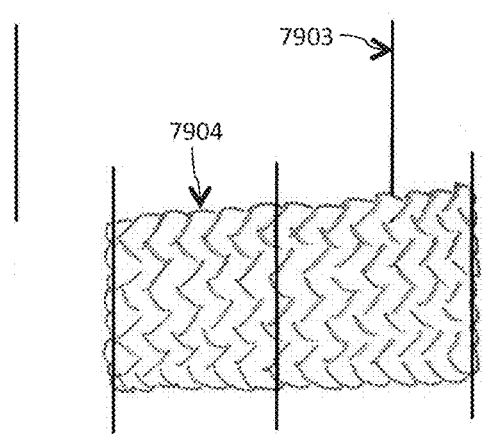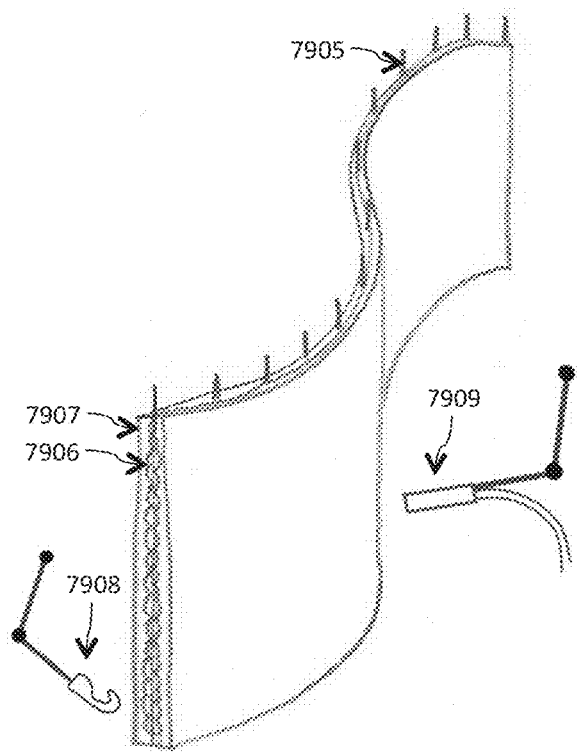
FIG. 79A-D

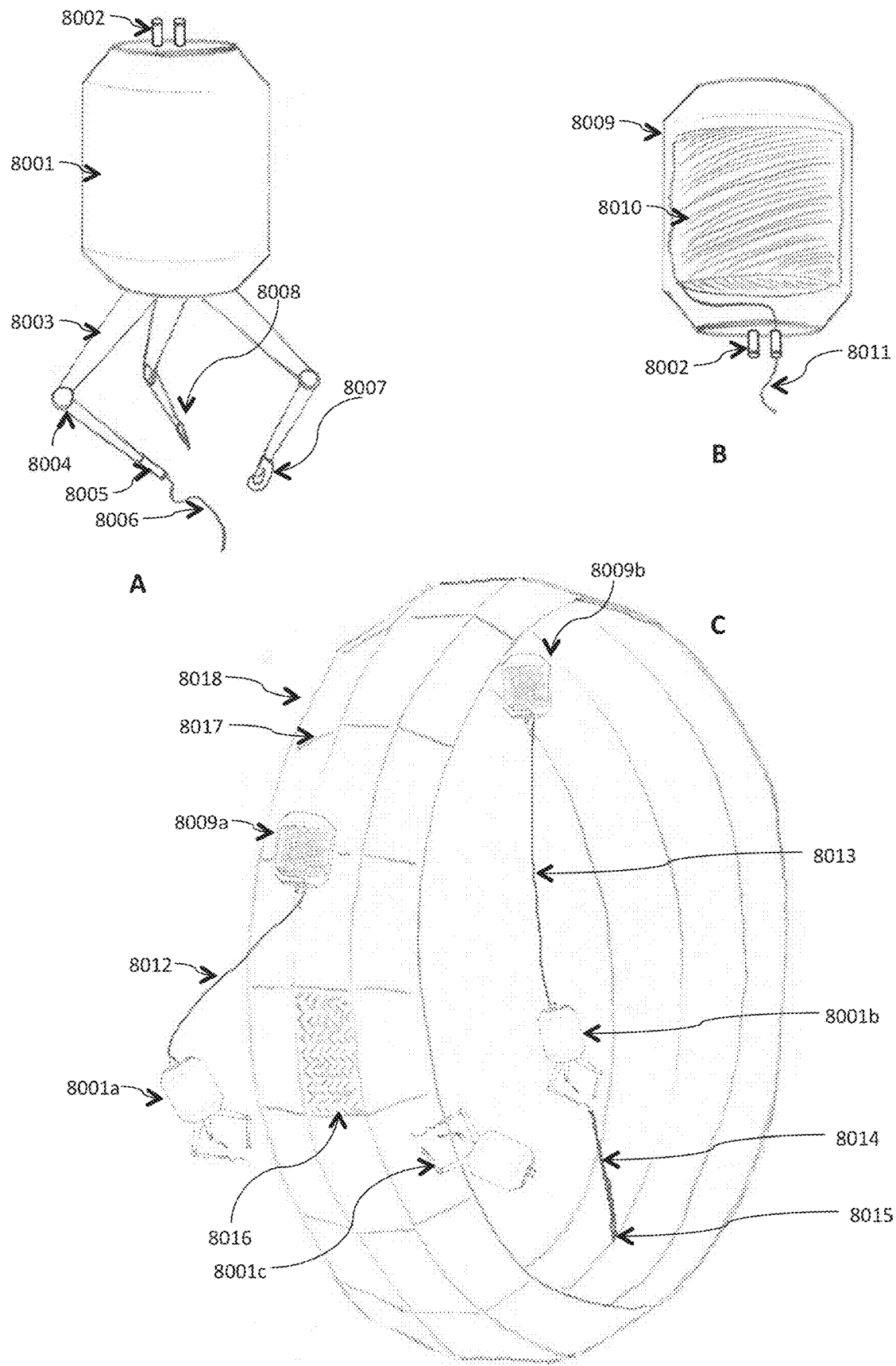
FIG. 80A-C

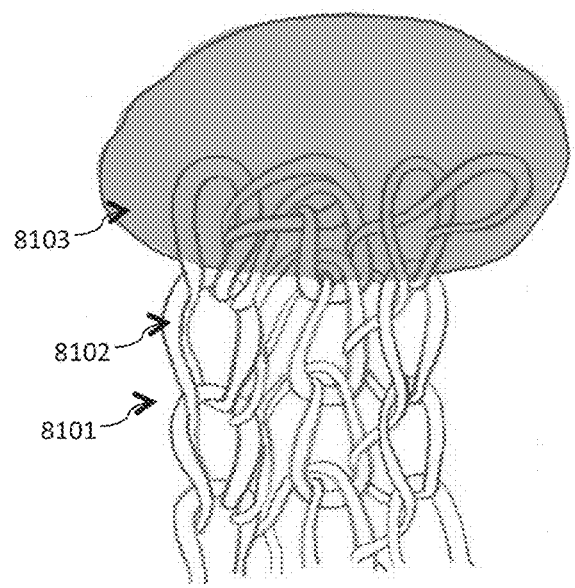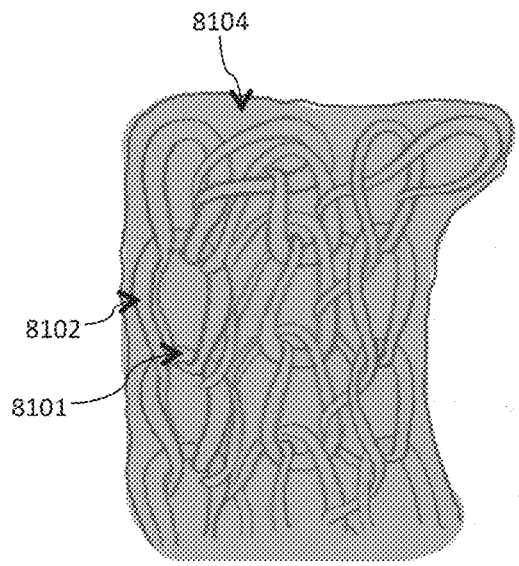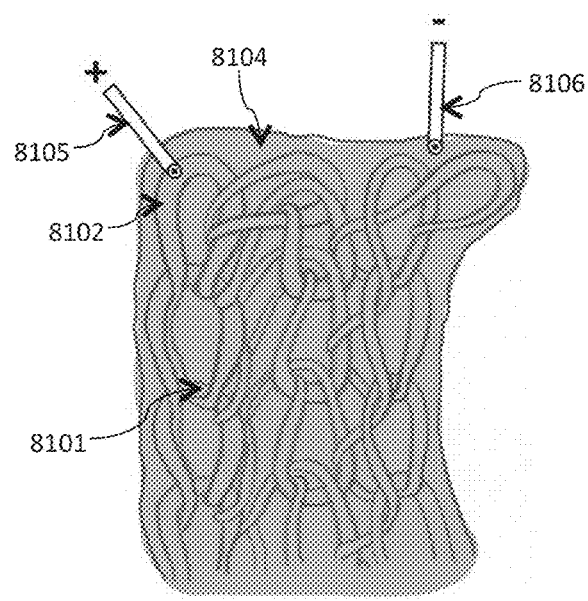
FIG. 81A-C

ADDITIVE MANUFACTURING SYSTEM USING INTERLINKED REPEATING SUBUNITS

CROSS-REFERENCE TO RELATED APPLICATIONS

This Nonprovisional patent application is a divisional of and claims priority to U.S. Nonprovisional patent application Ser. No. 16/947,197, entitled "ADDITIVE MANUFACTURING SYSTEM USING INTERLINKED REPEATING SUBUNITS" filed Jul. 22, 2020, by the same inventor, which is a continuation-in-part of and claims priority to International Patent Application No. PCT/US2019/023889, entitled "ADDITIVE MANUFACTURING SYSTEM USING INTERLINKED REPEATING SUBUNITS," filed Mar. 25, 2019, by the same inventor, which is a continuation of and claims priority to U.S. Nonprovisional patent application Ser. No. 16/270,253, entitled "ADDITIVE MANUFACTURING SYSTEM USING INTERLINKED REPEATING SUBUNITS," filed Feb. 7, 2019, by the same inventor, which claims priority to U.S. Provisional Patent Application No. 62/651,731, entitled "SYSTEMS AND METHODS OF MANUFACTURING USING YARN-LIKE INPUT," filed Apr. 3, 2018, by the same inventor; Nonprovisional patent application Ser. No. 16/947,197 also claims priority to U.S. Provisional Patent Application No. 62/876,989, entitled "ADDITIVE MANUFACTURING SYSTEM USING INTERLINKED REPEATING SUBUNITS," filed on Jul. 22, 2019, by the same inventor, all of which are incorporated herein by reference, in their entireties, for all purposes.

BACKGROUND OF THE INVENTION

1. Field of the Invention

This invention relates, generally, to additive manufacturing systems. More specifically, it relates to improved input materials and output structures for additive manufacturing machines, such as yarn-like input interlinked as subunits into the output macro-structure, allowing for customization of flexibility, tensile strength and other properties of the printed piece, beyond the capabilities of typically-used binder-powder, heat-fusible or photo/thermo-polymerizing raw materials and traditional additive manufacturing systems and methods.

2. Brief Description of the Prior Art

Additive manufacturing practices have been used since at least as early as the 1980s to make custom three-dimensional structures by progressively consolidating material together, as opposed to traditional machining practices which typically perform material removal to make parts with more limited shapes, dictated by the machining process. As such, an additive manufacturing machine could generate an entire structure during one or more printing sessions, as opposed to a series of machined or bulk-formed sub-parts being fabricated and then manually assembled into a final desired three-dimensional structure. Additive manufacturing has proven useful in manufacturing small objects, such as heart valves for patients requiring valve replacement surgery, as well as large objects, such as entire houses and other structures.

While additive manufacturing continues to improve and new uses are continually identified, additive manufacturing processes suffer from certain disadvantages. For example, due to the heat needed to melt the plastics typically used during a printing job, additive manufacturing machines tend to consume much more energy than similar injection molding processes to create a 3D structure. Moreover, the plastics, filaments and other materials typically used in additive manufacturing processes tend to be custom and precision-made resources, making them expensive for the average user. Perhaps even more harmful are the health and environmental impacts of using plastic materials in additive manufacturing processes—the use of plastics can lead to emissions that are harmful to both humans and the environment. Continued use of plastics, particularly non-biodegradable plastics, leads to harmful environmental impacts as byproducts of the production process, as well as the plastics themselves, tend to be disposed in landfills rather than be recycled for other uses, leading to waste.

Furthermore, the available selection of additive manufacturing input materials is constrained by the methods used in traditional additive manufacturing (AM), such as traditional additive manufacturing methods that employ binding, deposition, jetting and powder fusion; extrusion; sheet lamination; and vat photo-polymerization. Powder fusion-type methods require input materials in powder-like format, or small granulations that are then fused and built-up; materials that cannot be powderized or jetted cannot be used with such AM methods. Traditional additive manufacturing methods that employ extrusion require input materials that can be melted or otherwise extruded from a nozzle, and that will fuse with previously extruded material; materials that cannot be extruded cannot be used with such AM methods. Traditional additive manufacturing methods that employ sheet lamination require input material in the format of sheets. Finally, traditional additive manufacturing methods that employ vat photo-polymerization require input material in the format of liquid resin.

The above-constrained selection of input materials typically consists of plastics such as acrylonitrile butadiene styrene (ABS) and poly-lactic acid (PLA) that are non-flexible and of limited material strength, in particular tensile strength. Similarly, the limited range of traditional AM methods limits the achievable properties of the finished products, which are typically non-flexible, of limited material strength, and slow to manufacture.

A large portion of daily objects we use, e.g. clothing, furniture and wearable devices incorporate fabric or fabric-like materials. AM techniques have tried to produce fabric-like structures for functional e.g. wearability, breathability, comfort and aesthetic purposes using traditional AM methods, but these techniques have largely not been commercially viable.

Attempts have been made to provide improved additive manufacturing input materials. However, improvements in one property usually entails trade-offs in other properties. To increase flexibility, newer materials such as thermoplastic elastomers (TPE), thermoplastic polyurethane (TPU), nylon or polypropylene have been utilized. However, these flexible materials are more expensive, difficult to handle, and are limited by traditional AM methods to producing output structures in thin layer-by-layer increments. To increase material strength, metals (e.g. stainless steel, aluminum, titanium, gold and silver) have been used together with AM methods, such as selective laser sintering (SLS), or in two-step processes of printing a disposable wax mold and casting the metal. However, these metal printed structures are highly rigid and inflexible; high tensile strength together with a flexible structure (e.g. used for wearables and other accessories) has not been achieved. To obtain a more natural aesthetic, look, and feel, plastic materials mixed with wood, sand, metals, and other particles have been used to give a wooden or stony finish to 3D-prints. However, these mixed materials are difficult to work with using traditional AM machines (e.g. clogging nozzles, material adhesion), and a fabric-like finish and softness has not been achieved.

Similarly, attempts have been made to improve upon traditional additive manufacturing methods. To produce flexible structures, traditional AM methods have been employed to print fabric-like structures, e.g. 3D-printed chainmail, or other structures with repeating units joined by or composed of thin sections of material (as described in EP3181273A1 and WO2003082351A2) Further attempts to produce flexible structures involve printing fabric-like structures, e.g. 3D-printed chainmail, or other structures with repeating units using two material types. A first material type is dissolved in a post-processing stage, to release a second, permanent material in the form of e.g. linked 2D chains that could not have been printed 'floating' or without a support structure (as described in US20170165908A1). However, these methods require very high printing resolution, in order to reproduce in detail the fine fabric-like structure with flexible properties—this resolution is difficult to achieve with traditional AM materials and methods. These traditional AM-based methods are also likewise limited to traditional AM materials such as plastics and some metals, with limited range of material properties such as flexibility and tensile strength as previously discussed.

To produce soft fabric-like structures, US20160288317A1 introduced an additive manufacturing method where layers of fabric are cut and bonded together, forming a 3D structure out of fabric layer-by-layer. Some disadvantages of this AM method are the input material must be in the format of sheets, waste material is generated from cutting the sheets to size, bonding of fabric sheets produces an anisotropic structure, and coarse surface finish.

Textile fabric materials are manufactured in contemporary large-scale industry using weaving or knitting machines. Weaving machines include modern air jet looms, water jet looms and rapier looms that produce large 2D or circular woven fabric. Knitting machines include warp knitting and weft knitting machines that produce large 2D or circular knitted fabric. Some modern weaving and knitting machines can also produce arbitrary tubular structures (as described in U.S. Pat. No. 3,347,731A), such as full garments and gloves. However, conventional weaving and knitting machines are limited to produce generally 2D or tubular structures, and since these machines typically utilize needle arrays or needle beds, the width of the product of manufacture is limited to the width of the needle arrays or needle beds.

U.S. Pat. No. 5,987,929A attempted to combine contemporary fabric manufacturing methods i.e. knitting needles with the layer-by-layer approach of additive manufacturing to produce arbitrary fabric-like 3D structures. The proposed machine included four needle-and-latch arrays and a translating vertical needle head. This approach has advantages including: The use of textile yarn to produce the final product, resulting in true fabric-like properties including flexibility, high tensile strength, and fabric-like aesthetics. However, some disadvantages of this approach to manufacture 3D fabric-like structures are: The size of the product of manufacture is limited by the size of the needle-and-latch arrays. As the number of stitches per unit area is increased, more needles need to be built into the machine and to be individually controlled, increasing the cost and complexity of the machine.

US20160167296A1 attempted to combine another contemporary fabric manufacturing approach i.e. needle felting with the layer-by-layer approach of additive manufacturing to produce arbitrary fabric-like 3D structures. The proposed machine used a translating composition head, where a reciprocating felting needle draws and deposits fibers from a fiber strand source, onto the compositing surface, to build a 3D structure layer-by-layer. This approach has advantages including: The ability to use cheap and widely available textile yarn to produce the final product; and the size of product of manufacture is generally only limited by the translating volume of the composition head, with no increase in complexity for increasing volume. However, some disadvantages of this approach to manufacture 3D fabric-like structures are: Since needle felting is employed to bind the input yarn material together by puncturing the yarn with barbed needles to entangle the fibers of adjacent sections of yarn, the individual sections of yarn become indistinct and fuzzy, and the bond within the felted structure may not be as strong as the bond of woven or knitted sections of yarn; A woven or knitted fabric-like texture is also not achieved, instead a felted, more uniform, fuzzy surface texture results from this method; Only yarn comprised of fibrous material can be used, since the felting process is dependent on puncturing and entangling the constituent fibers.

However, no known prior art reference has disclosed a system utilizing yarn-like input (including but not limited to textile yarn) to produce interlinked or interlocking, repeating subunits to create three-dimensional fabric-like structures having improved structural strength, as well as customization of component flexibility and other functional and aesthetic properties. Accordingly, what is needed is an alternative input and method of generating additive manufacturing three-dimensional structures by using yarn-like input and repeating, interlinked or interlocking subunits, with minimal cost and complexity. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The long-standing but heretofore unfulfilled need for an improved additive manufacturing input and an improved method of interlinking sections of the additive manufacturing input is now met by a new, useful, and nonobvious invention.

The novel method includes a step of providing a desired 3D structure; inserting an input material into a stitch additive manufacturing machine; arranging the input material into a plurality of interlinked subunits that resemble the desired 3D structure; and producing a stitch additive manufactured 3D structure based on the provided desired 3D structure, the produced stitch additive manufactured 3D structure including the plurality of interlinked subunits. By interlinking subunits of the input material to produce the manufactured 3D structure, the structure has sufficient structural integrity to prevent collapse during the additive manufacturing process. The desired 3D structure is transposed into a representation including repeating subunits, and the representation is translated into a sequence of material arrangement operations, such that the input material can be arranged into the plurality of interlinked subunits that resemble the desired 3D structure.

To arrange the subunits together, the method includes a step of threading a traversal, such as a pull-through, of a portion of the input material through at least one loop of at least one previously-formed subunit. As such, the formed subunit is linked with the at least one previously-formed subunit. Furthermore, the step includes selecting the at least one previously-formed subunit through which the formed subunit traverses. The selection is made such that the interlinked formed subunit and at least one previously-formed subunit are desired to be disposed adjacent each other with reference to the desired final 3D structure. As such, a volume of the stitch additive manufactured 3D structure incrementally increases. Importantly, the formed subunit need not be directly linked to the previously-formed subunit that is immediately prior to the formed subunit; instead, the formed subunit can be linked to any previously-formed subunit, so long as the desired end result is such that the formed and traversed previously-formed subunits are disposed adjacent one another. The term "adjacent" here means that there is direct interlink of material between the formed subunit and the traversed previously formed subunit(s). Note, for example, that a formed subunit can traverse two spatially distant previously formed subunits, forming an interlink and adjacency between the formed subunit and two spatially distant previously-formed subunits—as the formed subunit is tightened, the overall 3D structure may warp or change shape as the two previously-formed subunits are drawn closer together. Alternatively, the formed subunit can be kept looser and larger in size, such that the two spatially distant previously-formed subunits remain spatially distant but are still interlinked with the formed subunit.

For example, in an embodiment, the step of arranging the input material into the plurality of interlinked subunits includes a step of threading a second subunit through a loop of a first subunit to interlink the second subunit to the first subunit. Further, the method includes a step of threading a traversal of a third subunit through a loop of the second subunit to interlink the third subunit to the second subunit. These threading and traversal steps can be repeated for each subsequent subunit, such that the plurality of interlinked subunits is a set of repeating, interlinked subunits. In addition, the traversal of the third subunit can be threaded through a loop of the first subunit to interlink the third subunit to the first subunit. This traversal of the third subunit through the loop of the first subunit can occur alone, or in combination with the traversal of the third subunit through the second subunit loop, and so on.

The input material is an elongated and flexible strand, and can be selected from the group consisting of natural fiber, synthetic fiber, metal fiber, metal wire, ceramic fiber, mineral fiber, edible filament, acrylonitrile butadiene styrene, thermoplastic polyurethane, thermoplastic elastomers, biocompatible nylon, hydroxyapatite, collagen, polylactic acid, polyethylene terephthalate, and combinations thereof. However, in an embodiment, the input material is flexible.

The method can be performed in conjunction with an active feeder and passive receiver. For example, the method can include a step of actively feeding the input material into the stitch manufacturing machine by inserting a flying eye on an active feeder within a cavity disposed within a passive receiver of the stitch additive manufacturing machine. The input material is received at the passive receiver from the flying eye. The method includes a step of retaining the input material by a gripping mechanism of the passive receiver. Moreover, the method includes a step of releasing the flying eye from the cavity disposed within the passive receiver, such that the flying eye translates away from the passive receiver along a length of the input material, and the step of inserting the input material into the stitch additive manufacturing machine can be repeated.

The method can alternatively be performed in conjunction with a passive feeder and active receiver. As such, either a passive feeder or an active feeder can be referred to as a "material feeder," which feeds an input material (either passively or actively) into a device to manipulate the input material, such as an additive manufacturing machine. For example, the method can include a step of passively feeding the input material into the stitch manufacturing machine by translating a hook and latch element, such as a latch hook, of an active receiver toward the input material issuing from a passive feeder. The latch hook retains the input material and translates the input material toward the active receiver and away from the passive feeder. The latch hook releases the input material, and the latch hook translates toward the passive feeder, such that the step of inserting the input material into the stitch additive manufacturing machine can be repeated. Moreover, the hook and latch element translates into and through a loop of at least one of the plurality of interlinked subunits, and optionally translates into and through a loop of another of the plurality of interlinked subunits, forming a new interlinked subunit of the plurality of interlinked subunits.

In an embodiment, the method includes a step of anchoring the stitch additive manufactured 3D structure during the additive manufacturing process. The stitch additive manufactured 3D structure is disposed on a work anchoring surface. The stitch additive manufactured 3D structure is then retained on the work anchoring surface via an adhesion force (which does not have to be a physical bonding, but can be any force sufficient enough to force the 3D structure into contact with the work anchoring surface, preventing the 3D structure from decoupling from the work anchoring surface)

between the stitch additive manufactured 3D structure and the work anchoring surface. As such, the stitch additive manufactured 3D structure is immobilized against the work anchoring surface during the additive manufacturing process, thereby reducing printing errors.

The stitch additive manufactured 3D structure can be manipulated during the additive manufacturing process by contacting at least a portion of the stitch additive manufactured 3D structure with a protruding end effector of the stitch additive manufacturing machine, and applying a directed force onto the portion of the stitch additive manufactured 3D structure by translating the protruding end effector in a direction, thereby translating the portion of the stitch additive manufactured 3D structure and manipulating the shape of the portion.

The novel system includes a passive feeder with an amount of an input material disposed thereon or issuing therefrom. The system also includes an active receiver including a hook and latch element adapted to contact the amount of the input material disposed on the passive feeder. The active receiver is also adapted to translate the amount of the input material away from the passive feeder. The active receiver arranges the amount of the input material into a plurality of interlinked subunits that resemble a desired 3D structure by forming subunits. Specifically, the active receiver forms a subunit by traversing the input material through at least one loop of at least one previously-formed subunit, thereby interlinking the formed subunit with the at least one previously-formed subunit. The at least one previously-formed subunit through which the formed subunit traverses is selected such that the interlinked formed subunit and at least one previously-formed subunit are disposed adjacent each other. Accordingly, a volume of an incrementally produced 3D structure incrementally increases. The system also includes a work anchoring surface adapted to receive and retain the incrementally produced 3D structure during manufacture via an adhesion force between the incrementally produced 3D structure and the work anchoring surface. Accordingly, at least part of the incrementally produced 3D structure is immobilized against the work anchoring surface during manufacture, thereby reducing printing errors.

An object of the invention is to provide an improved additive manufacturing input, as well as an improved method of interlinking repeating subunits, to create three-dimensional fabric-like structures having less waste products and having simultaneously greater flexibility, breathability, softness, tensile strength, structural integrity and unique aesthetic as compared with traditional additive manufacturing products and methods.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

For a fuller understanding of the invention, reference should be made to the following detailed description, taken in connection with the accompanying drawings, in which:

FIG. 2A-E depicts embodiments of a yarn-like input.

FIG. 3A-B depicts an example of interlinking subunit stitches.

FIG. 4A-J depicts an initial stitching subunit and the interlinking of subunits, including cuboid representations of the subunits.

FIG. 5A-N depicts interlinking stitching subunits in one and two planes, including cuboid representations of the subunits.

FIG. 6A-C depicts an alternative embodiment of interlinking stitching subunits.

FIG. 7A-C depicts an embodiment of a desired 3D structure that is divided into subunits.

FIG. 8A-C depicts an embodiment of a desired 3D structure that is divided into subunits.

FIG. 9A-C depicts an embodiment of a desired 3D structure that is divided into subunits.

FIG. 12A-B depicts an active feeder apparatus of a stitch additive manufacturing process (in section A) and a passive receiver apparatus of a stitch additive manufacturing process (in section B).

FIG. 13A-F depicts a flying eye embodiment, in accordance with an embodiment of the present invention (in sections A-B), and a passive receiver, in accordance with an embodiment of the present invention (in sections C-F).

FIG. 14A-G depicts steps of using an apparatus of an active feeder-passive receiver subsystem.

FIG. 16A-B depicts a passive feeder apparatus of a stitch additive manufacturing process (in section A), and an active receiver apparatus of a stitch additive manufacturing process (in section B).

FIG. 17A-D depicts an embodiment of a passive feeder and an active receiver.

FIG. 18A-K depicts steps of manufacturing a 3D structure using the passive feeder-active receiver stitch additive manufacturing methods described herein.

FIG. 19A-C depicts a pillow ground, in accordance with an embodiment of the present invention.

FIG. 20A-C depicts a work anchoring apparatus, in accordance with an embodiment of the present invention.

FIG. 21A-F depicts a work anchoring apparatus including pin-like components, in accordance with an embodiment of the present invention.

FIG. 22A-C depicts a simplified diagram of a work anchoring apparatus.

FIG. 23A-E depicts views of an embodiment of a work manipulation apparatus using a blunt end effector and a blunt tusk.

FIG. 24A-D depicts views of an embodiment of a work manipulation apparatus using a tapered end effector and a tapered tusk.

FIG. 25A-C depicts views of an embodiment of a work manipulation apparatus using an end effector with a ledge and a ledge tusk.

FIG. 26A-B depicts a work manipulation apparatus with a gripper (in section A) and a combination embodiment of a work manipulation apparatus (in section B).

FIG. 29A-C depicts an infiltrator limb, in accordance with an embodiment of the present invention.

FIG. 30A-C depicts an embodiment of a passive feeder and spooler, in accordance with an embodiment of the present invention.

FIG. 31A-C depicts an embodiment of a gripper-ledge-tusk SAM mechanism, in accordance with an embodiment of the present invention.

FIG. 32A-D depicts an embodiment of a Tanglehead, in accordance with an embodiment of the present invention.

FIG. 33A-D depicts a build frame including attached components, in accordance with an embodiment of the present invention.

FIG. 34A-B depicts an embodiment of a Tanglehead, in accordance with an embodiment of the present invention.

FIG. 35A-B depicts an embodiment of a sliding latch.

FIG. 36A-E depicts interlinking stitching subunits using two or more input materials.

FIG. 37A-B depicts an embodiment of a feeder device with a cable-extendable tube-ring tip, in accordance with an embodiment of the present invention.

FIG. 38 depicts an embodiment of a feeder device with a receptacle.

FIG. 45 depicts a diagram of a SAM workflow including pre-and-post-treatment processes, in accordance with an embodiment of the present invention.

FIG. 46A-D depicts a simplified diagram of an embodiment of a hybrid stitch additive manufacturing apparatus, in accordance with an embodiment of the present invention.

FIG. 50A-C depicts diagrams of embodiments of the data representation flow in a SAM process.

FIG. 51 depicts a simple schematic of a SAM system sensor and actuator general configuration.

FIG. 53A-D depicts simple diagrams of work/sample sensing and topography (in sections A-B) and of apparatus sensing and proprioception (in sections C-D).

FIG. 55A-C depicts a hierarchical representation of spatial and identifying information of subunits of a 3D structure.

FIG. 56A-C depicts hierarchical positioning and identification of subunits of a 3D structure (in sections A-B) and cooperative manufacturing of a 3D structure (in section C).

FIG. 57A-G depicts a method and apparatus for forming a slipknot.

FIG. 58A-F depicts a method and apparatus for forming an artillery loop.

FIG. 59A-I depicts a method and apparatus for forming a butterfly loop.

FIG. 60A-H depicts a method and apparatus for forming an overhand loop.

FIG. 61A-E depicts an apparatus for guiding filaments and elements within a channel, as well as methods and apparatuses for biasing filaments and elements within a channel.

FIG. 62A-D depicts an embodiment of a 3D structure comprising interlinked subunits and a layer(s) of fibers; an apparatus for forming and depositing layers of fibers onto a 3D structure; and an embodiment of a filament comprising sub-filaments and a paste.

FIG. 63A-D depicts embodiments of filament paths in the construction of a 3D structure.

FIG. 64A-C depicts a 3D structure comprising interlinked subunits and a matrix and its manufacture (in sections A and B), and the manufacturing of a 3D structure using multiple sub-filaments (in section C).

FIG. 65 depicts manufacturing of a 3D structure using multiple filaments.

FIG. 66A-B depicts filament property modification.

FIG. 67A-D depicts interfacing a 3D structure comprising interlinked subunits with another 3D structure.

FIG. 68A-B depicts embodiments of working platforms.

FIG. 69A-J depicts the building of a 3D structure interwoven with a frame.

FIG. 70A-D depicts a 3D structure interwoven with a frame (in sections A, B, and C), and a method of construction thereof (in section D).

FIG. 71A-B depicts a 3D structure comprising interlinked subunits, inlaid filaments and tendons, and embedded sensing.

FIG. 72A-E depicts a 3D structure comprising tubular filament(s), as well as embodiments of the tubular filament(s) itself.

FIG. 73A-B depicts a 3D structure comprising tubular filament (in section A), and a 3D structure (in section B).

FIG. 74A-B depicts a 3D structure comprising tubular filament.

FIG. 75 depicts an embodiment of a 3D structure comprising tubular filament with added functionality.

FIG. 76A-B depicts flowcharts of a method for computer aided design and pattern generation (in section A) and instruction generation (in section B).

FIG. 77A-C depicts block diagrams and flowcharts of a general production system, production management, and personalized and extemporaneous value presentation.

FIG. 78A-C depicts an embodiment of a protective structure and wearable products in stages of manufacture.

FIG. 79A-D depicts embodiments of 3D construction.

FIG. 80A-C depicts embodiments of a free-moving manufacturing system.

FIG. 81A-C depicts methods for producing a 3D structure comprising interlinked subunits, a matrix, and 3D structure property modification.

DETAILED DESCRIPTION OF THE INVENTION

Figure 1:
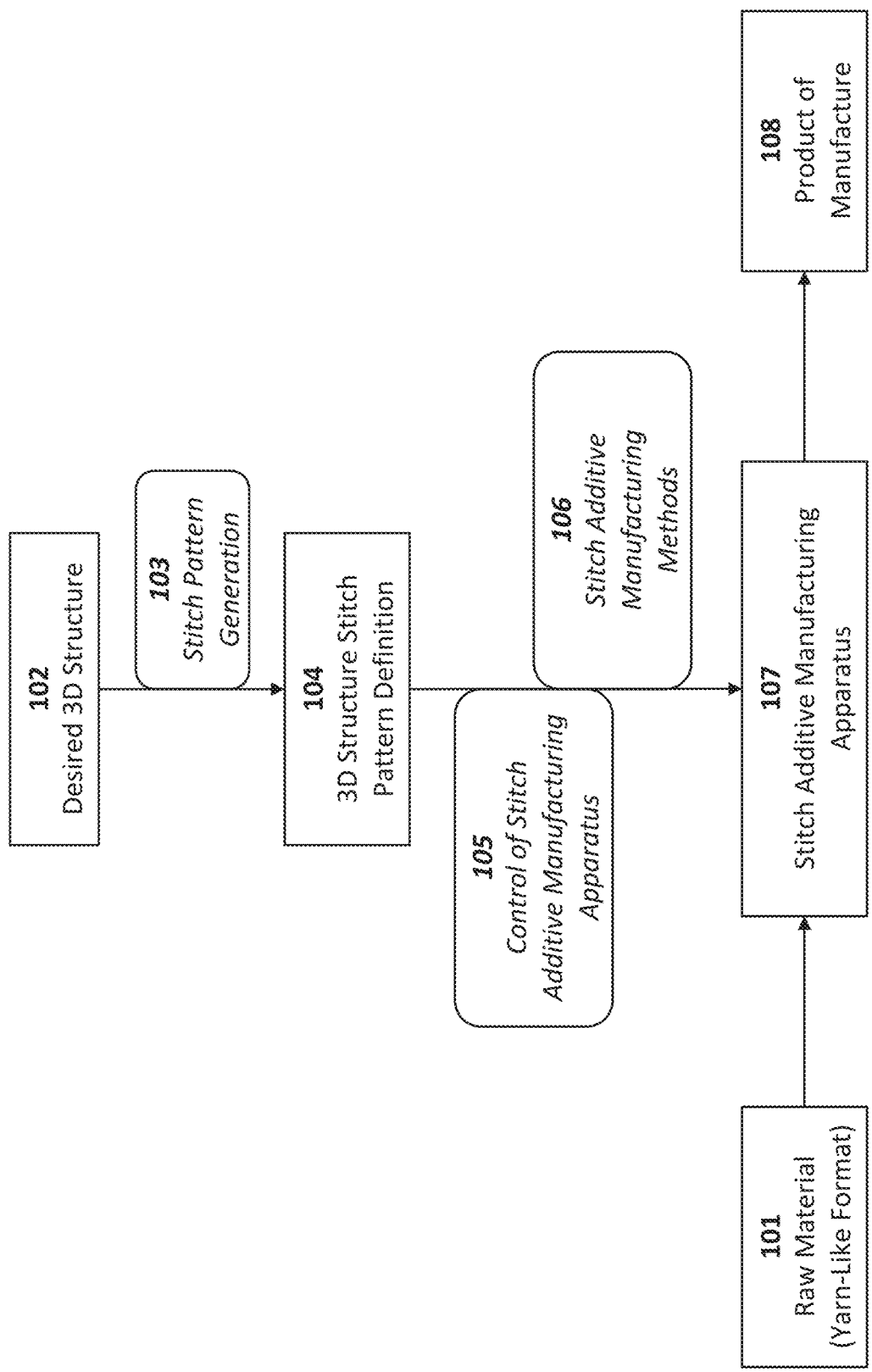
FIG. 1 is a process flow diagram providing an overview of a stitch additive manufacturing process, in accordance with an embodiment of the present invention.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention.

As such, elements/components shown in diagrams are illustrative of exemplary embodiments of the disclosure and are meant to avoid obscuring the disclosure. Any headings, used herein, are for organizational purposes only and shall not be used to limit the scope of the description or the claims.

Furthermore, the use of certain terms in various places in the specification, described herein, are for illustration and should not be construed as limiting. For example, any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Therefore, a reference to first and/or second elements does not mean that only two elements may be employed there or that the first element must precede the second element in some manner. Also, unless stated otherwise a set of elements may comprise one or more elements.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Referring in general to the following description and accompanying drawings, various embodiments of the present disclosure are illustrated to show its structure and method of operation. Common elements of the illustrated embodiments may be designated with similar reference numerals.

Accordingly, the relevant descriptions of such features apply equally to the features and related components among all the drawings. For example, any suitable combination of the features, and variations of the same, described with components illustrated in FIG. 1, can be employed with the components of FIG. 2, and vice versa. This pattern of disclosure applies equally to further embodiments depicted in subsequent figures and described hereinafter. It should be understood that the figures presented are not meant to be illustrative of actual views of any particular portion of the actual structure or method but are merely idealized representations employed to more clearly and fully depict the present invention defined by the claims below.

DEFINITIONS

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

As used herein, the terms "about," "approximately," or "roughly" refer to being within an acceptable error range (i.e., tolerance) for the particular value as determined by one of ordinary skill in the art, which will depend in part on how the value is measured or determined (e.g., the limitations of a measurement system), (e.g., the degree of precision required for a particular purpose, such additive manufacturing, via interlinked repeating subunits). As used herein, "about," "approximately," or "roughly" refer to within +25% of the numerical.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Additive Manufacturing System and Method Using Interlinked Repeating Subunits

The present invention pertains to a novel input material, machine, and manufacturing method for generating three-dimensional structures based on repeating, interlinked subunits of the input material. The novel method may be referred to as Stitch Additive Manufacturing (SAM), due to the resemblance between the repeating, interlinked subunits of input material comprising the three-dimensional structures, and traditional stitched structures. Repeating and interlinked subunits are used to manufacture three-dimensional structures that are more flexible than traditionally-printed structures, while having structural integrity due to the interlinked nature of the manufactured components.

Repeating subunits can be interlinked in two general ways: I) Fusing or II) Non-Fusing. In a fusing method, the subunits are bonded together, such that there is a continuity of volume and surface between adjacent subunits. Examples of fusing interlinking include: 1) Using conventional additive manufacturing, where repeating subunits can be printed using fused plastics, 2) Using needle-felting to bond together sections of yarn as in US20160167296A1, 3) Using heat to melt and fuse discrete premade subunits together, 4) Using a glue or bonding agent to fuse discrete premade subunits together. In a non-fusing method, the subunits are linked or interlocked together, but remain as separate, intact elements, such that there is a discontinuity of volume and surface between adjacent subunits (but overall, all subunits may still be part of the same continuous length of material). Examples of non-fusing interlinking include: 1) Methods involved in this invention Stitch Additive Manufacturing (SAM), as discussed in greater detail below, in which sections of yarn-like material are traversed through one or more previous subunits such that a newly formed subunit is interlinked with the traversed previous subunits, 2) Prior art references U.S. Pat. No. 5,987,929A (in which sections of yarn are drawn through typically one previous subunit using a knitting machine); U.S. Pat. No. 3,347,731A (in which sections of yarn are interlaced or woven together around supporting rods), and US20180132579A1 (in which pre-made rubber bands/loops are interlinked together using hand tools/looms).

The present invention includes an additive manufacturing machine, which will be discussed in greater detail below. However, a brief overview of how the machine improves upon prior art, conventional 3D printers is beneficial, before exploring the intricacies of the present invention. Conventional Fused Deposition Modeling (FDM) 3D printers typically use plastic filament and a heated nozzle to extrude the filament to produce 3D plastic parts. The present invention can use regular textile yarn or other strand-like input, not being limited to plastic filament; and uses a flying eye and receiver or a feeder and latch hook (in various embodiments), instead of the heated nozzle. The flying eye and receiver (or the feeder and latch hook, in various embodiments) is controlled in a specific repeating pattern, thereby causing the yarn to be repeatedly interlinked, and thereby producing a 3D part out of repeating subunits. Because there is no melting and fusing, the entire length of yarn remains intact: a very wide selection of input materials can thus be used, resulting in products with unique physical, functional, and aesthetic properties.

FIG. 1 provides a simplified overview of SAM, as discussed in greater detail below. As shown in FIG. 1, elongated units of input material 101 are fed into an additive manufacturing machine, which can be a novel machine or a traditional machine currently in use within the art. Regardless of whether the machine is novel or a traditional machine, the additive manufacturing machine may be referred to as reference numeral 107. Meanwhile, a computing device receives instructions for making target three-dimensional structure 102. The computing device performs stitch pattern generation 103 algorithms. After performing pattern generation algorithms 103, the computing device outputs pattern definition 104, which is a virtual attempt to match the structure and shape of target three-dimensional structure 102, such that additive manufacturing machine 107 can generate a printed structure matching that of target three-dimensional structure 102. The instructions are designed to create a pattern from the elongated units of input material 101 to create a three-dimensional structure that matches the shape and structure of target three-dimensional structure 102. As the elongated units of input material 101 are fed into additive manufacturing machine 107, additive manufacturing machine 107 assembles the input material into interlinked, repeating subunits that form tangible three-dimensional structure 108, which is designed to resemble target three-dimensional structure 102. The overall control over the additive manufacturing machine 107 is depicted by reference numeral 105, and will be discussed in greater detail below; similarly, the various methods of performing stitch additive manufacturing is depicted as reference numeral 106, which will be discussed in greater detail below as well.

While FIG. 1 provides a simplified overview of the system, examples of input materials, methods of producing structures from input materials, and additive manufacturing machines capable of utilizing the input materials to produce three-dimensional structures, are discussed in greater detail in the sections below.

Input Material

Traditional three-dimensional printers utilize melted plastics and other polymers to create three-dimensional structures via additive manufacturing processes. However, such structures are often not flexible enough for certain applications, due to fusing together of the material used in the printing process. Accordingly, the present system includes elongated units of input material 101 that can be fed into an additive manufacturing machine to produce three-dimensional structures that are flexible yet have structural integrity, where the input material is not fused together but interlinked to form the final structure. It is appreciated that input material 101 may be arranged in a variety of formats, depending on the capabilities of the additive manufacturing machine and the requirements of the printing job. For example, FIG. 2A depicts a length of single-ply yarn which is similar to a simple filament. FIG. 2B depicts a length of double-ply yarn that has a left-handed or "S" twist, with the two constituent plies labeled 201 and 202. FIG. 2C depicts a length of double-ply yarn that has a right-handed or "Z" twist, with the two constituent plies labeled 201 and 202. FIG. 2D depicts a length of four-ply yarn comprising of an S-twisting of two Z-twisted double-plies 203 and 204. FIG. 2E depicts a multi-material yarn comprised of S-twisted nylon plies 205 surrounding a single-ply copper core 206.

An important aspect of the present invention is the interlinking (instead of fusing) relationship between subunits of input material 101, with a plurality of subunits forming a repeating, interlinked input material 101 for use in an additive manufacturing process. By interlinking repeating subunits, a three-dimensional structure formed via the additive manufacturing process can have enough structural integrity to prevent collapse during printing. FIG. 3 depicts a simple interlinked chain of three stitches of an in-progress three-dimensional structure, with each of the stitches being a subunit of the overall three-dimensional structure. The first stitch subunit is referred to by reference numeral 301; the second stitch subunit by reference numeral 302; and the third stitch subunit by reference numeral 303.

Moreover, each of the subunits 301, 302, and 303 include various subsections, which, in the case of a yarn-like input material 101, may be referred to as "loops." For example, second stitch subunit 302 includes right loop section 305 and left loop section 306, as well as bottom loop section 307. In addition, tail 308 is shown upstream from subunit 301, with tail 308 being formed prior to subunit 301. Similarly, active input 309 is shown downstream from subunits 301, 302, and 303, with active input 309 being the portion of input material 101 being used by an additive manufacturing machine to continue forming a three-dimensional structure. Active subsection 310 is portion of active input 309 that is shown being added to the interlinked structure, forming a connection with subunit 303.

Some non-exhaustive examples of materials that may be used as input materials are natural fibers, such as cotton, wool, or silk; synthetic fibers, such as nylon, polyester, or acrylic materials; metal fibers, such as steel wool or copper wire; ceramic or mineral fibers, such as aluminum silicate or polycrystalline wool; or other filament-like materials, such as carbon fiber, carbon nanotube fiber, silicone, or rubber. In other embodiments, the input materials may be electrically conductive materials. In still other embodiments, the input materials may be biologic materials, such as edible ingredients in filament format. Some examples of edible ingredients that may be used as input materials are wheat, rice, buckwheat, processed ingredients mixed with a binding agent or encased in tubes of cellulose, or other ingredients that may be in strand-like format to be used as a filament. In yet other embodiments, the input material may comprise one or more plies of biocompatible materials (e.g. biocompatible nylon, hydroxyapatite, collagen, poly-lactic acid (PLA), or polyethylene terephthalate (PETE)) suitable for interaction with or situation in human or other biological bodies. Moreover, any combination of the above non-exhaustive list may be used, with the different materials leading to three-dimensional structures having different physical qualities, depending on the requirements of the printing project to be performed.

In addition, the input materials may be treated before printing, during printing, or after printing. Treatments include adding color to the input materials, including adding different color to different components of the final three-dimensional structure to be printed, depending on the desired ultimate design of the structure. Treatments also include changing the material properties of the input material, again depending on the desired ultimate design of the structure. For example, portions of the input material may be heated to a higher temperature than the main input material, such that the heated portions are temporarily softer than the main input materials, thereby changing the flexibility or pliability of the heated portions. Treatments can also include imparting an electrical property to the input material, or changing a strength of the material, by subjecting the material or final structure to a predetermined treatment. Still other treatments can include curing, disinfecting, sterilizing, or coating the final three-dimensional structure to alter the surface properties of the structure, such as by imparting biocompatibility or enhanced bonding with other materials e.g. priming for metal coating or crystalline growth or deposition. It is appreciated that the forms of treatments discussed above are not exhaustive of the possible treatments for the input materials of the three-dimensional structure, and that various forms of treatment are contemplated and are known in the art.

At the stage of the additive manufacturing process depicted in FIG. 3A, the interlinking of subunits resembles that of manual stitching or crocheting, such as the stitching used in making an article of tubular clothing. Methods of manufacturing arbitrary three-dimensional structures are described in greater detail below.

Example 1: Method of Producing Structures Using Novel Input Material

Figures 1, 4A:
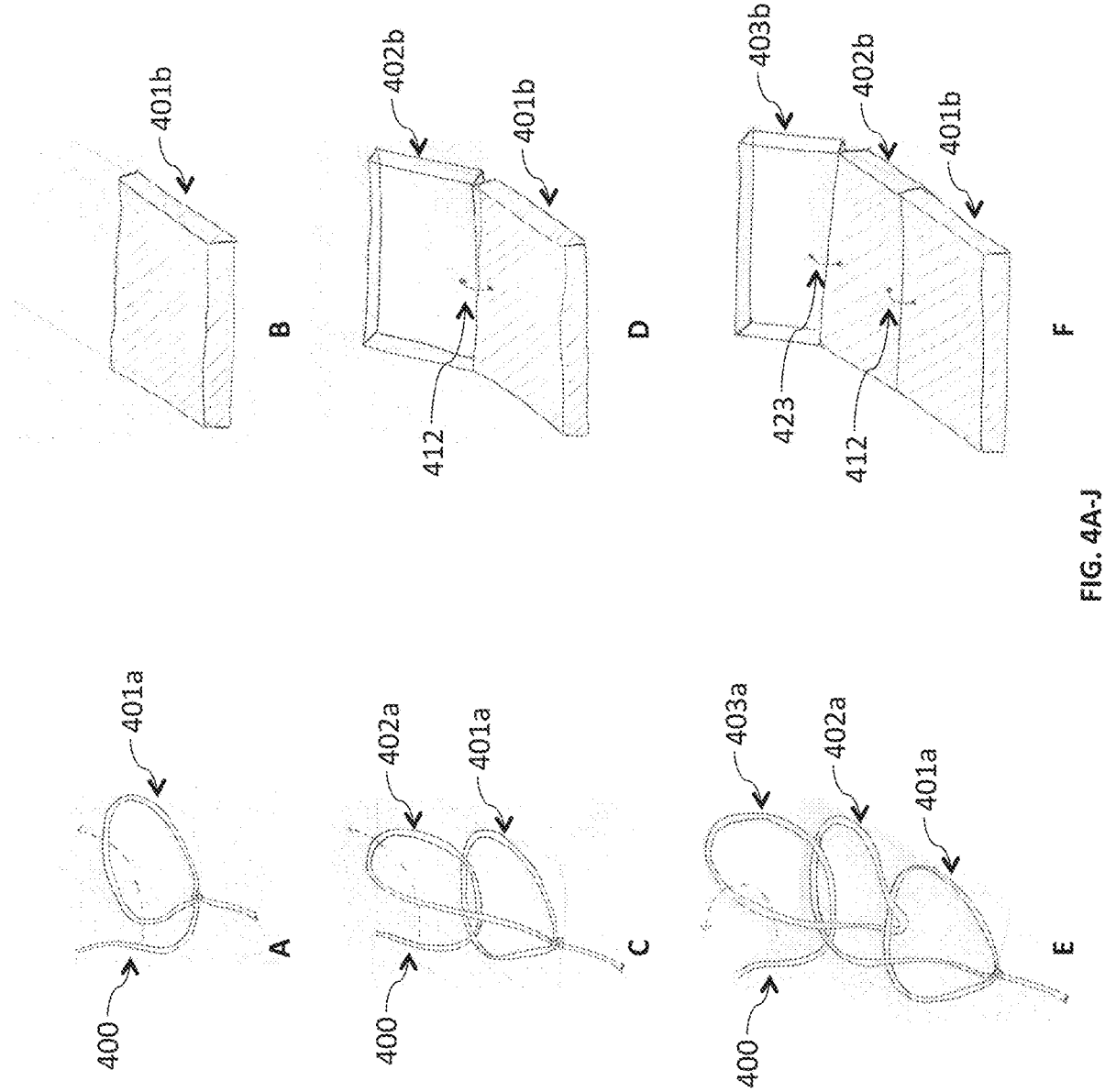

Turning now to FIGS. 4A-4J, the figures depict an example of a three-dimensional structure and a method of making such a structure from interlinked subunits of input material 101 discussed above. For example, as shown in FIG. 4A, first stitch 401a is formed from input material 400. As shown in FIG. 4A, first stitch 401a forms a starter loop to begin an additive manufacturing process with input material 400. FIG. 4B shows a corresponding cuboid representation of first stitch 401a, with the cuboid representation referred to as reference numeral 401b. The cuboid representation of FIG. 4B shares the same ratio of length, width, and height as the yarn-like structure from FIG. 4A; however, the cuboid representation depicts how equal-sized subunits can be used to generate a predetermined structure using the techniques discussed herein. The following figures discussed include both yarn-like representations and cuboid representations, similar to that of FIGS. 4A-4B.

To continue building on the structure depicted in FIGS. 4A-4B, as would happen during an additive manufacturing project, the input material shown in FIGS. 4A-4B must be drawn through the previously-printed loop to create an interlinked set of subunits. As such, a section of input material 400 is drawn under the left loop of, and toward the top of, first stitch 401a—otherwise known as a traversal, such as a pull-through, since the section of input material 400 is being pulled through the loop formed by first stitch 401a. It should be understood that the term pull-through should not be construed as limiting stitch formation to only pulling actions on the input material; in other embodiments the input material may be pushed, rather than pulled to traverse through a loop during stitch formation, using motion of an implement such as the active feeder, or other implements to force the input material through a structural opening. FIG. 4C depicts the result of the pull-through, in which active loop 402a is formed and interlinked to first stitch 401a. FIG. 4D depicts the resulting pull-through in cuboid form, with active loop 402b interlinked to first stitch 401b. Whereas the interlink in FIG. 4C is represented by the physical pull-through shown in the figure, the interlink in the cuboid representation of FIG. 4D is depicted as an arced line 412 connecting first stitch 401b to active loop 402b.

The process repeats to create another interlinked subunit, as depicted in FIG. 4E, which depicts another pull-through. A new active loop 403a is created to interlink to 402a, which is now a stitch and not an active loop. When the new active loop 403a is created, the previous active loop (in this case, 402a) is no longer active, and is instead an interlinked stitch within the overall structure. Again, FIG. 4F depicts the corresponding cuboid representation, including arced line 423 connecting second stitch 402b (previously active loop 402b) to active loop 403b.

FIG. 4G depicts the result of a pull-through in a different direction, such that the resulting subunit continues in a different direction from that of the first three subunits discussed in this example. To change directions, a section of input material 400 is drawn under the left loop of, and toward the top of, active loop 403a. The section of input material 400 is then biased in the left-direction relative to stitches 401a, 402a, and 403a, thereby changing the direction of the resulting active loop. As such, new active loop 404a forms interlinked to previous stitch 403a (previously an active loop that is no longer active as a result of new active loop 404a). The new active loop 404a is biased to the left of the previous stitches, thereby creating a change in direction and allowing for the addition of subunits in a different direction in turn. Again, the corresponding cuboid representation is depicted in FIG. 4H, including arced line 434 connecting subunits 403b and 404b.

Next, the process changes the direction of the subunits again, such that the next subunit added is connected to each of 404a and 402a, as shown in FIG. 4I. The process of forming active loop 405a is largely the same as the loops formed above (with the exception that in this instance the material traverses two instead of one previously formed subunit),—the previous active loop forming yet another subunit interlinked within the chain of subunits. FIG. 4J includes a depiction of the cuboid representation of the change in direction, showing that active loop 405b includes two connections interlinking the loop to previous subunits-arced line 425 connecting active loop 405b with second subunit 402b, and arced line 445 connecting active loop

405*b* with fourth subunit 404*b*. As such, the interlinked subunits have stronger connections and are disposed adjacent to each other, forming a structure having increased structural integrity and specific shape by virtue of the interlinking of the subunits to each other. The direction of stitch formation is shown as arrow 499. The interlinking method shown in FIGS. 4A-4J is a simplified example of methods of interlinking repeating subunits; however, the method remains largely the same when applied to more complex additive manufacturing projects, as will be discussed in further detail throughout this specification.

Example 2: Extension of Method of Producing Structures Using Novel Input Material Moreover, FIG. 5A-5N provide an extension of the interlinking method as discussed above, forming an exemplary 3×3×2 (three dimensional) arrangement of subunits with input material 500, spanning the x-direction and y-direction, and then extending to the z-direction where a second layer is formed.

FIG. 5A depicts nine set stitches or "subunits" forming a 3-by-3 array (shaded in darker gray), spanning the two orthogonal horizontal directions "X" and "Y". These nine set stiches will be here called the "first layer". Reference numeral 509*a* denotes the ninth stitch of the first layer. Reference numeral 510*a* denotes the active loop that will next form the first stitch of the second layer in the "Z" direction. FIG. 5B depicts a corresponding symbolic representation of the structure in FIG. 5A. The cuboid 509*b* corresponds to the ninth stitch of the first layer 509*a*. The cuboid 510*b* corresponds to the active loop 510*a*. The nine shaded cuboids forming a planar first layer in FIG. 5B corresponds to the nine shaded stitches forming a planar first layer in FIG. 5A. In FIG. 5B the arced lines (for clarity only an example 598 is directly labeled) depicts the interlinks between stitches of the first layer, where each stitch has an interlink with each neighboring stitch on the horizontal plane spanned by "X" and "Y". Each interlink also denotes that a new stitch traversed each of the interlinked previous stitches during the new stitch's formation. Reference numeral 599 denotes the path of traversal for the formation and setting of stitches on the first layer.

As depicted in FIG. 5A the next step of this exemplary process is to draw a section of the input material 500 under the right loop of the ninth set stitch of the first layer 509*a* and then under the active loop 510*a* in a pull-through/traversal, biasing the input material towards the negative "X" direction.

FIG. 5C depicts the result of said pull-through/traversal. A new active loop 511*a* has been formed that is interlinked to the previous stitch 510*a*. The stitch 510*a* is positioned on top of (with respect to the Z-axis) the stitch 509*a* of the first layer. The stitch 510*a* forms the first stitch of a "second layer" that extends the structure in the Z-direction. Because the working input material has traversed through the ninth stitch of the first layer 509*a*, this first stitch of the second layer 510*a* is also interlinked in the Z-direction. FIG. 5D depicts a corresponding symbolic representation of the structure in FIG. 5C. The cuboid 511*b* corresponds to the active loop 511*a*, the cuboid 510*b* corresponds to the first stitch of a "second layer" 510*a*, and the cuboid 509*b* corresponds to the ninth stitch of the first layer 509*a*. The arced lines (for clarity only a subset is depicted and only an example denoted by reference numeral 598 is directly labeled) illustrate the interlinks between stitches also in the Z-direction.

As depicted in FIG. 5C the next step of this exemplary process is to draw a section of the working input material 500 under the right loop of the eighth set stitch of the first layer 508*a* and then under the active loop 511*a* in a pull-through, biasing the input material towards the negative "X" direction. Traversing the working input material through a stitch on the first layer (508*a*) creates another interlink that binds the first layer and second layer.

FIG. 5E depicts the result of said pull-through/traversal. A new active loop 512*a* has been formed that is interlinked to the previous stitch 511*a*. The previous (now set) stitch 511*a* is positioned on top of (with respect to the Z-axis) the stitch 508*a* of the first layer. The stitch 511*a* forms the second stitch of a second layer that extends the structure in the Z-direction and negative X-direction. Because the working input material has traversed through the eighth stitch of the first layer 508*a*, this second stitch of the second layer 511*a* is also interlinked in the Z-direction. FIG. 5F depicts a corresponding symbolic representation of the structure in FIG. 5E. The cuboid 512*b* corresponds to the active loop 512*a*, the cuboid 511*b* corresponds to the second stitch of the second layer 511*a*, and the cuboid 508*b* corresponds to the eighth stitch of the first layer 508*a*. The arced lines (for clarity only a subset is depicted and only an example denoted by reference numeral 598 is directly labeled) illustrate the interlinks between stitches. Notice that stitches on the second layer are interlinked with each other and also interlinked with stitches on the first layer. These interlinks will bind the structure together in the X-, Y- and Z-dimensions.

As depicted in FIG. 5E the next step of this exemplary process is to draw a section of the working input material 500 under the left loop of the sixth set stitch of the first layer 506*a* and then under the active loop 512*a* in another pull-through. Traversing the working input material through a stitch on the first layer (506*a*) creates another interlink that binds the first layer and second layer.

FIG. 5G depicts the result of said pull-through/traversal. A new active loop 513*a* has been formed that is interlinked to the previous stitch 512*a*. The previous (now set) stitch 512*a* is positioned on top of (with respect to the Z-axis) the stitch 507*a* of the first layer. The stitch 512*a* forms a third stitch of the second layer that extends the structure in the Z-direction and negative X-direction. Because the working input material has traversed through the sixth stitch of the first layer 506*a* (through a loop section shared with the seventh stitch of the first layer 507*a*), this third stitch of the second layer 512*a* is also interlinked in the Z-direction. FIG. 5H depicts a corresponding symbolic representation of the structure in FIG. 5G. The cuboid 513*b* corresponds to the active loop 513*a*, the cuboid 512*b* corresponds to the third stitch of the second layer 512*a*, and the cuboid 507*b* corresponds to the seventh stitch of the first layer 507*a*. The arced lines (for clarity only a subset is depicted and only an example denoted by reference numeral 598 is directly labeled) illustrate the interlinks between stitches. Notice that stitches on the second layer are interlinked with each other and also interlinked with stitches on the first layer. These interlinks will bind the structure together in the X-, Y- and Z-dimensions.

As depicted in FIG. 5G the next step of this exemplary process is to draw a section of the working input material 500 under the right loop of the sixth set stitch of the first layer 506*a* and then under the active loop 513*a* in yet another pull-through. Traversing the working input material through a stitch on the first layer (506*a*) creates another interlink that binds the first layer and second layer.

FIG. 5I depicts the result of said pull-through/traversal. A new active loop 514a has been formed that is interlinked to the previous stitch 513a. The previous (now set) stitch 513a is positioned on top of (with respect to the Z-axis) the stitch 506a of the first layer. The stitch 513a forms a fourth stitch of the second layer that extends the structure in the Z-direction and negative Y-direction. Because the working input material has traversed through the sixth stitch of the first layer 506a, this fourth stitch of the second layer 513a is also interlinked in the Z-direction. FIG. 5J depicts a corresponding symbolic representation of the structure in FIG. 5I. The cuboid 514b corresponds to the active loop 514a, the cuboid 513b corresponds to the fourth stitch of the second layer 513a, and the cuboid 506b corresponds to the sixth stitch of the first layer 506a. The arced lines (for clarity only a subset is depicted and only an example denoted by reference numeral 598 is directly labeled) illustrate the interlinks between stitches. Notice that stitches on the second layer are interlinked with each other and also interlinked with stitches on the first layer. These interlinks will bind the structure together in the X-, Y- and Z-dimensions.

Referring to FIG. 5I and the circled regions, the next step of this exemplary process is to draw a section of the working input material 500 firstly under the right loop of the fifth set stitch of the first layer 505a, then under the right loop of the second stitch of the second layer 511a, and then finally under the active loop 514a in a pull-through. Notice that the working input material now traverses three loops. Traversing the working input material through a stitch on the first layer (505a) creates another interlink that binds the first layer and second layer. Traversing the working input material also through a stitch on the second layer (511a) creates another interlink that binds two stitches (511a and 514a) on the second layer in the Y-direction.

FIG. 5K depicts the result of said pull-through/traversal. A new active loop 515a has been formed that is interlinked to the previous stitch 514a. The previous (now set) stitch 514a is positioned on top of (with respect to the Z-axis) the stitch 505a of the first layer. The stitch 514a forms a fifth stitch of the second layer that extends the 3D volume of the structure. Because the working input material has traversed through the fifth stitch of the first layer 505a, this fifth stitch of the second layer 514a is also interlinked in the Z-direction. Because the working input material has also traversed through the second stitch of the second layer 511a, this fifth stitch of the second layer 514a is also interlinked in the Y-direction. FIG. 5L depicts a corresponding symbolic representation of the structure in FIG. 5K. The cuboid 515b corresponds to the active loop 515a, the cuboid 514b corresponds to the fifth stitch of the second layer 514a, and the cuboid 505b corresponds to the fifth stitch of the first layer 505a. The arced lines (for clarity only a subset is depicted and only an example denoted by reference numeral 598 is directly labeled) illustrate the interlinks between stitches. Notice that stitches on the second layer are interlinked with each other and also interlinked with stitches on the first layer. These interlinks will bind the structure together in the X-, Y- and Z-dimensions.

Referring to FIG. 5K and the circled regions, the next step of this exemplary process is to draw a section of the working input material 500 firstly under the right loop of the fourth set stitch of the first layer 504a, then under the right loop of the first set stitch of the second layer 510a, and then finally under the active loop 515a in a pull-through. Notice that the working input material traverses three loops. Traversing the working input material through a stitch on the first layer (504a) creates another interlink that binds the first layer and second layer. Traversing the working input material also through a stitch on the second layer (510a) creates another interlink that binds two stitches (510a and 515a) on the second layer in the Y-direction.

FIG. 5M depicts the result of said pull-through/traversal. A new active loop 516a has been formed that is interlinked to the previous stitch 515a. The previous (now set) stitch 515a is positioned on top of (with respect to the Z-axis) the stitch 504a of the first layer. The stitch 515a forms a sixth stitch of the second layer that extends the 3D volume of the structure. Because the working input material has traversed through the fourth stitch of the first layer 504a, this sixth stitch of the second layer 515a is also interlinked in the Z-direction. Because the working input material has also traversed through the first stitch of the second layer 510a, this sixth stitch of the second layer 515a is also interlinked in the Y-direction. FIG. 5N depicts a corresponding symbolic representation of the structure in FIG. 5M. The cuboid 516b corresponds to the active loop 516a, the cuboid 515b corresponds to the sixth stitch of the second layer 515a, and the cuboid 504b corresponds to the fourth stitch of the first layer 504a. The arced lines (for clarity only a subset is depicted and only an example denoted by reference numeral 598 is directly labeled) illustrate the interlinks between stitches. Notice that stitches on the second layer are interlinked with each other and also interlinked with stitches on the first layer. These interlinks will bind the structure together in the X-, Y- and Z-dimensions, and the specific pattern of interlinks give rise to the final shape and other physical properties of the article of manufacture.

It should be understood that the input material traversal sequences described above and shown in FIGS. 4-5 can be nearly infinitely varied. For example, where a left loop was traversed, a right loop could have been chosen. Or, where a right loop of a particular stitch was traversed, the left loop of an adjacent stitch could have been traversed. Alternatively, the working input material can traverse from the top of a stitch through towards the bottom instead of from the bottom of the stitch through towards the top. Further, the formation of stitches could have been first along the y-direction, or could have been in a spiral path. Furthermore, the formation of stitches does not have to follow the order of first creating a "layer" spanning the x-axis and y-axis, but could path toward any of the x-direction, y-direction, and z-direction at any point of the process, as the working input material can traverse any of the loops of the previously set stitches to create a different but similarly shaped structure, or a very differently shaped structure.

It should also be recognized that the corresponding FIGS. 4A-5N are simplified depictions of the method of interlinking subunits for the purpose of creating an interlinked structure. The input material is depicted as thin strands that are loosely intertwined for visual clarity, so that the intricate traversals can be seen. In physical embodiments of said examples, the input material may be much thicker and more tightly intertwined, such that there is little gap between loop sections, and that stitches are not so neatly 'flat' on the x-direction and the y-direction, but may be warped and/or tilted in some combined orientation of the x-direction, y-direction, and z-direction. Nonetheless, the interlink patterns that are depicted will remain the same in physical embodiments of said examples.

In the examples presented previously, a single length of yarn-like material is manipulated into a 3D structure. 3D structures can also be constructed from more than one length of yarn-like material. For example, a second strand of input material can be pulled through any of the set stiches, for example the left loop of the stitch 510*a* in FIG. 5M, to create a new active loop which is then used to form a new collection of stitches from this second strand of input material.

Example 3: Alternative Method of Producing Structures Using Novel Input Material As an example of the vast realm of possibilities of methods of interlinking subunits, FIG. 6A depicts interlinking formations using counterclockwise stitching, in contrast of the clockwise stitching shown in FIG. 3A and explored in FIGS. 4-5. In the counter-clockwise stitching shown in FIG. 6A, the yarn of the bottom loop of a stitch 601 transitions to form the right loop 602 of the next stitch before transitioning to form the left loop 603 of that next stitch, thereby producing a counter-clockwise stitch. Clockwise and counterclockwise stitches can both be incorporated or combined into a product of manufacture. Moreover, another variation for stitch formation is that the left loop and right loop of a stitch can be twisted together such that the left loop moves towards the right of the stitch and vice versa. This twist can be accomplished by twisting the active loop before it is set into a stitch. The twist can be a half twist, a full rotation twist, a two-full rotation twist or any other rotational twist. Many different stitches can be used, so long as the underlying subunits are interlinked together, as discussed in greater detail above.

Moreover, FIG. 6B depicts three stitches formed from a relatively thick yarn material 604 with relatively tighter stitches, as compared with other depictions, such as FIG. 4E above. FIG. 6C depicts a corresponding cuboid representation of the structure in FIG. 6B. The cuboid 605 corresponds to the stitch 604. Notice that the cuboid 605 has a height dimension (along the z-direction) more commensurate with its length (along the x-direction) and width (along the y-direction) dimensions compared to the cuboid representation in FIG. 4F. This serves to illustrate that the dimensions of the repeating units of a SAM structure can be modulated by controlling the yarn material or the tightness of stitch formation.

Example 4: Products of Manufacture

One or more of the above methods of producing a structure using a novel input can be employed to produce desired structures, such as 3D structures. FIG. 7A depicts an example of a 3D structure 700 in a 2D sheet-like form. FIG. 7B depicts a graphical representation 701 of the 3D structure 700 from FIG. 7A, with the graphical representation 701 including a plurality of repeating subunits 702. The repeating subunits 702 are similar to the cuboid representation of stitches discussed above relating to FIG. 4-6. FIG. 7C depicts final product 703 manufactured by performing one or more of the above-described methods (or a similar method), corresponding to the interlinking pattern shown in FIG. 7B, and corresponding to the overall desired shape of structure 700 in FIG. 7A.

Similarly, FIG. 8A depicts an example of a 3D structure 800 including an x-direction component 801, a y-direction component 802, and a z-direction component 803, such that structure 800 has a tripod-like shape having three orthogonal extensions. FIG. 8B depicts structure 800 in a graphical representation 804, including a plurality of repeating subunits 805 comprising each of the three orthogonal extensions 801, 802, and 803. FIG. 8C depicts final product 806 manufactured by performing one or more of the above-described methods (or a similar method), corresponding to the interlinking pattern shown in FIG. 8B, and corresponding to the overall desired shape of structure 800 in FIG. 8A.

Another example of a product of manufacture is depicting in FIG. 9A-9C. Similar to the examples above, FIG. 9A depicts structure 900 having a plurality of walls 901 and a base 902, with the structure 900 having an open top-portion, allowing for access to the void disposed between the plurality of walls 901 and the base 902. One of the plurality of walls 901 includes an extension 903 that extends above the remaining of the plurality of walls 901 along the z-direction of the structure 900. FIG. 9B depicts a graphical representation 904 including a plurality of repeating subunits 905 comprising the plurality of walls 901 and the base 902. As shown in FIG. 9B, the repeating subunits 905*a* of two of the walls 901 of the graphical representation 904 are smaller in volume and in surface area than the repeating subunits 905*b* of the remaining two walls 901 of the graphical representation 904, thereby demonstrating that subunits need not be identical to be interlinked. FIG. 9C depicts final product 906 manufactured by performing one or more of the above-described methods (or a similar method), corresponding to the interlinking pattern shown in FIG. 9B, and corresponding to the overall desired shape of structure 900 in FIG. 9A. As shown in FIG. 9C, extension 903 is a separate, interlinked strand of yarn-like material from the remainder of structure 900. Moreover, extension 903 may be a different material from the material used to create the other subunits of the structure 900. As such, complex structures can be created by using the methods of manufacture described in detail above.

System for Efficient Stitch Additive Manufacturing

Figure 10:
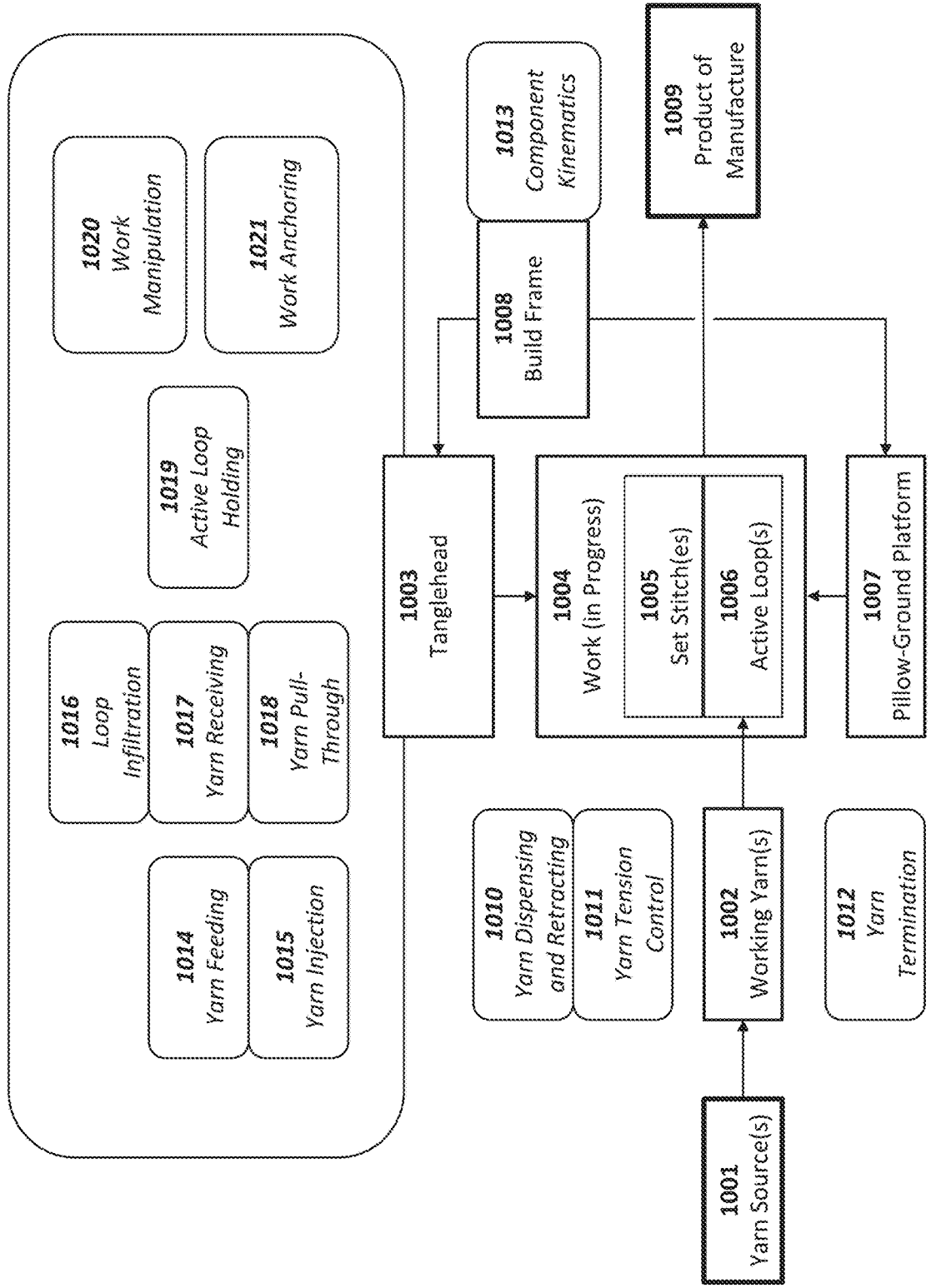
FIG. 10 is a process flow diagram depicting a stitch additive manufacturing process.

FIG. 10 presents an overview of a stitch additive manufacturing system, in accordance with an embodiment of the invention. The input into the system consists of one or more yarn source(s) 1001, which may be in the form of e.g. skeins, balls, rolls, or other dispensable aggregations of yarn-like material. Issuing from the yarn source(s) 1001 is one of more lengths of working yarn 1002. The working yarn(s) 1002 are manipulated into set stiches 1005 and active loops 1006 via the processes described in detail above. This collection of set stiches and active loops is the intermediary product, which may be referred to as a "Work In-Progress" or "Work" 1004. Once the final desired configuration of set stiches has been formed, the Work 1004 is complete and becomes the output of the system, or the Product of Manufacture 1009.

One function of the system is Yarn Dispensing and Retracting 1010, which is the function of drawing or returning working yarn(s) 1002 from or to the yarn source(s) 1001. Another function of the system is Yarn Tension Control 1011, which is the function of controlling the tightness of the working yarn 1002 with respect to the work 1004, which provides control of stitch tightness. Yet another function of the system is Yarn Termination 1012, which is the function of cutting or otherwise disconnecting the working yarn or work from the yarn source 1001, to start a new series of stitches or to disconnect a completed product of manufacture. The system includes a function of Yarn Feeding 1014, which is the function of providing a length of working yarn for a pull-through. Another related function of the system is Yarn Injection 1015, which is the function of moving a length of working yarn into a stitch and optionally pushing the length of yarn through the stitch.

Yet another function of the system is Loop Infiltration 1016, which is the function of inserting a manipulation apparatus into a stitch. The system also includes a function of Yarn Receiving 1017, which is the function of taking within a manipulation apparatus a length of working yarn. Another function of the system is Yarn Pull-Through 1018, which is the function of drawing or traversing a length of working yarn through a loop section of a stitch, typically resulting in a new active loop. Still another function of the system is Active Loop Holding 1019, which is the function of holding or maintaining manipulation of active loop(s) 1006, while other functions are being performed, such that when needed the held active loop(s) 1006 may be pulled-through to construct the desired final collection of stitches. Yet another function of the system is Work Manipulation 1020, which is the function of physically handling by e.g. moving, rotating, pressing, or gripping the work in-progress 1004. Another function of the system is Work Anchoring 1021, which is the function of physically or positionally constraining one or more stitches or parts of the work in-progress 1004, relative to other components of the system.

To help describe a general system, some components are defined. These components are associated with one or more functions of the SAM system. The 'Tanglehead' 1003 is defined as a component associated with the yarn and work manipulating functions 1014, 1015, 1016, 1017, 1018, 1019, 1020, and 1021, as defined above. The 'Pillow Ground Platform' 1007, is defined as a component associated with the work handling functions Work Manipulation 1020 and Work Anchoring 1021.

Another function of the system is Component Kinematics 1013, which is the function of controlling the position and orientation of various components of the system relative to each other, e.g. the work in-progress 1004 relative to the Tanglehead 1003 and its sub-components and/or the Pillow Ground Platform 1007. The Build Frame 1008 is defined as a structural component associated with the functions of spatially orienting the different components of the system.

Some of these functions may be optional in some embodiments of a system in accordance with the methods discussed in detail above. Moreover, the functions of the general system described above are further discussed below, and physical architectures including embodiments comprising apparatuses and methods are introduced.

Active Feeder-Passive Receiver System Architecture

Figure 11:
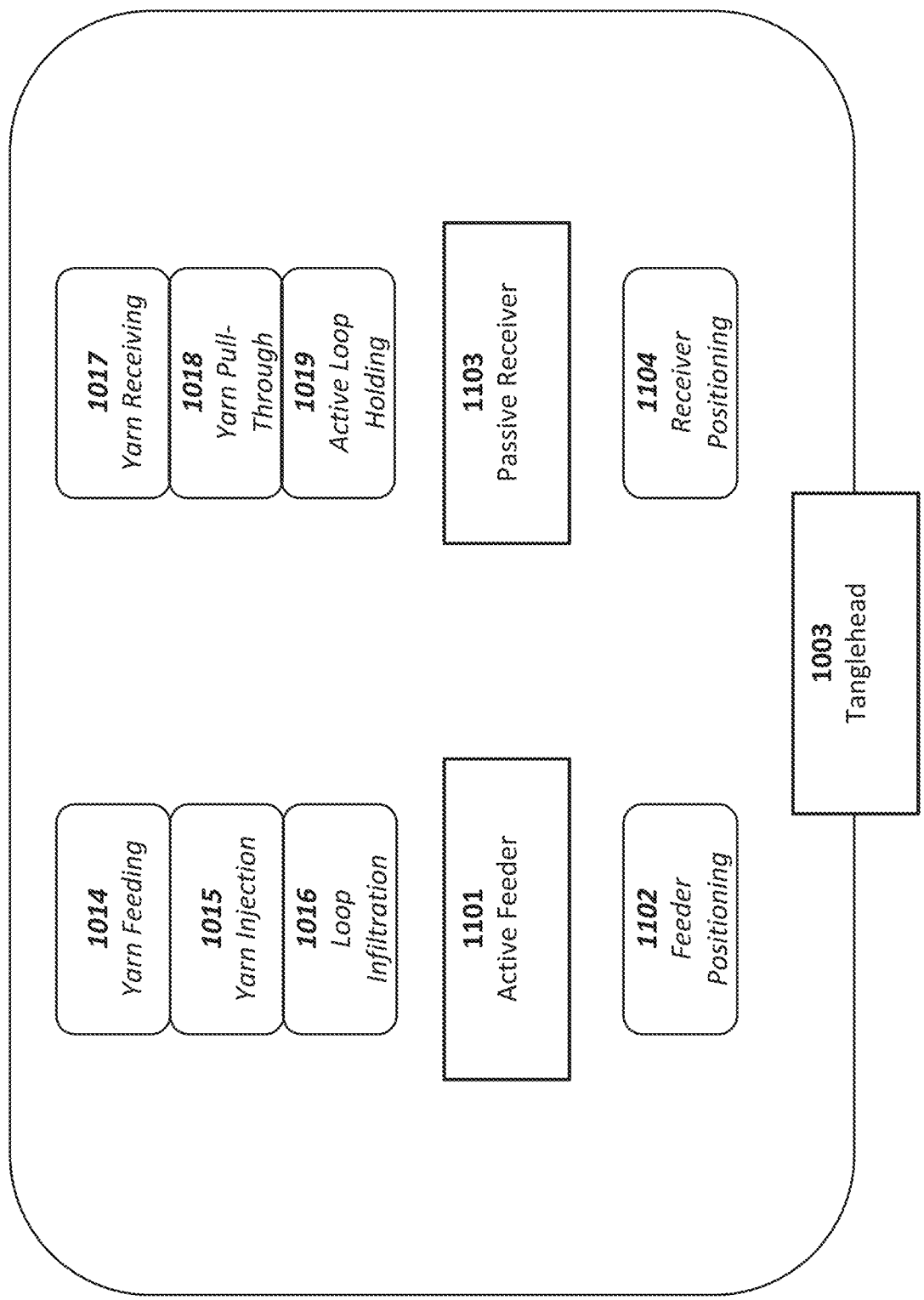
FIG. 11 is a general functional architecture of an active feeder-passive receiver type Tanglehead subsystem.

FIG. 11 depicts a general functional architecture of an Active Feeder-Passive Receiver type of Tanglehead subsystem, an embodiment of the systems described in detail above. A subcomponent 'Active Feeder' or 'Feeder' 1101 is defined and typically associated with the function Feeder Positioning 1102. The system depicted in FIG. 11 also includes the functions Yarn Feeding 1014, Yarn Injection 1015 and Loop Infiltration 1016. Another subcomponent 'Passive Receiver' or 'Receiver' 1103 is defined and typically associated with the function Receiver Positioning 1104, as well as the functions Yarn Receiving 1017, Yarn Pull-Through 1018 and Active Loop Holding 1019.

FIG. 12A depicts a simple schematic of an Active Feeder apparatus. The components that implement the Feeder Positioning function 1012 are shown in a kinematic chain diagram comprising: a slider 1201 that moves along an axis 1202, a rotational joint 1203 attached to the previous slider 1201, another rotational joint 1204 attached to the previous joint 1203, yet another rotational joint 1205 attached to the previous joint 1204, and an end effector 1206 i.e. the Feeder attached to the previous joint 1205. This kinematic chain may be attached to another kinematic chain.

FIG. 12A also depicts a 'Flying Eye' 1207, which may have a ferromagnetic knob 1208. An 'Eye Spool' 1209 winds and unwinds an 'Eye Draw-Wire' 1210 that passes through the Feeder 1206 and is attached to the Flying Eye 1207, enabling extension and retraction of the Flying Eye 1207. An example stitch 1211 is depicted, with the working yarn 1212 passing through the eye of the Flying Eye 1207. The yarn is further connected to the yarn source 1213.

FIG. 12B depicts a simple schematic of a Passive Receiver apparatus. The components that implement the Receiver Positioning function 1014 are shown in a kinematic chain diagram comprising: a slider 1214 that moves along an axis 1215, a rotational joint 1216 attached to the previous slider 1214, another rotational joint 1217 attached to the previous joint 1216, yet another rotational joint 1218 attached to the previous joint 1217, and an end effector 1219, i.e. the Receiver attached to the previous joint 1218. The receiver further includes a receptacle 1220 and a mini-gripper 1221.

FIG. 13A depicts a top view detail of the Flying Eye 1207. The eye 1301 of the Flying Eye 1207 is depicted. Yarn-like material may freely pass through the eye 1301. The flying eye 1207 includes an endpoint 1302 which is knob-like, and which may be ferromagnetic or otherwise attractable to the Receptacle 1220. The flying eye 1207 includes eye draw-wire 1303, which enables extension and retraction of the Flying Eye.

FIG. 13B depicts a side view detail of the Flying Eye 1207. The yarn may travel toward the yard tensioner, as depicted by reference numeral 1304. The yarn may also travel toward the work-in-progress, as depicted by reference numeral 1305. The relative motion of the yarn means that the yarn may travel while the flying eye remains fixed, or the flying eye may travel along a fixed yarn, or a combination of these two motions.

FIG. 13C depicts an inner cross-section detail of the Passive Receiver 1219. The flying eye mates within receptacle cavity 1306. The cavity 1306 includes a restriction 1307 that may help latch the flying eye into the receptacle cavity 1306, such that a greater pulling force is needed to dislodge the flying eye. Also depicted is a solenoid 1308 that facilitates attraction and holding of the flying eye, particularly the knob of the flying eye, into the receptacle cavity. The passive receiver 1219 includes a shaft 1309.

FIG. 13D depicts an outer view of the Passive Receiver 1219, including mini-gripper 1310 positioned on one side of the shaft 1309 of the passive receiver. The mini-gripper 1310 enables the holding of a section of yarn-like material.

FIG. 13E depicts one embodiment of an Active Feeder 1206 to Flying Eye 1207 joint. The Eye Draw-Wire 1210 is attached to the Flying Eye and passes through the Active Feeder. There are recessed edges 1310 on the Flying Eye and/or the Active Feeder. Moreover, FIG. 13F depicts the flexing of the active-feeder-to-flying-eye joint as the eye draw-wire is further retracted, enabling more control of the flying eye orientation simply via rotation of the eye spool 1209 (to dispense or retract the draw-wire).

FIG. 14A depicts an initial step of a general method utilizing the apparatus of an Active Feeder—Passive Receiver subsystem. The feeder shaft 1401 and the flying eye 1402 are positioned close to a stitch that is to be infiltrated (the target stitch). The eye draw-wire 1403 is retracted and a length of working yarn 1404 passes through the eye. Approximately concurrently, the receiver shaft 1405 is also positioned very close to the target stitch, approximately between the left loop 1406 and the right loop 1407 of the target stitch.

FIG. 14B depicts a subsequent step of said method. The active feeder is moved such that the flying eye 1402 begins to enter the target stitch, beginning to traverse the left loop 1406. During this process, the Loop Infiltration function 1016 is being performed.

FIG. 14C depicts another subsequent step of said method. The attraction between the flying eye 1402 and the receptacle of the passive receiver 1405 is activated by e.g., activating a solenoid within the passive receiver or by bringing the ferromagnetic knob of the flying eye close enough to the magnetic receptacle of the passive receiver. This attraction pulls and holds the flying eye 1402 into the receptacle of the passive receiver 1405. The eye draw-wire 1403 has been allowed to extend or slacken. Notice that a length of working yarn 1404 has been drawn through the target stitch under the left loop 1406. During this process, the Yarn Feeding 1014 and Yarn Receiving 1017 functions are being performed.

FIG. 14D depicts another subsequent step of said method. With the flying eye 1402 still held within the receptacle of the passive receiver 1405, by e.g. solenoid action, magnetic force or latching of the knob onto the receptacle constriction, the passive receiver 1405 is moved further from the target stitch, drawing out additional length of working yarn 1404 through the target stitch (forming a new Active Loop), as the eye draw-wire 1403 continues to extend in a slack state. During this process, the Yarn Pull-Through 1018 function is being performed. The mini-gripper 1408 is shown on the passive receiver in FIG. 14C. The mini-gripper is not shown in the previous figures for visual clarity as it is not yet utilized in the exemplary process.

FIG. 14E depicts another subsequent step of said method. The flying eye 1402 is now released from the receptacle of the passive receiver 1405, by e.g., cessation of solenoid action or a tugging impulse through the eye draw-wire. The flying eye 1402 is retracted by retracting the eye draw-wire 1403. The flying eye travels along the length of working yarn issuing from the yarn source, away from the passive receiver 1405. The mini-gripper 1408 is closed on a section of working yarn, holding the active loop in place while the flying eye is retracted. During this process, the Active Loop Holding 1019 function is being performed.

FIG. 14F depicts another subsequent step of said method. The flying eye 1402 has now been fully retracted out of the target loop 1406, and is rejoining the active feeder shaft 1401, while the active loop was held in place by the closed mini-gripper 1408. Notice that the working yarn 1404 still passes through the flying eye 1402. During this process, the Active Loop Holding 1019 function is being performed.

FIG. 14G depicts another subsequent step of said method. A next target stitch 1409 is selected. The passive receiver 1405 is again brought very close to this next target stitch 1409. The active feeder 1401 and flying eye 1402 are also moved close to this next target stitch 1409. Notice that the previously formed active loop 1404 is still held on the shaft of the passive receiver 1405. Next, the procedure for loop infiltration and stitch formation described in the previous paragraphs are repeated as needed to construct the desired 3D structure.

It should be understood that the series of steps presented in the above-described method is an example embodiment. The general method can be applied to target any loop (e.g. left loop, right loop, bottom loop or other loop) on any stitch (adjacent or further separated) within a work in-progress. The use of attractive e.g. magnetic and/or latching forces between the flying eye and the receptacle of the passive receiver simplifies the problem of positioning the end effectors accurately enough for reliable stitch formation. Once the passive receiver is within the general exit of a target loop or stitch, the attractive forces serve to guide the flying eye through, despite of some bounded error in end effector positioning. Moreover, a smooth knob-like structure of the flying eye also eases loop infiltration and simplifies the problem of positioning the end effectors accurately. Once the smooth knob is within the general entry of a target loop or stitch, the knob can easily catch and slide through the entry.

Active Receiver-Passive Feeder Architecture

Figure 15:
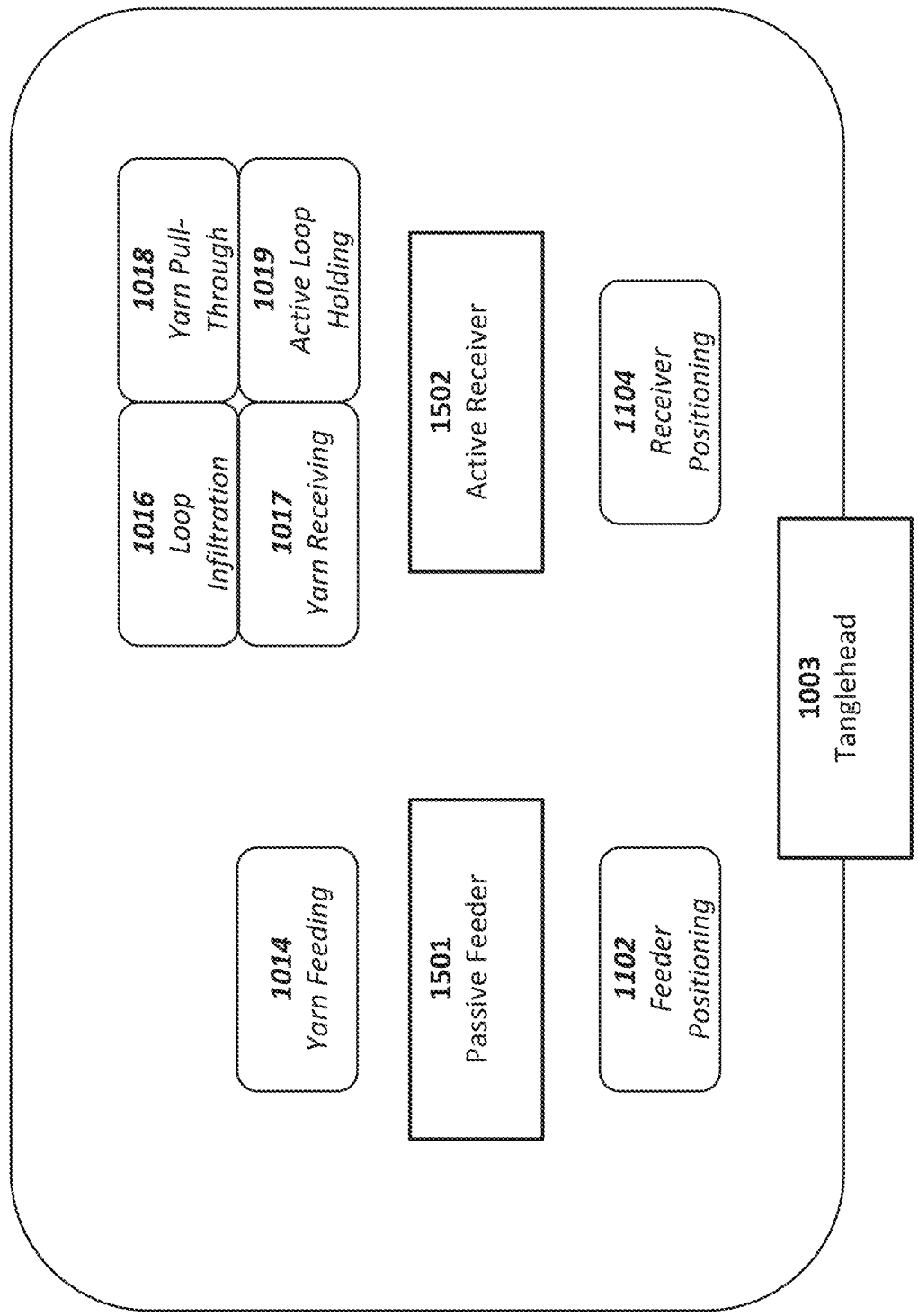
FIG. 15 is a diagram of a general functional architecture of a passive feeder-active receiver type Tanglehead subsystem.

An alternative, but related, method is depicted in FIG. 15, which depicts a general functional architecture of a Passive Feeder-Active Receiver type of Tanglehead subsystem, an embodiment of the systems described in detail above. A subcomponent 'Passive Feeder' or 'Feeder' 1511 is defined and typically associated with the function Feeder Positioning 1102 and the function Yarn Feeding 1014. Another subcomponent 'Active Receiver' or 'Receiver' 1103 is defined and typically associated with the function Receiver Positioning 1104 and the functions Loop Infiltration 1016, Yarn Receiving 1017, Yarn Pull-Through 1018 and Active Loop Holding 1019.

FIG. 16A depicts a simple schematic of a Passive Feeder apparatus. The components that implement the Feeder Positioning function 1012 comprises a slider 1601 that moves along an axis 1602, and an end effector 1603 i.e. the Feeder attached to the previous slider 1601. This simple kinematic chain may be attached to another kinematic chain and is one example embodiment to move the end effector. An example stitch 1604 is depicted, with the working yarn 1605 passing through the Feeder 1603. Towards one end 1606, the yarn is further connected to the yarn source.

FIG. 16B depicts a simple schematic of an Active Receiver apparatus. The components that implement the Receiver Positioning function 1014 are shown in a kinematic chain diagram comprising: a slider 1607 that moves along an axis 1608, a rotational joint 1609 attached to the previous slider 1607, another rotational joint 1610 attached to the previous joint 1609, yet another rotational joint 1611 attached to the previous joint 1610, and an end effector 1612 i.e. the Receiver attached to the previous joint 1611. This kinematic chain may be attached to another kinematic chain and is one example embodiment to move the end effector. As depicted in FIG. 16B, the end effector 1612 is similar to a Latch Hook, with a Hook structure 1614 and a Latch structure 1613.

FIG. 17A depicts a side view detail of the Passive Feeder 1603. 1701 depicts an example of how the Feeder Tube 1702 may be held, e.g. by a collar connected to a rigid structure. The feeder tube 1702 may be made of flexible material e.g. PTFE, PEEK, TPU or other plastics, such that the tube structure may elastically flex when an external force is applied. The yarn may travel through the feeder tube toward the work-in-progress, as denoted by reference numeral 1703. Alternatively, the yarn may travel through the feeder tube toward the yarn tensioner, as denoted by reference numeral 1704. The feeder tube 1702 may be angled forward relative to the vertical axis by some angle theta, as denoted by reference numeral 1705. This forwards angling facilitates the Latch Hook catching and drawing the Feeder Tube.

FIG. 17B depicts a cross-section detail of the Feeder Tube 1702. The feeder tube 1702 includes cavity 1706 that may have a smooth inner surface such that the yarn-like build material may slide through with relatively low friction. The back side of the feeder rube 1702 may be tapered, as denoted by reference numeral 1707, to facilitate the Latch Hook catching and drawing or pulling on the Feeder Tube. The front side of the feeder tube 1702 may be smooth or rounded, as denoted by reference numeral 1708.

FIG. 17C depicts a side view detail of the Active Receiver 1612. The active receiver shaft includes a first generally straight segment 1709 and a second generally straight segment 1710. Between the two segments 1709 and 1710 is a bend and displacement segment 1711. The two generally straight segments 1709 and 1710 may be parallel or at any angle relative to each other. A latch structure 1712 pivots between a closed and an open state, which may be passive (e.g. a loose latch that may be pushed open or close by contact with other surfaces) or active (e.g. a solenoid, drawstring or piezo-actuator controlled latch). A tip 1713 of the Latch 1712 is slightly displaced and rounded to facilitate opening and closing of the Latch through contact with the other surfaces. A hook-like structure 1714 toward the tip of the active receiver serves to catch, draw, and hold yarn-like material or other structures. A smooth, knob-like structure 1715 toward the tip of the active receiver facilitates loop infiltration and simplifies the problem of positioning the end effector accurately—once the smooth knob is within the general entry of a target loop or stitch, the knob can more easily catch and slide through the entry. The active receiver tip may be tapered, as denoted by reference numeral 1716, with the tapering facilitating loop infiltration.

FIG. 17D depicts a simple schematic showing the Latch Hook structure 1614 being optionally set at some angle phi 1717, relative to the Feeder Tube structure 1603. This angling 1717 between the Latch Hook 1614 and the Feeder Tube 1603 facilitates the Latch Hook catching and pulling on the Feeder Tube.

FIG. 18A depicts an initial step of a general method utilizing the apparatus of a Passive Feeder-Active Receiver subsystem. A stitch is selected to be infiltrated (the target stitch). As depicted, 1805 is the left loop of the target stitch and 1806 is the right loop of the target stitch. The active receiver end (or latch hook) 1803 is brought close to the target stitch. The latch 1804 is depicted in the closed state. The latch 1804 can also be in the open or other intermediate state. The feeder tube 1801 is also brought closer to the target stitch.

FIG. 18B depicts a subsequent step of said method. The tip of the active receiver 1803 is pushed through the target stitch, underneath the left loop 1805. The left loop of the target stitch 1805 collides with the latch 1804, causing the latch to begin to open. During this process, the Loop Infiltration function 1016 is beginning to be performed.

FIG. 18C depicts another subsequent step of said method. The entire latch hook (1803 and 1804) has been pushed through the target stitch. Collision with the target stitch 1805 has caused the latch 1804 to be fully or widely opened. The hook 1803 of the active receiver is pushed past the feeder tube 1801. During this process, the Loop Infiltration function 1016 is being performed.

FIG. 18D depicts another subsequent step of said method. The hook 1803 of the active receiver is drawn back, catching the flexible feeder tube 1801, which may flex as it is pulled by the hook 1803. The latch 1804 again collides with the target stitch 1805, causing the latch to begin to close.

FIG. 18E depicts another subsequent step of said method. The hook 1803 of the active receiver is drawn further back, beginning to pass through the target stitch. Collision with the left loop of the target stitch 1805 has caused the latch 1804 to be fully or nearly fully closed. As the hook 1803 was drawn back, the hook traveled down the flexible feed tube 1801 and caught the working yarn 1802. The working yarn 1802 is slack or dispensed in tandem with the drawback motion of the hook 1803, such that a section of yarn is now held within the closed latch hook of the active receiver 1803. During this process, the Yarn Feeding 1014 and Yarn Receiving 1017 functions are being performed.

FIG. 18F depicts another subsequent step of said method. The entire latch hook (1803 and 1804) has been pulled back through the target stitch 1805. A length of working yarn 1802 has been drawn out via the feeder tube 1801—this length forming a new active loop 1807 that is held within the closed latch hook (1803 and 1804). During this process, the Yarn Feeding 1014, Yarn Pull-Through 1018 and Active Loop Holding 1019 functions are being performed.

FIG. 18G depicts another subsequent step of said method. The active feeder 1803 is beginning to be moved to a new position. The latch 1804 collides with the slack active loop 1807, causing the latch to begin to open.

FIG. 18H depicts another subsequent step of said method. A next target stitch is selected, with 1808 being the left loop of this next target stitch. The active receiver end 1803 is brought close to the next target stitch. The feeder tube 1801 is also brought closer to the next target stitch. The latch 1804 may now be fully open, partially open, or still closed. Next, the procedure for loop infiltration and stitch formation described in the previous paragraphs are repeated as needed to construct the desired 3D structure.

Further exemplary illustration is given for the general method utilizing the apparatus of a Passive Feeder-Active Receiver subsystem. FIG. 18I depicts a subsequent step of said method. Following the previously described procedure for loop infiltration and pull-through in FIG. 18A-18H, a new section of working yarn 1802 is captured in the active receiver 1803 that is now being drawn out of the next target stitch 1808. The previously formed active loop 1807 is still being held on the active receiver shaft.

FIG. 18J depicts one possible subsequent step of said method, when one or more active loops are previously held on the active receiver shaft. The latch hook (1803 and 1804) with the captive working yarn 1802 can be completely pulled through both the target stitch 1808 and the previously held active loop 1807. The previously held active loop 1807 has now become a set loop, and a new active loop 1809 is now held by the active receiver.

FIG. 18K depicts another possible subsequent step of said method, when one or more active loops are previously held on the active receiver shaft. The latch hook (1803 and 1804) is completely pulled through the target stitch 1808 but not through the previously held active loop 1807. A new active loop 1809 is formed. Both the previous active loop 1807 and the new active loop 1809 remain on the active receiver shaft. One or more of these active loops can be set in a subsequent pull-through, allowing formation of various stitches approximating e.g. single crochet, half double crochet, double crochet, triple crochet, and other configurations of loops.

Pillow Ground Platform Architectures

To facilitate the methods for stitch formation previously described and to facilitate the Work Manipulation function 1020, a platform or 'ground platform' for the work in-progress to rest on may be utilized. This ground platform may furthermore be elastic, spongy, cushion-like, or springy, locally deforming when pressure is applied and returning to its non-deformed state after pressure is removed, similar to a pillow. Such a component is defined as a 'Pillow Ground Platform' or 'Pillow Ground'.

FIG. 19A depicts a simplified cross-section view of one embodiment of a pillow ground 1901 comprising a relatively thick layer of elastic or springy material e.g. cotton, polyester, or other fibrous wool, or polyurethane or other spongy foam. Reference numeral 1904 denotes a simplified depiction of a cross-section of yarn e.g. in a stitch that is being infiltrated. Also shown in FIG. 19A is a depiction of an active receiver latch hook 1903. Reference numeral 1902 denotes the temporary local deformation of the pillow ground 1901, which facilitates the movement of the hook 1903 under the yarn 1904.

FIG. 19B depicts a simplified cross-section view of another embodiment of a pillow ground 1905 comprising a relatively thin layer or film of elastic material e.g. woven or knitted fabric, or PVC or other plastic sheet. Reference numeral 1906 denotes the temporary local deformation of the pillow ground 1905 when pressure is applied by an external body 1903.

FIG. 19C depicts a simplified cross-section view of yet another embodiment of a pillow ground 1907 comprising a bed of columnar protrusions or lateral ribs of elastic or springy material e.g. rubber, silicone, or polyurethane foam. Reference numeral 1908 denotes the temporary local deformation of the pillow ground 1907 when pressure is applied by an external body 1903.

Work Anchoring Architectures

Work Anchoring 1021 is the function of physically constraining one or more stitches or parts of a work in-progress, relative to other components of a SAM system. For example, the work in-progress may be affixed to the pillow ground such that the work in-progress is not displaced while a loop is being infiltrated by the passive receiver, or otherwise handled, and the work in-progress may be released when it is to be moved or when the product of manufacture is complete.

FIG. 20A depicts a simplified cross-section view of one embodiment of a work anchoring apparatus comprising an adhering layer, showing ground platform 2000. A layer of material 2001 temporarily adheres to a yarn-like material 2002 (depicted as a simplified cross-section) when brought into contact together, and then separated by a pulling force stronger that the adhering force between the layer and the yarn-like material. The adhering material 2001 may be e.g. a layer of micro-hooks (similar to a hook and loop fastener) or a sticky tape-like surface.

FIG. 20B depicts a simplified cross-section view of another embodiment of a work anchoring apparatus comprising elastic macro-hooks. Reference numeral 2003 denotes an example of an elastic macro-hook made of e.g. nylon or other plastic, or steel or other metal wire. Reference numeral 2004 denotes how the macro-hook may catch within the plies 2005 of a yarn-like material (depicted as a simplified cross-section of a six-ply yarn) to hold it in place. The yarn-like material may be released from the elastic hooks by pulling the yarn-like material with a force greater than the adhesive force between the array of hooks and the attached yarn(s). FIG. 20C depicts a simplified cross-section view of another embodiment of a work anchoring apparatus comprising elastic macro-hooks 2006 of hook size approximately that of the yarn 2002 cross-section.

FIG. 21A depicts a simplified cross-section view of yet another embodiment of a work anchoring apparatus comprising pin-like components, including a ground platform 2100 of e.g. cotton or other fibrous wool, or polyurethane or other spongy foam material, that can be repeatedly punctured without functional damage, and that can firmly hold the embedded pins. A pinhead 2101 compresses and holds in place the yarn-like material 2103 (depicted as a simplified cross section of a six-ply yarn) onto the ground platform 2100. The pinhead 2101 is attached to the needle structure 2102 that is embedded in the ground platform 2100. The pin-like component may be removed by pulling the pinhead with a force greater than the holding or frictional force between the needle and the embedding material. FIG. 21B depicts a simplified cross-section view of another embodiment of a work anchoring apparatus comprising pin-like components, where the yarn-like material 2104 is not punctured by the needle 2102 but is compressed and held in place by the pinhead 2101.

FIG. 21C depicts one example embodiment of a pin structure comprising a needle 2102 attached to a winged pinhead 2101 for added surface contact with the yarn(s) being compressed and held in place. The pinhead 2101 is optionally also grooved or recessed on the bottom side to facilitate trapping of the yarn(s) being compressed and held in place. FIG. 21D depicts another example embodiment of a pin structure comprising a needle 2102 attached to a winged pinhead 2101 that is asymmetric or one-sided.

FIG. 21E depicts another example embodiment of a pin structure comprising a pinhead 2101 attached to a needle with a kink 2102 that can facilitate trapping of the yarn(s) being compressed and held in place. FIG. 21F depicts another example embodiment of a pin structure comprising a pinhead 2101 attached to a two- or multi-pronged needle 2102 where the gap between prongs can facilitate trapping of the yarn(s) being compressed and held in place.

A pin-like component for work anchoring can also comprise a "pinhead" without a physical needle, where the temporary attachment between the pinhead and the ground platform is accomplished by other attractive means e.g. magnetic attraction between a magnetized (or ferroelectric) pinhead and a ferromagnetic (or magnetized) ground platform, a sticky tape-like surface or hook-and-loop type complementary surfaces.

FIG. 22A depicts a simplified diagram of another embodiment of a work anchoring apparatus comprising an array of small elastic "pincers". Reference numeral 2201 denotes an example of a small (with height on the order of a few yarn-like material cross-sections) elastic post (made of e.g. rubber, silicone, polyurethane or other elastic material) that is curved towards the horizontal close to its tip. Reference numeral 2202 denotes an example of a complementary elastic post that is mirror-imaged relative to the previous post 2201 such that the curved tips of both posts almost touch and are closer together than the cross-section of the yarn-like material. The posts 2201 and 2202 together form a "pincer" like structure. An array of these pincer-like structures is attached to a ground platform 2203. Reference numeral 2204 denotes how yarn-like material can be drawn through and held in the arc of the pincer-like structures. The work in-progress or completed product may be released by pulling the yarn-like material with a force greater than the holding or elastic hook force between the array of pincers and the attached yarn(s).

FIG. 22B is a simplified diagram of another embodiment of a work anchoring apparatus comprising a wire grid. Reference numeral 2205 denotes an example of posts over which a wire-like component 2206 e.g. cotton, nylon, copper, or other thin and flexible thread, is wound to construct a grid-like structure. Reference numeral 2207 denotes how yarn may be intertwined with the grid-like structure to form loops of a work in-progress. The work in-progress or completed product may be released by unwinding the wire-like component 2206 from the posts 2205. Another set of wire-like components may be wound to form another grid orthogonal to the grid depicted in FIG. 22B, with this orthogonal grid placed above or below the grid depicted in FIG. 22B. The two orthogonal grids may together form a mesh.

FIG. 22C is a simplified diagram of another embodiment of a work anchoring apparatus comprising a mesh. An array of small elastic rods 2208 are aligned along a first axis, with the rods 2208 having a cross-section on the order of one yarn-like material cross-section or smaller, and being made of nylon, silicone, PTFE, steel wire or other elastic material. A second array of small elastic rods 2209 are aligned along a second orthogonal axis. The two arrays of orthogonal rods form a mesh-like structure within which yarn may be intertwined to form loops of a work in-progress. A holding bar 2210 may be removed to allow the elastic rods 2209 to bend. More holding bars 2210 may be employed on the orthogonal array of rods 2208 and 2209. With the holding bar(s) removed, the work in-progress or completed product may be released by pulling the yarn-like material with a force greater than the holding or elastic force between the mesh and the attached yarn(s).

Work Manipulation Architectures

During stitch formation and other processes described above, the work in-progress may be manipulated. The Work Manipulation function 1020 can be implemented by various embodiments of apparatuses and methods.

FIG. 23A depicts a simplified cross-section view of one embodiment of a work manipulation apparatus using a blunt end effector, including a ground platform 2300. Reference numeral 2301 denotes a simplified cross-section view of interlinked stitches comprising a work in-progress. Reference numeral 2302 denotes a blunt end effector with a columnar structure, here called a blunt 'Tusk'. The tusk may perform Work Manipulation 1020 by holding the work in-progress 2301 against the ground platform 2300. The tusk 2302 may also perform Work Manipulation 1020 by moving in any direction in any combination of the X, Y and/or Z axes, resulting in the movement (by e.g. pushing, pulling or dragging) of the work in-progress 2301 in a like direction. FIG. 23B depicts how Work Manipulation 1020 may also be performed by folding or warping the work in-progress 2301 via movement of the tusk 2302 against the work-in-progress. The tusk 2302 may also be tilted, panned, or rotated around any axis to accomplish the desired work manipulation.

FIG. 23C depicts an embodiment of a blunt tusk with a rounded or knobbed tip 2303. FIG. 23D depicts an embodiment of a blunt tusk with a broadened tip 2304. FIG. 23E depicts an embodiment of a blunt tusk with a grooved or textured tip 2303. The tip of the tusk may also be composed of rubbery material e.g. rubber or silicone, that has a higher coefficient of friction with the yarn-like material to facilitate work manipulation.

FIG. 24A depicts a simplified cross-section view of another embodiment of a work manipulation apparatus using a tapered end effector, including a ground platform 2300. Reference numeral 2301 depicts a simplified the cross-section view of interlinked stitches comprising a work in-progress. Reference numeral 2301 depicts a tapered end effector with a columnar structure, here called a tapered 'Tusk'. The tapered tusk tip 2301 can be introduced (partially or completely traversing) in between the loops of the stitches of the work in-progress 2301. Movement of the tapered tusk 2301 in contact with the work in-progress 2301 results in movement, warping, folding or other manipulation of the work.

FIG. 24B depicts an embodiment of a tapered tusk with a sharpened tip 2302. FIG. 24C depicts an embodiment of a tapered tusk with a blunter or smoother tip 2303. FIG. 24D depicts an embodiment of a tapered tusk with a knobbed tip 2304. The tip of the tusk may also be composed of rubbery material e.g. rubber or silicone, that has a higher coefficient of friction with the yarn-like material to facilitate work manipulation.

FIG. 25A depicts a simplified cross-section view of another embodiment of a work manipulation apparatus using an end effector with a ledge, including a ground platform 2300. Reference numeral 2301 denotes a simplified the cross-sectional view of interlinked stitches comprising a work in-progress. End effector 2511 includes an angled or kinked tip forming a ledge-like structure, here called a ledge 'Tusk'. Reference numeral 2512 denotes an example of another end effector e.g. an active receiver that may be used to push the work in-progress against the ledge of the work manipulator 2511. The ledge 2511 allows the holding of a portion (or the whole) of the work in-progress 2301 at a height above the ground platform 2300 or above other portions of the work in-progress, to facilitate stitch formation for manufacturing an arbitrary 3D structure.

FIG. 25B depicts one embodiment of a ledge tusk with a broad ledge 2513. FIG. 25C depicts another embodiment of a ledge tusk with a gap 2514 in the vertical column of the tusk, allowing movement of another end effector or parts of the work in-progress through the gap 2514.

FIG. 26A depicts a simplified cross-section view of another embodiment of a work manipulation apparatus using a gripper, including a ground platform 2300. Reference numeral 2301 denotes a simplified cross-sectional view of interlinked stitches comprising a work in-progress. Reference numeral 2601 denotes one 'claw' of the 'gripper' that may be moved into an open or closed position. Reference numeral 2602 denotes a complementary 'claw' that may be moved into an open or closed position. The reference numerals 2601 and 2602 constitute the gripper and may both be mobile or only one claw may open and close. The claws of the gripper may pinch onto a portion of the work in-progress 2301 to move, warp, fold or otherwise manipulate the work. The gripper may also be used to retain and reposition a work anchoring component such as a pin-like component exemplified in FIG. 21A.

The different embodiments of work manipulation apparatuses here presented may be combined in different permutations. FIG. 26B depicts an example of a combinatorial embodiment of a work manipulation apparatus, having a gripper structure with two motile claws 2601 and 2602, also having a ledge structure 2511 attached to the right claw 2602, and also having a tapered tusk structure 2301 attached to the left claw 2601.

Component Kinematics Architectures

The apparatuses and methods of the system involve motion and positioning of the components of the system relative to each other. For example, during stitch formation an active receiver may be moved through a target stitch of a work-in-progress, to capture a passive feeder that has also been moved close to the work. The dynamic positioning and orienting of components of the system relative to each other is defined as the Component Kinematics function 1013. The degrees of freedom, range of motion and other allowable spatial interactions between components is defined by the mechanical design of the system, which can be described by a kinematic architecture.

Figure 27:
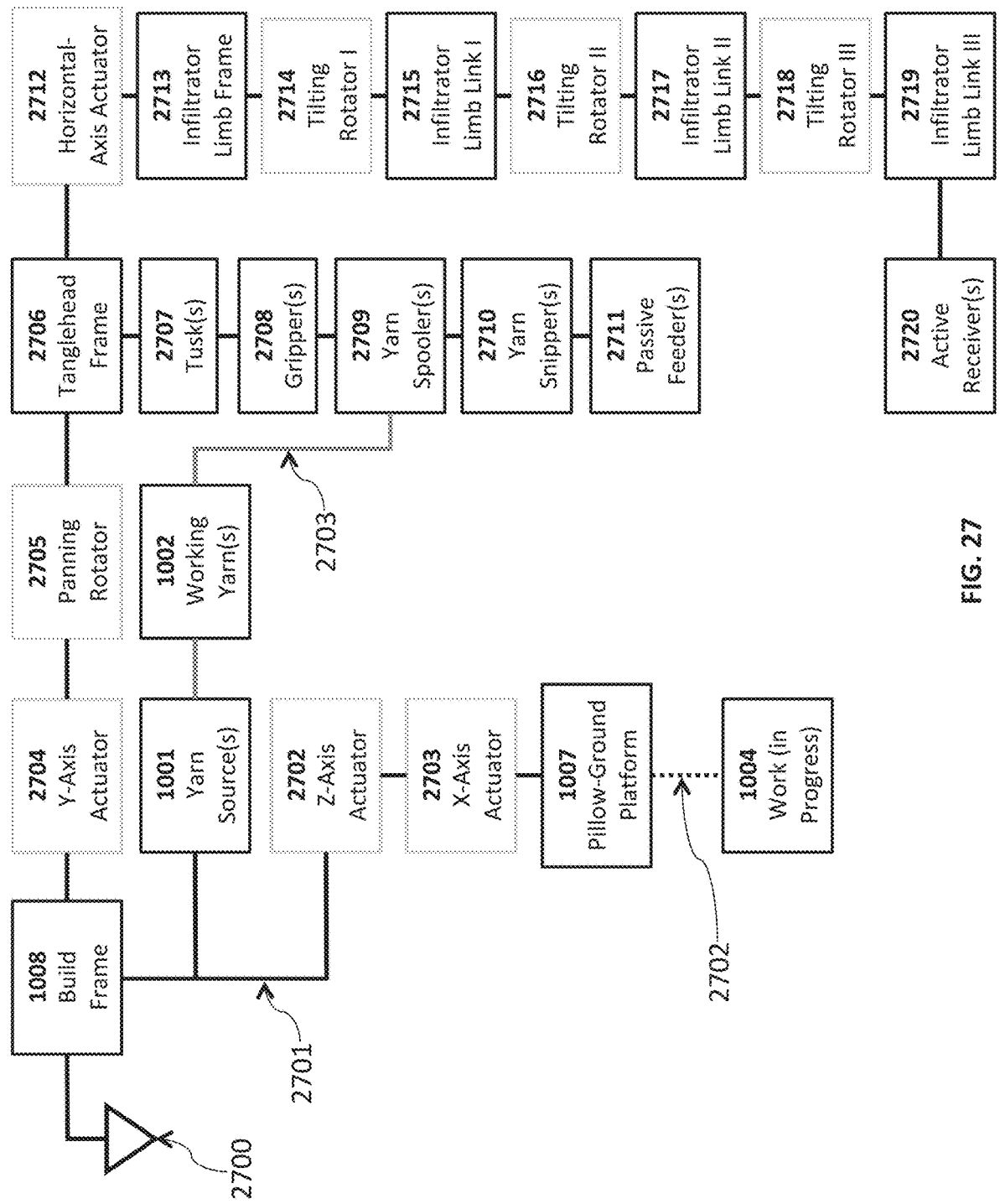
FIG. 27 is a diagram of the kinematic topology of one embodiment of a SAM kinematic architecture.

FIG. 27 depicts the kinematic topology of one embodiment of a kinematic architecture as used in the system described in the sections above. Reference numeral 2700 denotes the ground reference or the inertial frame of reference. Reference numeral 2701 denotes a rigid link-components connected by a rigid link have a rigid body relationship to each other. Reference numeral 2702 denotes a conditionally rigid or contact link, e.g. the work in-progress 1004 may be resting on top of the pillow ground platform 1007 and may move with the platform, or may not move with the platform if the work 1004 is held in place by another manipulator. Reference numeral 2703 denotes a yarn attachment, depicting the yarn source(s) 1001 issuing working yarn(s) 1002 that is dispensed or retracted by the yarn spooler(s) 2709.

The kinematic topology in FIG. 27 can be understood by analyzing the links between actuators, joints and components which can form chains and sub-chains. The degrees of freedom, range of motion and other allowable spatial interactions between any two components can be identified by traversing the series of links connecting the two reference components.

For example, in FIG. 27, in one chain, the Inertial Reference 2700 is rigidly linked to the Build Frame 1008, which is then rigidly linked to a z-axis Actuator 2702 (which moves any attached downlink components along a first vertical axis) which is in turn rigidly linked to an x-axis Actuator 2703 (which moves any attached downlink components along a second horizontal axis). The x-axis actuator 2703 is then rigidly linked to the Pillow Ground Platform 1007. Comparing the two components 'inertial reference 2700' and 'pillow ground platform 1007', it is identified that the ground platform 1007 has two degrees of freedom relative to the reference frame 2700, and can relatively move in the X- and Z-directions.

As depicted in FIG. 27, in another chain, the inertial reference 2700 is rigidly linked the Build Frame 1008, which is then rigidly linked to a y-Axis Actuator 2704 (which moves any attached downlink components along a third orthogonal horizontal axis), which is in turn rigidly linked to a Panning Rotator 2705 (which rotates any attached downlink components about the first vertical axis). The panning rotator 2705 is then rigidly linked to a Tanglehead Frame 2706. As defined, the Tanglehead Frame 2706 has two degrees of freedom relative to the inertial reference 2700 and can relatively move in the y-direction and rotate about the z-axis. The Tanglehead Frame 2706 then branches into two separate kinematic chains—the components on these kinematic chains may have additional degrees of freedom and motion dimensions, compounded with the kinematics of the Tanglehead Frame 2706.

Also depicted in FIG. 27, in one kinematic chain branching from the Tanglehead Frame 2706, the Tanglehead Frame 2706 is rigidly linked to one or more Tusk(s) 2707, which is then rigidly linked to one or more Gripper(s) 2708. The one or more gripper(s) 2708 is then rigidly linked to one or more Yarn Spooler(s) 2709, which is in turn rigidly linked to one or more Yarn Snipper(s) 2710, with the yarn snipper(s) 2710 being rigidly linked to one or more Passive Feeder(s) 2711. All of the components on the kinematic chain are rigidly linked, and thus all these components share the kinematics of the Tanglehead Frame 2706 and move as one rigid body. These components may have sub-components that move independently; for example, the grippers may have motile claws that open and close, the snippers may have blades or cutting edges that open and close to cut or terminate a section of yarn, and the spoolers may have gears that rotate.

Still referring to FIG. 27, in another kinematic chain branching from the Tanglehead Frame 2706, the Tanglehead Frame 2706 is rigidly linked to a Horizontal-Axis Actuator 2712 (which moves any attached downlink components along a varying horizontal axis). Since this Horizontal-Axis Actuator 2712 is downlinked from the Tanglehead Frame 2706, the orientation of this linear actuator will vary with the changing orientation of the Tanglehead Frame 2706. The horizontal-axis actuator 2712 is then rigidly linked to an Infiltrator Limb Frame 2713, which is in turn rigidly linked to a Tilting Rotator I 2714 (which rotates any attached downlink components about a varying horizontal axis). Tilting Rotator I 2714 is then rigidly linked to an Infiltrator Limb Link I 2715, which is then rigidly linked to another Tilting Rotator II 2716 (which rotates any attached downlink components about another varying horizontal axis). Similarly, Tilting rotator II 2716 is then rigidly linked to another Infiltrator Limb Link II 2717, which is then rigidly linked to another Tilting Rotator III 2718 (which rotates any attached downlink components about another varying horizontal axis). Tilting rotator III 2718 is then rigidly linked to another Infiltrator Limb Link III 2719, which is then rigidly linked to one or more Active Receiver(s) 2720. Some axes are described as 'varying' because the reference actuator is being dynamically repositioned by other uplinked actuators.

Tracing the previously described kinematic links, there are eight degrees of freedom between the Active Receiver(s) 2720 and the Work In-Progress 1004, and four degrees of freedom between the Active Receiver(s) 2720 and the Passive Feeder(s) 2711, in the embodiment of a kinematic architecture depicted in FIG. 27.

Figure 28:
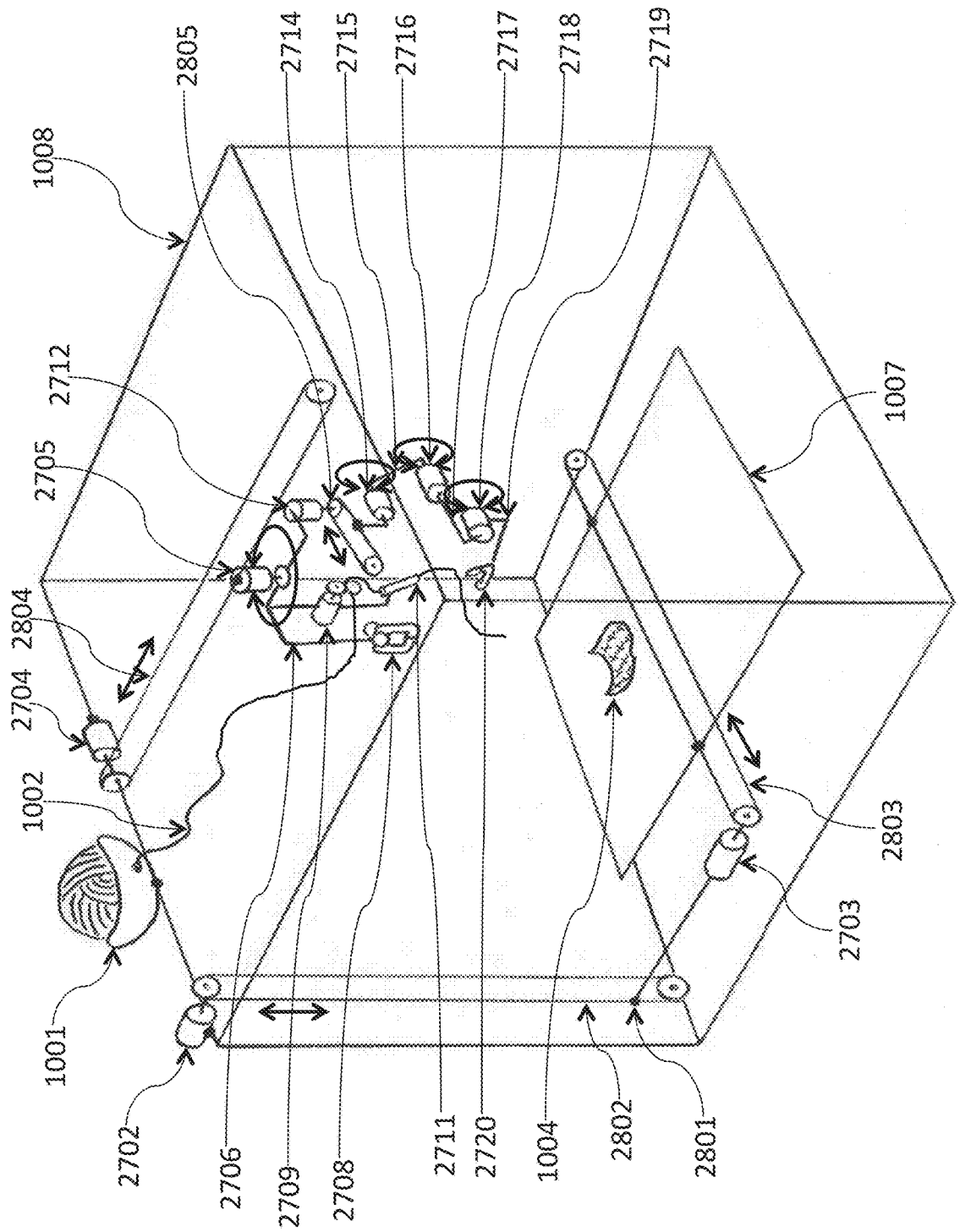
FIG. 28 is a simple schematic of a SAM kinematic architecture corresponding to the kinematic topology depicted in FIG. 27.

FIG. 28 is a simple schematic of a kinematic architecture corresponding to the kinematic topology depicted in FIG. 27. Reference numeral 1008 depicts an example Build Frame as a cuboid structure that is stationary relative to the inertial frame of reference. On this Build Frame 1008 several exemplary actuating components are disposed, with the function of translating and/or orienting parts of the apparatus in 3D space during manufacturing operations. (A number of non-limiting, exemplary linear actuating systems are depicted, each comprising an actuator and a pulley belt system: the actuator moves a belt along the pulley system— any component attached to the belt will linearly translate as the belt is moved by the actuator. An example of a belt may be a loop of material held sufficiently taut between two roller ends, such that rotating or driving a first roller end causes the entire belt to move along the pulley system, and the second roller end to also rotate as a result. The loop of material comprising the belt may be very narrow—much narrower than the overall apparatus, or very wide—as wide as or wider than the overall apparatus. The belt loop material may be rubber, nylon, Teflon, fabric, a chain link, or any other sufficiently flexible material.) As depicted in FIG. 28, Z-Axis Actuator 2702 is fixed to the Build Frame 1008 and drives the vertically translating pulley belt 2802. A dot symbol 2801 denotes a rigid attachment between two components. Here an X-Axis Actuator 2703 is rigidly attached to the vertically moving pulley belt 2802 as denoted by the dot symbol 2801, and thus the x-axis actuator 2703 will move vertically as the vertical pulley belt 2802 is driven. Also depicted in FIG. 28, the X-Axis Actuator 2703 drives the horizontally moving pulley belt 2803. The Pillow Ground Platform 1007 is attached to the horizontally moving pulley belt 2803, such that the platform 1007 will move horizontally as the horizontal pulley belt 2803 is driven. A Work In-Progress 1004 rests on top of the Pillow Ground Platform 1007.

As depicted in FIG. 28, the Build Frame 1008 is rigidly linked to a Y-Axis Actuator 2704 which drives a horizontally moving pulley belt 2804. Attached to the horizontally moving pulley belt 2804 is a Panning Rotator 2705 that rotates a Tanglehead Frame 2706 (depicted as a wireframe) about a vertical axis. Attached to the rotating Tanglehead Frame 2706 is an example of a Gripper 2708. Also attached to the rotating Tanglehead Frame 2706 is an example of a Spooler 2709 and a Passive Feeder 2711.

Also attached to the rotating Tanglehead Frame 2706 is a Horizontal-Axis Actuator 2712, which drives a horizontally moving pulley belt 2805 that changes position and orientation together with the Tanglehead Frame 2706 to which it is mounted. Attached to the horizontally moving pulley belt 2805 is a Tilting Rotator I 2714. Attached to the Tilting Rotator I 2714 is an Infiltrator Limb Link I 2715, which is then attached to another Tilting Rotator II 2716. Tilting rotator II 2716 is then attached to another Infiltrator Limb Link II 2717, which is then attached to another Tilting Rotator III 2718. Tilting rotator III 2718 is then attached to another Infiltrator Limb Link III 2719, which is then attached to an example of an Active Receiver 2720.

Also depicted in FIG. 28, an example of a Yarn Source 1001 is rigidly attached to the Build Frame 1008. Issuing from the Yarn Source 1001 is a length of Working Yarn 1002, which is then connected to the Spooler 2709, which further dispenses the working yarn to the Passive Feeder 2711.

The pulley systems depicted in FIG. 28 comprise one embodiment of a linear actuator system. Other embodiments include e.g. linear screws, hydraulic actuators, electroactive polymers, piezoelectric actuators, delta actuator mechanisms, cable or parallel actuators, telescoping systems, or other mechanisms. The driving actuators and rotators in various embodiments may also be, for example, servo motors, stepper motors, DC motors, AC motors or other mechanical drivers.

FIG. 27 and FIG. 28 introduce one embodiment of a kinematic architecture that can be utilized in the system described in the sections above. Numerous variations of a kinematic architecture can be defined by permuting the placement and sequence of actuators and components, while achieving the same or some other desired configuration of degrees of freedom and dimensions of movement, as can be analyzed using the kinematic topology diagram introduced. For example, the Pillow Ground Platform 1007 can be rigidly linked to the Build Frame 1008, and the Z-Axis Actuator 2702 and the X-Axis Actuator 2703 can be moved onto the kinematic chain that includes the Y-Axis Actuator 2704 and the Panning Actuator 2705. Such a variation will still possess eight degrees of freedom between the Active Receiver(s) 2720 and the Work In-Progress 1004, and four degrees of freedom between the Active Receiver(s) 2720 and the Passive Feeder(s) 2711.

Detailed Embodiment of an Apparatus of a Stitch Additive Manufacturing System

FIG. 29A is a side profile view of an embodiment of an Infiltrator Limb, corresponding to the kinematic diagrams in FIG. 16B and FIG. 28. An end effector 2901, such as an active receiver latch hook, is attached to a rotating socket called "Infiltrator Limb Link III" 2902, which is in turn attached to a bracket called "Infiltrator Limb Link II" 2903. The infiltrator limb includes a base frame 2904, with slider sockets 2905a and 2905b being attached to the base frame 2904, enabling translation of the entire Infiltrator Limb structure along an axis.

FIG. 29B is another view of the same embodiment of an Infiltrator Limb, corresponding to the kinematic diagrams in FIG. 16B and FIG. 28. Reference numeral 2906 denotes a first rotating actuator or "tilting rotator" connected to "Infiltrator Limb Link I" 2907. A second tilting rotator 2908 is connected to a link 2909, which is in turn connected to a link 2910, which is in turn connected to a link 2911, which is part of the Infiltrator Limb Link II 2903 rigid body. The links 2907, 2909, 2910 and 2911 form a parallelogram linkage, which allows 2-DOF positioning of Infiltrator Limb Link 112903 while keeping the actuators 2906 and 2908 at the base of the structure 2904.

FIG. 29C is a yet another view of the same embodiment of an Infiltrator Limb, corresponding to the kinematic diagrams in FIG. 16B and FIG. 28. The tilting rotator 2912 actuates the Infiltrator Limb Link III 2902 that is attached to the end effector 2901. Slider sockets 2905a, 2905b and 2905c are attached to the base frame 2904, enabling translation of the entire Infiltrator Limb structure along an axis.

Passive Feeder(s) and Spooler(s)

FIG. 30A is a side profile view of an embodiment of (three) Passive Feeders and a Spooler, including a flexible feeder tube 3001a, which is angled with respect to the vertical. A rigid bracket 3002 holds the feeder tube 3001a. The spooler includes a first wheel 3003 and a second wheel 3004. The first wheel 3003 of the Spooler is driven by a rotary actuator 3005. The Passive Feeder and Spooler components are attached to a rigid bracket 3006 which has a socket 3007 for connecting to other components of the SAM apparatus.

FIG. 30B is a front profile view of the same embodiment of (three) Passive Feeders and a Spooler. Flexible feeders 3001a, 3001b, and 3001c are embodiments of flexible feeder tubes, each of which is angled with respect to the vertical, with a rigid bracket 3002 holding the feeder tubes. A channel 3008 is disposed within the bracket 3006, through which yarn may be supplied to the Spooler wheels 3003 and 3004.

FIG. 30C is another view of the same embodiment of (three) Passive Feeders and a Spooler, showing the channel 3008 through the bracket 3006, through which yarn may be supplied to the Spooler wheels 3003 and 3004. The spooler wheels 3003 and 3004 are geared and grooved to capture the yarn, which is dispensed or retracted by driving the rotary actuator 3005 attached to the wheel 3003.

Gripper-Ledge-Tusk(s)

FIG. 31A is a side profile view of an embodiment of a Gripper-Ledge-Tusk. A motile 'claw' 3101 of the Gripper rotates about a pivot 3102. An actuator 3103 opens and closes that motile claw 3101. A stationary tusk 3104, with a Ledge facing rightwards, (herein called a Ledge-Tusk) is fixed to the rigid bracket 3105. A socket 3106 connects the bracket 3105 to other parts of the SAM apparatus. The Gripper is depicted holding a Pin 3107. The overall infiltrator limb is denoted by reference numeral 3108.

FIG. 31B is another view of the same embodiment of a two Gripper-Ledge-Tusks. In this view, two Gripper-Ledge-Tusks are depicted, the tusks being the mirror images of each other. FIG. 31C is yet another view of the same embodiment of a two Gripper-Ledge-Tusks. In this view, the motile claw of the right Gripper-Ledge-Tusk is made invisible, revealing a cavity 3109 that fits the head of the held Pin 3107.

Tanglehead

FIG. 32A is a side profile view of an embodiment of a Tanglehead corresponding to FIG. 28. 3201 is the rigid Tanglehead Frame. Attached to the Tanglehead Frame 3201 is a Passive Feeder-Spooler 3202 (as introduced in FIG. 30A-E). Also attached to the Tanglehead Frame 3201 are two Gripper-Ledge-Tusks 3203 (as introduced in FIG. 31A-D). Also attached to the Tanglehead Frame 3201 is an Infiltrator Limb 3204 (as introduced in FIG. 29A-D). The Infiltrator Limb 3204 can translate horizontally relative to the Tanglehead Frame 3201, via a pulley system driven by a horizontal-axis actuator 3205. The Tanglehead Frame and attached components rotate about a pivot 3206 as driven by a rotary actuator 3207.

FIG. 32B is another view of the same embodiment of a Tanglehead corresponding to FIG. 28. Three Spoolers 3202a, 3202b and 3202c are depicted attached to the Tanglehead Frame 3201. The pulley system is visible: note one driven end 3205a and one idle end 3205b of the pulley system driven by the horizontal-axis actuator 3205. The Infiltrator Limb Frame 3204 slides along rails 3205c as driven by the pulley system. The pulley belts are not depicted in FIG. 32B.

FIG. 32C is yet another view of the same embodiment of a Tanglehead corresponding to FIG. 28. Two Gripper-Ledge-Tusks 3203a and 3203b are visible, with the tusk 3203b holding a Pin 3207. The three Spoolers feed three Feeder Tubes, which are attached to a single modular bracket 3202 that is attached to one Spooler. The Spoolers and Feeder Tubes are modular—one or more modules may be attached to a Tanglehead Frame.

FIG. 32D is still another view of the same embodiment of a Tanglehead corresponding to FIG. 28. This figure shows the horizontal-axis actuator 3205 (in wire-frame relief) which drives the pulley belt 3205d that is also attached to the idle pulley end 3205b. The pulley system moves the Infiltrator Limb 3204 that slides along the rails 3205c.

Build Frame

FIG. 33A is a side profile view of an embodiment of a Build Frame with attached components corresponding to FIG. 28. Reference numeral 3301 denotes the structure of the Build Frame. As shown in FIG. 33A, the build frame 3301 includes a Tanglehead 3302 (as introduced in FIG. 32A-E). An x-axis actuator 3303a is attached to one end of a 'pillow ground platform,' with the other end of the pillow ground platform denoted by reference numeral 3303b. The pillow ground platform includes truss structure 3303. The 'z-axis actuator' 3304a raises and lowers the pillow ground platform structure 3303c, which slides along the vertical rails 3304b.

FIG. 33B is another view of the same embodiment of a Build Frame with attached components corresponding to FIG. 28. Visible is the driven end of the pillow ground platform 3303a and the idle end of the pillow ground platform 3303b. The ends of the pillow ground platform 3303a and 3303b are rollers that form part of a conveyor belt system. The wide belt that wraps around the two rollers 3303a and 3303b is not shown here. The z-axis actuator 3304a raises and lowers the pillow ground platform structure 3303c, which slides along the vertical rails 3304b. 3305a is a 'y-axis actuator' that drives a pulley system that moves the Tanglehead 3302, which slides along the horizontal rails 3305b.

FIG. 33C is yet another view of the same embodiment of a Build Frame with attached components corresponding to FIG. 28. Attached to the Build Frame 3301 is a y-axis actuator 3305a that drives a pulley belt 3305c that moves the Tanglehead 3302, which slides along the horizontal rails 3305b. An x-axis actuator 3303a is attached to the driven end of the pillow ground platform. The idle end of the pillow ground platform is denoted by reference numeral 3303b. Rollers 3303a (active roller driven by a motor) and 3303b (idle roller) are attached to the ends of the pillow ground platform structure 3303c, with the rollers 3303a and 3303b forming part of a conveyor belt system. Reference numeral 3307 denotes a wide fabric conveyor belt that wraps around the two rollers 3303a and 3303b. A foam piece 3308 functions as the pillow ground, resting on top of the conveyor belt 3307. The yarn source is denoted by reference numeral 3306.

FIG. 33D is still another view of the same embodiment of a Build Frame with attached components corresponding to FIG. 28. Attached to the Build Frame 3301 is a z-axis actuator 3304a that drives a vertical pulley belt 3304c. The pillow ground platform structure 3303c is attached via a bracket 3303d to the vertical pulley belt 3304c. The pillow ground platform structure 3303c slides along the vertical rails 3304b. A foam piece 3308 rests on the x-axis conveyor belt 3307 of the pillow ground platform.

Additional Embodiment

FIG. 34A provides a view of an embodiment of a Tanglehead as a variation of the embodiment depicted in FIG. 32A-D. In FIG. 34A, the depicted Tanglehead embodiment expresses two articulated limbs, Articulated Limb I 3401 and Articulated Limb II 3402. Reference numeral 3403 denotes a sensor (e.g. camera, depth sensor, ultrasonic sensor) attached to and moving with part of the articulated limbs. Reference numerals 3404a and 3404b denote end effectors (which may each be a latch hook, a tapered tusk, a yarn feeder, a sensor, or other implement) at the tip of the articulated limbs 3401 and 3402. Reference numeral 3405 denotes an actuator that rotates part of the articulated limb structure.

FIG. 34A also depicts a feed tube 3406 attached to the tip of one of the articulating limbs 3402. A length of working yarn 3407 dispenses from the feed tube 3406 and may be arranged by the latch hook or other material-arranging implement of the end effector 3404a. The input material 3408 is further connected to and dispensed from the material source (not depicted). The articulating limbs are attached to the Tanglehead frame 3409. Reference numeral 3410 denotes an actuator for a pulley belt system 3411 that may move the articulating arms relative to the Tanglehead frame 3409. In further embodiments, two or more articulating arms may be included, each with feed tubes, latch hooks, tapered tusks, and/or other implements.

FIG. 34B provides a view of an embodiment of a Tanglehead as a variation of the embodiment depicted in FIG. 34A. FIG. 34B depicts one articulating limb 3401 and part of the Tanglehead frame 3409. FIG. 34B also depicts a rod structure 3412 attached to the frame 3409. Attached to the rod 3412 is an exemplary ledge tusk 3413 with a concave foot structure to help press on and hold in place works in-progress. The concave foot structure may be rubberized, possess tapered tips, or have other means of securing the work in-progress. Reference numeral 3414 denotes a pillar structure that may present markings to assist computer vision and computer-aided control of the apparatus. The pillar structure 3414 may also house a stapling apparatus that dispenses work-anchoring elements e.g. as depicted in FIG. 21C-F. The pillar structure 3414 may also house an active gripper apparatus as depicted in FIG. 26A-B, or a passive gripper that is not actuated. A passive gripper may transport an element e.g. a pin work-anchoring apparatus by pressing onto the element so that the element catches in a notch or other receptacle. The element may be released from the gripper at its destination with a jerking movement, assistance from an articulating limb, or greater adhesion of the element to the destination.

FIG. 35A depicts a latch hook apparatus with a hook element 3501 and a sliding latch element 3502 in a closed configuration. FIG. 35B depicts the same latch hook apparatus with the sliding latch 3503 in an open configuration. The sliding latch may be controlled by a solenoid, screw motor, pulley, piezoelectric or other actuators. The sliding latch has a slimmer movement profile than the flipping latch depicted in FIG. 17C.

Two or more input material strands may be intertwined to construct a product of manufacture. FIG. 36A depicts an exemplary first step of arranging two input material sources into a desired 3D structure. Reference numeral 3601*a* denotes a first loop or subunit of a first input material. Reference numeral 3602 denotes a further length of the first input material. Reference numeral 3603 denotes a length of a second input material. The next step of this exemplary intertwining material arrangement is to traverse a section of the first material 3602 through the loop 3601*a* along the denoted path 3604.

FIG. 36B depicts the result of said traversal. A second subunit 3601*b* of the first material has been formed, interlinked to the first subunit 3601*a* of the first material. The next step of this exemplary method is to traverse a section of the second input material 3603 through the loop 3601*b* of the first material along the denoted path 3605.

FIG. 36C depicts the result of said traversal. A first subunit 3606*a* of the second material has been formed, interlinked to the second subunit 3601*b* of the first material. The next step of this exemplary method is to traverse a section of the first input material 3602 through the loops 3606*a* and 3601*b* of both materials along the denoted path 3607.

FIG. 36D depicts the result of said traversal. A third subunit 3601*c* of the first material has been formed, interlinked to previous subunits 3601*b* and 3606*a* of both input materials. The next step of this exemplary method is to traverse a section of the second input material 3603 through the loop 3601*c* of the first material along the denoted path 3608.

FIG. 36E depicts the result of said traversal. A second subunit 3606*b* of the second material has been formed, interlinked to both previous subunits 3601*b* and 3601*c*. The exemplary process repeats, with the first input material traversed through the denoted path 3609 producing a progression similar to that depicted in FIG. 36C-D.

The process described in FIG. 36A-E may be combined with previously introduced or other methods of constructing a desired 3D structure, may be varied in sequence of operation, the selection of, and the number of traversed previously formed subunits, for each intertwining input material.

The different intertwining input materials may be of different compositions, cross-section/gauge, tensile strength, or other physical properties. One of the intertwining inputs may be used as reinforcement for the overall structure, or as a support structure to assist manufacture of complex shapes—the support material being removed by unraveling, dissolving, or etching of the material. Two or more intertwining input materials may be arranged by two or more articulating limbs with feed tubes or other arranging implements.

Further Feeder-Device Receiver-Device Systems

FIG. 37A depicts a simple schematic of a feeder apparatus with a cable extendable tube-ring tip. In this example embodiment, the components that implement the Feeder Positioning function 1102 are shown in a kinematic chain diagram comprising: a slider 3701 that moves along an axis 3702, a rotational joint 3703 attached to the previous slider 3701, another rotational joint 3704 attached to the previous joint 3703, yet another rotational joint 3705 attached to the previous joint 3704, and an end effector 3706 i.e. the Feeder attached to the previous joint 3705. This kinematic chain may be attached to another kinematic chain, and is an example embodiment of the various arrangements and types of actuators (including servo, stepper and dc motors, linear actuators, tendon, flexible limbs, artificial muscle systems etc.) that may be implemented.

FIG. 37A also depicts as attached to joint 3705, a feeder device 3706, through which passes an extendable tip 3707. The extendable tip 3707 is shaped like a small tube, through which the working input material 3709 passes through, forming an exit length of material 3710. A cable or draw wire 3708 passes through the Feeder 3706 and is attached to the tube tip 3707, enabling extension and retraction of the tube tip 3707 by pulling or releasing the cable 3708.

FIG. 37B depicts a simple schematic of the feeder apparatus in FIG. 37A, with the tube tip in an extended position. The cable 3708 has been loosened, and the tube tip 3707 extends away from the feeder 3706. Note that the input material still passes through both the tube tip 3707 and the feeder tube 3706.

FIG. 38 depicts a simple schematic of a feeder apparatus with a receptacle. In this example embodiment, the components that implement the Feeder Positioning function 1102 are shown in a kinematic chain diagram comprising: a slider 3801 that moves along an axis 3802, a rotational joint 3803 attached to the previous slider 3801, another rotational joint 3804 attached to the previous joint 3803, yet another rotational joint 3805 attached to the previous joint 3804, and an end effector 3806 i.e. the Feeder attached to the previous joint 3805. This kinematic chain may be attached to another kinematic chain and is an example embodiment of the various arrangements and types of actuators that may be implemented.

FIG. 38 also depicts attached to joint 3805, a receptacle 3806 for mating with another device such as a receiver device. A side opening 3807 in the receptacle guides the input material 3808 through the front of the feeder and the receptacle 3806. The receptacle 3806 may have attractive or repulsive coupling to the mating device, e.g. by means of a permanent magnet, a solenoid or other coupling device. The receptacle 3806 may also rotate (freely or motor-controlled) about its link to the joint 3805, to reposition the receptacle 3806 and/or the filament exit 3807. The receptacle 3806 may also extend and retract (via a linear actuator, solenoid, screw motor, etc.) forwards and backwards.

Figure 39:
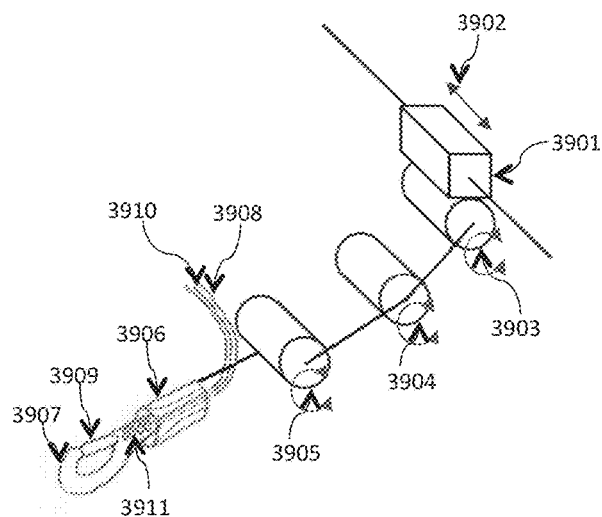
FIG. 39 depicts an embodiment of a receiver device with a cable-extendable hook end.

FIG. 39 depicts a simple schematic of a receiver apparatus with a cable-extendable hook tip. In this example embodiment, the components that implement the Receiver Positioning function 1104 are shown in a kinematic chain diagram comprising: a slider 3901 that moves along an axis 3902, a rotational joint 3903 attached to the previous slider 3901, another rotational joint 3904 attached to the previous joint 3903, yet another rotational joint 3905 attached to the previous joint 3904, and an end effector 3906 i.e. the Feeder attached to the previous joint 3905. This kinematic chain may be attached to another kinematic chain and is an example embodiment of the various arrangements and types of actuators that may be implemented.

FIG. 39 also depicts attached to joint 3905, an extendable latch hook apparatus comprising a hook end 3907 and a latch element 3909. The latch hook apparatus is stabilized by a collar 3906, through which a cable 3908 passes through. The cable 3908 is attached to the hook element 3907, allowing extension and retraction of the latch hook apparatus. The latch element 3909 is attached to a Bowden cable 3910 running through the outer cable 3908, the Bowden cable enabling extension and retraction of the latch element 3909, effecting opening and closing of the latch hook, facilitated by a spring element 3911 that closes the latch by default.

Figure 40:
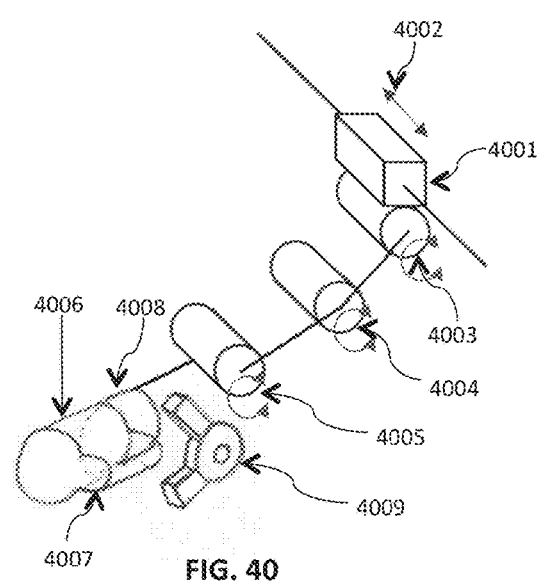
FIG. 40 depicts an embodiment of a receiver device with a receptacle.

FIG. 40 depicts a simple schematic of a receiver apparatus with a receptacle and mini gripper. In this example embodiment, the components that implement the Receiver Positioning function 1104 are shown in a kinematic chain diagram comprising: a slider 4001 that moves along an axis 4002, a rotational joint 4003 attached to the previous slider 4001, another rotational joint 4004 attached to the previous joint 4003, yet another rotational joint 4005 attached to the previous joint 4004, and an end effector 4006 i.e. the Feeder attached to the previous joint 4005. This kinematic chain may be attached to another kinematic chain and is an example embodiment of the various arrangements and types of actuators that may be implemented.

FIG. 40 also depicts as attached to joint 4005, a receptacle 4006 for mating with another device such as a feeder device. A channel 4007 on one side of the receptacle 4006 aids in positioning the input material during mating with a feeder device. The receptacle 4006 may have attractive or repulsive coupling to the mating device, e.g. by means of a permanent magnet, a solenoid or other coupling device, denoted by reference numeral 4008. A mini gripper 4009 is also attached to joint 4005 and positioned over the opening of the channel 4007 to selectively retain input material provided by a mating feeder device.

Figure 41:
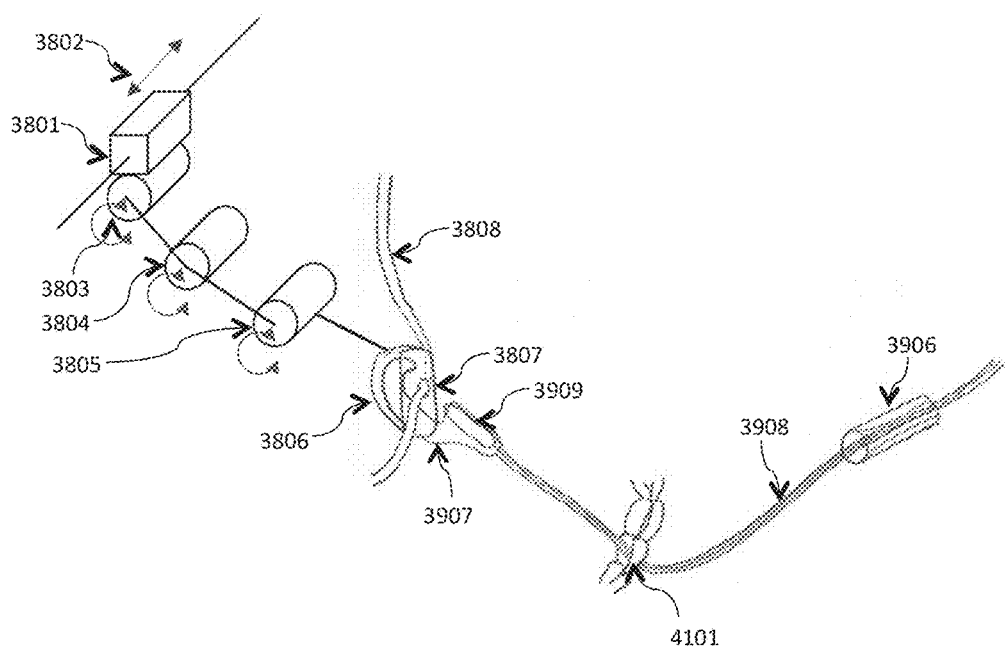
FIG. 41 depicts an embodiment of a portion of a receiver device within a feeder device receptacle.

FIG. 41 depicts an embodiment of a portion of a receiver device within a feeder device receptacle. In this example operation, the feeder device with receptacle from FIG. 38 and the receiver device with extendable tip from FIG. 39 are depicted. The latch hook apparatus 3907 has traversed through target loop 4101 and is extended from the receiver collar 3906 via extension of the receiver cable 3908. The latch element 3909 is depicted in the open position via e.g. drawstring action. The hook apparatus 3907 is depicted as mated into the feeder receptacle 3806. The hook apparatus 3907 may be attracted into and coupled with feeder receptacle 3806 via magnetic or other coupling forces. Note that the input material 3808 feeding through the opening 3807 is disposed such that as the receiver device 3907 enters and exits the receptacle 3806, the input material 3808 is retained by the receiver device 3907. The next step in this example operation is to close the latch element 3909 via e.g. drawstring action, and to retract the receiver apparatus 3907 by retracting the cable 3908 back towards the collar 3906, with the input material retained by the receiver device.

Figure 42:
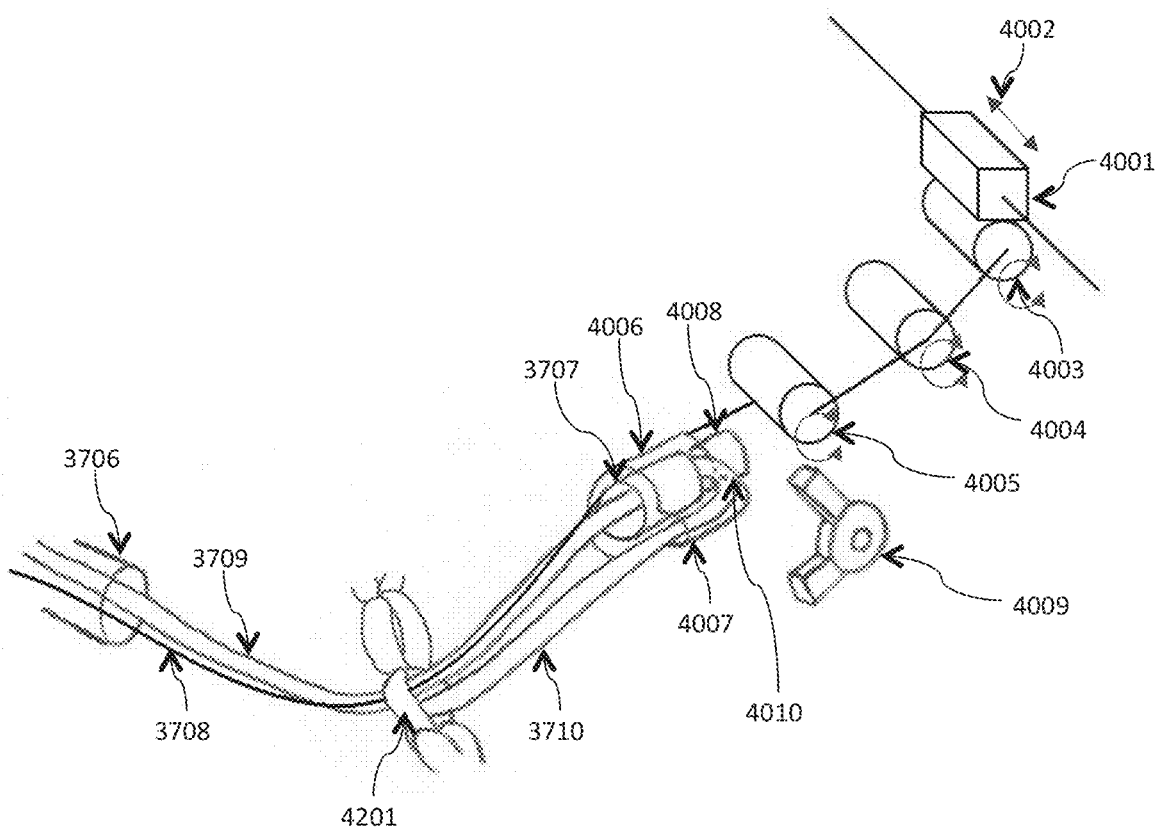
FIG. 42 depicts an embodiment of a portion of a feeder device within a receiver device receptacle.

FIG. 42 depicts an embodiment of a portion of a feeder device within a receiver device receptacle. In this example operation, the feeder device with extendable tip from FIG. 37 and the receiver device with receptacle from FIG. 40 are depicted. The extendable feeder tip 3707 has traversed through target loop 4201 and is extended from the feeder tube 3706 via extension of the feeder cable 3708. Note that the input material 3709 remains threaded through the feeder tube 3706 and the extendable tip 3707 and is attached to the work-in-progress via segment 3710. The feeder tip 3707 is also depicted as mated into the receiver receptacle 4006. The feeder tip 3707 may be attracted into and coupled with receiver receptacle 4006 via a magnetic or other coupling device 4008. Note that the input material 3709 threaded through the feeder tip 3707 is funneled to one side via the receptacle channel 4007. The mini gripper 4009 (shown displaced from the joint 4005 for visual clarity) can close to grip onto a section of the input material 4010 positioned by the mating. The next step in this example operation is to close the mini gripper 4009 and to retract the feeder tip 3707 by retracting the cable 3708 back towards the feeder 3706, with the input material retained by the receiver device gripper 4009.

The discussed embodiments of feeder, receiver and other devices may be combined and/or modified in various ensembles e.g. only the feeder, only the receiver, or both devices may have receptacles, mini grippers, mechanical extension/retraction, extendable cabling, etc.

Further Subunit Types and Interlinking Patterns

The subunits (stitches) in a SAM object are interlinked with other subunits within the object, providing shape, and physical cohesion. In FIG. 3A, each subunit 302 and 303 have yarn-wise links and loop-wise links to the immediately-preceding subunit 301 and 302, respectively. Here a yarn-wise link between subunit 'A' and subunit 'B' means tracing the yarn of one subunit 'A' directly leads to the yarn of the next subunit 'B' (or vice versa); a loop-wise link between subunit 'A' and subunit 'B' means the loop of yarn 'A' traverses through a loop of yarn 'B' (or vice versa), but tracing the yarn from subunit A does not necessarily lead to the yarn in subunit B (or vice versa). FIG. 3A also depicts only one active or free-standing loop 310. Further variations of subunit types and interlink patterns are possible with SAM.

Figure 43:
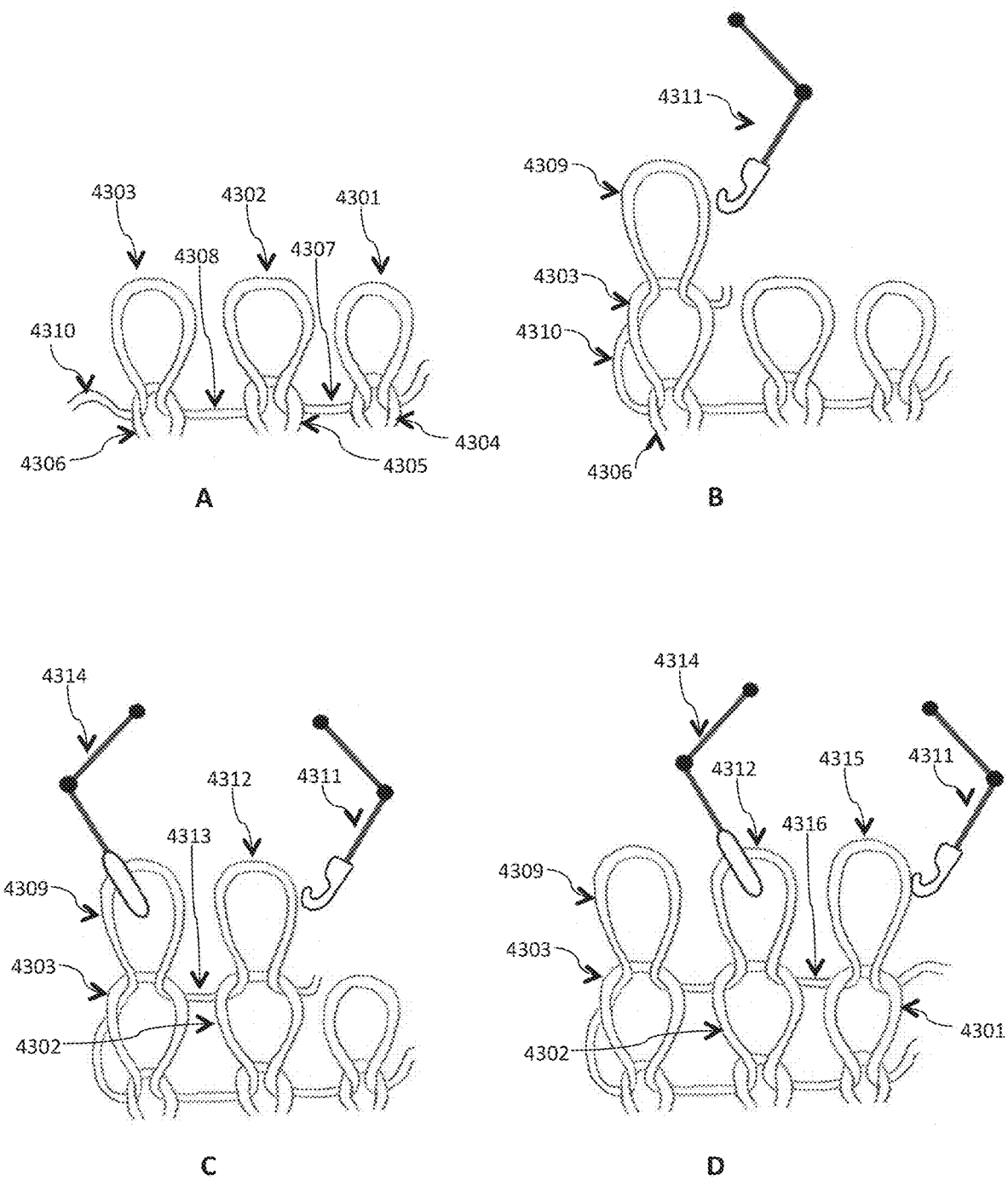
FIG. 43A-D depicts a 3D structure comprising interlinked subunits in stages of manufacture.

FIG. 43A depicts a 3D structure comprising interlinked subunits in a stage of manufacture. Note that there are three active or free-standing loops 4301, 4302 and 4303. The interlink patterns are also configured such that there is a yarn-wise link between sequentially adjacent subunits: yarn-wise link 4307 between subunits 4301 and 4302, and yarn-wise link 4308 between subunits 4302 and 4303. However, the sequential subunits 4301, 4302 and 4303 are not loop-wise interlinked with each other, but with are loop-wise linked with subunits on a previous row: 4304, 4305 and 4306, respectively. A free end of input material 4310 is also depicted.

FIG. 43B depicts a 3D structure comprising interlinked subunits in another stage of manufacture. A new loop subunit 4309 has been drawn through the previous loop subunit 4303 using the previously free input material 4310 via an example hook apparatus 4311. In this case, the new loop 4309 is both yarn-wise and loop-wise connected to its preceding loop 4303.

FIG. 43C depicts a 3D structure comprising interlinked subunits in another stage of manufacture. Another new loop subunit 4312 has been drawn through a previous loop subunit 4302 via an example hook apparatus 4311. Note that this new loop 4312 is yarn-wise linked 4313 to the immediately preceding loop 4309, but loop-wise linked to an arbitrary loop 4302 on a previous row. Since the preceding loop 4309 is free-standing while the input material is being pulled to form the new loop 4312, a manipulation device 4314 e.g. a blunt tusk, may be applied into the loop 4309, to stabilize or prevent the previous loop 4309 from constricting or collapsing, while the input material is being pulled. In this manner, any number of free-standing loops may be arranged in arbitrary positions within the 3D structure, to be interlinked with arbitrary other loops to create complex 3D structures via SAM.

FIG. 43D depicts a 3D structure comprising interlinked subunits in another stage of manufacture. Yet another new loop subunit 4315 has been drawn through a previous loop subunit 4301 via an example hook apparatus 4311. Note that this new loop 4315 is yarn-wise linked 4316 to the immediately preceding loop 4312, but loop-wise linked to an arbitrary loop 4301 on a previous row. Since the preceding loop 4312 is free-standing while the input material is being pulled to form the new loop 4315, a manipulation device 4314 e.g. a blunt tusk, may be applied into the loop 4312, to stabilize or prevent the previous loop 4312 from constricting or collapsing, while the input material is being pulled. Note that the manipulation device 4312 stabilizes the free-standing loop 4312, which prevents the input material from also pulling on the preceding free-standing loop 4309. Thus, the manipulation device 4312 stabilization at one position arrests free-standing loop collapse in all preceding yarn-wise connected subunits.

Figure 44:
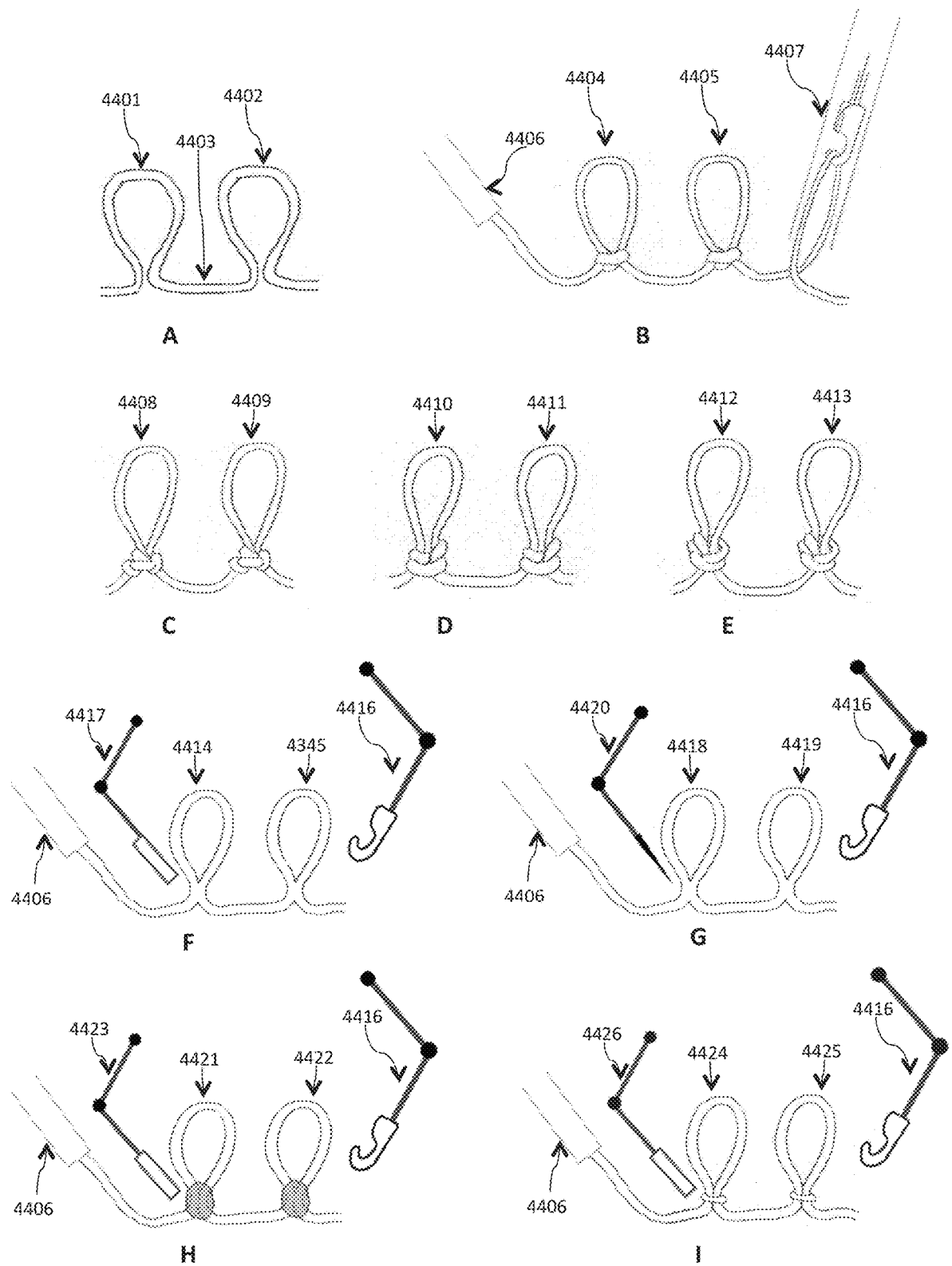
FIG. 44A-I depicts embodiments of repeating subunits and apparatuses for producing the same.

FIG. 44A depicts an embodiment of repeating subunits. Simple loops 4401 and 4402 are depicted, being yarn-wise connected via segment 4403. Simple loops 4401 and 4402 are free-standing and will typically collapse if the connected input material is pulled.

FIG. 44B depicts another embodiment of repeating subunits. The depicted subunit types are slipknots 4404 and 4405. Also depicted is a feeder device 4406 and a knotting device 4407, to produce the repeating subunits. The free-standing slipknot subunits can be more resistant to collapsing if the connected input material is pulled during 3D structure manufacture. FIG. 44B also depicts how free-standing loops e.g. 4404, 4405, of different types can be pre-arranged on a length of input material, before said loops are incorporated into a 3D structure. The position of the loops on the input filament, the distance between the loops e.g. between 4404 and 4405, and other configuration of the pre-arranged subunits can be predicted based on the structure and sub-unit layout of the desired 3D structure.

FIG. 44C depicts another embodiment of repeating subunits. The depicted subunit types are artillery loops 4408 and 4409. The free-standing artillery loop subunits do not collapse if the connected input material is pulled during 3D structure manufacture.

FIG. 44D depicts another embodiment of repeating subunits. The depicted subunit types are butterfly loops 4410 and 4411. The free-standing butterfly loop subunits do not collapse if the connected input material is pulled during 3D structure manufacture.

FIG. 44E depicts another embodiment of repeating subunits. The depicted subunit types are overhand loops 4412 and 4413. The free-standing overhand loop subunits do not collapse if the connected input material is pulled during 3D structure manufacture.

FIG. 44F depicts another embodiment of repeating subunits. The depicted subunit types are loops 4414 and 4415 with material fused together at the base. Also depicted is a feeder device 4406, a material arrangement device 4416, and a melting device 4417 e.g. a convection, radiative or laser heater, an ultrasonic or radiofrequency device or other means to melt and fuse the input material. The free-standing fused-loop subunits do not collapse if the connected input material is pulled during 3D structure manufacture.

FIG. 44G depicts another embodiment of repeating subunits. The depicted subunit types are loops 4418 and 4419 with material fused together at the base. Also depicted is a feeder device 4406, a material arrangement device 4416, and a needle felting device 4420 to entangle together fibers of the input material at the base of the loops. The free-standing fused-loop subunits do not collapse if the connected input material is pulled during 3D structure manufacture.

FIG. 44H depicts another embodiment of repeating subunits. The depicted subunit types are loops 4421 and 4422 with material cemented together at the base. Also depicted is a feeder device 4406, a material arrangement device 4416, and a cement dispenser device 4423 to dispense a cement or adhesive to bond together material at the base of the loops. The free-standing cemented-loop subunits do not collapse if the connected input material is pulled during 3D structure manufacture.

FIG. 44I depicts another embodiment of repeating subunits. The depicted subunit types are loops 4424 and 4425 with material tied together at the base. Also depicted is a feeder device 4406, a material arrangement device 4416, and a fastening device to tie together input material at the base of the loops. The free-standing tied-loop subunits do not collapse if the connected input material is pulled during 3D structure manufacture.

Yarn-Like Input Materials and Pre-and-Post Manufacturing Processes

Stitch Additive Manufacturing (SAM) can produce arbitrary 3D structures using yarn-like build material of many different embodiments. Non-limiting examples are here discussed. Some embodiments of a yarn-like build material may comprise one or more plies of natural fiber (e.g. cotton, wool, or silk), synthetic fibers (e.g. nylon, polyester or acrylic), metal fibers or wires (e.g. steel wool, copper wire), ceramic or mineral fibers (e.g. aluminum silicate or polycrystalline wool) or any other filament-format material (e.g. carbon fiber, carbon nanotube fiber, silicone, rubber) or any blend of different fibers and/or plies—resulting in products of manufacture with different physical qualities.

Other embodiments of a yarn-like build material may comprise one or more electrically conductive plies of e.g. metal wires, conductive polymers or carbon nanotube fibers, or blends of conductive material and other structural materials. Moreover, the yarn-like build material may comprise one or more plies of edible ingredients in filament format e.g. wheat, rice, buckwheat, or other foods commonly or uncommonly formed into strands. Food ingredients not commonly in filament- or yarn-like format may be processed into a yarn-like format by e.g. pulverizing the ingredient and introducing a binding agent e.g. gluten or other protein, and extruding into a filament-like format suitable for SAM. In other embodiments, food ingredients not commonly in filament- or yarn-like format may also be processed into a yarn-like format by e.g. encasing the ingredient in long, thin, and hollow tubes of cellulose or other edible casing. In other embodiments, food ingredients not commonly in filament- or yarn-like format may also be processed into a yarn-like format by e.g. dispersing the ingredient (pulverized, granulated or otherwise dispersible) into strands of edible material e.g. wheat, rice, collagen, or cellulose.

Still other embodiments of a yarn-like build material may comprise one or more plies of biocompatible materials (e.g. biocompatible nylon, hydroxyapatite, collagen, polylactic acid (PLA), or polyethylene terephthalate (PETE)) suitable for interaction with or situation in human or other biological bodies.

A SAM product of manufacture may incorporate one or more different types of yarn-like material, each with different physical, electrical, or other properties as desired in the final 3D structure. The different types of yarn-like material may be incorporated into the final 3D structure as a blend of different yarns in alternating, interleaving or mixed stitches, or as a stitch pattern having specifically designed traces for yarns of different materials, to combine or synergize different qualities e.g. color, texture, electrical conductivity, thermal insulation, pliability and/or breathability. The different types of yarn-like material may also be incorporated into the final 3D structure such as to form functional sub-components e.g. electrically or thermally conductive traces, shells, hulls, wiring pads, sockets, handles, or other specialized or separate sub-components.

Yarn-like build materials and the utilizing SAM apparatuses may be scaled very small, very large, or to any physically feasible size-yarn-like material of any scale that is or can be temporarily made sufficiently flexible and with sufficient tensile integrity to be formed into stitch-like structures may be utilized in an appropriately scaled SAM system Pre-Processing FIG. 45 is a simple diagram depicting how yarn-like materials may be pre-processed as it enters a SAM apparatus. As yarn is drawn from the Yarn Source 1001, the yarn may pass through a Pre-Treatment component 4501 (e.g. a pre-treatment chamber) that selectively pre-processes each incremental section of Treated Working Yarn 4502, that is then drawn into the other components of the SAM Apparatus 4503. One example of pre-processing is dynamic coloring of the yarn-like material. A Pre-Treatment 4501 chamber with one or more nozzles that dispense ink or other coloring agents can selectively color each section of yarn that is then drawn into a spooler or other parts of a SAM apparatus 4503. This dynamic coloring may also be used to mark lengths of yarn for fiducial tracking or other purposes.

In other embodiments, yarn-like material pre-processing (e.g. by passing the yarn drawn from the yarn source into a pre-treatment chamber before the yarn is drawn into a spooler or other parts of a SAM apparatus) may be used to modify other properties of selected sections of yarn, e.g. application or coating of electrically, thermally or magnetically conductive or insulating or biocompatible material to selected sections of yarn, or application of hardening or softening agents to selected sections of yarn.

In still other embodiments, yarn-like material Pre-Treatment 4501 may involve temporarily softening or increasing the pliability and/or flexibility of a length of working yarn by e.g. local heating or application of softening agents as the yarn passes through a pre-treatment component, chamber or nozzle, to increase the workability of the yarn for SAM processes e.g. pull-through and stitch formation.

Post-Processing

FIG. 45 also depicts how a Product of Manufacture 1009 constructed of the Treated Working Yarn 4502 (or untreated working yarn) may be post-processed after exiting a SAM apparatus. In some embodiments, Post-Treatment 4504 may involve local (on select parts of the finished product) or global (on the whole finished product) application of agents or materials that alter the color (e.g. inks, dyes), electrical (e.g. carbon-nanotube impregnation), strength (e.g. resin or epoxy) or other physical qualities of the Product of Manufacture 1009.

In other embodiments, Post-Treatment 4504 may involve using the SAM Product of Manufacture 1009 as a preform in a 3D composite, matrix composite or hybrid composite product. A Product of Manufacture 1009 may be constructed of interlinked yarns of various materials (e.g. thermoplastics, thermosets, metals, ceramic or mineral wools) and serve as a preform structure into which resin, epoxy, polymers, fiberglass, metals or other matrix materials may be introduced, resulting in a final product with select physical qualities.

In yet other embodiments, Post-Treatment 4504 may involve curing, annealing, or exposing the Product of Manufacture 1009 to modifying agents. The Product of Manufacture may be constructed of yarn-like material with an initial set of physical qualities e.g. flexibility, softness, color, transparency, porosity, conductivity, or other property. Local (on select parts of the finished product) or global (on the whole finished product) curing or annealing via e.g. ultraviolet (UV) or other wavelength range of light exposure, heating, chemical (e.g. HF, or other etchants) exposure, plasma exposure, ultrasound or other treatment, may be used to alter the physical qualities of the Product of Manufacture 1009. Post-treatment, the Product of Manufacture may exhibit a different set of local or global physical qualities e.g. increased or reduced flexibility, strength, toughness, changed color, opaqueness, porosity, conductivity, or other property.

In other embodiments, Post-Treatment 4504 may involve locally or globally altering the structure or surface finish of the Product of Manufacture 1009. The structure of a Product of Manufacture may be modified by fusing sections of the yarn-like build material together by application of heat above the melting point of the yarn-like material, application of a dissolvent e.g. isopropanol or acetone, or specific radiation e.g. UV or other wavelength or ultrasound, optionally coupled with physical manipulation e.g. locally compressing, brushing, shearing or polishing. The surface finish of a Product of Manufacture may be modified by 'smoothening out' the stitch structures via e.g. application of heat above the melting point of the yarn-like material, application of a dissolvent e.g. isopropanol or acetone, or specific radiation e.g. UV or other wavelength or ultrasound, optionally coupled with physical manipulation e.g. locally compressing, brushing, shearing or polishing.

In other embodiments, Post-Treatment 4504 may involve disinfection, pasteurization, or sterilization of the Product of Manufacture 1009, by application of high heat, suitable chemicals, irradiation, or high pressure to eliminate or deactivate lifeforms or biological agents on or within the Product of Manufacture.

In other embodiments, Post-Treatment 4504 may involve locally or globally coating the Product of Manufacture 1009 with one or more layers of one or more different materials. In some embodiments, the different coating materials may be materials not suited for full SAM manufacture but desirable in the 3D formats generated by SAM, such as brittle or inflexible materials (ceramic, metals, various plastics) or costly or precious materials (gold, silver, platinum). In other embodiments, the different coating materials may be used to alter the surface properties of the Product of Manufacture, e.g. imparting biocompatibility or enhanced bonding with other materials e.g. priming for metal coating or crystalline growth or deposition. In other embodiments, the different coating materials may be used in functional multi-layer configurations, such as reflective or anti-reflective coatings, thermal, electrical, and/or magnetic insulation, or other functional multi-layer structures.

Pre-processing and post-processing processes are discussed as distinct functions for clarity. These functions may be more closely incorporated or integrated as components into a SAM apparatus. A SAM Product of Manufacture may be the final product or may be used as input or tooling or support for other fabrication or manufacturing processes.

Hybridizations and Extensions of Stitch Additive Manufacturing

Stitch Additive Manufacturing (SAM) may be combined with other manufacturing or manipulation technologies. FIG. 46A is a simplified diagram depicting one embodiment of a Hybrid Stitch Additive Manufacturing (H-SAM) system combining SAM and Fused Deposition Modeling (FDM). A general build frame 4601 includes X-, Y- and Z-actuators for positioning various end effectors. Tanglehead end effector 4602 is also included, as is FDM end effector 4603, such as a heated printer nozzle. The Tanglehead 4602 and the FDM nozzle 4603 can move independently or semi-independently in this H-SAM embodiment. The Tanglehead 4602 and the FDM nozzle 4603 can be used to concurrently or sequentially form parts of a Product of Manufacture that combines 3D structured yarn stitches of various materials, with fused filaments of various materials (e.g. PLA, ABS, TPU). 3D structured yarn stitches formed by the Tanglehead 4602 may be used as the base for fused filament structures formed by the FDM nozzle 4603, or fused filament structures formed by the FDM nozzle 4603 can have arcs, slots or rings through which to anchor 3D structured yarn stitches formed by the Tanglehead 4602.

FIG. 46B is a simplified diagram depicting another embodiment of a H-SAM system combining SAM and FDM, including general build frame 4601 with X-, Y- and Z-actuators for positioning various end effectors. A Tanglehead 4602 end effector for SAM, as well as an FDM end effector 4603, such as a heated printer nozzle, are both attached to a sub-frame 4604 actuated in the X-, Y- and Z-directions. The Tanglehead 4602 and the FDM nozzle 4603 can be used to concurrently or sequentially form parts of a Product of Manufacture that combines 3D structured yarn stitches of various materials, with fused filaments of various materials (e.g. PLA, ABS, TPU) as previously described. In addition, 3D structured yarn stitches formed by the Tanglehead 4602 may be interlaced with fused filament structures formed by the FDM nozzle 4603 e.g. interstitial filling, interspersed small structures e.g. rings, brackets, larger shells, walls, or other combinations of parts.

With reference to FIGS. 46A and 46B, other embodiments of a H-SAM system combining SAM and FDM may utilize the FDM nozzle 4603 to dynamically extrude a filament of various materials, and of various cross-sectional dimensions (e.g. small, medium, large circumference) and shapes (e.g. circular, square, polygonal, star-shaped) that is then used as the yarn-like build material by the SAM end effector 4602 to form stitches in a 3D structure.

FIG. 46C is a simplified diagram illustrating another embodiment of a H-SAM system combining SAM and FDM. In this embodiment, a Feeder dispenses a Filament 4605 (e.g. PLA, ABS, TPU or other flexible blend of heat-fusible materials) that may be selectively melted 4606 by an auxiliary FDM heating element 4607 that may be attached to an independently positioned end effector or limb. A SAM end effector 4608 e.g. an active receiver may be used to independently form stitches using the Filament 4605, producing HSAM structures with both stitched and fused structural elements.

FIG. 46D is a simplified diagram illustrating yet another embodiment of a H-SAM system combining SAM and FDM. In this embodiment, a Feeder dispenses a Filament 4605 (e.g. PLA, ABS, TPU or other flexible blend of materials) that may be selectively melted 4606 by an auxiliary FDM heating element 4607 that is attached to the SAM end effector 4608 e.g. an active receiver. The SAM end effector 4608 may be used to form stitches using the Filament 4605, and the FDM heating element 4607 may be selectively activated to melt, fuse, or smoothen select portions of the stitched structure.

Other embodiments of a H-SAM system may combine SAM and Needle Felting. In one such embodiment similar to FIG. 46D, a felting needle—a mechanically reciprocating needle or passive needle moved by the SAM end effector—may replace FDM heating element 4607 and be attached to the tip of the SAM end effector 4608. The SAM end effector 4608 may be used to form stitches using yarn-like build material, and the Felting Needle may be used to repeatedly puncture the stitch structure to selectively alter the fiber arrangement of the formed stitches, e.g. to increase cohesion, modify the structure or produce a more uniform surface finish. The Felting Needle may be used to repeatedly puncture the stitch structure while forcing in externally applied fibers, to introduce new fibers e.g. different colored or different material fibers into the stitch structure. The Felting Needle may be used to attach or fuse a length of working yarn to various positions on the work in-progress by repeated puncturing and entangling of the fibers, without having to form a stitch.

Other embodiments of a H-SAM system may combine SAM with medical or surgical tools and operations. In one simple embodiment, a SAM or H-SAM system may construct a bio-compatible product of manufacture that is then utilized by an adjacent or co-operational surgical process. In another embodiment, a SAM apparatus may be integrated with a surgical apparatus, such that the resulting H-SAM apparatus has SAM components and/or end effectors (e.g. active feeder, active receiver) and surgical components and/or end effectors (e.g. scalpels, suturing needles, laparoscopes, biopsy needles, laser, ultrasound or thermal delivery systems, or other medical or surgical implements), with an optional pillow ground platform or utilizing the medical or surgery subject as the ground plane. In an example embodiment, a medical H-SAM may be used to construct arbitrary 3D structures (with properties such as flexibility, porosity, permeability) of bio-compatible materials in situ during medical or surgical operations. In another embodiment, a medical H-SAM may be used in conjunction with surgical tools or end effectors to e.g. construct scaffolding or facilitate suturing or other medical procedures.

Further extensions and embodiments of a SAM or H-SAM system may include more than one end effector e.g. multiple SAM active receivers and passive feeders and/or multiple types of end effectors e.g. SAM, FDM, Needle Felting tips and/or surgical implements in one apparatus.

Further extensions and embodiments of a SAM or H-SAM system may mount components or assemblies of components of a SAM system (e.g. an active receiver, an active feeder, an Infiltrator Limb, a Tanglehead) onto other actuating systems such as fixed robot arms or mobile (e.g. wheeled, walking, airborne, aquatic) robots, which may enhance the dexterity, range of motion, working volume, working environment, integration with other manufacturing or operational processes, or other considerations.

Production Line Integrating Stitch Additive Manufacturing

Figure 47:
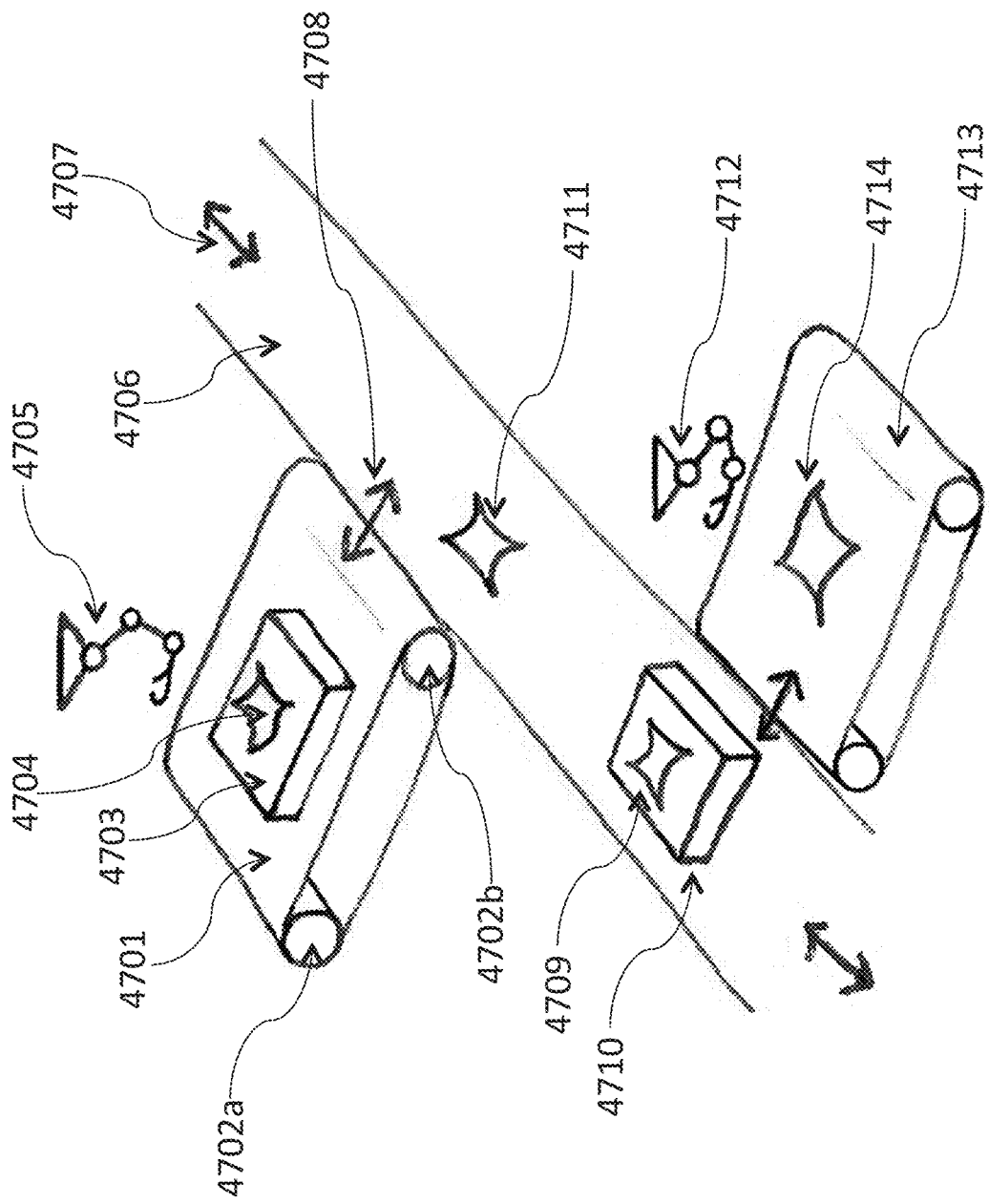
FIG. 47 depicts a diagram of a production line integrating SAM stations, in accordance with an embodiment of the present invention.

SAM systems may be incorporated into a streamlined and automated or semi-automated production line for high-throughput and efficient manufacturing. FIG. 47 is a simple diagram depicting a production line integrating SAM stations. A pillow ground platform 4701 is in the form of a conveyor belt system (ground platform 4701 may be alternatively referred to as conveyer belt system 4701), with two roller ends 4702a and 4702b. The conveyor belt 4701 may be an elastic sheet material or fabric that can be directly used as a pillow ground for SAM processes. Alternatively, a slab of elastic or spongy material 4703 e.g. polyurethane foam or silicone may be used as a platform for the work in-progress 4704, that rests on or is temporarily anchored (via pins, hook-and-loop fasteners, tape, or magnetic or other temporary attachment) to the conveyor ground platform 4701. A first station 4705 for SAM manufacturing processes is disposed adjacent to another 'bus' conveyor system 4706 that can transport objects back-and-forth or in a single direction along a separate path 4707. Completed or partially completed works in-progress may be transferred 4708 to and from the conveyor/pillow ground platform 4701 of the first SAM station 4705 and the 'bus' conveyor 4706, optionally with assistance from actuators at the respective manufacturing stations. The transfer may transport a work 4709 that is still resting or anchored on a support slab 4710 or may transport isolated works 4711 in various stages of manufacture. The bus conveyor 4706 can then be used to transport the works to other manufacturing, treatment or finishing stations, optionally with assistance from actuators at the respective manufacturing stations. A second SAM station 4712 with a second conveyor belt pillow ground platform 4713 is connected to the bus conveyor 4706, that can send and receive works to and from other manufacturing stations including the first SAM station 4705. Reference numeral 4714 denotes an example of a work in-progress that uses the elastic conveyor belt 4713 as the pillow ground platform.

Figure 48:
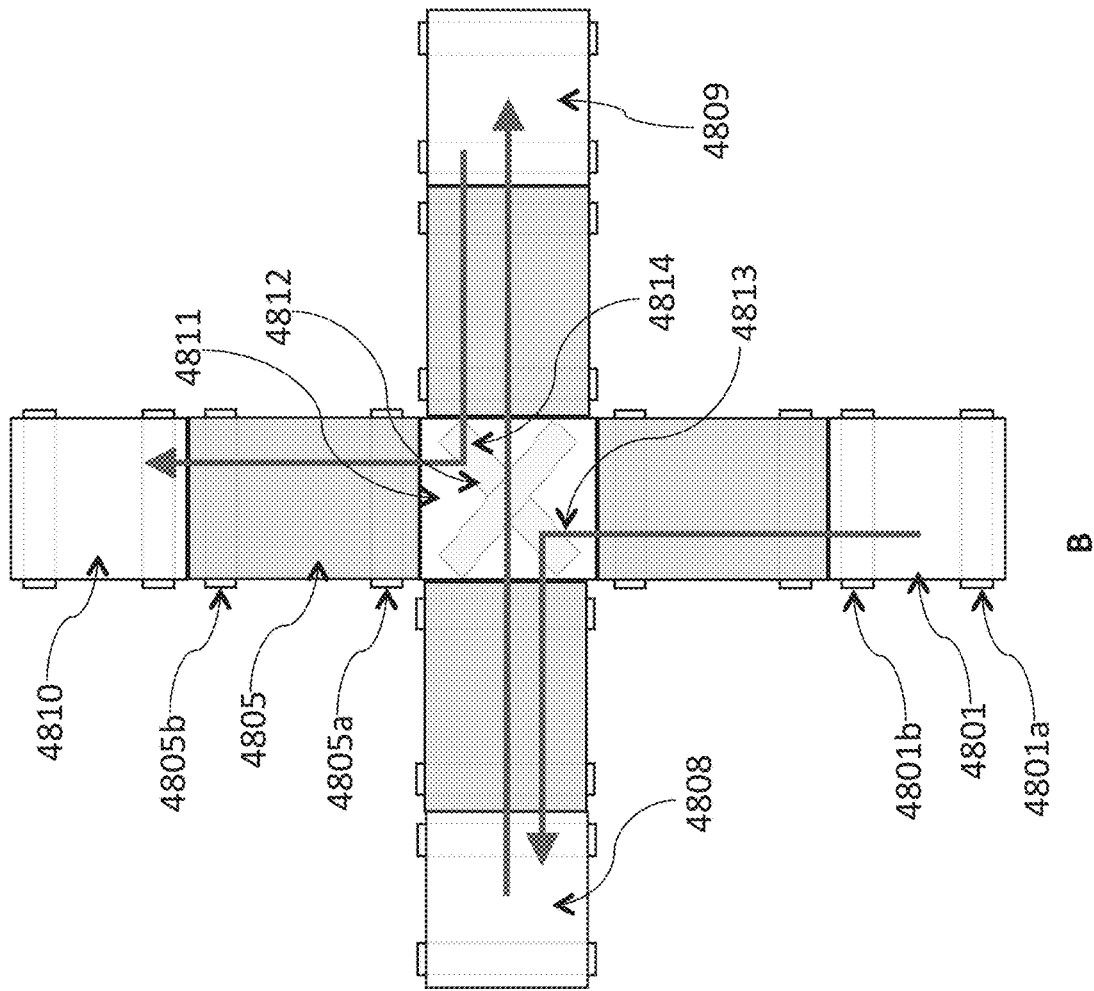
FIG. 48A-B depicts a diagram of a conveyor topology capable of integrating SAM and other manufacturing stations, in accordance with an embodiment of the present invention.

FIG. 48A is a simplified diagram of an embodiment of a 'serial' conveyor topology capable of integrating SAM and other manufacturing stations. A simplified conveyor belt system 4801 serves as a pillow ground platform for a first SAM or other manufacturing or manipulation station. The pillow ground platform conveyor system 4801 includes two rollers 4801a and 4801b. A second example SAM or other manufacturing station 4802 is depicted, as well as a third example SAM or other manufacturing station 4803. Reference numeral 4804 denotes an example work or work in-progress. Also included is a 'bus' or transporting conveyor system 4805 connecting the multiple manufacturing stations together and including two rollers 4805a and 4805b. In this example 'serial' conveyor topology, the SAM or other manufacturing stations 4801, 4802 and 4803 are connected by bus conveyors in a series or serial arrangement. Works or works in-progress may be transported between adjacent SAM stations as depicted by the bi-directional arrows 4806 or transported between more distantly separated stations by traversing intermediate stations as depicted by the example arrow 4807. No assisting actuators would be necessary to move a work off or onto a station, as a station's conveyor belt or system can offload or uptake a work onto or from the connecting conveyors of the bus system.

FIG. 48B is a simplified diagram of an embodiment of a 'star' conveyor topology capable of integrating SAM and other manufacturing stations, including manufacturing systems 4801, 4808, 4809 and 4810. In this example 'star' conveyor topology, the SAM or other manufacturing stations 4801, 4808, 4809, and 4810 are connected by bus conveyors to a central redirecting station 4811 that has a redirecting element 4812. The redirecting element may be sets of omni-wheels, orthogonally arranged omni-wheels, a rotating roller table, actuated ball tables, or other multi-directional conveyor system. Works or works in-progress may be transported between any of the connected SAM or other manufacturing stations by offloading to a bus conveyor, redirection by the central station 4811, transport via another conveyor and arrival at a different manufacturing station. For example, the arrow 4813 depicts a work departing station 4801, being conveyed to the redirector 4811, and redirected leftwards to station 4808. In another example, arrow 4814 depicts a work moving from station 4809 to 4810 via the connecting bus conveyors and the central redirector 4812.

The bus or transporting conveyor systems are depicted as having two rollers for visual simplicity. Embodiments of conveyor systems may have two or more rollers with belts, be wheel or ball systems, or other conveyor systems with or without belts. Embodiments of conveyor systems may also follow linear, curved, or other circuitous paths, be unidirectional or bidirectional, or be inclined or declined.

The example 'serial' and 'star' conveyor topologies may be combined in various series, parallel, star, tree, ring, or other graph permutations to form larger and more complex conveyor topologies.

The various stations in a conveyor topology of a production line may be for example other SAM systems with e.g. different yarn-like build material or build conditions, other manufacturing stations (e.g. FDM, sheet bending, rolling), or heat, chemical or mechanical treatment stations, or packaging, quality control, or other stations.

From Desired 3D Structure to Product of Manufacture

Figure 49:
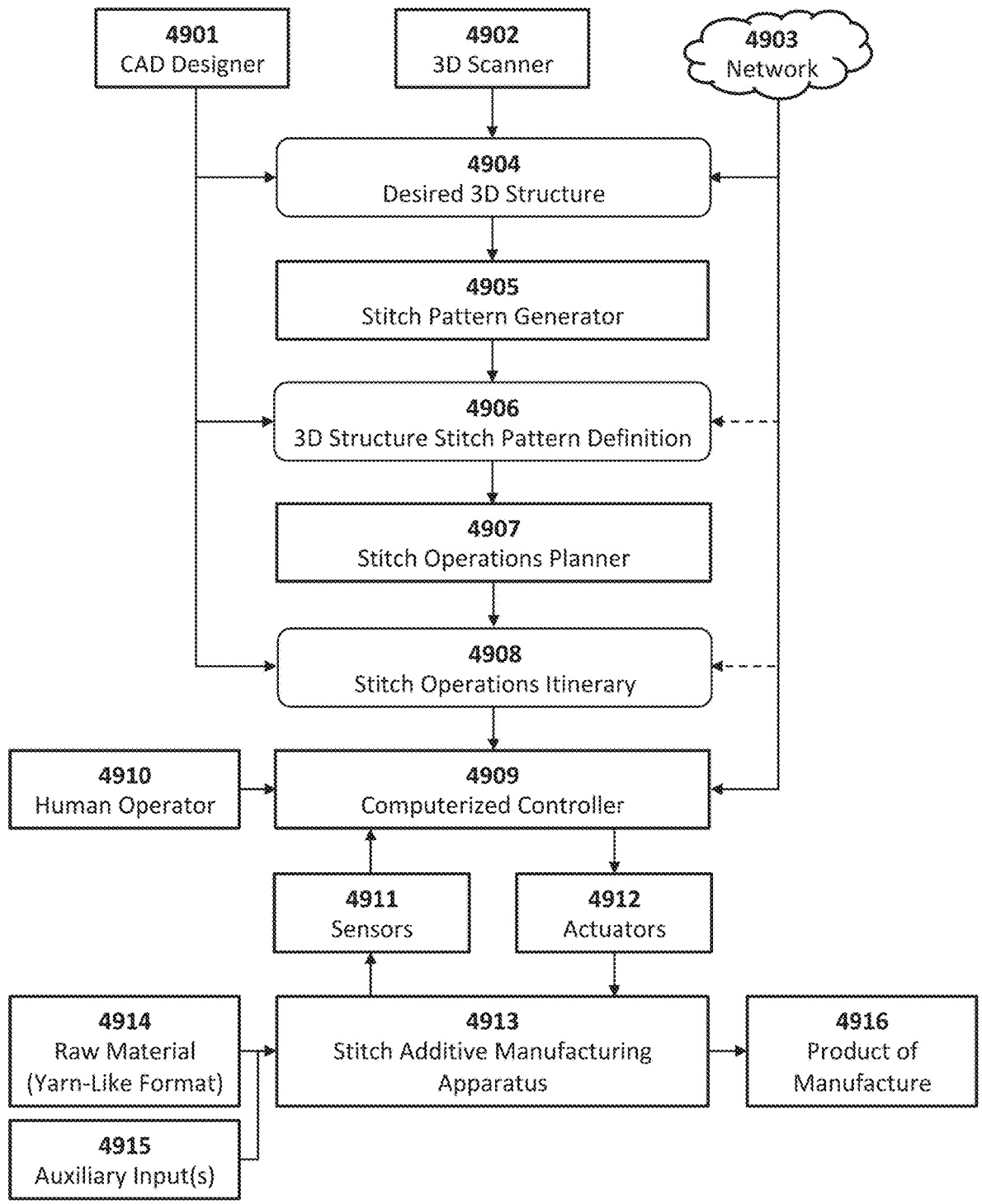
FIG. 49 depicts a diagram overview of the Stitch Additive Manufacturing (SAM) general workflow.

FIG. 49 is a diagram overview of the Stitch Additive Manufacturing (SAM) general workflow. A designer using Computer Aided Design tools (CAD Designer) 4901 is involved in the general SAM workflow by defining a Desired 3D Structure 4904 to be manufactured. In another embodiment, the Desired 3D Structure 4904 can also be defined or extracted by scanning an object using a 3D Scanner 4902. In yet another embodiment, the Desired 3D Structure 4904 data can be received from remote servers and sources over a Network 4903. The Desired 3D Structure 4904 may be represented by data stored in digital media, in Computer Aided Design (CAD) and 3D Modeling formats such as .stl, .iges, 0.3ds, .dxf, or .obj, in point cloud formats such as .csv, .ply, .pcd, or in any other format for defining 3D structures.

FIG. 49 also depicts the next step in the general workflow, which is to input the Desired 3D Structure 4904 data into a Stitch Pattern Generator 4905 that then outputs a 3D Structure Stitch Pattern Definition 4906. The 3D Structure Stitch Pattern Definition 4906 corresponds to the Desired 3D Structure 4904 but populates or represents the 3D volume with Stitch subunits data. In one embodiment, the 3D Structure Stitch Pattern Definition 4906 may be represented by data stored in digital media, in a format that defines a 3-dimensional array of stitches with associated metadata for each stitch including: stitch 3D coordinate, stitch size, stitch type, stitch 3D orientation, stitch color, stitch material, stitch index, and/or other stitch metadata.

The generation of the 3D Structure Stitch Pattern Definition 4906 by the Stitch Pattern Generator 4905 is in some regards analogous to the generation of voxels, to tessellation of 3D volumes, and to the generation of 3D filled meshes. Analogous algorithms may be applied in the Stitch Pattern Generator 4905 to generate the 3D Structure Stitch Pattern Definition 4906 such as marching cubes, marching tetrahedra, asymptotic decider, 3D contouring and 3D nesting algorithms.

FIG. 49 also depicts the following step in the general workflow, which is to input the 3D Structure Stitch Pattern Definition 4906 into a Stitch Operations Planner 4907 that then outputs a Stitch Operations Itinerary 4908. The Stitch Operations Itinerary 4908 is analogous to a g-code file in Computer Numerical Control (CNC) manufacturing that is a file defining a group and/or sequence of maneuvers and operations for a manufacturing apparatus.

The generation of Stitch Operations Itinerary 4908 by the Stitch Operations Planner 4907 is in some regards analogous to the generation of gcode files for CNC or additive manufacturing tools. Analogous algorithms may be applied in the Stitch Operations Planner 4907 to generate the Stitch Operations Itinerary 4908 such as sweep plane slicing, triangle grouping, incremental slicing, Vatti clipping, polygon offsetting, or other slicing, infill and tool path planning algorithms.

The Stitch Operations Itinerary 4908 for a SAM system has an expanded repertoire of operations compared to a traditional CNC gcode file, including new operations for yarn control: Yarn Dispensing and Retraction, Yarn Tension Control, Yarn Termination; SAM apparatus positioning: Feeder Positioning, Receiver Positioning, Pillow Ground Positioning, Work Manipulation, Work Anchoring; feeder control: Yarn Feeding, Yarn Injection, Loop Infiltration; receiver control: Loop Infiltration, Yarn Receiving, Yarn Pull-Through, Active Loop Holding; and other SAM operations.

In one embodiment, the Stitch Operations Itinerary 4908 may be represented by data stored in digital media, in a format that defines a sequence of operations for example: "1) Feeder Positioning to 'X1Y1Z1' coordinate. 2) Receiver Positioning to 'X2Y2Z2' coordinate. 3) Direct Yarn Receiving. 4) Yarn Pull-Through to 'P' Yarn Tension. 5) Feeder Positioning to 'X3Y3Z3' coordinate. 6) Receiver Positioning to 'X4Y4Z4' coordinate. 7) Yarn Receiving through the Left Loop of Stitch 1. 8) Yarn Pull-Through to 'P' Yarn Tension. 9) Feeder Positioning to 'X5Y5Z5' coordinate. 10) Receiver Positioning to 'X6Y6Z6' coordinate. 11) Yarn Receiving through the Right Loop of Stitch 2. 12) Yarn Pull-Through to 'P' Yarn Tension" . . . and so on.

In some embodiments, the Stitch Operations Itinerary 4908 may define SAM apparatus operations at a lower level of abstraction by declaring absolute positional coordinates, orientations and values as targets or parameters of each operation. In other embodiments, the Stitch Operations Itinerary 4908 may define SAM apparatus operations at a higher level of abstraction by declaring relative positions or movements, such as "Yarn Pull-Through" and "Stitch Setting toward the Left (Negative X-Axis) of the previously made stitch".

FIG. 49 also depicts another next step in the general workflow, which is to input the Stitch Operations Itinerary 4908 into the Computerized Controller 4909. The Computerized Controller 4909 interfaces with the SAM Apparatus 4913 via a set of Sensors 4911 and Actuators 4912. The Computerized Controller 4909 may also interface with a Human Operator 4910 for monitoring, fully automated operation, or semi-automated operation. The Computerized Controller 4909 transcribes the Stitch Operations Itinerary 4908 and drives the SAM Apparatus 4913 in the appropriate manner such that Raw Material 4914 and any Auxiliary Inputs 4915 (e.g. partially completed products of manufacture from a different manufacturing station, manufacturing scaffolds, parts of other materials such as metals, plastics etc.) are processed into a final or intermediate Product of Manufacture 4916 that corresponds to the Desired 3D Structure 4904.

FIG. 49 depicts how in one embodiment, the CAD Designer 4901 may define a Desired 3D Structure 4904. In another embodiment, using custom CAD tools the CAD Designer 4901 may directly define part or all of the 3D Structure Stitch Pattern Definition 4906, to have more control over the stitch placements, orientations, types and other stitch properties of the final product. In yet another embodiment, using custom CAD tools the CAD Designer 4901 may directly define part or all of the Stitch Operations Itinerary 4908, to have more control over the stitch layout, surface finish, texture quality and other properties of the final product. Similarly, the Desired 3D Structure 4904, or the lower level 3D Structure Stitch Pattern Definition 4906 and Stitch Operations Itinerary 4908 may be fetched over a Network 4903. The Computerized Controller 4909 may also interface with the Network 4903 for monitoring, control assistance, remote commands or other communications or data transfer.

FIG. 50A is a simple diagram of an embodiment of the data representation flow of a SAM process. Reference numeral 4904a denotes a simple example of a Desired 3D Structure 4904 in the form of a rectangular slab. The Desired 3D Structure 4904 is processed into a 3D Structure Stitch Pattern Definition 4906 by a Stitch Pattern Generator 4905. Reference numeral 4906a denotes a simple example of a 3D Structure Stitch Pattern Definition 4906, showing the individual stitches comprising the rectangular slab in the example form of cuboids. The 3D Structure Stitch Pattern Definition 4906 is next processed into a Stitch Operations Itinerary 4908 by a Stitch Operations Planner 4907. Reference numeral 4908a denotes a simple example of a Stitch Operations Itinerary 4908, showing the sequence by which the individual stitches are to be created for the rectangular slab. The Stitch Operations Itinerary 4908 is then input into the SAM Controller and Apparatus 5001 components, producing the Product of Manufacture 4916. Reference numeral 4916a denotes an example of a product of manufacture in the corresponding form of a rectangular slab.

FIG. 50B is a simple diagram of another embodiment of the data representation flow of a SAM process. In this embodiment the Desired 3D Structure 4904 is first processed by a Stitch Path Planner 5002 which outputs a Stitch Path 5003 that traverses the 3D volume of the desired structure, without yet defining the individual stitches. Reference numeral 5003a denotes a simple example of a Stitch Path 5003 that traverses the volume of the rectangular slab. The Stitch Path 5003 is then processed by a modified Stitch Pattern Generator 4905a which outputs the final Stitch Operations Itinerary 4908 containing both the traversal sequence and the individual stitch metadata. Reference numeral 4908a denotes a simple example of a Stitch Operations Itinerary 4908, showing the sequence by which the individual stitches are to be created for the rectangular slab. The Stitch Operations Itinerary 4908 is then input into the SAM Controller and Apparatus 5001 components, producing the Product of Manufacture 4916.

FIG. 50C is a simple diagram of yet another embodiment of the data representation flow of a SAM process. In this embodiment the Desired 3D Structure 4904 is input into an Infill Completion Observer 5004 and passed on to the SAM Controller and Apparatus 5001 components. No predefined toolpaths or sequence of operation is provided, instead the SAM Controller and Apparatus 5001 begins an Infill-Seeking Random/Heuristic Tool Path 5005: Beginning at a starting point within the Desired 3D Structure 4904 volume, stitches are created in a heuristic pattern (e.g. hatched, back-and-forth or other traversals), gradually filling up the Desired 3D Structure 4904 volume. As the desired volume is filled up with generated stitches, the Infill Completion Observer 5004 monitors the percentage or completion progress of the infill and provides feedback measures to the SAM Controller and Apparatus 5001. At the completion of this closed loop feedback process, the Desired 3D Structure 4904 is filled with stitch subunits, resulting in the Product of Manufacture 4916.

The different presented embodiments for data representation, processing and workflow of a SAM process may be combined, hybridized, or expanded in various permutations.

Apparatus Perception and Control Architecture

FIG. 51 is a simplified schematic of an example SAM system sensors and actuators general configuration. The Computerized Controller 4909 interfaces with the SAM Apparatus 4913 via a set of Sensors 4911 and Actuators 4912. The Computerized Controller 4909 may also interface with a Human Operator 4910 for monitoring, fully automated operation, or semi-automated operation.

FIG. 51 depicts a Tanglehead 5101 that can rotate about the vertical axis. The axes 5102 represent a gantry system that can move the Tanglehead 5101 over a horizontal plane. Reference numeral 5103 denotes a Vision or 3D Sensor (e.g. an RGB camera, a stereo camera, a time-of-flight camera, or a laser scanner). Reference numeral 5104 denotes an Active Receiver Limb represented by a kinematic chain. Reference numeral 5105 is an example of a Rotary Actuator that is part of the kinematic chain of the Active Receiver Limb 5104. Reference numeral 5106 denotes an example of a Position Sensor or Encoder (e.g. optical encoders, hall sensors, feedback sensors, stepper counters, strain gages, accelerometers, gyroscopes, or piezoelectric sensors) on the Rotary Actuator 5105. Reference numeral 5107 denotes an example of the end effector of the Active Receiver Limb 5104 comprising a latch hook structure.

Reference numeral 5108 denotes an Active Feeder Limb represented by a kinematic chain. Reference numeral 5109 denotes an example of a Rotary Actuator that is part of the kinematic chain of the Active Feeder Limb 5108. Reference numeral 5110 denotes an example of a Position Sensor or Encoder (e.g. optical encoders, hall sensors, feedback sensors, strain gages, accelerometers, gyroscopes, or piezoelectric sensors) on the Rotary Actuator 5109. Reference numeral 5111 denotes an example of an end effector of the Active Feeder Limb 5104 comprising a tusk structure. The Tusk End Effector 5111 can also house or attach Proximity, Tactile Feedback or Other Sensors (e.g. capacitive sensors, resistive sensors, sonar sensors, air chamber resonance sensors, optical sensors, whisker strain gage sensors or soft collision sensors). Reference numeral 5112 denotes an example of another end effector of the Active Feeder Limb 5104 comprising an active feeder. Reference numeral 5113 denotes the working yarn. Reference numeral 5114 denotes an example of a work in progress, comprising a collection of interlinked set stitches in the form of an L-shaped structure.

Figure 52:
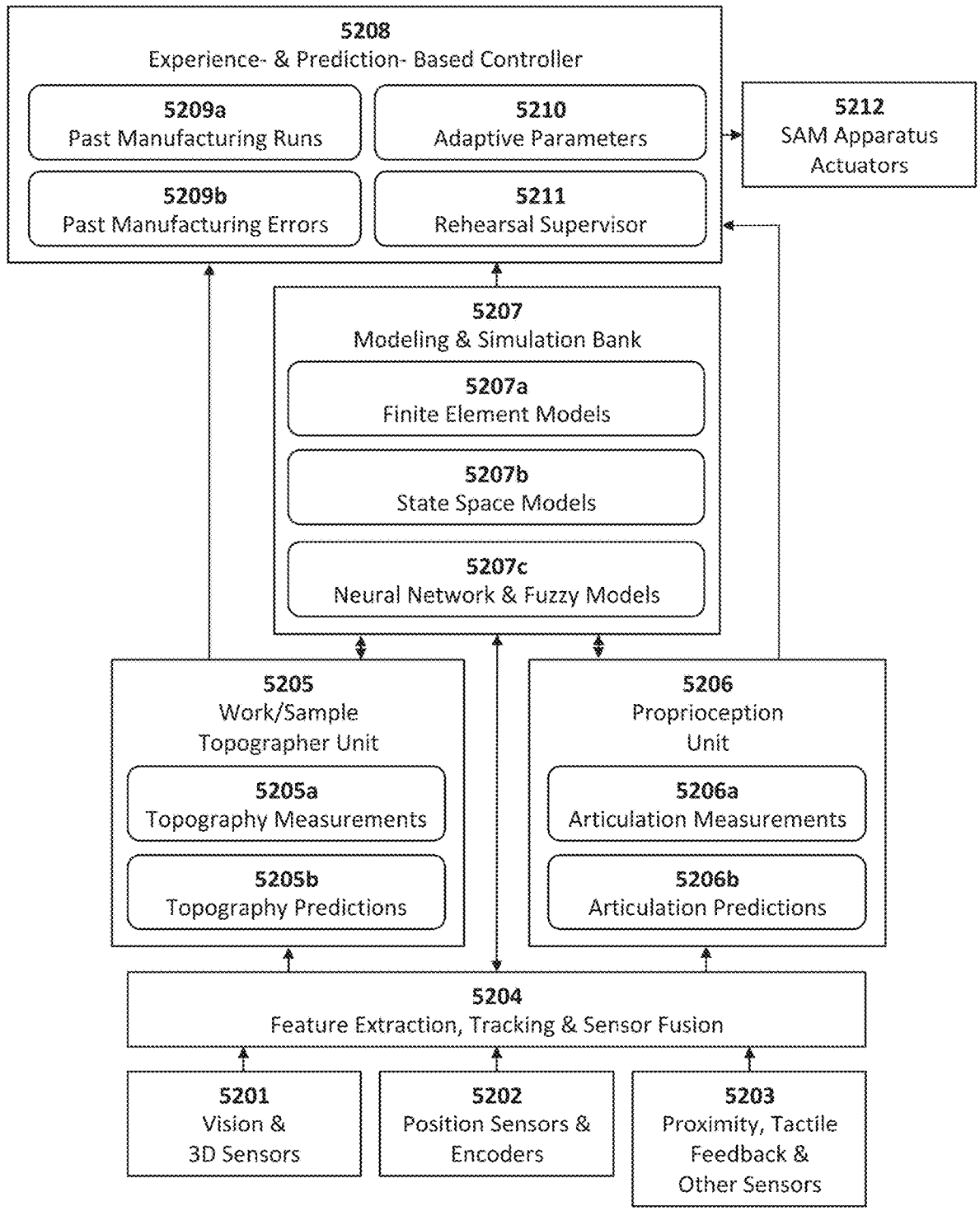
FIG. 52 depicts a diagram of a SAM system perception and control general architecture.

FIG. 52 is a diagram of a SAM system perception and control general architecture. The input to the perception and control system comprises the data from various sensor modules. Vision and 3D Sensors 5201 (e.g. RGB cameras, stereo cameras, time-of-flight cameras, laser scanners or other sensors) capture data of 3D structures such as the work in progress, the 3D position and orientation of the SAM apparatus limbs, and other structures in the work volume. There may be one or more Vision and 3D Sensors 5201, attached to the Tanglehead, the Build Frame, an articulating limb or other structure on the SAM apparatus. Position Sensors and Encoders 5202 (e.g. optical encoders, hall sensors, feedback sensors, stepper counters, strain gages, accelerometers, gyroscopes, or piezoelectric sensors) capture data on the absolute or relative position and/or orientation of structures relative to each other (e.g. relative angle between two rigid links, or displacement of the Tanglehead along a gantry axis). There may be one or more Position Sensors and Encoders 5202 on some or all of the fixed, or absolutely or relatively moving structures of the SAM apparatus to measure the displacements and motions of the moving parts. Proximity, Tactile Feedback and Other Sensors 5203 (e.g. capacitive sensors, resistive sensors, sonar sensors, air chamber resonance sensors, optical sensors, whisker strain gage sensors or soft collision sensors) capture data on the proximity, collision events, or other kinematic states of one structure relative to another structure. There may be one or more Proximity, Tactile Feedback and Other Sensors 5203 on some or all of the fixed, or absolutely or relatively moving structures of the SAM apparatus.

Referring to FIG. 52, the raw sensor data is then processed through various Feature Extraction, Tracking and Sensor Fusion 5204 operations. Feature Extraction may involve the identification of individual stitches, specific articulation limbs, or specific end effectors, using the images from the Vision and 3D Sensors 5201. Feature Tracking may involve the spatial localization and tracking over time of the identified features such as stitches, specific articulation limbs, or specific end effectors. Sensor Fusion may involve Kalman filtering, Bayesian networks, convolutional neural networks, regularization, denoising or other signal processing operations to aggregate the sensor data from the Vision and 3D Sensors 5201, Position Sensors and Encoders 5202 and Proximity, Tactile Feedback and Other Sensors 5203 into more accurate or precise measurements of the actual physical state of the SAM apparatus.

Referring still to FIG. 52, the processed sensor data 5204 is then input into a Work/Sample Topographer Unit 5205. The function of the Work/Sample Topographer Unit 5205 is to provide an accurate representation of the physical state of the work in progress. This includes inferring from the processed sensor data a set of Topography Measurements 5205*a* that define the 3D morphology of the work in progress e.g. 3D positions of the constituent stiches. During operation, the SAM system and the work sample is in dynamic motion. The Work/Sample Topographer Unit 5205 can also provide Topography Predictions 5205*b* e.g. predicted 3D positions of the stiches at a future point in time by extrapolating system models.

The processed sensor data 5204 is also input into a Proprioception Unit 5206. The function of the Proprioception Unit 5206 is to provide an accurate representation of the physical state of the SAM apparatus, including the absolute and relative positions of the relevant fixed and moving parts e.g. the Tanglehead, Build Frame, Pillow Ground and the various articulating limbs. This includes inferring from the processed sensor data a set of Articulation Measurements 5206*a* that define the 3D position and orientation of the apparatus components. The Proprioception Unit 5206 can also provide Articulation Predictions 5206*b* e.g. predicted 3D positions and orientations of the dynamically moving parts of the SAM apparatus at a future point in time by extrapolating system models.

Referring again to FIG. 52, a Modeling and Simulation Bank 5207 may take input from the Processed Sensor Data 5204, and exchange data with the Work/Sample Topographer Unit 5205 and the Proprioception Unit 5206. The function of the Modeling and Simulation Bank 5207 is to provide an array of mathematical models of the SAM system comprising models of the physical state of the apparatus and the work in progress. The goal of the mathematical models is to obtain accurate information of the past, current and predicted future positions, orientations and other physical states of the apparatus and work in progress, so that correct motion control and manufacturing maneuvers can be executed. An array of one or more mathematical models can be used and the results from each model weighted and aggregated based on various measures of confidence, reliability, variance, or other priors. The different mathematical models may include Finite Element Models 5207*a* such as numerical models of discretized representations of the work sample and/or the SAM apparatus; State Space Models 5207*b* such as Linear Time Invariant, Linear Time Varying, or other models that represent the work sample and/or the SAM apparatus as a collection of state variables with governing equations, constraints, inputs and outputs; and Neural Network and Fuzzy Models 5207c that represent the work sample and/or the SAM apparatus as a black box that receives inputs and produces outputs according to behaviors that can be trained or asymptotically approximated from training datasets comprising actual and/or simulated system inputs and outputs. Other mathematical model types, combinations or hybrids can also be applied.

Referring still to FIG. 52, an Experience- and Prediction-Based Controller 5208 may receive input from the Modeling and Simulation Bank 5207, the Work/Sample Topographer Unit 5205, and the Proprioception Unit 5206. The function of the Experience- and Prediction-Based Controller 5208 is to drive the SAM Apparatus Actuators 5212 in a correct set of operations, to correctly produce a Product of Manufacture that sufficiently conforms (within manufacturing tolerance) to the Desired 3D Structure.

For rapid operation, the Experience- and Prediction-Based Controller 5208 stores (or receives over the network) and utilizes data from previous or related manufacturing runs, analogous to muscle and temporal memory of biological systems. Past Manufacturing Runs 5209a and Past Manufacturing Errors 5209b are utilized to manufacture a new or similar product of manufacture more rapidly. Many copies of a product of manufacture e.g. a shoe design, will usually be produced by the same or similar SAM apparatus. The sequence of operations for each manufacturing run will thus be very similar, with deviations due to fluctuations in operating conditions (e.g. temperature, humidity, wear and tear, friction) and material (e.g. variations in yarn dimensions or flexibility). The SAM system can rapidly repeat past operations based on Past Manufacturing Runs 5209a and Past Manufacturing Errors 5209b, while correcting for deviations in real time using measurements and predictions from the Modeling and Simulation Bank 5207, the Work/Sample Topographer Unit 5205 and the Proprioception Unit 5206. Adaptive Parameters 5210 can be used to encapsulate the short-term deviations of the system e.g. parameters of temperature, humidity, friction and effective inertia of the various joints and bearings of the apparatus, where these parameters can be updated using the data from the Modeling and Simulation Bank 5307, the Work/Sample Topographer Unit 5205 and the Proprioception Unit 5206.

The Experience- and Prediction-Based Controller 5208 is a high-level controller that can also include a Rehearsal Supervisor 5211 that can initiate practice activities analogous to practicing gaining muscle memory in a biological system. Before beginning a manufacturing run, or during idle periods, the Rehearsal Supervisor 5211 may determine that certain Adaptive Parameters 5210 are outdated, fall below a confidence threshold, or are undefined relative to a new set of Desired 3D Structure or Stich Operation Itinerary. The Rehearsal Supervisor 5211 may then initiate a series of operations by the SAM Apparatus Actuators 5212, such that during these operations sensor data is collected, and the Adaptive Parameters 5210 can be updated using input from the Modeling and Simulation Bank 5207, the Work/Sample Topographer Unit 5205 and the Proprioception Unit 5206. Data from the practice/rehearsal runs can also be stored and utilized as part of Past Manufacturing Runs 5209a and Past Manufacturing Errors 5209b.

FIG. 53A is a simple diagram depicting work/sample topography sensing. Reference numeral 5103 denotes an example of a Vision or 3D Sensor (e.g. RGB cameras, stereo cameras, time-of-flight cameras, laser scanners or other sensors). Reference numeral 5114s denotes an example of a work in progress, comprising a collection of interlinked set stitches in the form of an L-shaped structure.

FIG. 53B is a simple diagram depicting the output of work/sample topography sensing, or the output of the Work/Sample Topographer Unit 5205. Reference numeral 5114b denotes an example of the extracted/estimated sample topography, comprising information of Nodes 5301 (corresponding to e.g. stitches, physical locations, fiducials, or other identifiable features on the work in progress) including node position, node connections, node relations to adjacent nodes, node velocity and acceleration, connection elasticity and flexibility, and other node information. The information of the Nodes 5401 in the sample topography may be represented by a 3D mesh, 3D matrix, voxel database or other data formats.

FIG. 53C is a simple diagram depicting an example of apparatus articulation sensing. Reference numeral 5104 denotes an Active Receiver Limb represented by a kinematic chain. Reference numeral 5105 (with cylinder) denotes one of three rotary actuators that are part of the kinematic chain of the Active Receiver Limb 5104. Reference numerals 5106a, 5106b and 5106c (with 'X') denote Position Sensors or Encoders (e.g. optical encoders, hall sensors, feedback sensors, stepper counters, strain gages, accelerometers, gyroscopes, or piezoelectric sensors) on the three rotary actuators. Reference numeral 5107 denotes an example of the end effector of the Active Receiver Limb 5104 comprising a latch hook structure. As the output angle of each rotary actuator changes, the relative position and orientation of the links on the Active Receiver Limb 5104 change. The final positions and orientations of the End Effector 5107 and each link are defined by the rotation angles (measured by the sensors 5106a, 5106b and 5106c) at the three joints.

FIG. 53D is a simple diagram depicting the output of apparatus proprioception, or the output of the Proprioception Unit 5206. Reference numeral 5304 denotes an example of the estimated articulation state of the Active Receiver Limb 5104, comprising information of the position and orientation of each joint and link in the limb structure, with reference to a Coordinate System 5307. Reference numeral 5305 (with dotted lines) denotes a depiction of the 'true' articulation state of the actual Active Receiver Limb 5104. Reference numeral 5306 denotes the error between the estimated and the true position of the end effector node. Where the Limb 5104 is visible to other sensors e.g. Vision or 3D Sensors, more data is available to infer or estimate the articulation state of the Limb 5104, and sensor fusion from different sensors can reduce the estimation error 5306.

Referring to FIG. 49 and FIG. 52, the perception and control system of a SAM unit can be fully automated or semi-automated. In a fully automated SAM unit, minimal or no Human Operator 4910 input is required. Instead, the Computerized Controller 4909 may receive the Stitch Operations Itinerary 4908, the 3D Structure Stitch Pattern Definition 4906, or the Desired 3D Structure 4904 (and implicitly perform the functions of e.g. the Stich Pattern Generator 4905 and/or the Stitch Operations Planner 4907), and drive the SAM Apparatus 4913 in an automated process.

In one embodiment of a semi-automated SAM unit, some Human Operator 4910 input may be required, with the Computerized Controller 4909 functioning as an efficiency tool. For example, the Human Operator 4910 may initiate a command to manufacture a sheet of stitches, followed by a circular wall of stitches, followed by a hollow structure of stitches. The Computerized Controller 4909 in such a semi-automated SAM unit will receive the high-level commands and perform the low-level stitch formation operations.

In another embodiment of a semi-automated SAM unit, the Human Operator 4910 may initiate lower-level commands e.g. instruct that a stitch be formed at a specific location at some or each step of the manufacturing process, making use of visual feedback, 2D or 3D displays, haptic feedback, virtual or augmented reality displays, telemetry, teleoperation or other monitoring, maneuvering or feedback tools. The Computerized Controller 4909 facilitates the execution of the lower-level commands by e.g. providing smooth, accurate, rapid, and repeatable motion of the SAM apparatus.

In yet another embodiment of a semi-automated SAM unit, the Human Operator 4910 may initiate lower-level commands, or even manually operate the SAM Apparatus 4913 for part or all of a manufacturing run for a Product of Manufacture 4916. The manufacturing run data is then recorded by the Experience- and Prediction-Based Controller 5208, in the Past Manufacturing Runs 5209a and Past Manufacturing Errors 5209b database. Future manufacturing runs of the same or similar Product of Manufacture 4916 may then be fully or semi-automated, using the initial manufacturing run data as a reference, baseline, or training dataset for the Computerized Controller 4909.

Stitch Additive Manufacturing Ecosystem

Figure 54:
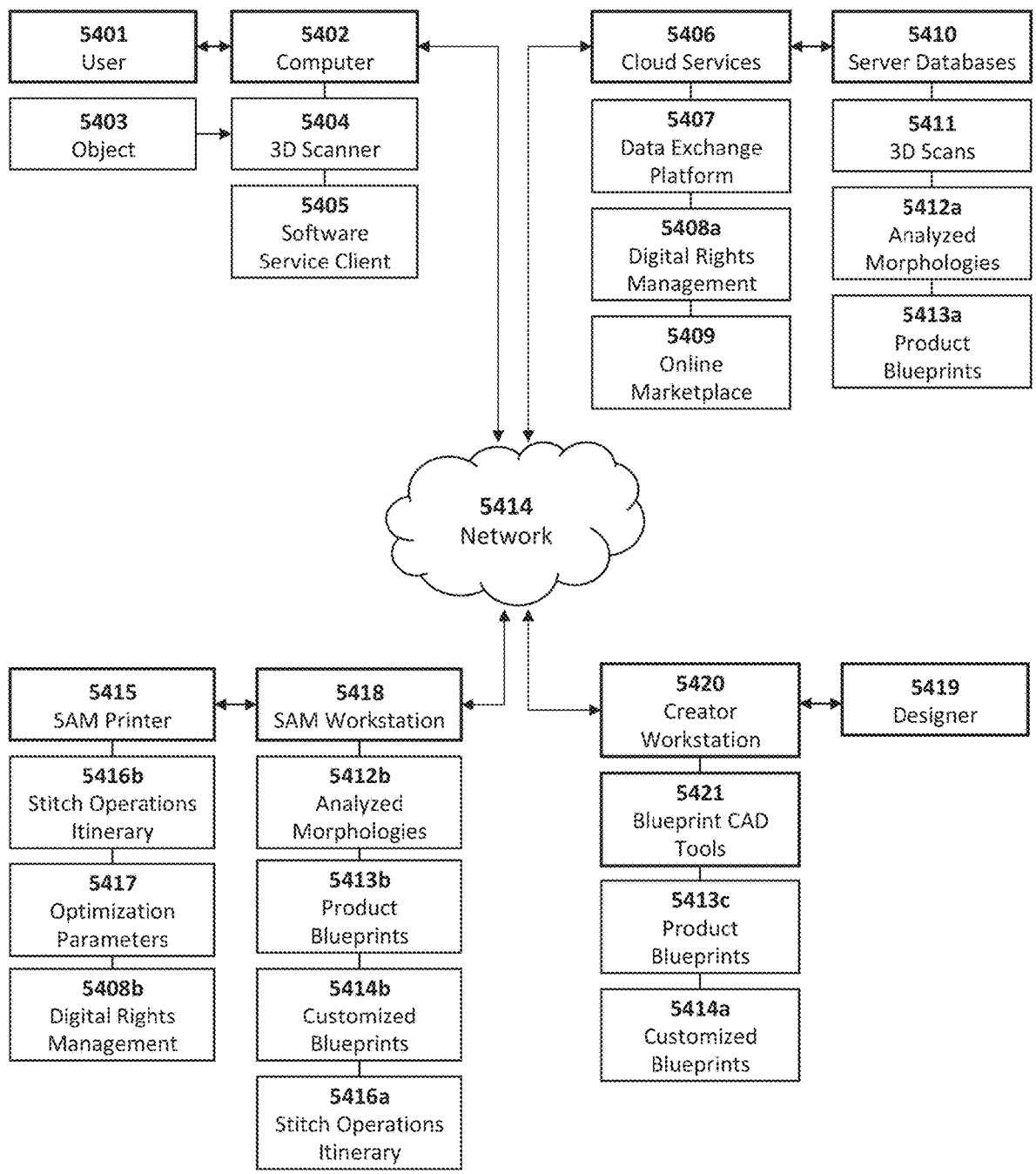
FIG. 54 depicts a simplified diagram of a SAM general ecosystem workflow.

FIG. 54 is a simplified diagram of a SAM general ecosystem workflow. Within a SAM economic ecosystem, various entities interact and exchange services and physical or digital goods. A User 5401 entity may be a mass consumer. The User 5401 may possess or interact with a Computer 5402. The Computer 5402 may be interfaced with a 3D Scanner 5404 that can extract the morphology of physical Objects 5403. The User 5401, through the Computer 5402 and 3D Scanner 5404 may interface with a Software Service Client 5405. The Computer 5402 using protocols in the Software Service Client 5405 may then interface with other entities through a Network 5414 (e.g. an intranet or the world wide web via Wi-Fi, Ethernet, Bluetooth, or other communication methods).

Also interfacing with the Network 5414 is one or more Cloud Services 5406. The Could Services 5406 may include a Data Exchange Platform 5407 that standardizes, facilitates and/or mediates the communication and exchange of information between SAM ecosystem entities across the Network 5414; Digital Rights Management 5408a systems that certify, secure and/or facilitate transfer of digital information ownership, rental or other transactions; an Online Marketplace 5409 where entities may discover, curate, sell, purchase, rent or otherwise transact digital information related to the SAM ecosystem. Interfacing with and supporting the Could Services 5406 is one or more Server Databases 5410. The Server Databases 5410 may store and retrieve 3D Scans 5411 of physical objects; Analyzed Morphologies 5412a i.e. processed information of the shape, structure and other features of the 3D Scans or other 3D objects; and Product Blueprints 5413a i.e. digital information related to manufacturing a Product of Manufacture, which may include a Desired 3D Structure 4904, a 3D Structure Stitch Pattern Definition 4906, and/or a Stitch Operations Itinerary 4908 or related digital information.

Also interfacing with the Network 5414 is one or more SAM Workstation(s) 5418, which may be a desktop, a laptop, an embedded computer, or other computing device. The SAM Workstation 5418 may digitally store and manipulate Analyzed Morphologies 5412b, Product Blueprints 5413b, Customized Blueprints 5414b and Stich Operation Itineraries 5416a. Interfacing with the SAM Workstation 5418 is one or more Sam Printer(s) 5415, comprising the Computerized Controller 4909 and the entire SAM Apparatus 4913 including Sensors 4911 and Actuators 4912. The SAM Printer 5415 may digitally store and utilize Stitch Operation Itineraries 5416b; Optimization Parameters 5417 i.e. SAM unit or Product of Manufacture specific instructions or modifications of procedure, algorithm or heuristics to improve or otherwise tweak manufacturing operation; and a Digital Rights Management 5408b client that ensures ownership rights are verified for each Product Blueprint and/or Product of Manufacture.

Also interfacing with the Network 5414 is one or more Creator Workstation(s) 5420 which may be a desktop, a laptop, an embedded computer, or other computing device. Designer 5419 entities may operate the Creator Workstation(s) 5420 to use Blueprint CAD Tools 5421 that facilitate the creation of Product Blueprints 5413c i.e. digital information related to manufacturing a Product of Manufacture, which may include a Desired 3D Structure 4904, a 3D Structure Stitch Pattern Definition 4906, and/or a Stitch Operations Itinerary 4908 or related digital information; and the modification of existing Product Blueprints 5413c into Customized Blueprints 5414a. The designed Product Blueprints 5413c and Customized Blueprints 5414a may be shared over the Network 5414.

Hierarchical Representation, Positioning, and Manufacturing

SAM typically involves the creation of smaller subunits that aggregate over many repetitions to form a much larger 3D structure. There exist differences in scale from the subunits level to the overall 3D structure level: differences in size or spatial scale, where subunits (e.g. loops) are much smaller (e.g. mm) than the overall 3D structure size (e.g. m); and differences in speed of operation or temporal scale, where individual subunits are created rapidly (e.g. ms to s), but larger portions of the overall 3D structure more slowly (e.g. min) take form. The representation of a SAM structure and the design of SAM apparatuses and methods including positioning and manufacturing operations can be more efficient by noting the spatially and temporally hierarchical nature of SAM.

FIG. 55A depicts an example hierarchical representation of spatial and identifying information of a 3D structure at the lowest subunit level. Two rows of four subunits are depicted, with three subunits labeled by reference numeral 5501, 5502 and 5503. The links between the individual subunits are depicted, with the link between subunit 5501 and 5502 labeled by reference numeral 5504. In a digital representation, the lowest level subunit representation may encode information about each individual subunit, including but not limited to: spatial position, visual and other sensor identification, and CAD properties including material and physical properties etc. and relationship to higher hierarchy levels.

FIG. 55B depicts an example hierarchical representation of spatial and identifying information of a 3D structure at an intermediate level. The lowest level subunits are grouped together into larger units. For example, subunits 5501 and 5502 are now in the subgroup 5505, while the subunit 5503 is in a different subgroup 5506. An empty subgroup 5507 is also depicted without any subunits within its spatial envelope. In a digital representation, an intermediate level subunit representation may encode aggregate group information, including but not limited to: spatial position, visual and other sensor identification, and CAD properties including material and physical properties etc. and relationship to higher or lower hierarchy levels.

FIG. 55C depicts an example hierarchical representation of spatial and identifying information of a 3D structure at a higher level. All lowest level subunits depicted including subunits 5501, 5502 and 5503 are grouped together into a high-level group 5508. In a digital representation, a high-level subunit representation may encode aggregate group information, including but not limited to spatial position, visual and other sensor identification, and CAD properties including material and physical properties etc. and relationship to lower hierarchy levels. Group 5508 is the highest-level representation in this example, but other higher or adjacent groupings may be applied.

FIG. 56A depicts hierarchical apparatus positioning and identification of subunits of a 3D structure. Utilizing the example 3D structure representation in FIG. 55, an apparatus 5602 with hierarchical sensing and positioning is designed. Reference numeral 5601 denotes a higher level, wider view, or coarse sensor (e.g. optical sensor, lidar, ultrasonic sensor, magnetic or electric field sensor etc.) that identifies the higher-level spatial position of the apparatus relative to the 3D structure. For example, sensor 5601 is used to locate the high-level group 5508, then to locate the intermediate group 5505 (i.e. to determine that the apparatus 5602 is not otherwise within the intermediate group 5506). Based on information from the coarse sensor 5601, the apparatus 5602 may be moved in larger increments (e.g. m) and at a slower speed (e.g. min).

Referring again to FIG. 56A, reference numeral 5603 denotes a lower level, smaller view or fine sensor e.g. (e.g. optical sensor, depth sensor, contact sensor, magnetic or electric field sensor etc.) that identifies the lowest level subunits of the 3D structure. For example, sensor 5603 enables distinguishing between closely resembling subunits 5501 and 5502 (both subunits within the same group 5505) based on fine scale differences and other mapping information. Based on information from the fine sensor 5603, the end effector 5605 may be moved in small increments (e.g. mm) at high speed (e.g. ms to s) using fine-scale motor movement of e.g. articulation arm 5604, to effect arrangement of input material and the creation of new subunits.

FIG. 56B depicts another embodiment of hierarchical apparatus positioning and identification of subunits of a 3D structure. Various apparatuses can be designed using the disclosed coarse-to-fine and multilevel spatial and temporal positioning approach. A course-scale sensor 5601 aids the slower positioning of apparatus 5602. A sub-apparatus 5606 is attached to and articulates from the higher-level apparatus 5602. A fine-scale sensor 5603 aids the quicker identification of individual subunits and the quicker positioning of end effectors 5607 and 5608 (e.g. feeder device, receiver device and/or manipulation device with e.g. fast reciprocating linkage action).

FIG. 56C depicts cooperative manufacturing of a 3D structure. A hierarchical representation of a 3D structure may be shared across multiple SAM systems, enabling cooperative and simultaneous construction of a 3D object. FIG. 56C depicts a first SAM system 5602 with coarse sensor 5601 aiding positioning of the overall system 5602, and fine sensor 5603 hierarchically aiding positioning of end effector 5605, to operate on low-level subunit 5501. Simultaneously, a second SAM system 5610 is depicted, with coarse sensor 5609 aiding positioning of the overall system 5610, and fine sensor 5611 hierarchically aiding positioning of end effector 5612, to operate on low-level subunit 5613. The SAM systems 5602 and 5610 may share the same 3D structure representation and may cooperatively localize and map the 3D structure during manufacture. The SAM subsystems may have the same or different end effectors e.g. each having feeder, receiver, and manipulation devices, or be configured for each system to have a different selection of end effector devices.

Knotting Apparatus

Filamentary input material may be arranged into knot-like subunits that resist unraveling when the input material is pulled. FIG. 57A depicts an apparatus for forming a slipknot on an arbitrary segment of an input filamentary material without needing access to the ends of the filament, also called 'in the bight'. Input material 5701 is depicted, together with a hook element 5702, a retractable latch element 5703, a cable element 5704 for extending and retracting the hook-latch element 5702, a drawstring element 5705 for extending and retracting the latch element 5703, and a channel element 5706, through which the hook-latch elements travel. The hook-latch apparatus 5702 can be rotated about the vertical axis within the channel 5706.

FIG. 57B depicts an apparatus for forming a slipknot in a stage of operation. The hook element 5702 is first extended towards the input material 5701, retaining a segment of the input material. FIG. 57C depicts a next stage of operation. The hook element 5702 is retracted into the channel 5706, with the input material 5701 retained on the hook element 5702. A first simple loop has been formed of the input material, with first segment 5707 and second segment 5708. FIG. 57D depicts a next stage of operation. The hook element 5702 is rotated clockwise (looking down the channel 5706) such that the first filament segment 5707 is repositioned behind the second filament segment 5708.

FIG. 57E depicts a next stage of operation. The hook element 5702 is extended to traverse between the segments 5708 and 5707 of the first loop, to retain a new segment of input material 5709. FIG. 57F depicts a next stage of operation. The hook element 5702 is retracted back into the channel 5706, between the segments 5708 and 5707 of the first loop, with the filament segment 5709 retained on the hook element 5702. A newly formed slipknot is gradually tightened as the input material is pulled by the hook element (receiver) and feeder devices where applicable.

FIG. 57G depicts an apparatus for forming a slipknot in a finishing stage of operation. The filament segment 5709 has become the loop portion of a new slipknot attached 'in the bight' to the input material 5701. The hook element 5702 is lowered and the new slipknot subunit can be released.

FIG. 58A depicts an apparatus for forming an artillery loop on an arbitrary segment of an input filamentary material without needing access to the ends of the filament, also called 'in the bight'. Input material 5801 is depicted, together with a hook element 5802, a retractable latch element 5803, a cable element 5804 for extending and retracting the hook-latch element 5802, a drawstring element 5805 for extending and retracting the latch element 5803, and a channel element 5806, through which the hook-latch elements travel. The hook-latch apparatus 5802 can be rotated about the vertical axis within the channel 5806. Also depicted is a retractable protrusion 5807 for retaining a portion of the input material. Further depicted is the input material dispensing 5808 from within the apparatus channel 5806, with the input material biased to one side 5808 of the apparatus channel. FIG. 58A depicts an apparatus for forming an artillery loop in a stage of operation. The hook element 5802 is first extended towards the input material 5801, retaining a segment of the input material.

FIG. 58B depicts a next stage of operation. The hook element 5802 is retracted into the channel 5806, with the input material 5801 retained on the hook element 5802. A first simple loop has been formed of the input material, with first segment 5809 and second segment 5810. Notice that the input material 5808 dispensing from one side of the channel remains retained by the extended protrusion 5807, forming an angled segment of input material 5811 behind and between the filament segments 5809 and 5810. FIG. 58C depicts a next stage of operation. The hook element 5802 is rotated counterclockwise (looking down the channel 5806) such that the first filament segment 5809 is repositioned in front of the second filament segment 5810. FIG. 58D depicts a next stage of operation. The hook element 5802 is extended downward, in front of the second segment 5810 and behind the angled segment 5811, to retain a portion of the first segment 5809. The biasing of filament segments during element traversal can be accomplished by biasing channels and/or stationary or movable protrusions, as will be discussed later.

FIG. 58E depicts a next stage of operation. The hook element 5802 is retracted back into the channel 5806, behind the angled segment 5811 and in front of the second segment 5810, with a portion of filament segment 5812 retained on the hook element 5802. A newly formed artillery loop is gradually tightened as the input material is pulled by the hook element (receiver) and feeder devices where applicable. Notice that the input material is still retained by the extended protrusion 5807. The latch element 5803 may be opened or closed for durations of the traversals when required.

FIG. 58F depicts an apparatus for forming an artillery loop in a finishing stage of operation. The filament segment 5812 has become the loop portion of a new artillery loop attached 'in the bight' to the input material 5801. The hook element 5802 is lowered and the new artillery loop subunit can be released. The retractable protrusion 5807 (not shown) is also disengaged, allowing release of the new artillery loop subunit. The loop of an artillery loop does not unravel or diminish when any connected input material ends are pulled.

FIG. 59A depicts an apparatus for forming a butterfly loop on an arbitrary segment of an input filamentary material without needing access to the ends of the filament, also called 'in the bight'. Input material 5901 is depicted, together with a retractable hook element 5902, a retractable latch element 5903, and a channel element 5906 through which the hook-latch elements travel. The hook-latch apparatus 5902 can be rotated about the vertical axis within the channel 5906. Also depicted is a retractable protrusion 5907 for retaining a portion of the input material. FIG. 59A depicts an apparatus for forming a butterfly loop in a stage of operation. The hook element 5902 is retracted into the channel 5906, with the input material 5901 retained on the hook element 5902. A first simple loop has been formed of the input material, with first segment 5904 and second segment 5905. The retractable protrusion 5907 is not yet engaged and does not impede the filament movement.

FIG. 59B depicts a next stage of operation. The hook element 5902 is rotated clockwise (looking down the channel 5906) such that the first filament segment 5904 is repositioned behind the second filament segment 5905. The retractable protrusion 5907 is not yet engaged and does not impede the filament movement. FIG. 59C depicts a next stage of operation. The hook element 5902 is retracted further into the channel 5906 such that the first 5904 and second 5905 segments of the first loop straddle two retractable protrusions 5907 and 5908. The retractable protrusions 5907 and 5908 are now engaged to retain the input material. FIG. 59D depicts a next stage of operation. The hook element 5902 is again rotated clockwise (looking down the channel 5906) such that a second twisted loop is formed with first segment 5909 and second segment 5910. The retractable protrusions 5907 and 5908 remain engaged to retain the input material, retaining the second loop segments 5909 and 5910, and keeping open the first loop segments 5905 and 5904.

FIG. 59E depicts a next stage of operation. The hook element 5902 is extended downwards, in front of all filament segments while still retaining the second loop. The retractable protrusions 5907 and 5908 remain engaged to retain the input material. The latch element 5903 may be closed for the duration of this or another traversal. FIG. 59F depicts a next stage of operation. The hook element 5902 is retracted back into the channel 5906 while releasing the previously-retained second loop. The retractable protrusions 5907 and 5908 remain engaged to retain the input material. Note that the second loop with first segment 5909 and second segment 5910 remain folded at a lower position to the first loop with first segment 5904 and second segment 5905.

FIG. 59G depicts a next stage of operation. The hook element 5902 is extended downwards, into the opening between and under the first 5904 and second 5905 segments of the first twisted loop. The hook element 5902 is positioned to retain a segment 5911 of the second twisted loop with first segment 5909 and second segment 5910. The retractable protrusions 5907 and 5908 remain engaged to retain the input material. FIG. 59H depicts a next stage of operation. The hook element 5902 is retracted back into the channel 5906, into the opening between the first 5904 and second 5905 segments of the first twisted loop, while retaining a segment 5911 of the second loop. A newly formed butterfly loop is gradually tightened as the input material is pulled by the hook element (receiver) and feeder devices where applicable.

FIG. 59I depicts an apparatus for forming a butterfly loop in a finishing stage of operation. The filament segment 5911 has become the loop portion of a new butterfly loop attached 'in the bight' to the input material 5901. The hook element 5902 is lowered and the new butterfly loop subunit can be released. The retractable protrusions 5907 and 5908 (not shown) are disengaged, allowing release of the new butterfly loop subunit. The loop of a butterfly loop does not unravel or diminish when any connected input material ends are pulled.

FIG. 60A depicts an apparatus for forming an overhand loop on an arbitrary segment of an input filamentary material without needing access to the ends of the filament, also called 'in the bight'. Input material 6001 is depicted, together with a retractable hook element 6002, a retractable latch element 6003, and a channel element 6006 through which the hook-latch elements travel. The hook-latch apparatus 6002 can be rotated about the vertical axis within the channel 6006. Also depicted are moving protrusions 6007 and 6008 for retaining a portion of the input material. FIG. 60A depicts an apparatus for forming an overhand loop in a stage of operation. The hook element 6002 is retracted into the channel 6006, with the input material 6001 retained on the hook element 6002. A first simple loop has been formed of the input material, with first segment 6004 and second segment 6005.

FIG. 60B depicts a next stage of operation. The first loop is released from the hook element 6002, while the moving protrusions 6007 and 6008 are moved to opposite sides of the channel 6006. A bridge of input material 6009 is formed between the engaged protrusions 6007 and 7008. A free segment 6010 of the input material is formed above the protrusions. FIG. 60C depicts a next stage of operation. The hook element 6002 is extended downwards and behind the free segment 6010, to retain the bridge of input material 6009. FIG. 60D depicts a next stage of operation. The hook element 6002 is retracted into the channel 6006 while retaining the input material. A second compound loop (comprising two strands of filament on each segment) is formed, with first compound segment 6011 and second compound segment 6012.

FIG. 60E depicts a next stage of operation. The hook element 6002 is rotated clockwise (looking down the channel 6006) such that the second compound loop is twisted with first segment 6011 positioned behind second segment 6012. The moving protrusions 6007 and 6008 remain engaged to retain the input material. FIG. 60F depicts a next stage of operation. The hook element 6002 is extended downwards between and above the first 6011 and second 6012 segments of the compound loop, to retain a new segment 6013 of the first loop. FIG. 60G depicts a next stage of operation. The hook element 6002 is retracted back into the channel 6006, into the opening between the first 6011 and second 6012 compound segments of the first compound loop, while retaining a segment 6013 of the input material. A newly formed overhand loop is gradually tightened as the input material is pulled by the hook element (receiver) and feeder devices where applicable.

FIG. 60H depicts an apparatus for forming an overhand loop in a finishing stage of operation. The filament segment 6013 has become the loop portion of a new overhand loop attached 'in the bight' to the input material 6001. The hook element 6002 is lowered and the new overhand loop subunit can be released. The retractable protrusions 6007 and 6008 (not shown) are disengaged, allowing release of the new overhand loop subunit. The loop of an overhand loop does not unravel or diminish when any connected input material ends are pulled.

Biasing of filament segments and filament manipulation elements, to position the segments and elements for retainment and traversal may be achieved by channels and stationary and/or moving protrusions. FIG. 61A depicts a method for guiding filaments and elements within a channel. An outer channel 6101 is depicted, through which flows two segments of filament 6102 and 6103 (depicted as circular cross-sections). Within the channel 6101 are grooved channels 6104, 6105 and 6106 that guide the input material such that segment 6102 is confined to channel 6104 and segment 6103 is confined to channel 6106. The grooved channel structure may be constructed of rigid or elastic material such as rubber, silicone, polyurethane etc.

FIG. 61B depicts a method for biasing filaments and elements within a channel. An outer channel 6101 is depicted, through which flows two segments of filament 6102 and 6103 (depicted as circular cross-sections). Protrusions 6107 and 6108 are also depicted at upper and lower starting positions initially.

FIG. 61C depicts a next step of said method. The protrusions 6107 and 6108 are moved to opposite positions, downwards and upwards, respectively. The protrusions 6107 and 6108 may contact, retain, and compress the segments of filament 6102 and 6103 against the walls of the channel 6101. The protrusions may be simple extensions of structural material e.g. plastic, aluminum, steel, etc. The protrusions may be moved, extended, or retracted by standard mechanical methods such as solenoid activation, drawstring action, servomotors etc.

FIG. 61D depicts a method for biasing filaments and elements within a channel. An outer channel 6101 is depicted, through which flows three segments of filament 6102, 6103 and 6109 (depicted as circular cross-sections). Protrusions 6107 and 6108 are also depicted at lower starting positions initially. A third protrusion with a groove 6110 is also depicted at an upper starting position.

FIG. 61E depicts a next step of said method. The protrusions 6107 and 6108 are moved to opposite positions upwards. The protrusions 6107 and 6108 may contact, retain, and compress the segments of filament 6102 and 6103 against the walls of the channel 6101. The protrusions 6110 is also moved to an opposite position downwards. The protrusions 6110 may contact, retain, and compress the filament segment 6109 against the walls of the channel 6101, while providing a groove 6110 to guide e.g. filament manipulation elements within the channel.

Fiber Layering and SAM

FIG. 62A depicts an embodiment of a 3D structure comprising interlinked subunits and a layer(s) of fibers and an apparatus for depositing layers of fibers onto a 3D structure. Example repeating subunits 6201 are depicted, with a layer of deposited fibers 6202. A fiber depositing device 6203 on a positioning device 6204 is also depicted. The fiber depositing device 6203 may be e.g. a solvent electrospinning, coaxial electrospinning, emulsion electrospinning, electromelting, and/or electrospraying device. A stream of electrospun material 6205 is depicted traveling towards the 3D structure 6201, with an electrospinning target 6206 positioned behind the 3D structure. The layer of fibers may provide additional functionality to the 3D structure, e.g. bioactivity, affinity to other materials, surface quality etc.

FIG. 62B depicts an apparatus for depositing and forming layers of fibers onto a 3D structure. Example repeating subunits 6201 are depicted, with a layer of deposited or formed fibers 6208. A fiber layering device 6207 on a positioning device 6204 is also depicted. The fiber layering device 6207 may be a felting needle maneuvered in reciprocating motion to perturb and extend small fibers 6208 of the 3D structure 6201 material. The felting needle device 6207 may also be maneuvered in reciprocating motion to incorporate externally supplied fibers 6208 of other materials into the 3D structure 6201 by entangling the externally supplied fibers with the fibers of the 3D structure.

FIG. 62C depicts embodiment of a 3D structure comprising interlinked subunits and a layer(s) of fibers. Example repeating subunits 6201 are depicted, with a thick layer of deposited or formed fibers 6209, produced by the aforementioned methods or other fiber deposition methods. The thick layer of fibers 6209 may give a smoother appearance and surface quality, decrease porosity or permeability, increase absorption, and/or provide other modifications to the 3D structure 6201.

FIG. 62D depicts an embodiment of a compound filament comprising sub-filaments and a paste. One or more sub-filaments 6210 with higher tensile strength can serve as the backbone or structural element for a compound filament also comprising one or more paste-like materials 6211. The paste 6211 may be material of physical qualities not suited to be formed into a filament e.g. low tensile strength and tendency to separate into clumps etc., but with sufficient adhesion to the sub-filaments 6210, without or with a binder e.g. water, clay, gluten, adhesives, etc. By combining the sub-filaments 6210 of various lengths with the paste 6211 to produce a compound filament, the paste 6211 is made amenable to be arranged into complex 3D structures including into repeating interlinked subunits. The filaments 6211 and/or paste 6210 may be removed or post-processed e.g. hardened, chemically treated, sintered, cooked etc. after arrangement into a 3D structure. Examples of sub-filaments 6210 include but are not limited to: metal, polymer, and ceramics filaments, and biologically compatible and edible materials. Examples of pastes 6211 include but are not limited to: cement, clay, ceramic and other mixtures, biologically compatible pastes, and edible pastes. The compound filament may also be sheathed in a tube.

Property Control Via Subunit Sequence Patterning

The physical properties of a SAM structure, including stretch and elasticity, can be directional or anisotropic, depending on the orientation of the interlinks between the constituent subunits of the 3D object. In particular, the direction of yarn-wise interlinks can exhibit higher stretch compared to the direction of loop-wise interlinks between subunits. (Depending on the subunit type, the differences in yarn-wise and loop-wise interlink physical properties may vary or be reversed).

FIG. 63A depicts a general filament path in the construction of a 3D structure. The input material 6301 is arranged into subunits (e.g. 6302) running along a zig-zag path 6303. Based on the zig-zag path 6303 subunit patterning, yarn-wise interlinks between subunits are predominantly along the horizontal direction, while loop-wise interlinks are predominantly along the vertical direction. Physical property anisotropy can easily arise from this zigzag 6303 patterning, e.g. higher stretch in the horizontal direction.

The directionality of physical properties of a SAM structure can be controlled by designing the subunit sequence pathing. FIG. 63B depicts another general filament path in the construction of a 3D structure. A different horizontal zig-zag path 6304 is followed during the creation of loop subunits, with a vertical bridge section 6305. The bridge section 6305 introduces a column of yarn-wise interlinks vertically into the 3D structure where there had been predominantly only loop-wise interlinks vertically. Bridge sections can be used to control physical properties across otherwise homogeneous sections of subunit arrangement.

FIG. 63C depicts yet another general filament path in the construction of a 3D structure. A 'random walk' path 6306 is followed during the creation of loop subunits. The random or nearly random directionality of subunit sequence helps to distribute more equally yarn-wise and loop-wise interlink properties along the horizontal and vertical directions, producing a more isotropic 3D structure. The aforementioned examples depict horizontal and vertical paths, but the directionality design methods can be applied to other orientations e.g. inward, outward, diagonal, radial, tangential etc.

FIG. 63D depicts multiple general filament paths in the construction of a 3D structure. A multilayer patterning or an orientated lamination approach can be used to control the directionality or anisotropy of physical properties of a SAM structure. FIG. 63D depicts four layers 6307, 6308, 6309 and 6310 of interlinked subunits. Layers 6307 and 6309 are constructed with a horizontal zig-zag subunit pathing, while layers 6308 and 6310 are constructed with a vertical zig-zag subunit pathing. All layers 6307, 6308, 6309 and 6310 are also interlinked with adjacent layers by input material traversal, e.g. loop-wise interlinks between layers. The aggregate physical properties e.g. stretch or elasticity over the 'laminated' layers become more isotropic as the orthogonal directionality of the yarn-wise and loop-wise interlinks of the individual layers overlap.

3D Composites and Multi-Material SAM

FIG. 64A depicts a 3D structure comprising interlinked subunits and a matrix. A collection of interlinked subunits 6401 e.g. a SAM structure is used as the reinforcement for a matrix material 6402, creating a 3D composite. The repeating subunits may be constructed of filaments of e.g. ceramic, metal, aramid, carbon-, glass-, polymer and/or other fibers or filaments. The matrix may be made of e.g. metallic, concrete/cement, ceramic and/or polymer (including but not limited to acrylic, acrylonitrile butadiene styrene (ABS), polyethylene, polyvinyl chloride, polyester resin, polyurethanes, epoxy resin, silicone etc.) or other materials.

FIG. 64B depicts manufacturing of a 3D structure comprising interlinked subunits and a matrix. A collection of interlinked subunits 6401 is arranged by a SAM apparatus 6403. Concurrently, a matrix material 6402 may be applied to the 3D object 6401, via a dispensing device 6404, e.g. a nozzle ejecting the matrix material that solidifies after being deposited onto the structure 6401, the solidification occurring via curing, cooling, heating or other methods. Also depicted is a softening device 6405, that locally softens the matrix material 6402, so that the SAM apparatus 6403 can penetrate to and/or apply enough force to manipulate the input material to form the interlinked subunits 6401 that may already be in contact the with hardening matrix material 6402. The softening device may be a heating or cooling device, a laser source, a chemical or solvent source, or other device to temporarily increase the workability of the matrix material. The softening device may also selectively soften the filamentary input material.

FIG. 64C depicts manufacturing of a 3D structure using multiple sub-filaments. The filamentary input material 6406 used to construct the interlinked subunits 6401, may be composed of sub-filaments or plies of various materials. Each sub-filament may provide different functionality to the 3D construct. For example, one sub-filament 6407 may be of a material with high affinity or wetting coefficient with the matrix material 6402, such that the matrix material (e.g. epoxy resin) easily wicks and diffuses through the entire 3D collection of subunits 6401 during manufacture, producing a homogenous and strong 3D composite. Other sub-filaments in the input filament 6406 may function as high-strength materials e.g. steel, glass, or carbon fibers, that do not need to exhibit high affinity or wetting coefficient with the matrix material 6402.

FIG. 65 depicts manufacturing of a 3D structure using multiple filaments. A material arrangement device 6501 is depicted e.g. a hook and latch device. A material feeder device 6502 is also depicted, dispensing two filaments of input material 6503 and 6504. The filaments 6503 and 6504 may be of the same material, or different materials with different physical properties and functions in the final 3D object. The manipulation device 6501 may use one or both of the input filaments 6503 and 6504 sequentially or concurrently, to create compound subunits 6505. Two or more filaments may be dispensed and arranged into a 3D SAM construct.

During a SAM manufacturing process, low rigidity or high flexibility of the input filamentary material may be desirable to reduce the forces required to bend and arrange the input material into repeating interlinked subunits. Materials with intrinsically high stiffness and/or Young's modulus e.g. aluminum, steel, ceramics, and glass may be formed into highly flexible filaments by formatting the high stiffness material into thin fibers that are then wound together into yarn-like filaments. FIG. 66A depicts a yarn-like filament 6601 comprising many smaller diameter sub-filaments or plies 6602. The small diameter sub-filaments 6602 have low stiffness and the bundling of the individual thin sub-filaments produces an overall flexible large-diameter filament 6601.

After material arrangement in a SAM process, the final 3D object may be desired to have high stiffness, for example to serve as reinforcement for buildings, bridges, or other structures. The low-stiffness/high-flexibility filamentary input material in FIG. 66A may be transformed into a high-stiffness filament by bonding together the thin constituent sub-filaments of intrinsically high-stiffness materials e.g. metals, ceramics and/or polymers. The bonding together of the thin constituent filaments may be accomplished by wicking or infusing a cementing material into the yarn-like filament, filling the volume between the constituent sub-filaments, and bonding the structure into one large-diameter filament. The bonding together of the thin constituent filaments may also be accomplished by melting and re-solidifying together the constituent sub-filaments into a large-diameter filament, the melting being achieved by convective heating, radiative heating with e.g. a laser, electrical/joule heating by e.g. passing an electrical current through the filaments, ultrasonic and/or other heating or melting methods. FIG. 66B depicts the result of bonding the constituent sub-filaments of a yarn-like filament. A new filament structure 6603 is produced, where the small-diameter sub-filaments of high-stiffness material have amalgamated into a large-diameter beam 6604 with high stiffness.

Subassembly Interfacing

SAM structures comprising interlinked stitch subunits may be interfaced with other 3D structures including objects manufactured via non-SAM methods. FIG. 67A depicts interfacing a 3D structure comprising interlinked subunits with another 3D structure. A collection of interlinked subunits 6701 e.g. a SAM object is depicted as interfaced with a bar 6702 e.g. a bar of injection-molded plastic, extruded steel, or milled aluminum. The interfacing between the SAM object 6701 and the bar 6702 is provided by the filamentary connections 6704 e.g. loop-wise links or yarn-wise links, where the filamentary material traverses through apertures 6703 in the external 3D object 6702.

FIG. 67B depicts another embodiment of interfacing a 3D structure comprising interlinked subunits with another 3D structure. A collection of interlinked subunits 6701 e.g. a SAM object is depicted as interfaced with a collection of tile-like structures 6705. The interfacing between the SAM object 6701 and the tiles 6705 is provided by the filamentary connections 6704 e.g. loop-wise links or yarn-wise links, where the filamentary material traverses through apertures 6703 in the external tiles 6705.

FIG. 67C depicts another embodiment of interfacing a 3D structure comprising interlinked subunits with another 3D structure. A collection of interlinked subunits 6701 e.g. a SAM object is depicted as interfaced with a textile-like structure 6706. The interfacing between the SAM object 6701 and the textile-like structure 6706 is provided by the filamentary connections 6704 e.g. loop-wise links or yarn-wise links, where the filamentary material traverses through openings between the filaments in the textile-like structure 6706. The textile-like structure may be a woven or knitted fabric, a woven or braided composite reinforcement, or other textile-like structure.

FIG. 67D depicts another embodiment of interfacing a 3D structure comprising interlinked subunits with another 3D structure. A collection of interlinked subunits 6701 e.g. a SAM object is depicted as interfaced with a biological structure 6707 e.g. tendon, ligament, bone, muscle, or other biological tissue. The interfacing between the SAM object 6701 and the biological structure 6707 is provided by the filamentary connections 6704 e.g. loop-wise links or yarn-wise links, where the filamentary material traverses through apertures 6708 in the biological structure 6707. The apertures 6708 may be pre-existing or created/punctured by a needle device 6709. Also depicted is a material arranging device 6710 that may construct the SAM structure 6701 in tandem. The punctured and interfaced object 6707 may also be non-biological. The SAM object 6701 may also be constructed of material (e.g. silicone, polyurethanes, biological adhesives, fibrin etc.) that permanently, temporarily, and/or reversibly adheres to biological surfaces e.g. skin, membranes, muscle, ligaments, bone etc.

The working platform of a SAM apparatus can be flat and planar, or concave, convex, or possessing another arbitrary topology. FIG. 68A depicts a SAM apparatus working platform with arbitrary topology. An example material arranging device 6801 is depicted together with a cross-section of an arbitrary-shaped working platform 6802. The working platform may be prefabricated using additive or traditional manufacturing processes. The working platform may be shaped to conform to the unique contours a SAM object to be constructed on top of the platform, and/or to assist in positioning and/or stabilizing the SAM object during construction.

FIG. 68B depicts a SAM apparatus working platform with arbitrary topology. An example material arranging device 6801 is depicted together with a cross-section of an arbitrary-shaped working platform 6803. The working platform comprises individually actable pistons 6804 that can dynamically reposition the 'head' sections 6803 on which a SAM object may rest. By individual control of the pistons 6804, a working platform of arbitrary topology can be approximated.

SAM with Framing

A SAM structure may also be interfaced with a frame to help support the repeating subunit arrangement of the SAM structure. FIG. 69A depicts a step of an example method producing a 3D structure interwoven with a frame. Filamentary input material 6901 is arranged into a first loop 6904, above a vertical strut or cable-like frame element 6902. The input material 6901 and the frame elements 6902 and 6903 may be configured to have sufficient friction between the respective surfaces such that the input material 6901 resists slipping along the frame elements 6903 and 6903.

FIG. 69B depicts a next step of producing a 3D structure interwoven with a frame. Filamentary input material 6901 is drawn under the frame element 6902 and through the loop 6904 to form a new loop 6905. The new loop 6905 is interlinked with both the previous loop 6904 and the frame element 6902. The new free end of filamentary material 6906 is now below the frame element 6902.

FIG. 69C depicts a next step of producing a 3D structure interwoven with a frame. Filamentary input material 6906 is drawn over the frame element 6902 and through the loop 6905 to form a new loop 6907. The new loop 6907 is interlinked with both the previous loop 6905 and the frame element 6902. FIG. 69D depicts a next step of producing a 3D structure interwoven with a frame. Filamentary input material 6908 is drawn under the frame element 6902 and through the loop 6907 to form a new loop 6909. The new loop 6909 is interlinked with both the previous loop 6907 and the frame element 6902.

FIG. 69E depicts a next step of producing a 3D structure interwoven with a frame. Filamentary input material 6910 is drawn over the frame element 6902 and through the loop 6909 to form a new loop 6911. The new loop 6911 is interlinked with both the previous loop 6909 and the frame element 6902. FIG. 69F depicts a next step of producing a 3D structure interwoven with a frame. Filamentary input material 6912 is drawn under the frame element 6902 and through the loop 6911 to form a new loop 6913. The new loop 6913 is interlinked with both the previous loop 6911 and the frame element 6902. The new free end of filamentary material 6914 is now below the horizontal frame element 6903.

FIG. 69G depicts a next step of producing a 3D structure interwoven with a frame. Filamentary input material 6914 is drawn over the horizontal frame element 6903 and through the loop 6913 to form a new loop 6915. The new loop 6915 is interlinked with both the previous loop 6913 and the horizontal frame element 6903. The stitched 3D structure is now interlinked with both vertical 6902 and horizontal 6903 frame elements. FIG. 69H depicts a next step of producing a 3D structure interwoven with a frame. Filamentary input material 6916 is drawn under the horizontal frame element 6903 and through the loop 6915 to form a new loop 6917. The new loop 6917 is interlinked with both the previous loop 6915 and the horizontal frame element 6903. FIG. 69I depicts a next step of producing a 3D structure interwoven with a frame. Filamentary input material 6918 is drawn over the horizontal frame element 6903 and through the loop 6917 to form a new loop 6919. The new loop 6919 is interlinked with both the previous loop 6917 and the horizontal frame element 6903.

FIG. 69J depicts a later step of producing a 3D structure interwoven with a frame. A collection of interlinked stitch subunits 6921 is added to the 3D structure, and the new collection of subunits 6921 is interlinked with the previously created subunits e.g. 6909, which are in turn interlinked with the frame elements 6902 and 6903. As such, the whole SAM structure is secured and framed by the structural elements 6902 and 6903. The aforementioned steps are exemplary and can be rearranged, changed in direction or traversal etc. in various embodiments to interweave a 3D structure with a frame.

FIG. 70A depicts a 3D structure interwoven with a pre-stressing frame. An example collection of interlinked subunits 7001 is interwoven with a rod-like frame element 7002. The frame element 7002 may be curved or pre-bent such that the overall 3D structure is pre-stressed in a selected direction. Pre-stressing of the compound structure enables the structure to support loads more rigidly in certain directions, reduces stretch under certain load directions, and provides other structural improvements. A frame element interwoven with a SAM structure can also be deformed before, during or after manufacture, to change the overall shape of the SAM object.

FIG. 70B depicts another a 3D structure interwoven with a frame. A wireframe 7003 is prepared in the desired shape of a final product. FIG. 70C depicts the final product, with interlinked subunits 7004 interwoven with the wireframe 7003, such that the final SAM object 7004 assumes the shape outlined by the wireframe 7003. The wireframe may be removed during or after manufacture or remain as part of the product.

FIG. 70D depicts a method of constructing a 3D structure interwoven with a frame. A collection of interlinked subunits 7005 is constructed using an example SAM apparatus 7007 and interwoven with an example frame 7006 comprising vertical rods. The vertical rods 7006 can be additively manufactured in tandem using an additive manufacturing apparatus 7008, e.g. a fused deposition modeling nozzle or other additive manufacturing device. The supporting frame 7006 can be constructed and take shape simultaneously with the stitched SAM structure 7005.

FIG. 71A depicts a 3D structure comprising interlinked subunits and inlaid filaments. A collection of interlinked subunits 7101 is depicted, together with example inlaid filaments 7102 of the same or different materials. The inlaid filaments 7102 may traverse through one or more subunits 7103 of the 3D structure 7101. The inlaid filaments 7102 may be of a stronger but potentially less flexible material e.g. metal, ceramic, class, carbon, or high molecular weight polymer filament, incorporated into the 3D structure 7101 as reinforcements. The inlaid filaments 7102 may also be anchored 7104 to portions of the 3D structure, such that pulling or pushing on the inlaid filaments 7102 effects warping, folding or other shape change of the 3D structure i.e. the inlaid filaments can serve as actuating tendons for the 3D structure 7101.

FIG. 71B depicts an embodiment of embedded sensing in a SAM structure. A collection of interlinked subunits 7101 is depicted, together with example sensors 7105 attached to filament segments of some subunits 7103. The sensors 7105 may be small strain, pressure, light, temperature, capacitive, resistive, vibration or other sensors. The cell-like structure of SAM objects 7101 enables targeted sensor placement and targeted monitoring of specific subunits, to monitor e.g. stress and strain distribution, contact profile, temperature distribution, and physical or other metrics. As the filamentary material within a specific subunit 7103 experiences strain, change in volume, or other perturbation, the specific sensor 7105 can monitor and report the localized physical perturbations.

Tubular Filament 3D objects can be constructed out of tubular filamentary material, i.e. filaments with hollow cross-section. FIG. 72A depicts a 3D structure comprising tubular filament. A tubular filament input material 7201 is depicted, with a first opening 7202 and a second opening 7203 into the tube structure. The tubular filament is arranged into both a 3D structure portion without stitching 7204 and a 3D structure portion with stitching 7205 or interlinking subunits.

FIG. 72B depicts another embodiment of a 3D structure comprising tubular filament. A first tubular filament input material 7201 is depicted arranged into both a 3D structure portion without stitching 7204 and a 3D structure portion with stitching 7205 or interlinking subunits. A second tubular filament 7207 is also depicted, formed into a 3D structure 7206 that is also interlinked with the 3D structure 7205 of the first tubular filament. Multiple tubular and non-tubular filamentary input material can be used to construct a 3D structure.

FIG. 72C depicts an embodiment of tubular filament. A tubular outer wall component 7208 is depicted, with a hollow inner volume 7209. An opening 7210 into the tubular filament is also depicted. The wall 7208 of the tubular filament may comprise a range of both permeable and non-permeable materials: plastics, polymers, rubber, silicone, metals, ceramics, and other materials. The inner volume 7209 of the tubular filament may be a vacuum or filled with one or more gases, liquids, solids, colloids, or other mixtures. The walls 7208 of the filament may also be transparent or translucent such that the color or contents 7209 of the filament are visible.

FIG. 72D depicts another embodiment of tubular filament. A tubular outer wall component 7208 is depicted, with an inner volume 7209 filled with granules 7211 and one or more gasses or liquids. The gas or liquid pressure within the inner volume 7209 may be reduced or depressurized (e.g. via a pump attached to the opening 7210), such that the granules 7211 or other filler material begin to jam. The jamming together of the filler material 7211 increases the stiffness of the overall filament 7208, and the stiffness can be dynamically controlled by modulating the pressure within the tubular filament.

FIG. 72E depicts another embodiment of tubular filament. A tubular outer wall component 7208 is depicted, with an inner volume 7209 filled with strips 7212 of filler material and one or more gasses or liquids. The strips 7212 can also represent sub-filaments, tows, or layers of material. The gas or liquid pressure within the inner volume 7209 may be reduced or depressurized (e.g. via a pump attached to the opening 7210), such that the strips 7212 or other filler material begin to jam. The jamming together of the filler material 7212 increases the stiffness of the overall filament 7208, and the stiffness can be dynamically controlled by modulating the pressure within the tubular filament. The strips of material 7209 can also intrinsically provide increased rigidity, temperature resistance, electrical conductance, or other property modification to the tubular filament.

FIG. 73A depicts an embodiment of a 3D structure comprising tubular filament. A tubular filament input material 7301 is depicted and is arranged into both a 3D structure portion without stitching 7302 and a 3D structure portion with stitching 7303 or interlinking subunits. The tubular filament 7301 is filled with an initially liquid or flowable material 7304 that remains in a non-solid or non-rigid state during arrangement of the tubular filament 7301 into a desired 3D structure.

FIG. 73B depicts an embodiment of a 3D structure produced using tubular filament and post-processing. The filling material 7304 has been solidified (via e.g. temperature curing, UV curing, setting or other method), and the outer wall 7301 has been removed (via e.g. dissolving in a solution, etching, melting, burning, stripping or other method), resulting in the filler material 7304 retaining the structure of both a 3D structure portion without stitching 7302 and a 3D structure portion with stitching 7303 or interlinking subunits. The outer wall 7301 may also be retained after solidification of the filler material.

FIG. 74A depicts an embodiment of a 3D structure comprising tubular filament in a deflated state. A tubular filament input material 7401 is depicted and is arranged into both a 3D structure portion without stitching 7402 and a 3D structure portion with stitching 7403 or interlinking subunits. An example opening 7404 of the tubular filament is also depicted.

FIG. 74B depicts an embodiment of the 3D structure depicted in FIG. 74A in an inflated state. Gas, liquid, or other material has been pumped into the example opening 7404. The wall material of the tubular filament 7401 may be compliant or elastic such that the volume of the tubular filament increases as material is pumped into the tubular filament. The volume and shape of the overall 3D structure may also change as the tubular filament 7401 is inflated or deflated.

FIG. 75 depicts an embodiment of a 3D structure comprising tubular filament with added functionality. A tubular filament input material 7501 is depicted and is arranged into both a 3D structure portion without stitching 7502 and a 3D structure portion with stitching 7503 or interlinking subunits. At a first opening to the tubular filament, an example dynamic pump 7505 may be attached, to inject or remove gaseous, liquid or other material from the interior of the tubular filament 7501 to e.g. inflate, deflate or increase or decrease the pressure within the tubular filament. At a second opening to the tubular filament, an example pressure sensor 7506 or other sensor may be attached, to dynamically monitor the pressure or other metric within the tubular filament, in response to e.g. changing external forces or contact onto the tubular filament 3D structure. A second tubular filament 7504 is also depicted arranged into a 3D structure and interlinked with the first tubular filament 7501. At a first opening to the second tubular filament, an example variable aperture device 7507 may be attached. A variable aperture may be e.g. a motor-controlled iris, a solenoid-controlled valve or other variable opening.

The variable aperture device 7507 may be used to dynamically allow release or intake of gas, liquid, or other material into or out of the tubular filament. At a second opening to the tubular filament, an example pressure/volume reservoir 7508 may be attached. The pressure/volume reservoir 7508 may be a pressurized gas or liquid chamber, or a buffer volume to receive excess gas, liquid, or other material. The attached functional devices e.g. dynamic pump 7505, pressure sensor 7506, variable aperture 7507, pressure/volume reservoir 7508 and/or other device may all be controlled by a computing system, and operated in concert such that the stiffness, volume, shape, energy absorption, impact resistance, softness, conformity and/or other physical property of a 3D structure constructed of tubular filaments may be dynamically controlled.

Computer Aided Design with Stitch Additive Manufacturing

FIG. 76A is a flowchart of a method for computer aided design (CAD) and SAM pattern generation. One or more user(s) 7601 may utilize computerized software 7602 to transfer, modify and/or generate the data and/or instructions required to operate a SAM system to produce a 3D object. An example workflow of computer aided design with SAM is discussed below.

Beginning with traditional CAD methods 7605, a user may design and document a 3D structure 7603 using available CAD tools, to define the 3D shape of a desired 3D object. Portions of the defined 3D structure can then be assigned material properties, with some portions being designated as stitch additively manufactured (SAM) portions 7604, while other portions being traditionally manufactured e.g. solid plastic or aluminum portions. If part of the 3D structure is SAM-designated and other parts are not, the interfaces between the SAM portions and non-SAM portions are initialized 7606 by software 7602, e.g. initializing the anchoring pattern and the number of apertures needed for loop or filament traversal through the non-SAM portions, to bind the collective 3D structure together. The software 7602 also initializes the subunit composition, subunit patterning and positioning, subunit interlink pattern, filament path traversal, and other SAM structure definitions 7607, to fully initialize 7608 and define the substructure of the SAM portions of the 3D structure.

After initialization, the user 7601 may customize the interfaces between SAM and non-SAM portions 7609 or volumes of the 3D structure, e.g. moving interface boundaries, changing interface or binding types, changing number of traversed apertures etc. After initialization, the user 7601 may also customize the subunit definitions 7612, including increasing or decreasing subunit/loop size, increasing or decreasing the width of the filaments, adding manipulation instructions such as twists, changing subunit layout and subunit type, e.g. simple loops, knotted loops, cemented loops etc. After initialization, the user 7601 may also customize the subunit interlink definitions 7615, including adding or removing filaments, changing the filament run paths, changing the sequence and direction of subunits, changing the interlink patterns and directions and other modifications.

The user 7601 may also define additional pre- and post-processing steps for the 3D structure 7618. Example pre-processing instructions include defining treatment, e.g. coloring, functional coating, or material infusion, to portions of the filamentary input material. Example post-processing instructions include functional coating, cement deposition, temperature cycling, and other treatments. The user 7601 may also insert or define additional functional subassemblies into the CAD representation 7621. Functional subassemblies including embedded electronics, embedded sensors and actuators, integrated pumps, motors, and other components can be introduced and interfaced with the 3D structure.

As the user makes any of the aforementioned changes, the software may update the SAM pattern, predicted physical and functional properties, and graphical visualization of the overall 3D structure in real time 7610, 7613, 7616, 7619, 7622. The result of the above designs, initializations and user customizations is a data representation of stitch or subunits pattern definition 7624, providing an index of the entire 3D structure and all its constituent subunits, including all relevant subunit metadata e.g. position, orientation, interlink relationship, filaments, functions, interfaces etc.

FIG. 76B is a flowchart of a method for computer aided design (CAD) and SAM instruction generation and operation. An example continued workflow of computer aided design with SAM is discussed below.

The stitch or subunits pattern definition 7624 provides an index of the entire 3D structure and all its constituent subunits including relevant metadata. The software 7602 receives the subunits information and initializes low-level toolpaths 7625, defining the operation of a SAM system to manufacture or materialize the 3D structure defined by the pattern definition 7624. The low-level toolpaths include defining the x-y-z position and roll-pitch-yaw orientations over manufacturing time, for all relevant manufacturing devices and device subcomponents e.g. feeder device, receiver device, manipulation device, sensor device and any movable, retractable or extendable subcomponents of said devices.

The software 7602 receives the subunits information and initializes high-level toolpaths 7626, further defining the operation of a SAM system in order to manufacture or materialize the 3D structure defined by the pattern definition 7624. The high-level toolpaths include defining material arrangement, device control and other manufacturing operations over manufacturing time, e.g. defining a sequence of filament traversals relative to indexed subunits, defining pre- and post-processing operations relative to portions of the 3D structure, defining a path for subunit creation and interlinking etc. Many different alternative low-level toolpaths may achieve the same high-level toolpath. The user 7601 may also provide input and modification to the low- and/or high-level toolpaths initialized by software 7627.

The software 7602 may further modify the low- and/or high-level toolpaths 7628 based on data regarding the input material and/or SAM apparatus. For example, manufacturer or simulation data or historical operational data on material stiffness, SAM apparatus joint friction, hysteresis, motor backlash, device response time etc. can be used to adjust the low- and/or high-level toolpath control, to more efficiently and accurately arrange the input material into the desired 3D shape. The processing and re-computation of the apparatus toolpaths or instructions 7629 may be executed in real time, or at intervals with batch-buffered data, depending on computational resources.

The result of the aforementioned steps of the stitch operations planner 7630 is a data representation of stitch itinerary or instructions 7631, providing an index of the operations to be carried out by a SAM apparatus to produce the 3D structure, including data on all drive signals and control signals to all relevant devices and processors.

During manufacturing 7634, the stitch itinerary or instructions 7631 data is used to control the SAM system 7632 to produce the 3D structure. The control of the SAM system may be open loop, where e.g. positioning and movement instructions for the devices are executed without sensor feedback; or closed loop, where e.g. position, proximity, vision, depth and other sensors are used in a feedback loop to ensure more accurate control of the SAM apparatus. User 7601 input may or may not be provided during manufacturing.

The SAM system may also operate in concert with other manufacturing stations 7633, to produce 3D structures with both SAM and non-SAM portions and volumes. The CAD instructions may also include instructions for other manufacturing stations cooperating with or integrated with the SAM system. The result of the manufacturing operations of the SAM system and other manufacturing stations is the 3D product 7635, matching the CAD-designed 3D structure mediated by the aforementioned processes.

Manufacturing Resource Planning with Stitch Additive Manufacturing

FIG. 77A is a block diagram of a general production system involving SAM. At the earliest stages of the production chain, raw material suppliers 7701, 7704 and 7706 produce various types of raw materials e.g. chemicals, fibers, ores and other feedstock, which are then processed by input material suppliers 7702, 7705 and 7707 into various types of manufacturing input materials. For example, SAM input material supplier 7702 processes the raw materials 7703 via e.g. carding, spinning and extruding of filaments, modifying the filaments, filling or infusing the filaments with other materials, coloring and spooling, and other preparatory processes, to produce filamentary input materials.

Additive manufacturing input material supplier 7705 processes the raw material into filaments, resins, powders, or other additive manufacturing inputs. General input material supplier 7707 processes raw materials into e.g. metal sheets, slabs, carbon fiber weaves, plastic pellets, and other input materials. Supplier data 7715 is recorded and monitored, including supply chain availability, material inventory, supplier capacity, lead times and other supply chain information.

Referring again to FIG. 77A, the input materials are then supplied to the production system. SAM filamentary input material is supplied to SAM stations 7708, additive manufacturing input material is supplied to additive manufacturing stations 7709, and general input material is supplied to other manufacturing stations 7710. Parts of products are manufactured and then assembled and/or post-processed in finishing stations 7711. The finished products are packaged 7712, inventoried and prepared to be shipped. Within the production system, technicians, operators 7716 and other personnel may service production activities. The various manufacturing stations, equipment and resources are managed via additive (and other) manufacturing control, assignment, and scheduling 7717. Production data 7718 is recorded and monitored, including equipment status, personnel status, production rate, lead time, inventory, and other production metrics.

Next, the packaged products are handled by shipping providers 7713 and delivered to ordering customers 7714. The aforementioned processes illustrate the material flow from suppliers to customer. At the same time, a demand pull is generated from the customer, who places an order for products that are then fulfilled by the supply and production systems. Within the sales and marketing system, order, and sales data 7719 is recorded, including order types and quantity, sale rates and other metrics. Shipping and fulfilment channel data 7720 is also recorded, including shipping times, shipping locations, warehousing status etc. Customer data 7721 may also be recorded, including customer profiles, interests, demographics etc.

Higher level monitoring of customer demand, together with real-time control of production systems and material requisition is enabled by data collection, tracking, and sharing across the supply chain. Marketing, Sales, Logistics and E-commerce 7724 activities generate customer orders, which are then communicated to Production Control 7723. Production Control manages the aforementioned production systems, including assigning tasks to manufacturing stations, operators, and other resource allocation actions. As required, purchase orders for new input materials are communicated to Material Requirements Planning 7722, where relevant material suppliers are notified of requests for current or future supplies of material.

At the same time, availability of materials, availability of manufacturing resources and time-varying capabilities can also be communicated to marketing, e-commerce, and sales, to present real-time options for customers to purchase unique, customized and/or time-limited goods. Manufacturing Resource Planning 7725 integrates data and monitoring of the materials 7722 and production 7723 status and capabilities, that are communicated to Enterprise Resource Planning 7726, to generate overall product offerings, sales, promotions etc. that are tailored to individual customers and the current supply of materials and production capabilities.

FIG. 77B is a flowchart of a method for production management. A customer may initiate the process by placing an order on an e-commerce channel 7727 e.g. on a website or a mobile application. The order is then transmitted to the production control system 7728, which then initiates order fulfilment 7729, by allocating resources to manufacture and ship the ordered product. Production control allocates an amount of input material 7730 required to fulfil the order. Depending on the available inventory of input material, production control may also send input material purchase orders 7734 to input material suppliers, which then produce and deliver the requested materials to the production system 7735. Depending on input material inventory, the input material suppliers may also send purchase orders to raw material suppliers 7736, which then produce and deliver the requested raw materials 7736. Production control also allocates manufacturing resources 7731 including manufacturing, finishing and other stations, together with the technicians and operators needed to complete the order 7732. After the customer order is manufactured, finished, and packaged, the shipping provider delivers the completed product to the customer 7723. Simultaneously, data from the suppliers and production is monitored and fed back to manufacturing resource planning 7728, and data from the overall system including customer activity is monitored and fed back to enterprise resource planning.

FIG. 77C is a flowchart of a method for personalized and extemporaneous value presentation. Real-time supplier data and production data can inform the types, designs and custom configurations of products that can be produced 7740 and marketed. For example, new shipments of input material types, colors or sizes enables a new range of products with custom patterns and colors; and newly upgraded, programmed, or available capacity of manufacturing equipment can enable new custom product geometry, surface finish, colorways etc. The range of input material and manufacturing capabilities then informs a manual or algorithmic product design generation 7741, where a designer can customize a product blueprint, or an algorithm can generate randomized, heuristic or machine intelligence-based product patterns and designs. The generated product patterns may be further customized by customer data 7742 e.g. by customer indicated fashion preferences, sizing, personal interests, and other profile data. The generated product designs are then presented to potential customers via an e-commerce channel 7743. The custom generated product designs may be presented as time limited offers, presented only to a single or selected customers, be offered with personal discounts, as part of a curation, discovery or recommendation service, presented on a virtual runway, on revolving selection of products etc. The customer may interact with the presented product designs 7744 by e.g. personalizing the design, performing tasks to earn the ability to purchase the design, choose between alternative designs, and other input. Finally, the customer may place an order based on the customized product design 7727.

SAM Products and Constructs

FIG. 78A depicts an embodiment of a protective structure. An example outer layer 7801 forms e.g. a hard or soft outer shell of e.g. plastic, metal or ceramic. The outer shell layer may provide aesthetic, impact resistance, scratch resistance and/or other functionality. An example arbitrarily shaped SAM layer 7802 is also depicted consisting of repeating interlinked subunits 7803. The SAM layer may provide tensile strength, impact resistance, tear resistance, individual subunit-resolution strain gauge, pressure, electrical conductance or other physical property sensing, and/or other functionality. An example arbitrarily shaped tubular filament 3D structure 7804 is also depicted consisting of interlinked or non-interlinked tubular filaments, with an example opening 7806 to the tubular structure. The tubular filament 3D structure 7804 may be dynamically actuated and monitored, to have dynamically re-inflatable shape, variable stiffness, energy absorption, and/or other static and/or dynamic properties. An inner shell layer 7807 is also depicted forming e.g. a hard or soft outer shell of e.g. plastic, metal, ceramic and or foam. The inner shell layer may provide aesthetic, fit, comfort, and/or other functionality.

FIG. 78B depicts an embodiment of a wearable product in a stage of manufacture. A wireframe 7808 of the final 3D structure is constructed via additive manufacturing, robotic arrangement, or other manufacturing methods. The wireframe may have portions with a denser arrangement of wires 7809 to help support loads on the final product.

FIG. 78C depicts an embodiment of a wearable product following FIG. 78B. SAM processes are performed to construct repeating interlinked subunits interwoven with the frame 7808, such that the final product 7810 is a collection of subunits of filamentary input material conformed to the shape of the wireframe. The SAM structure may also be interlinked or integrated with other types of 3D objects, for example a textile or fabric layer 7811 that is interfaced 7812 to the example wearable product 7810.

FIG. 79A depicts a first stage of a 3D construction. A set of cables 7901 may be spanned over an area or volume where a 3D structure is to be built. FIG. 79B depicts an embodiment of a 3D structure constructed over cable frames. A collection of interlinked subunits 7902 is built interwoven with the cable frames 7901, such that a suspended or supported SAM construct is produced, guided, and/or shaped by the spanning or suspending cables 7901.

FIG. 79C depicts an embodiment of 3D construction. A series of vertical bars or posts 7903 is erected to outline the perimeter of a building or construct. A SAM system produces a collection of interlinked subunits 7904 interwoven with the erected bars 7903. The vertical bars or other guides may provide support, reinforcement, shape, pre-stress or other function to the overall 3D building or construct. The erected bars may also be additively manufactured in tandem with the SAM structure. FIG. 79D depicts another embodiment of 3D construction. A series of vertical bars or posts 7905 is erected to outline the perimeter of a building or construct. An example SAM system 7908 produces a collection of interlinked subunits 7906 interwoven with the erected bars 7905. Additional inner and/or outer layers 7907 of cement, resin, plaster, or other construction material may be deposited, adhered, and/or sprayed onto the SAM layer 7906 via an example material depositing device 7909 e.g. a cement, foam or other material sprayer.

FIG. 80A depicts an embodiment of a free-moving manufacturing system. A manufacturing unit 8001 is depicted with receptacles 8002 for docking and/or tethering with other units. The manufacturing unit 8001 has one or more manipulation arms 8003 with coarse-scale and fine-scale 8004 spatial and temporal resolution. Attached to the manipulation arms are a selection of general manufacturing and SAM devices, including a feeder device 8005 that supplies a filamentary input material 8006, a receiver device 8007 or material arrangement device that formats the input material into repeating interlinked subunits, a manipulation device 8008 for imparting force, immobilizing and/or holding parts of a work-in-progress, and other devices including visual, depth sensors, lidar, ultrasonic, proximity, magnetic and electric field and other sensors, material extruders, material deposition devices, heating and cooling devices, and other implements.

FIG. 80B depicts an embodiment of another free-moving manufacturing system. Another manufacturing unit 8009 is depicted, within which is stored a quantity of filamentary input material 8010. The manufacturing unit 8009 also has receptacles 8002 for docking and/or tethering with other units and may dispense and retract the stored input material 8011 through a receptacle.

The free-moving manufacturing systems in FIG. 80A and FIG. 80B may operate in a range of environments. The free-moving manufacturing systems may operate in a space or orbital environment i.e. beyond Earth or planetary atmosphere conditions, including in microgravity. The free-moving manufacturing systems may also operate underwater in marine environments with high buoyancy. The free-moving manufacturing systems may be self-propelled using e.g. gas rocket, plasma or other thrusters and propellers. The free-moving manufacturing systems may be compactly designed such that the units and input material are weight- and volume-efficient for transport to orbit.

FIG. 80C depicts a process for free-moving manufacturing, for example in an orbital or underwater environment. A first manufacturing unit 8001a is depicted tethered 8012 to a storage unit 8009a, which is in turn attached to a structure 8018. The dispensed tether 8012 may also serve as the input filamentary material for SAM construction. The structure 8018 may begin as a wireframe 8017 robotically assembled from parts, expanded from a folded storage state, or additively manufactured. Filamentary material may then be arranged and interwoven with the wireframe to form panels 8016, walls and other SAM structures. A second manufacturing unit 8001b is also depicted tethered 8013 to another storage unit 8009b, which is in turn attached to the structure 8018. The second manufacturing unit 8001b is constructing a cable-like structure 8014 beginning at an anchor point 8015, while being tethered 8013 to the storage unit 8009b. As the second manufacturing unit 8001b creates more of the cable 8014, it retracts more along the tether 8013 that also serves as the source of input material. In this manner the manufacturing units may traverse across the construction volume while remaining tethered and being supplied input material. A self-propelled free-moving manufacturing unit 8001c is also depicted.

FIG. 81A depicts a method for producing a 3D structure comprising interlinked subunits and a matrix. A collection of interlinked subunits 8101 is depicted, with an example subunit 8102 labeled. An initial volume of liquid or flowable material 8103 is also depicted. Within a microgravity environment (or a condition where surface tension, wetting and other surface forces predominate gravitational forces) the flowable material 8103 will begin to wet and disperse across the subunits 8102 or surfaces of the 3D structure 8101.

FIG. 81B depicts a next stage in a method for producing a 3D structure comprising interlinked subunits and a matrix. The flowable material 8103 has dispersed 8104 across the surface of the 3D structure 8101, coating the subunits 8102. The liquid or flowable material 8104 e.g. epoxy resin, molten metal, thermoplastic polymer, UV-curable resin, or other construction material, may be post-processed, cured or hardened to function as a matrix for the coated structure 8101.

FIG. 81C depicts a method for 3D structure property modification. The liquid or flowable material 8104 may also be a chemical solution for electroplating, electrodeposition, galvanization, or other chemical process, to coat or deposit a material onto the wetted 3D structure 8101. For example, the filamentary input material or a sub-filament constituting some or all of the subunits 8102 may be electrically conductive, or the filaments coated to be electrically conductive. An electrical potential or current may be set up between the 3D structure 8105 and the solution 8106, to effect electroplating or other electrochemical reaction on the 3D structure for material deposition. The dispersing and wetting of the solution 8104 onto the 3D structure can be facilitated by a microgravity environment. The solution-wetting and electrochemical-reaction method may also be used to remove or modify coatings or other materials on the 3D structure The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. A method of producing a 3D structure from incrementally linked subunits of an input filamentary material, the method comprising the steps of:
   providing a desired 3D structure;
   providing a material feeder with an amount of an input material disposed thereon;
   receiving the amount of the input material at a receiver by:
      magnetically receiving, at a receptacle disposed within the receiver, the feeder;
      translating the amount of the input material from the feeder to the receiver; and
      decoupling the feeder from the receptacle disposed within the receiver;
   contacting, via the receiver, the amount of the input material to translate the amount of the input material in a direction away from the material feeder;
   arranging the amount of the input material into a plurality of interlinked subunits that resemble the desired 3D structure by:
      forming a subunit of the plurality of interlinked subunits by traversing the amount of the input material through at least one loop of at least one previously-formed subunit, thereby interlinking the formed subunit with the at least one previously-formed subunit; and
      selecting the at least one previously-formed subunit through which the formed subunit traverses, the selection made such that the interlinked formed subunit and at least one previously-formed subunit are disposed adjacent each other, such that a volume of an incrementally produced 3D structure incrementally increases; and
   producing a stitch additive manufactured 3D structure based on the provided desired 3D structure, the produced stitch additive manufactured 3D structure including the plurality of interlinked subunits.

2. The method of claim 1, further comprising the steps of:
   transposing the desired 3D structure into a representation comprising repeating subunits; and
   translating the repeating subunits representation into a sequence of material arrangement operations, such that the amount of the input material can be arranged into the plurality of interlinked subunits that resemble the desired 3D structure.

3. The method of claim 1, wherein the step of arranging the amount of the input material into the plurality of interlinked subunits further comprises the step of:
   interlinking subunits of the amount of the input material to produce the manufactured 3D structure having sufficient structural integrity to retain a desired shape during the additive manufacturing process.

4. The method of claim 1, wherein the step of arranging the amount of the input material into the plurality of interlinked subunits further comprises the step of:
   forming a subunit of the plurality of interlinked subunits by traversing the amount of the input material through at least one loop of at least one previously-formed subunit, thereby interlinking the formed subunit with the at least one previously-formed subunit.

5. The method of claim 4, further comprising the step of:
   selecting the at least one previously-formed subunit through which the formed subunit traverses, the selection made such that the interlinked formed subunit and at least one previously-formed subunit are disposed adjacent each other, such that the volume of the stitch additive manufactured 3D structure incrementally increases.

6. The method of claim 1, wherein the step of arranging the amount of the input material into the plurality of interlinked subunits further comprises the step of:
   threading a traversal of a second subunit through a loop of a first subunit to interlink the second subunit to the first subunit.

7. The method of claim 6, further comprising the steps of:
   threading a traversal of a third subunit through a loop of the second subunit to interlink the third subunit to the second subunit; and
   repeating the threading step for each subsequent subunit, such that the plurality of interlinked subunits is a set of repeating, interlinked subunits.

8. The method of claim 6, further comprising the step of:
   threading a traversal of a third subunit through a loop of the first subunit to interlink the third subunit to the first subunit.

9. The method of claim 6, further comprising the steps of:
   threading a traversal of the third subunit through the loop of the first subunit to interlink the third subunit to the first subunit; and
   threading the traversal of a third subunit through the loop of the second subunit to interlink the third subunit to the second subunit.

10. The method of claim 1, wherein the step of receiving the amount of the input material at the receiver further comprises the steps of:
    translating the amount of the input material in a direction away from the feeder via a feeder tube having a retractable tube tip; and
    receiving, via the receiver, the amount of the input material from the retractable tube tip of the feeder tube.

11. The method of claim 1, wherein the step of receiving the amount of the input material at the receiver further comprises the steps of:
    feeding the amount of the input material into the receiver by translating a hook and latch element of the receiver toward the amount of the input material issuing from the material feeder;
    retaining the amount of the input material by the hook and latch element; and
    translating the amount of the input material via the hook and latch element in the direction toward the receiver and away from the material feeder.

12. The method of claim 11, further comprising the steps of:
    translating the hook and latch element into and through a loop of at least one of the plurality of interlinked subunits; and
    translating the hook and latch element into and through a loop of another of the plurality of interlinked subunits, forming a new interlinked subunit of the plurality of interlinked subunits.

13. The method of claim 11, further comprising the steps of:
    releasing the amount of the input material by the hook and latch element; and
    translating the hook and latch element toward the material feeder, such that the step of feeding the input material into the stitch additive manufacturing machine can be repeated.

14. The method of claim 11, wherein the hook and latch element is a latch hook.

15. The method of claim 1, further comprising the steps of:
   contacting at least a portion of the incrementally produced 3D structure via a protruding end effector; and
   applying, via the protruding end effector, a directed force onto the portion of the incrementally produced 3D structure, such that a shape of the incrementally produced 3D structure can be manipulated.

* * * * *